United States Patent [19]

Elliott et al.

[11] Patent Number: 4,861,972

[45] Date of Patent: Aug. 29, 1989

[54] BAR CODE SCANNER AND METHOD OF PROGRAMMING

[75] Inventors: Randy D. Elliott; Nicolas N. Tabet, both of Eugene, Oreg.

[73] Assignee: Spectra-Physics, Inc., San Jose, Calif.

[21] Appl. No.: 116,962

[22] Filed: Nov. 5, 1987

[51] Int. Cl.⁴ .............................................. G06K 7/10
[52] U.S. Cl. .................................... 235/462; 235/375; 235/436; 364/709.11
[58] Field of Search ............... 235/462, 472, 375, 436; 364/709.11

[56] References Cited

U.S. PATENT DOCUMENTS 4,463,250  7/1984  McNeight et al. ............. 235/375 X
4,675,513  6/1987  Kuze ................................... 235/375

Primary Examiner—David L. Trafton
Attorney, Agent, or Firm—Killworth, Gottman, Hagan & Schaeff

[57] ABSTRACT

The scanner includes scanning circuitry for optically scanning bar code labels and providing an electrical signal in response thereto, decoding circuitry, responsive to the scanning circuitry for translating the electrical signal into a digital signal, and a microprocessor, responsive to the decoding circuitry, for controlling operation of the scanner and for translating the digital signal into data to be provided to the associated host computer under control of control characters. A non-volatile random access control memory is provided for storing control characters. Interface circuitry, connected to the host computer and to the microprocessor, transfers data from the microprocessor to the host computer. A switch enables the microprocessor to translate the digital signal into control characters and enables the microprocessor to store the control characters in the non-volatile random access control memory. The control characters may be character sets which when read by the scanner indicate that two bar code labels are associated with the same item.

12 Claims, 2 Drawing Sheets

BAR CODE SCANNER AND METHOD OF PROGRAMMING

BACKGROUND OF THE INVENTION

The present invention relates to a scanner and a method of programming a computer controlled bar code scanner and, more particularly, to such a scanner and method in which control data is supplied to a non-volatile memory in the scanner by scanning specially encoded bar code labels. The control data comprises character sets, which if read on two labels, indicate that the labels are affixed to the same product, and further indicate the ordering of the two labels. Any of a plurality of predetermined character sets may be used to provide an indication of a two label condition.

Laser scanners are known in which a beam of laser light is swept in a scan pattern to find and read a bar code printed on a surface which is presented to the scanner, such as for example a package label. Bar code labels are used on a broad range of retail packages for check-out and inventory purposes. A scanner, located for example at the check-out station in a retail establishment is used by a clerk automatically to enter product identification data into an associated computer system.

Typically such a scanner includes a laser source, such as a gas discharge laser, which produces a low power laser beam. The bea then passes through appropriate optical lenses and is swept across the package surface by a motor-driven, rotating mirror assembly. A portion of the light reflected from the package surface returns through the optical lenses to a detector which provides an electrical signal in dependence upon the level of the reflected light. A signal processing system in the scanner then analyses the electrical signal and translates the scanned characters into data which is transmitted to the host computer.

The computer then determines the total price of the products being purchased, as well as storing the identity of the purchased products for inventory and accounting purposes. The host computer may be located in the cash register associated with the scanner. Alternatively, a single host computer may service a number of scanners at the retail establishment.

A number of different bar codes have come into use. In some of these, it is possible for two labels to be applied to the same product, with all of the information defined by the labels relating to the product. It is important for the scanner system to be able to distinguish those pairs of scanned labels which are affixed to the same product and, also, which of the labels in each such pair is the "first" label and which of the labels is the "second" label. In EAN 13 code, for example, the first two characters on each label ae predetermined characters if the label is the first or second of a label pair affixed to the same product.

Each scanner typically includes a microprocessor which performs a number of functions, including recognizing the electrical signals produced when a label is scanned. Previously, the valid character set for indicating "first" and "second" labels where the labels are affixed to the same product have been stored in the random access memory of the microprocessor, or have been manually set by means of mechanical switches. Both approaches are disadvantageous. Either the character set cannot be easily changed, or the chacter set is not maintained in memory when the scanner is turned off and must be reloaded upon resumption of operation.

To avoid these difficulties, a scanner system has been developed in which a number of character sets may be stored in an electrically erasable programmable read only memory associated with the scanner microprocessor. Such a system is disclosed in U.S. patent application Ser. No. 122,743, filed Nov. 19, 1987, entitled BAR CODE SCANNER AND METHOD, assigned to the assignee of the present invention, which is incorporated herein by reference.

While tbhe character sets stored in the EEPROM of the scanner system may be programmed by means of the host computer, it is desireable for a scanner technician to be able to program the character sets described above by other means. This is particularly true where a number of scanners, all sharing a single host computer system, are being installed, or where one of the scanners is of a multiple scanner system is being serviced. By providing other means of programming the scanner, the host computer and the other scanners in the system are free to operate normally. A portable terminal specifically designed for this task and for simulating the host computer to a scanner is disclosed in copending U.S. Ser. No. 129,300, filed Dec. 17, 1987, entitled PORTABLE TERMINAL AND METHOD, assigned to the assignee of the present invention, which is incorporated herein by reference.

It will be appreciated that while using a portable terminal for programming and testing a scanner is easier than using a remotely located host computer for these tasks, nevertheless it may be desirable for a technician to be able to program the EEPROM memory of such a scanner without the use of a terminal of any sort. It is seen, therefore, that there is a need for a scanner which may be programmed without the use of a terminal, and for a method of programming such a scanner.

SUMMARY OF THE INVENTION

This need is met by a scanner for scanning bar code labels and for providing data related to a host computer according to the present invention. The scanner includes scanning means for optically scanning bar code labels and providing an electrical signal in response thereto, decoding means, responsive to the scanning means for translating the electrical signal into a digital signal, and microprocessor means, responsive to the decoding means, for controlling operation of the scanner and for translating the digital signal into data to be provided to the associated host computer under control of control characters. A non-volatile random access control memory is provided for storing control characters. An interface means, connected to the host computer and to the microprocessor means, transfers data from the microprocessor means to the host computer. A switch means enables the microprocessor means to translate the digital signal into control characters and enables the microprocessor to store the control characters in the non-volatile random access control memory.

The non-volatile random access control memory may comprise an electrically erasable programmable read only memory. The interface means may comprise an optically isolated interface. The non-volatile random access control memory may comprise an EEPROM memory device. The control characters are character sets which, when read by the scanner, indicate that two bar code labels are associated with the same item.

A scanner for scanning bar code labels on products presented to the scanner and for providing the data from the bar code labels to a host computer, includes scanning means for optically scanning bar code labels and providing an electrical signal in response thereto; decoding means, responsive to the scanning means, for translating the electrical signal into a digital signal; a non-volatile random access control memory in which a plurality of sets of control characters are stored, the sets of control characters defining characters which, if detected on a pair of successively scanned labels, indicate that the labels are affixed to the same product and further indicate which is the first and which is the second of the label pair; microprocessor means, responsive to the decoding means, for controlling operation of the scanner and for translating the digital signal into data to be provided to the associated host computer under control of control characters; interface means, connected to the host computer and to the microprocessor means, for transferring data from the microprocessor means to the host; and switch means for enabling the microprocessor means to translate the digital signal into control characters and for enabling the microprocessor to store the control characters in the non-volatile random access control memory.

The non-volatile random access control memory may comprise an electrically erasable programmable read only memory. The non-volatile random access control memory may comprise an EEPROM memory device. The non-volatile random access control memory may comprise a NOVRAM memory device.

The method of the present invention programs a bar code scanner of the type which optically scans bar code labels. The scanner includes a switch and a non-volatile control memory in which at least one set of control characters is stored. The set of control characters defines characters which, if detected on a pair of successively scanned labels, indicate that the labels are affixed to the same product and, further, indicate which is the first and which is the second of the label pair. Actuation of the switch indicates that control characters encoded on bar code labels which are scanned are to be stored in the non-volatile control memory.

The method comprises the steps of:
(a) providing at least one bar code label having sets of control characters encoded thereon,
(b) actuating the switch,
(c) scanning the one bar code label,
(d) storing the set of control characters in the control memory and,
(e) deactuating the switch.

The method of programming a scanner of the type which optically scans bar code labels, the scanner including a non-volatile control memory in which control characters are stored, comprises the steps of:
(a) providing a programming bar code label with control characters encoded thereon;
(b) scanning the programming bar code label with the scanner;
(c) transmitting the control characters to the scanner non-volatile control memory for storage therein.

The control characters are preferably character sets which read by the scanner indicate that two bar code labels are associated with the same item.

Accordingly, it is an object of the present invention to provide an improved bar code scanner and method of programming the scanner; to provide such a scanner and method in which the scanner is programmed to recognize character sets which indicate that products bear more than one label; and to provide such a scanner and method in which the scanner is programmed by means of properly encoded bar code labels.

Other objects and advantages of the invention will be apparent from the following description, the accompanying drawings and the appended claims.

DETAILED DESCRIPTION OF THE PREFERRED EMBODIMENTS

Figure 1:
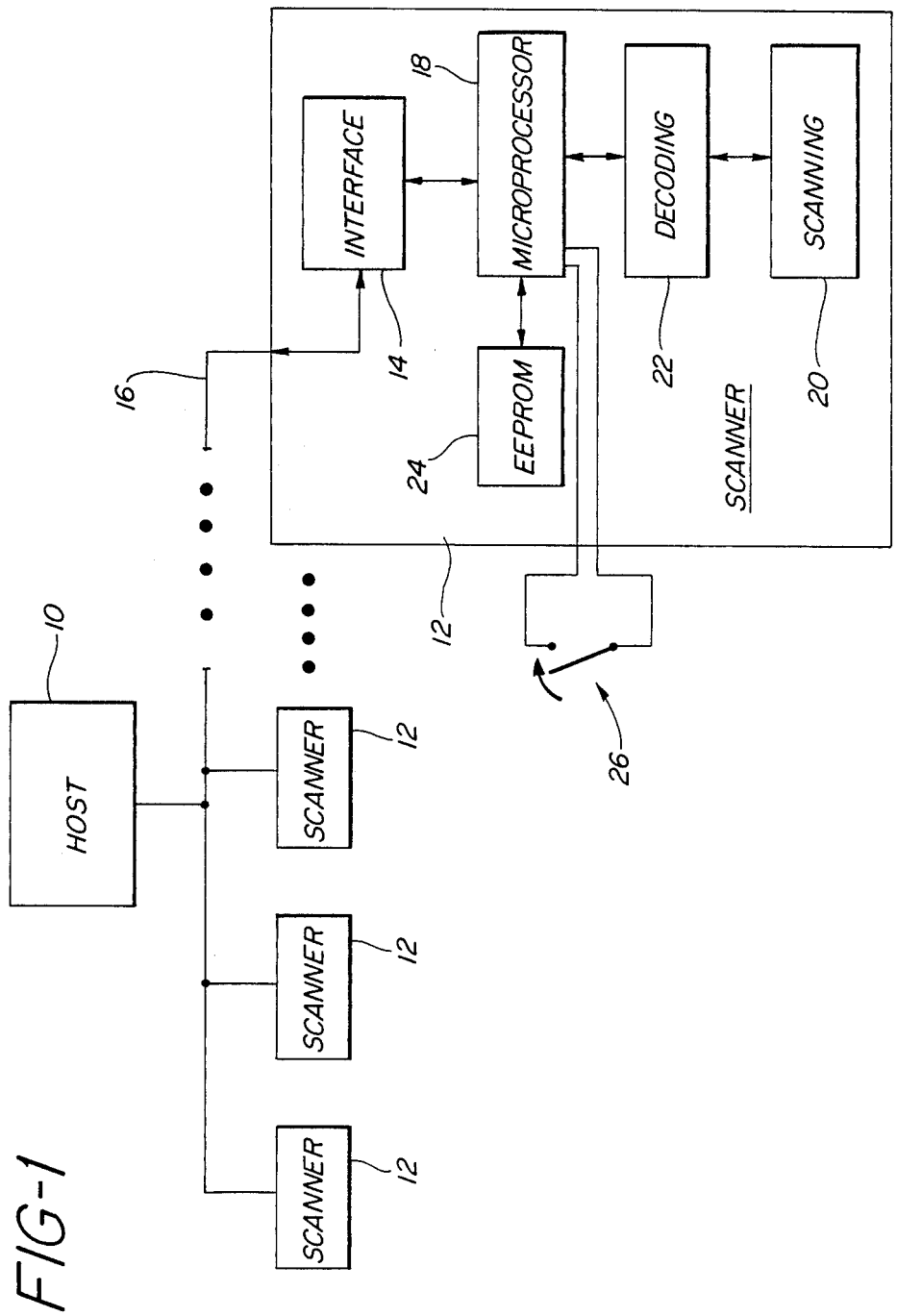
FIG. 1 is an electrical schematic diagram of a scanner system of the type which incorporates a number of scanners constructed according to the present invention.

Reference is made to FIG. 1 of the drawings which illustrates a scanner system constructed according to the present invention including a plurality of scanners 12 for scanning bar code labels and for providing data related thereto to a host computer 10. Since each of the scanners 12 are identical, the electrical system of only one of the scanners is shown in somewhat greater detail.

The scanner 12 includes interface circuitry 14 which communicates with the host computer over line 16. Line 16, although illustrated by a single line in FIG. 1, is actually a plurality of lines which provide for two way communication between hosst computer 10 and each of scanners 12, as described more fully in copending U.S. patent application Ser. No. 122,743, filed Nov. 19, 1987, entitled BAR CODE SCANNER AND METHOD. Transmission of data over line 16 is accomplished in a serial format.

A microprocessor means 18 is responsive to scanning circuitry 20 and decoding circuitry 22 for controlling operation of the scanner, identifying the characters on the scanned labels and transmitting the data produced by the scanning operation to the host computer 10 via interface means 14 over the line 16. Scanning means 20 optically scans bar code labels and provides an electrical signal in response thereto. Decoding means 22 is responsive to the scanning means 20 for translating the electrical signal into a digital signal. An example of such circuitry is shown in U.S. patent Ser. No. 063,538, filed June 18, 1987, entitled SIGNAL TRANSITION DETECTION METHOD AND SYSTEM.

A control memory comprising electrically erasable programmable read only memory (EEPROM) 24 communicates with the microprocessor 18 and stores a plurality of sets of control characters in a non-volatile manner. Other types of non-volatile random access memory devices may be utilized in place of the EEPROM, if desired, such as for example a NOVRAM. The scanner microprocessor 18 interprets the reading of labels bearing these control characters in predetermined positions on the labels as indicating that the labels are affixed to the same product, and that one of the labels if the "first" label of the pair and the other label is the "second" label of the pair.

In EAN 13 code the first two characters on each label provide an indication as to whether the label is one of two applied to a product and, if so, whether the label is the first or second of the pair of labels. A "21" appearing as the first two characters on a label, for example, may indicate that the label is the first of a pair affixed to a product. Similaly, a "22" appearing as the first two characters on a label may indicate that the label is the second of a pair affixed to the product.

The use of EEPROM 24 to store the control characters permit the scanner 12 to be programmed to recognize any desired control characters, and multiple sets of such characters as indicating a pair of labels on a single product. Further, the EEPROM 24 maintains the stored control characters in memory even when power to the scanner is terminated, but allows the stored control character sets to be easily verified or altered by the host computer 10.

In a large retail establishment, a single host computer 10 may service a great many scanners. When the scanners are installed or serviced, it may not be convenient to transmit the control characters to the scanner from the host computer, since this would interrupt the interactionof the host computer 10 with the balance of the scanners. Additionally, the host computer 10 may be physically located at a site remote from the scanner being service or installed, making the use of the host computer 10 somewhat inconvenient for purposes of inputting control characters at times when the technician is performing tests at the scanner location.

By means of the present invention, the technician may program control characters into memory 24 without the use of the host computer 10. A switch means, including switch 26, is provided for enabling the microprocessor 18 to translate the digital signal into control characters and for enabling the microprocessor 18 to store the control characters in the non-volatile random access control memory 24. Actuation of the switch 26 indicates that the characters encoded on bar code labels which are thereafter scanned are not data characters, but rather are control characters which are to be stored in the non-volatile control memory 24. When control characters are to be stored in memory 24, a bar code label having one or more sets of control characters encoded thereon is produced with an appropriate bar code printer. Next, switch 26 is actuated. The bar code label is then scanned, and the switch 26 is deactuated, indicating the conclusion of the scanning process and ensuring that further scanned labels are treated as carrying data characters which are to be supplied to host computer 10.

Figure 2:
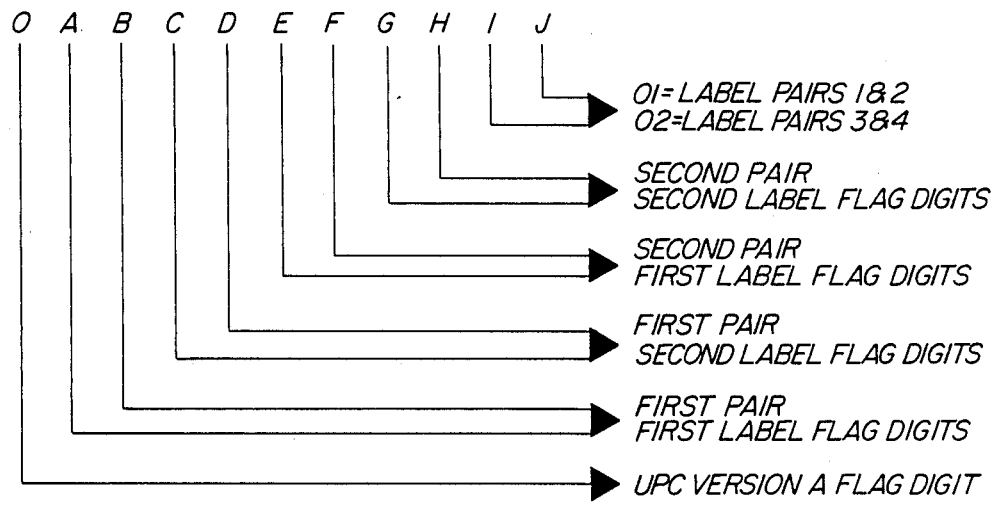
FIG. 2 is a chart which is useful in understanding the arrangement of control characters on a programming bar code label.
Figure 3A:
FIG. 3A illustrates an exemplary first programming-bar code label.
Figure 3B:
FIG. 3B illustrates an exemplary second programming bar code label.

FIGS. 2, 3A, and 3B illustrate the manner in which bar code labels, having sets of control characters encoded thereon, are configured. The characters of the bar code label are delineated from left to right on a label as characters "0", "A", "B", "C", "D", "E", "F", "G", "H", "I", and "J" in FIG. 2, with the significance of each character being given. In the illustrated embodiment, up to eight sets of control characters may be programmed by way of appropriately encoded labels, with the labels in the UPC Version A format, ad the character "0" will have a "0" value as signifying this fact. Characters "A" through "I" will each have a value of between zero and nine, and will have the significance indicated in the drawing. Characters "I" and "J" are zero and one, respectively when the specific label bears the first and second control character sets (otherwise referenced as "label pairs").

Perhaps an example would be helpful in this respect. Assume that it is desired to program the memory 24 such that scanning a label with the control characters "21" before or after scanning of a label with the control characters "22", "28", "29", or "30" results in a detection by the scanner 12 of a two-label condition, i.e. two labels affixed to the same product. Assume, further, that the label bearing the "21" control characters is to be recognized by the scanner as the "first" of the pair of labels and the label bearing any of the other control characters is to be recognized as the "second" of the pair of labels. Thus it is desired to program the following:

| Set | First Label | Second Label |
| --- | --- | --- |
| 1 | 21 | 22 |
| 2 | 21 | 28 |
| 3 | 21 | 29 |
| 4 | 21 | 30 |

The labels illustrated in FIGS. 3A and 3B are then printed. The switch 26 is actuated and the labels are scanned, with the order of scanning being immaterial since the encoded label pairs are indicated by characters "I" and "J". Finally, the switch 26 is deactuated. The control characters are now stored in memory 24, and the normal scanning operation of the scanner 12 may be resumed.

Microprocessor 18 preferably comprises an Intel 8039 microcomputer with an external 2732 EPROM providing storage of the softwareprogram which controls operation thereof, including the method of programming the memory 24 according to the present invention. A listing of exemplary software for performing the method of the present invention is as follows.

```
ISIS-II MCS-48/UPI-41 MACRO ASSEMBLER, V4.2
TEC 750SL BY RANDY ELLIOTT  7-23-87 07:00

LOC  OBJ      LINE      SOURCE STATEMENT                              SPR 011 P2
              1   ;***********************************************************
              2   ;   FILE: TECSL2.SRC   07-20-87 17:30 RANDY ELLIOTT
              3   ;
              4   ;   TEC 750SL TWO LABEL READ SCANNER PROGRAM (JAN13-JAN13 OR JAN13-JAN8).
              5   ;
              6   ;   S-P PART NUMBER  R96-0130 (SECOND 4K OF EPROM OF TOTAL PROGRAM)
              7   ;   EPROM PART NUMBER  0438-0800
              8   ;
              9   ;***********************************************************
             10 $      INCLUDE(:F3:HISTRY.SRC)
       =     11   ;***********************************************************
       =     12   ;   FILE: HISTRY.SRC  02-18-87 08:30  BOB ACTIS
       =     13   ;
       =     14   ;   IVRD53 - 750F IG DEMO, SP-OC, VERSION D3 W/ 2ND CHECK      MAY 1983
       =     15   ;
       =     16   ;   FVRD53 - 750F FT DEMO, SP-OC, VERSION D3 W/ 2ND CHECK      OCT 1983
```

```
=  17 ;
=  18 ; FTLR53 - 750F, TWO LABEL READ, JAN13-JAN13 OR JAN13-JAN-8 MAR 1986
=  19 ;
=  20 ; G2L053 - 750SL, TWO LABEL READ, AS ABOVE              FEB 1987
=  21 ;
=  22 ; TEC093 - 750SL TEC VERSION, TWO LABEL READ WITH EEPROM   APR 1987
=  23 ;
=  24 ; TEC193 - 750SL TEC VERSION, VERSION D WITH EEPROM        APR 1987
=  25 ;********************************************************************
   26 $     INCLUDE(:F2:FTDEFS.SRC)
=  27 ;********************************************************************
=  28 ; FILE: FTDEFS.SRC   10-27-83 13:50   BOB ACTIS
=  29 ;       MODIFIED     03-27-86         DREW TAUSSIG
=  30 ;       MODIFIED     08-21-86         ADD 2ND LABEL 2 FLAG (28 AND 29)
=  31 ;       MODIFIED     11-20-86 14:15   BOB ACTIS, ADDED 3RD LABEL 2, 22
=  32 ;       MODIFIED     02-18-87 08:35   CHANGED JUMPER SENSE FOR 750SL
=  33 ;       MODIFIED     03-19-87 09:00   750SL TEC CHANGES BY RANDY ELLIOTT
=  34 ;       MODIFIED     07-17-87 10:17   DELETE EAN13-EAN8 LABEL READ AND
=  35 ;                                     INCORPORATE EEPROM PROGRAMING FROM
=  36 ;                                     ENCODED UPC CODES READ FROM SCANNER.
=  37 ;********************************************************************
=  38 ;
=  39 ; *** SYSTEM DEFINITION ***
=  40 ;
=  41 ; PORT 1 DEFINITION:
=  42 ;
0001  =  43 ETEST   EQU   00000001B   ;P10-O-ENABLE TEST MODE
0002  =  44 ETMARK  EQU   00000010B   ;P11-O-TEST MARK
0002  =  45 EMTREB  EQU   00000010B   ;P11-O-ENABLE MOTOR
0004  =  46 EPRMDI  EQU   00000100B   ;P12-O-EEPROM_IN
0008  =  47 EPRMSK  EQU   00001000B   ;P13-O-EEPROM_SK
0010  =  48 ELASDB  EQU   00010000B   ;P14-O-DISABLE LASER
0020  =  49 EGDLT   EQU   00100000B   ;P15-O-ENABLE GOOD LIGHT
0040  =  50 EBDLT   EQU   01000000B   ;P16-O-ENABLE BAD LIGHT
0080  =  51 ETONE   EQU   10000000B   ;P17-O-TONE BIT (AC COUPLED)
=  52 ;
=  53 ; PORT 2 DEFINITION:
=  54 ;
0010  =  55 ESENT   EQU   00010000B   ;P24-I-SENT LINE OF LSI3/VLSI
0020  =  56 EUP2SP  EQU   00100000B   ;P25-I-MOTOR UP2SPD SIGNAL
0040  =  57 EVLSIR  EQU   01000000B   ;P26-I-VLSI POWER RESET*
0080  =  58 EPRMCS  EQU   10000000B   ;P27-O-EEPROM_CS
=  59 ;
=  60 ;********************************************************************
=  61 ; FRAME CONTROL ARRAY:
=  62 ;
=  63 ;     EXTERNAL MEMORY ADDRESSES
=  64 ;
0000  =  65 EPARRD  EQU   00H         ;R - PARITY BYTE
0001  =  66 ESRRD   EQU   01H         ;R - SEGMENT REGISTER
0001  =  67 EFRRST  EQU   01H         ;W - FRAME RESET (CLEARS SEGMENT)
0002  =  68 EOCIA   EQU   02H         ;R/W - OCIA REGISTERS
0003  =  69 EFCRST  EQU   03H         ;W - RESET FCA
0004  =  70 EPRDEC  EQU   04H         ;R - DECODED PARITY BYTE
0008  =  71 SWLATC  EQU   08H         ;R - DIP SWITCHES
=  72 ;DIPSWITCH DEFINITION
=  73 ;     DIPSW1-DIPSW2          VOLUME CONTROL
=  74 ;     DIPSW3                 INTERNAL/EXTERNAL SPEAKER
=  75 ;     DIPSW4          B0     TONE CONTROL
=  76 ;     DIPSW5          B1     TONE CONTROL
=  77 ;     DIPSW6          B6     SPARE
=  78 ;     DIPSW7          B2     TWO SCAN
=  79 ;     DIPSW8          B3     TWO SCAN
=  80 ;     DIPSW9          B5     EEPROM PROGRAM ENABLE VIA UPC CODE
=  81 ;     DIPSW10         B4     VERSION D/2-SCAN*
=  82 ;     JUMPER          B7     SPARE
=  83 ;
=  84 ;     PARITY DECODE BYTE
=  85 ;
000F  =  86 EDECOD  EQU   00001111B   ;0-9 IS DECODED DIGIT
000A  =  87 EDEC8L  EQU   00001010B   ;A IS 8L
000B  =  88 EDEC8R  EQU   00001011B   ;B IS 8R
000C  =  89 EDECAL  EQU   00001100B   ;C IS AL
000D  =  90 EDECAR  EQU   00001101B   ;D IS AR
000E  =  91 EDECBE  EQU   00001110B   ;E IS NOT USED
000F  =  92 EDECBF  EQU   00001111B   ;F IS "NO DECODE" (ERROR)
0010  =  93 EDECE   EQU   00010000B   ;E-TAG
0020  =  94 EDECD   EQU   00100000B   ;D-TAG
0040  =  95 EDECBK  EQU   01000000B   ;BACKWARD CAPTURE
0080  =  96 EDECB7  EQU   10000000B   ;NOT USED. ALWAYS=1.
=  97 ;
=  98 ;     SHIFT REGISTER READ
=  99 ;
000F  = 100 ESRCHR  EQU   00001111B   ;BCD CHARACTER
0010  = 101 ESR4CH  EQU   00010000B   ;4-CHAR CAPTURE
0020  = 102 ESRF13  EQU   00100000B   ;FRAME 1 TO 3 CAPTURE
0040  = 103 ESRPER  EQU   01000000B   ;PERIODICAL CAPTURE
0080  = 104 ESRSDT  EQU   10000000B   ;SDATA BYTE AVAILABLE
= 105 ;********************************************************************
= 106 ; FLAG REGISTERS:
= 107 ;
```

```
                  = 108 ;     RB0-R4  SCAN FLAGS
                  = 109 ;
0001              = 110 ESCNG   EQU     00000001B       ;SCANNING (FLAG CKFCA TO GET SEGMENTS)
0002              = 111 T2LNOK  EQU     00000010B       ;NOT USED
0004              = 112 EAMBMS  EQU     00000100B       ;ENABLE AMB LABEL MESSAGE
0008              = 113 ESBFUL  EQU     00001000B       ;SEND BUFFER HAS DATA TO SEND
0010              = 114 ER4B4   EQU     00010000B       ;NOT USED
0020              = 115 EBFREQ  EQU     00100000B       ;BUFMAN REQUEST FLAG
0040              = 116 ER4B6   EQU     01000000B       ;NOT USED
0080              = 117 ER4B7   EQU     10000000B       ;ERROR FLAG FOR TWO LABEL READ
                  = 118 ;
                  = 119 ;  RB0-R6  VERSION POINTER/FLAG
                  = 120 ;
0000              = 121 EVER00  EQU     00H             ;NO VALID VERSIONS
0001              = 122 EVERA   EQU     01H             ;UPC-A
0002              = 123 EVER13  EQU     02H             ;EAN-13
0003              = 124 EVERE   EQU     03H             ;UPC-E
0004              = 125 EVER8   EQU     04H             ;EAN-8
0005              = 126 EVTL8   EQU     05H             ;TWO LABEL READ (JAN13-JAN8)
0006              = 127 EVTL13  EQU     06H             ;TWO LABEL READ (JAN13-JAN13)
0007              = 128 EVERAM  EQU     07H             ;AMBIGUOUS 2-LABEL READ
                  = 129 ;
                  = 130 ;
0010              = 131 ER6B4   EQU     00010000B       ;FLAG COUNTER (B0-TWO LABEL READ)
0020              = 132 ER6B5   EQU     00100000B       ;FLAG COUNTER (B1-TWO LABEL READ)
0040              = 133 ER6B6   EQU     01000000B       ;FLAG COUNTER (B2-TWO LABEL READ)
0080              = 134 ER6B7   EQU     10000000B       ;NOT USED
                  = 135 ;
                  = 136 ;EEPROM OPCODES
0080              = 137 OPREAD  EQU     80H             ;READ REGISTER
0030              = 138 EWEN    EQU     30H             ;ERASE/WRITE ENABLE
0020              = 139 ERAL    EQU     20H             ;ERASE ALL
0040              = 140 OWRITE  EQU     40H             ;WRITE REGISTER
0000              = 141 EWDS    EQU     00H             ;ERASE/WRITE DISABLE
00C0              = 142 ERASE   EQU     0C0H            ;ERASE REGISTER
                  = 143 ;*******************************************************************
                  = 144 ;  MISC. CONSTANTS:
                  = 145 ;
0032              = 146 E1000M  EQU     50              ;1.00 SEC (100 CENTI-SECONDS)
                  = 147 ;
0008              = 148 EGDTON  EQU     8               ;GOOD TONE ON TIME
0028              = 149 EBDTON  EQU     40              ;BAD TONE ON TIME
                  = 150 ;
0014              = 151 ETONCT  EQU     20              ;TONE COUNT (CYCLES/10MS)
FFFA              = 152 ETONFQ  EQU     -6              ;TONE FREQUENCY CONSTANT (500US)
                  = 153 ;
0045              = 154 ESEN    EQU     045H            ;SCAN ENABLE CHAR (LAST CHAR E)
00C4              = 155 ESDIS   EQU     0C4H            ;SCAN DISABLE CHAR (LAST CHAR D)
00C1              = 156 EAMESE  EQU     0C1H            ;ENABLE AMB LABEL MESS (LAST CHAR A)
00C2              = 157 EAMESD  EQU     0C2H            ;DISABLE AMB LABEL MESS (LAST CHAR B)
0089              = 158 STRAM1  EQU     089H            ;WRITE 'TWO LABEL' SETTINGS TO RAM ('I')
00C7              = 159 WRPRM1  EQU     0C7H            ;WRITE 'TWO LABEL' SETTINGS TO EEPROM ('G')
00C8              = 160 TRPRM1  EQU     0C8H            ;READ EEPROM 'TWO LABEL' SETTINGS ('H')
004A              = 161 TRPRM2  EQU     04AH            ;READ 'TWO LABEL' SETTINGS FROM RAM ('J')
00CB              = 162 SWSET1  EQU     0CBH            ;READ CURRENT SCANNER CONFIGURATION FROM RAM ('K')
008C              = 163 OVRST1  EQU     08CH            ;OVERIDE SCANNER SETTINGS ('L')
                  = 164 ;
0040              = 165 EBIT6   EQU     01000000B       ;LAST CHAR BIT FOR HOST DATA
000A              = 166 EMISCN  EQU     0DAH            ;MISSCAN CHARACTER (LAST CHAR Z)
00BB              = 167 EMSNBY  EQU     0BBH            ;MISSCAN BYTE FOR SEND BUFFER
00CC              = 168 ETRMBY  EQU     0CCH            ;TERMINATION BYTE FOR SEND BUFFER
0058              = 169 EAMBIG  EQU     058H            ;AMBIGUOUS 2 LABEL READ (LAST CHAR X)
000D              = 170 EAMBBY  EQU     0DDH            ;AMBIGUOUS READ BYTE FOR SEND BUFFER
00AA              = 171 ETL1BY  EQU     0AAH            ;2-LABEL INTER-LABEL TERMIN BYTE (SBUF)
                  = 172 ;
                  = 173 ;  FLATTOP TIME CONSTANTS
                  = 174 ;
000E              = 175 EWAIT   EQU     14              ;VALUE FOR "NO SEGS" WAIT
0056              = 176 EGDLTW  EQU     100-EWAIT       ;GD-LT ON WAIT CONSTANT
0024              = 177 EDRDLY  EQU     50-EWAIT        ;DOUBLE READ WAIT CONSTANT
0002              = 178 FACTOR  EQU     2               ;TIMER FACTOR 10/20MS TIMER ROUTINES
                  = 179 ;
                  = 180 ;  TWO LABEL READ CONSTANTS
                  = 181 ;
                  = 182 ;  SET BITS FOR 2-LABEL READ STATUS REGISTERS
                  = 183 ;
007F              = 184 SETL11  EQU     01111111B       ;LEFT HALF LABEL 1
00BF              = 185 SETL12  EQU     10111111B       ;LEFT HALF LABEL 1 - SECOND READ
00DF              = 186 SETL21  EQU     11011111B       ;LEFT HALF LABEL 2
00EF              = 187 SETL22  EQU     11101111B       ;LEFT HALF LABEL 2 - SECOND READ
00F7              = 188 SETR11  EQU     11110111B       ;RIGHT HALF LABEL 1
00FB              = 189 SETR12  EQU     11111011B       ;RIGHT HALF LABEL 1 - SECOND READ
00FD              = 190 SETR21  EQU     11111101B       ;RIGHT HALF LABEL 2
00FE              = 191 SETR22  EQU     11111110B       ;RIGHT HALF LABEL 2 - SECOND READ
                  = 192 ;
00FF              = 193 E2SCN   EQU     11111111B       ;MASK VALUE FOR 2-SCAN REQUIREMENT
00AA              = 194 EN2SCN  EQU     10101010B       ;MASK VALUE FOR 1-SCAN REQUIREMENT
00AF              = 195 EN12SN  EQU     10101111B       ;MASK VALUE FOR ENHANCED 2-SCAN REQUIREMENT
                  = 196 ;
                  = 197 ;
                  = 198 ;  TWO LABEL READ TIME CONSTANTS - DISABLE SCANNING AFTER AMBIGUOUS
```

```
                 = 199 ; READ
                 = 200 ;
000C             = 201 EAMBWT  EQU     12                      ;BAD LIGHT ON (OFF) TIME (CENTI-SECS)
000C             = 202 EAMBCY  EQU     12                      ;# OF BAD LIGHT FLASH CYCLES
                 = 203 ;
                 = 204 ; NOTE: TOTAL TIME SCANNER IS DISABLED AFTER AMBIGUOUS READ IS
                 = 205 ;      (EAMBWT*2 * EAMBCY) / 100  SECONDS ( APPROX. 3 SECONDS HERE)
                 = 206 ;TONE CONSTANTS
000A             = 207 ETNCT1  EQU     00AH                    ;CYCLE COUNT FOR 500HZ
000F             = 208 ETNCT2  EQU     00FH                    ;CYCLE COUNT FOR 730HZ
0014             = 209 ETNCT3  EQU     014H                    ;CYCLE COUNT FOR 960HZ
001C             = 210 ETNCT4  EQU     01CH                    ;CYCLE COUNT FOR 1370HZ
00F4             = 211 ETNFQ1  EQU     0F4H                    ;FREQUENCY FOR 500HZ
00F8             = 212 ETNFQ2  EQU     0F8H                    ;FREQUENCY FOR 730HZ
00FA             = 213 ETNFQ3  EQU     0FAH                    ;FREQUENCY FOR 960HZ
00FC             = 214 ETNFQ4  EQU     0FCH                    ;FREQUENCY FOR 1370HZ
                 = 215 ;****************************************************************
                 = 216 ;
                 = 217 ; RAM POINTERS AND CONSTANTS USED IN THE HORSE TEST
                 = 218 ;
0030             = 219 TSEG1   EQU     30H                     ;SEGMENT BUFFER
0034             = 220 TSEG2   EQU     34H
                 = 221 ;
0038             = 222 TCNT1   EQU     38H                     ;SEGMENT COUNTER
003A             = 223 TCNT2   EQU     3AH
                 = 224 ;
0050             = 225 TSCBUF  EQU     50H                     ;FCA READ BUFFER
0001             = 226 EHCNTL  EQU     001H                    ;HORSE CONTROL BYTE
                 = 227 ;****************************************************************
                 = 228 ; DATA MEMORY MAP - RAM - 8039 NEEDED
                 = 229 ;
                 = 230 ;     REGISTER BANK 0  (NON-INTERRUPT USEAGE)
0000             = 231         ORG     000H
0000             = 232 MRB0:   DS      4                       ;R0 TO R3 - SCRATCH
0004             = 233 SCNFLG: DS      1                       ;R4 - SCAN FLAGS
0005             = 234 DRTIMR: DS      1                       ;R5 - DOUBLE READ TIMER
0006             = 235 VERFLG: DS      1                       ;R6 - VERSION POINTER/FLAG
0007             = 236 TIMREG: DS      1                       ;R7 - GENERAL PURPOSE TIMER/COUNTER
                 = 237 ;
                 = 238 ;     STACK AREA
0008             = 239 STACK:  DS      16                      ;8 LEVELS OF SUBROUTINES ALLOWED
                 = 240 ;
                 = 241 ;     REGISTER BANK 1  (INTERRUPT USEAGE)
0018             = 242 MRB1:   DS      4                       ;R0 TO R3 - SCRATCH (NOT USED)
001C             = 243 MRB1R4: DS      1                       ;R4 - NOT USED
001D             = 244 TONCNT: DS      1                       ;R5 - TONE CYCLE COUNTER (CYCLES/10MS)
001E             = 245 TONLTH: DS      1                       ;R6 - TONE LENGTH COUNTER
001F             = 246 TASAVE: DS      1                       ;R7 - TIMER "A" SAVE REGISTER
                 = 247 ;
                 = 248 ;     FREE MEMORY AREA
                 = 249 ;
                 = 250 ;     SEGMENT BUFFERS
0020             = 251 SEGBUF  EQU     $
0020             = 252 RCRAM   EQU     $                       ;16 BYTES FOR 2 LABEL SCRATCH PAD
0020             = 253 SCNBUF: DS      4                       ;SCAN BUFFER
                 = 254 ;
0024             = 255 BF6CST  EQU     $
0024             = 256 L6S1:   DS      4                       ;SCAN 1 BUFFER
0028             = 257 L6S2:   DS      4                       ;SCAN 2 BUFFER
002C             = 258 L6SCNT: DS      1                       ;PACKED SCAN COUNTER (SCAN2/SCAN1)
002D             = 259 L6STOT: DS      1                       ;TOTAL COUNTER
                 = 260 ;
002E             = 261 R6S1:   DS      3
0031             = 262 R6S2:   DS      3
0034             = 263 R6SCNT: DS      1
0035             = 264 R6STOT: DS      1
0012             = 265 BF6CNT  EQU     $-BF6CST
                 = 266 ;
0036             = 267 BF4CST  EQU     $
0036             = 268 L4S1:   DS      2
0038             = 269 L4S2:   DS      2
003A             = 270 L4SCNT: DS      1
003B             = 271 L4STOT: DS      1
                 = 272 ;
003C             = 273 R4S1:   DS      2
003E             = 274 R4S2:   DS      2
0040             = 275 R4SCNT: DS      1
0041             = 276 R4STOT: DS      1
                 = 277 ;
000C             = 278 BF4CNT  EQU     $-BF4CST
                 = 279 ;
                 = 280 ; TWO LABEL READ STORAGE AREAS
                 = 281 ;
0042             = 282 STTL13: DS      1                       ;JAN13-JAN13 2 LABEL READ STATUS
0043             = 283 STTL8:  DS      1                       ;JAN13-EAN8 2 LABEL READ STATUS
0044             = 284 ERRTL:  DS      1                       ;ERROR FLAG FOR 2-LABEL READ
0045             = 285 CXSUML: DS      1                       ;LEFT SEGMENT HALF CHECK SUMS
0046             = 286 CXSUMR: DS      1                       ;RIGHT SEGMENT HALF CHECKSUMS
                 = 287 ;
                 = 288 ;     SEND BUFFER
                 = 289 ;
```

```
0047            = 290 SBFPNT: DS      1              ;POINTER
                = 291 ;
0048            = 292 SBUFAD  EQU     $              ;FIRST DATA BYTE ADDRESS
0048            = 293 SBUF:   DS      18             ;DATA BUFFER
0090            = 294 SBSTRT  EQU     2*SBUF         ;PACKED BUFFER START POINTER
0012            = 295 SBUFSZ  EQU     $-SBUF         ;BYTES IN SEND BUFFER
0059            = 296 SBFEND  EQU     $-1            ;LAST RAM LOCATION IN BUFFER
                = 297 ;
                = 298 ; WORK AREA USED BY EM0010 ROUTINE
005A            = 299 WRKBUF: DS      3
                = 300 ;
                = 301 ; DOUBLE READ LABEL DATA SUM LOCATION
005D            = 302 DRSUM:  DS      1
                = 303 ;
                = 304 ;2 LABEL READ SUPPORT
005E            = 305 STSOTA: DS      1              ;COMMAND BYTE
005F            = 306 SWISET: DS      1              ;SWITCH SETTINGS
0060            = 307 INTSTR: DS      1              ;SCRATCH PAD STORAGE FOR R1 (TIMER INTERUPT)
0061            = 308 TWOLAB: DS      16             ;TWO LABEL READ FLAGS
0070            = 309 LSTUSD  EQU     $-1            ;LAST USED RAM LOCATION
                  310 ; FVECTR.SRC INCLUDES FTIMER.SRC
                  311 $      INCLUDE(:F3:FVECTR.SRC)
                = 312 ;****************************************************************
                = 313 ; FILE: FVECTR.SRC   11-18-86 12:00  BOB ACTIS
                = 314 ;
                = 315 ; RESET AND INTERRUPT VECTORS
                = 316 ;
0000            = 317         ORG     000H           ;RESET TRAP
0000 E5         = 318 RSTTRP: SEL     MB0
0001 64A4       = 319         JMP     POWUP          ;GO START PROGRAM
                = 320 ;
0003            = 321         ORG     003H           ;EXTERNAL INTERRUPT TRAP
0003 93         = 322 INTTRP: RETR                   ;RETURN FROM SPURIOUS INTERRUPTS
                = 323 ;
0007            = 324         ORG     007H           ;INTERNAL TIMER INTERRUPT TRAP
0007            = 325 TIMTRP  EQU     $              ;GO TO TIMER ROUTINE
                = 326 $       INCLUDE(:F3:FTIMER.SRC)
                1= 327 ;****************************************************************
                1= 328 ; FILE: FTIMER.SRC  03-15-87 24:00  RANDY ELLIOTT  (TEC MOD.)
                1= 329 ; FUNCTION:  IF NO TONE IN PROGRESS, DECREMENT RB0-R7 UNTIL 0.
                1= 330 ;            IF TONE IN PROGRESS, DECREMENT RB1-R6 UNTIL 0.
                1= 331 ; ENTRY: RB1-R6 = TONE LENGTH IN 10'S OF MS.
                1= 332 ;        RB0-R5 = DOUBLE READ TIMER COUNTER
                1= 333 ;        RB0-R7 = GENERAL PURPOSE TIMER COUNTER
                1= 334 ; EXIT:  RB1-R7 = ACCUMULATOR SAVE
                1= 335 ;        RB1-R5 = TONE CYCLE COUNTER
                1= 336 ;        RB1-R6 = DECREMENTED UNTIL 0
                1= 337 ;        RB0-R5 = DECREMENTED UNTIL 0
                1= 338 ;        RB0-R7 = DECREMENTED UNTIL 0
0007 D5         1= 339 TIMER:  SEL     RB1
0008 AF         1= 340         MOV     R7,A           ;SAVE A
                1= 341 ;SAVE R1 IN RAM SO AS TO RESTORE WHEN EXITING INTERUPT.
0009 F9         1= 342         MOV     A,R1
000A B960       1= 343         MOV     R1,#INTSTR     ;SET RAM POINTER
000C A1         1= 344         MOV     @R1,A          ;SAVE R1 (RB1)
                1= 345 ;
000D FE         1= 346         MOV     A,R6           ;GET TONE COUNTER
000E 9623       1= 347         JNZ     TIME30         ;JUMP IF TONE IN PROGRESS
0010 C5         1= 348         SEL     RB0
0011 FF         1= 349         MOV     A,R7
0012 C615       1= 350         JZ      TIME05         ;JUMP IF TIMER COUNTER IS 0
0014 CF         1= 351         DEC     R7
0015 FD         1= 352 TIME05: MOV     A,R5
0016 C619       1= 353         JZ      TIME10         ;JUMP IF DOUBLE READ TIMER IS 0
0018 CD         1= 354         DEC     R5
0019 2383       1= 355 TIME10: MOV     A,#-(250/FACTOR)   ;10MS/80US = 125
001B 62         1= 356 TIME20: MOV     T,A            ;SET TIMER COUNTER
001C D5         1= 357         SEL     RB1
                1= 358 ;RESTORE ACCUMULATOR AND R1 (RB1) BEFORE RETURNING.
001D B960       1= 359         MOV     R1,#INTSTR     ;SET RAM POINTER
001F F1         1= 360         MOV     A,@R1          ;RETRIEVE R1 (RB1) FROM RAM
0020 A9         1= 361         MOV     R1,A           ;RESTORE R1
0021 FF         1= 362         MOV     A,R7           ;RESTORE A
0022 93         1= 363         RETR
0023 09         1= 364 TIME30: IN      A,P1           ;GET TONE BIT
0024 997F       1= 365         ANL     P1,#255-ETONE  ;SET TONE BIT LOW
0026 F22A       1= 366         JB7     TIME40         ;JUMP IF TONE BIT WAS HIGH
0028 8980       1= 367         ORL     P1,#ETONE      ;SET TONE BIT HIGH
                1= 368 TIME40:
002A ED3A       1= 369         DJNZ    R5,TIME60      ;JUMP IF NOT 10MS YET
                1= 370 ;SET TONE CYCLE COUNTER ACCORDING TO RAM (SWITCH SETTINGS)
002C B4AF       1= 371         CALL    TON1CT         ;SET TONE CYCLE COUNTER (R5)
                1= 372 ;
002E C5         1= 373         SEL     RB0
002F FF         1= 374         MOV     A,R7
0030 C633       1= 375         JZ      TIME50
0032 CF         1= 376         DEC     R7
0033 D5         1= 377 TIME50: SEL     RB1
0034 EE3A       1= 378         DJNZ    R6,TIME60      ;JUMP IF TONE NOT FINISHED
0036 8980       1= 379         ORL     P1,#ETONE      ;LEAVE TONE LINE HIGH
0038 0419       1= 380         JMP     TIME10
```

```
                1= 381 TIME60:
                1= 382 ;SET TONE FREQUENCY CONSTANT ACCORDING TO SWITCH SETTING
003A B95F       1= 383        MOV    R1,#SWISET         ;SET RAM POINTER
003C F1         1= 384        MOV    A,@R1              ;RETRIEVE SWITCH SETTING
003D 5303       1= 385        ANL    A,#03H             ;MASK ALL BUT TONE BITS
003F 0344       1= 386        ADD    A,#LOW FREQAD      ;SET EPROM ADDRESS FETCH
0041 A3         1= 387        MOVP   A,@A               ;GET TONE FREQUENCY
0042 041B       1= 388        JMP    TIME20
                1= 389 ;
0044            1= 390 FREQAD EQU    $
0044 F4         1= 391        DB     ETNFQ1             ;TONE FREQUENCY FOR 500HZ
0045 F8         1= 392        DB     ETNFQ2             ;TONE FREQUENCY FOR 730HZ
0046 FA         1= 393        DB     ETNFQ3             ;TONE FREQUENCY FOR 960HZ
0047 FC         1= 394        DB     ETNFQ4             ;TONE FREQUENCY FOR 1370HZ
                1= 395 ;
                   396 $      INCLUDE(:F3:CK4HRS.SRC)
                 = 397 ;****************************************************************
                 = 398 ; FILE: CK4HRS.SRC  7-07-86 15:05  BOB ACTIS
                 = 399 ; FUNCTION: CHECK SDATA FOR THE HORSE CONTROL BYTE
                 = 400 ; ENTRY: NO SETUP
                 = 401 ; EXIT: USES R0,A
                 = 402 ;       GOES INTO HORSE TEST IF CONTROL BYTE IS RECEIVED
                 = 403 ;
0048 864B        = 404 CK4HRS: JNI   CK4H20             ;JUMP IF FCA HAS DATA
004A 83          = 405 CK4H10: RET
                 = 406 ;
004B B801        = 407 CK4H20: MOV   R0,#ESRRD
004D 80          = 408         MOVX  A,@R0              ;READ BYTE
004E F252        = 409         JB7   CK4H30             ;JUMP IF SDATA
0050 90          = 410         MOVX  @R0,A              ;RESET FRAME CAPTURE
0051 83          = 411         RET
                 = 412 ;
0052 B802        = 413 CK4H30: MOV   R0,#EOCIA
0054 80          = 414         MOVX  A,@R0              ;GET SDATA
0055 D3D1        = 415         XRL   A,#EHCNTL
0057 964A        = 416         JNZ   CK4H10             ;JUMP IF NOT HORSE CONTROL BYTE
0059 E467        = 417         JMP   SDATAH             ;GO ENTER THE HORSE TEST
                   418 $       INCLUDE(:F2:FLGMTC.SRC)
                 = 419 ;****************************************************************
                 = 420 ;**                  Subroutine FLGMTC                         **
                 = 421 ;** Function: Check label flag sets to match read label flags  **
                 = 422 ;** Date: 3-18-87                                              **
                 = 423 ;** Subroutines Called: None                                   **
                 = 424 ;** Registers/Flags affected: R0, R1, *R0, R2, ACCUMULATOR     **
                 = 425 ;** Ports affected: None                                       **
                 = 426 ;** RAM locations affected: None                               **
                 = 427 ;****************************************************************
                 = 428 ;ON ENTRY IF R3=0 THEN WE HAVE EAN13-EAN8 OTHERWISE WE HAVE EAN13-EAN13 PAIR
                 = 429 FLGMTC:
005B D5          = 430         SEL   RB1                ;SELECT REGISTER BANK 1
005C B861        = 431         MOV   R0,#TWOLAB         ;SET RAM POINTER TO RAM FLAGS
005E C5          = 432         SEL   RB0                ;SELECT REGISTER BANK 0
005F BA08        = 433         MOV   R2,#8              ;LABEL SET COUNTER
                 = 434 ;GET LABEL FLAGS READ FROM SCANNER
                 = 435 GTSFLG:
0061 D5          = 436         SEL   RB1                ;SELECT REGISTER BANK 1
0062 F0          = 437         MOV   A,@R0              ;CHECK RAM FOR FLAGS TO CHECK AGAINST
0063 C5          = 438         SEL   RB0                ;SELECT REGISTER BANK 0
0064 37          = 439         CPL   A                  ;CHECK ACCUMULATOR FOR FF
0065 C690        = 440         JZ    NFLGMC             ;JUMP IF RAM HAD FF
                 = 441 ;
0067 B824        = 442         MOV   R0,#L6S1           ;SET RAM POINTER TO LEFT HALF OF FIRST LABEL
0069 F5          = 443         SEL   MB1
006A 349C        = 444         CALL  GETFLG             ;GET LABEL 1 FLAGS
006C E5          = 445         SEL   MB0
006D D5          = 446         SEL   RB1                ;SELECT REGISTER BANK 1
006E D0          = 447         XRL   A,@R0              ;COMPARE FLAG SETS
006F C5          = 448         SEL   RB0                ;SELECT REGISTER BANK 0
0070 9688        = 449         JNZ   NXTSET             ;JUMP IF NOT LABEL 1 FLAG MATCH
0072 D5          = 450         SEL   RB1                ;SELECT REGISTER BANK 1
0073 18          = 451         INC   R0                 ;CHECK LABEL 2 FLAGS
0074 C5          = 452         SEL   RB0                ;SELECT REGISTER BANK 0
0075 FB          = 453         MOV   A,R3               ;CHECK IF WHAT TYPE 2ND LABEL
0076 C680        = 454         JZ    E82NDL             ;JUMP IF EAN8 SECOND LABEL
0078 B828        = 455         MOV   R0,#L6S2           ;SET RAM POINTER TO LEFT HALF OF SECOND LABEL
007A F5          = 456         SEL   MB1
007B 349C        = 457         CALL  GETFLG             ;GET LABEL 2 FLAGS
007D E5          = 458         SEL   MB0
007E 0483        = 459         JMP   CMPFLG
0080 B836        = 460 E82NDL: MOV   R0,#L4S1           ;SET RAM POINTER TO LEFT HALF OF 4 SEG. BUFFER
0082 F0          = 461         MOV   A,@R0              ;GET LABEL 2 FLAGS
0083 D5          = 462 CMPFLG: SEL   RB1                ;SELECT REGISTER BANK 1
0084 D0          = 463         XRL   A,@R0              ;COMPARE FLAG SETS
0085 C5          = 464         SEL   RB0                ;SELECT REGISTER BANK 0
0086 9688        = 465         JNZ   NXTSET             ;JUMP IF NOT LABEL 2 MATCH
                 = 466 ;WE HAVE A MATCH.
0088 27          = 467         CLR   A                  ;SET ACCUMULATOR TO SHOW GOOD READ
0089 0492        = 468         JMP   RTNFLG             ;JUMP TO RETURN
008B D5          = 469 NXTSET: SEL   RB1                ;SELECT REGISTER BANK 1
008C 18          = 470         INC   R0                 ;INCREMENT RAM POINTER
008D C5          = 471         SEL   RB0                ;SELECT REGISTER BANK 0
```

```
008E EA61      = 472         DJNZ    R2,GTSFLG            ;DECREMENT LABEL COUNTER AND CHECK FOR ZERO
               = 473 ;
0090 2302      = 474 NFLGMC: MOV     A,#2                 ;SIGNIFY BAD READ
0092 83        = 475 RTNFLG: RET
               = 476 $       INCLUDE(:F3:TREPRM.SRC)
               = 477 ;*********************************************************************
               = 478 ;**                    Subroutine TREPRM                            **
               = 479 ;** Function: Transmit EEPROM contents to Host or transmit Ram contents **
               = 480 ;** Date: 3-4-87                                                    **
               = 481 ;** Subroutines Called: RDEPRM, SOCIA, PARITY                       **
               = 482 ;** Registers/Flags affected: *R2, ACCUMULATOR, R0, F0, CARRY, R1, R2, R3,*R1*
               = 483 ;** Ports affected: P2, P1                                          **
               = 484 ;** RAM locations affected: EXT. RAM EOCIA(VLSI), @*R1 TO @*R1+16   **
               = 485 ;*********************************************************************
               = 486 TREPRM:
               = 487 ;READ EEPROM TO SCRATCH PAD RAM (16 BYTES PACKED)
               = 488         ;SET RAM POINTER TO TRANSFER EEPROM DATA TO.
0093 D5        = 489         SEL     RB1                  ;SELECT REGISTER BANK 1
0094 F9        = 490         MOV     A,R1                 ;RETRIEVE RAM POINTER FROM *R1
0095 C5        = 491         SEL     RB0                  ;SELECT REGISTER BANK 0
0096 A9        = 492         MOV     R1,A                 ;SET RAM POINTER
               = 493 ;
0097 54B0      = 494         CALL    RDEPRM               ;TRANSFER EEPROM DATA TO RAM.
               = 495 ;CHECK THAT EEPROM HAS BEEN PROGRAMMED. ;SET UP HEADER CHARACTER.
               = 496         ;SET RAM POINTER TO TRANSFER EEPROM DATA TO.
               = 497 TRRAM:
0099 D5        = 498         SEL     RB1                  ;SELECT REGISTER BANK 1
009A F9        = 499         MOV     A,R1                 ;RETRIEVE RAM POINTER FROM *R1
009B C5        = 500         SEL     RB0                  ;SELECT REGISTER BANK 0
009C A9        = 501         MOV     R1,A                 ;SET RAM POINTER
               = 502 ;
009D F1        = 503         MOV     A,@R1                ;READ RAM
009E 37        = 504         CPL     A
009F 96A7      = 505         JNZ     PDATA                ;IF NOT ZERO, WE HAVE DATA IN RAM. JUMP SEND DATA.
               = 506 ;NO DATA IS IN EEPROM. SEND HEADER CHARACTER WITH LAST BYTE BIT SET HIGH.
00A1 23C7      = 507         MOV     A,#0C7H              ;HEADER CHAR. 'G' WITH LAST BYTE BIT SET.
00A3 34EB      = 508         CALL    SOCIA                ;TRANSFER ACCUMULATOR TO VLSI CHIP OCIA BUFFER.
00A5 04E3      = 509         JMP     TXRET                ;JUMP TO RETURN. EXIT ROUTINE.
               = 510 ;LABEL FLAGS ARE IN RAM. SEND HEADER CHARACTER.
00A7 2307      = 511 PDATA:  MOV     A,#07H               ;HEADER CHAR. 'G'
00A9 34EB      = 512         CALL    SOCIA                ;TRANSFER ACCUMULATOR TO VLSI CHIP OCIA BUFFER.
               = 513 ;
               = 514 ;BEGIN UNPACKING RAM DATA AND SEND OVER OCIA.
               = 515 ;SET RAM POINTER TO TRANSFER EEPROM DATA TO.
               = 516 UNPACK:
00AB D5        = 517         SEL     RB1                  ;SELECT REGISTER BANK 1
00AC F9        = 518         MOV     A,R1                 ;RETRIEVE RAM POINTER FROM *R1
00AD C5        = 519         SEL     RB0                  ;SELECT REGISTER BANK 0
00AE A9        = 520         MOV     R1,A                 ;SET RAM POINTER
               = 521 ;
               = 522 UNPAK1:
00AF F1        = 523         MOV     A,@R1                ;RETRIEVE ONE BYTE FROM RAM
00B0 530F      = 524         ANL     A,#0FH               ;MASK MS DIGIT OFF.
00B2 4330      = 525         ORL     A,#30H               ;CONVERT LS DIGIT TO ASCII.
00B4 A8        = 526         MOV     R0,A                 ;STORE LS DIGIT IN R0.
00B5 F1        = 527         MOV     A,@R1                ;RETRIEVE SAME BYTE AGAIN TO GET MS DIGIT.
00B6 47        = 528         SWAP    A                    ;SWAP NIBBLES AROUND
00B7 530F      = 529         ANL     A,#0FH               ;MASK LS DIGIT OFF.
00B9 4330      = 530         ORL     A,#30H               ;CONVERT MS DIGIT TO ASCII.
00BB AA        = 531         MOV     R2,A                 ;SAVE MS DIGIT IN R2.
               = 532 ;LOOK AT NEXT BYTE IN RAM TO CHECK FOR LAST BYTE.
00BC 19        = 533         INC     R1                   ;INCREMENT RAM POINTER
00BD F1        = 534         MOV     A,@R1                ;RETRIEVE NEXT BYTE
00BE 37        = 535         CPL     A
00BF C607      = 536         JZ      LSTBYT               ;IF ZERO, PREVIOUS RAM LOCATION HAD LAST BYTE.
               = 537 ;CHECK RAM POINTER IN THAT IT DOES NOT EXCEED 16. (16 BYTES TRANSMITTED)
00C1 D5        = 538         SEL     RB1
00C2 F9        = 539         MOV     A,R1                 ;SET RAM POINTER TO FIRST BYTE OF DATA
00C3 C5        = 540         SEL     RB0
00C4 37        = 541         CPL     A                    ;SUBTRACT BEGINNING OF RAM TO PRESENT POINTER
00C5 69        = 542         ADD     A,R1
00C6 17        = 543         INC     A                    ;RESULT OF SUBTRACTION IN ACCUMULATOR
00C7 D310      = 544         XRL     A,#16D               ;CHECK FOR 16.
00C9 C607      = 545         JZ      LSTBYT               ;IF ZERO, PREVIOUS RAM LOCATION HAD LAST BYTE.
               = 546 ;MORE DATA TO SEND. NOT 17TH BYTE NOR IS NEXT BYTE LAST BYTE.
00CB FA        = 547         MOV     A,R2                 ;GET MS BYTE TO SEND
00CC 3490      = 548         CALL    PARITY               ;CALCULATE PARITY
00CE 34EB      = 549         CALL    SOCIA                ;SEND MS BYTE TO HOST
00D0 F8        = 550         MOV     A,R0                 ;GET LS BYTE TO SEND
00D1 3490      = 551         CALL    PARITY               ;CALCULATE PARITY
00D3 34EB      = 552         CALL    SOCIA                ;SEND LS BYTE TO HOST
               = 553 ;MORE DATA TO RETRIEVE, LOOP BACK.
00D5 04AF      = 554         JMP     UNPAK1
               = 555 ;
               = 556 ;LAST BYTE COMMING UP. SEND MS BYTE AND LS BYTE WITH LAST BYTE BIT SET.
00D7 FA        = 557 LSTBYT: MOV     A,R2                 ;GET MS BYTE.
00D8 3490      = 558         CALL    PARITY               ;CALCULATE PARITY
00DA 34EB      = 559         CALL    SOCIA                ;SEND MS BYTE TO HOST
00DC F8        = 560         MOV     A,R0                 ;GET LS BYTE.
00DD 4340      = 561         ORL     A,#40H               ;SET LAST BYTE BIT
```

```
000F 3490       = 562           CALL    PARITY              ;CALCULATE PARITY
00E1 34E8       = 563           CALL    SOCIA               ;SEND LS BYTE WITH LAST BYTE BIT SET.
                = 564 ;
                = 565 ;ALL DONE.  RETURN TO MAIN ROUTINE.
00E3 83         = 566 TXRET:    RET
                  567 ;************************************
00E4 A3           568 TROPG0:   MOVP    A,@A
00E5 83           569           RET
0100              570           ORG     100H
                  571 ;**************************************************************
                  572 $         INCLUDE(:F3:TROMSM.SRC)
                = 573 ;
                = 574 ; ROUTINE: TROMSM     11-22-82 10:15   BOB ACTIS
                = 575 ;
                = 576 ; FUNCTION - SUM ALL BYTES IN BOTH MEMORY BANKS
                = 577 ;            ASSUMES THAT EACH OF THE SIXTEEN PAGES CONTAINS THE
                = 578 ;            SEQUENCE "TROPGX: MOVP A,@A ; RET" FOR PAGE X.
                = 579 ;
0100 B90B       = 580 TROMSM:   MOV     R1,#STACK+3         ; R1 POINTS TO SECOND STACK ENTRY
                = 581 ;
                = 582 ; DO SIXTEEN PAGES WITH 256 BYTES PER PAGE
                = 583 ;
0102 27         = 584           CLR     A
0103 A1         = 585           MOV     @R1,A               ; STACK+3 = PAGE 0 TO START
0104 AA         = 586           MOV     R2,A                ; R2 = BYTE ADDRESS
0105 BB10       = 587           MOV     R3,#16              ; R3 = PAGES TO DO
0107 A8         = 588           MOV     R0,A                ; R0 = SUM OF BYTES
0108 D7         = 589           MOV     PSW,A               ; INSURE STACK IS EMPTY
                = 590 ;
                = 591 ; PUT PAGE ACCESS ADDRESS IN STACK
                = 592 ;
0109 F1         = 593 TRO10:    MOV     A,@R1
010A 0321       = 594           ADD     A,#LOW TROTAB
010C A3         = 595           MOVP    A,@A
010D C9         = 596           DEC     R1
010E A1         = 597           MOV     @R1,A
010F 19         = 598           INC     R1
                = 599 ;
                = 600 ; DO A PAGE
                = 601 ;
0110 341C       = 602 TRO20:    CALL    TRO50               ; FETCH BYTE
0112 68         = 603           ADD     A,R0                ; ADD TO SUM
0113 A8         = 604           MOV     R0,A
0114 EA10       = 605           DJNZ    R2,TRO20            ; JMP = NOT DONE WITH PAGE
0116 11         = 606           INC     @R1                 ; PAGE NUMBER INCREMENTED
0117 EB09       = 607           DJNZ    R3,TRO10            ; JMP = NOT THRU WITH PAGES
0119 17         = 608           INC     A                   ; (A) = ZERO FOR CORRECT SUM
011A 6453       = 609           JMP     TRORET
                = 610 ;
                = 611 ; LINK TO EACH PAGE
                = 612 ;
011C 2302       = 613 TRO50:    MOV     A,#02
011E D7         = 614           MOV     PSW,A               ; SET STACK POINTER AHEAD
011F FA         = 615           MOV     A,R2                ; A = ADDRESS OF BYTE TO FETCH
0120 83         = 616           RET                         ; JMP TO SELECTED PAGE
                = 617 ;
                = 618 ; TABLE FOR ADDRESS OF FETCH ROUTINE IN EACH PAGE
                = 619 ;
0121 E4         = 620 TROTAB:   DB      LOW TROPG0
0122 F6         = 621           DB      LOW TROPG1
0123 E9         = 622           DB      LOW TROPG2
0124 F7         = 623           DB      LOW TROPG3
0125 FA         = 624           DB      LOW TROPG4
0126 E3         = 625           DB      LOW TROPG5
0127 EA         = 626           DB      LOW TROPG6
0128 E9         = 627           DB      LOW TROPG7
0129 EF         = 628           DB      LOW TROPG8
012A D1         = 629           DB      LOW TROPG9
012B F0         = 630           DB      LOW TROPGA
012C F8         = 631           DB      LOW TROPGB
012D F2         = 632           DB      LOW TROPGC
012E F8         = 633           DB      LOW TROPGD
012F F4         = 634           DB      LOW TROPGE
0130 E0         = 635           DB      LOW TROPGF
                  636 $         INCLUDE(:F3:TRAM.SRC)
                = 637 ;**************************************************************
                = 638 ; FILE: TRAM.SRC  6-19-86 11:20   BOB ACTIS
                = 639 ; FUNCTION:  TEST THE 8039 RAM LOCATIONS 0 TO 7FH
                = 640 ; ENTRY:  NO SETUP
                = 641 ; EXIT:   RAM HAS GARBAGE (TEST PATTERN)
                = 642 ;
                = 643 ; START BY WRITTING EACH RAM ADDRESS INTO ITSELF
0131 B87F       = 644 TRAM:     MOV     R0,#7FH             ;SIZE OF 8039 RAM
0133 F8         = 645 TRAM10:   MOV     A,R0                ;GET RAM ADDRESS
0134 A0         = 646           MOV     @R0,A               ;STORE RAM ADDRESS IN IT'S LOCATION
0135 E833       = 647           DJNZ    R0,TRAM10           ;DO ALL LOCATIONS
                = 648 ;
                = 649 ; CHECK IF EACH LOCATION HAS IT'S OWN ADDRESS
0137 B87F       = 650           MOV     R0,#7FH
0139 F8         = 651 TRAM20:   MOV     A,R0                ;GET RAM ADRESS
013A D0         = 652           XRL     A,@R0               ;COMPARE ADDRESS TO CONTENTS
```

```
0138 9674    = 653           JNZ    TRAMER           ;JUMP IF ERROR
013D E839    = 654           DJNZ   R0,TRAM20        ;DO ALL LOCATIONS
             = 655 ;
             = 656 ; TRY A 055H/0AAH CHECKER BOARD PATTERN
013F B802    = 657           MOV    R0,#2            ;POINTER WILL GO FROM 2 TO 7FH
0141 2355    = 658 TRAM30:   MOV    A,#055H
0143 A0      = 659           MOV    @R0,A            ;WRITE EVEN LOCATION
0144 37      = 660           CPL    A                ;PATTERN IS NOW 0AAH
0145 18      = 661           INC    R0
0146 A0      = 662           MOV    @R0,A            ;WRITE ODD LOCATION
0147 18      = 663           INC    R0
0148 F8      = 664           MOV    A,R0             ;GET NEXT ADDRESS
0149 37      = 665           CPL    A
014A F241    = 666           JB7    TRAM30           ;JUMP IF NOT DONE YET, R0 < 80H
             = 667 ;
             = 668 ; CHECK THE 055H/0AAH TEST PATTERN
014C B902    = 669           MOV    R1,#2            ;USE R1 AS POINTER IN THIS SECTION
014E F1      = 670 TRAM40:   MOV    A,@R1            ;GET EVEN BYTE DATA, 055H
014F 19      = 671           INC    R1
0150 61      = 672           ADD    A,@R1            ;ADD ODD BYTE DATA, 0AAH
0151 17      = 673           INC    A                ;055H+0AAH+1=000H
0152 9674    = 674           JNZ    TRAMER           ;JUMP IF ERROR
0154 19      = 675           INC    R1
0155 F9      = 676           MOV    A,R1             ;GET NEXT ADDRESS
0156 37      = 677           CPL    A
0157 F24E    = 678           JB7    TRAM40           ;JUMP IF NOT DONE YET
             = 679 ;
             = 680 ; TRY A 0AAH/055H CHECKER BOARD PATTERN
0159 B902    = 681           MOV    R1,#2            ;POINTER WILL GO FROM 2 TO 7FH
015B 23AA    = 682 TRAM50:   MOV    A,#0AAH
015D A1      = 683           MOV    @R1,A            ;WRITE EVEN LOCATION
015E 37      = 684           CPL    A                ;PATTERN IS NOW 055H
015F 19      = 685           INC    R1
0160 A1      = 686           MOV    @R1,A            ;WRITE ODD LOCATION
0161 19      = 687           INC    R1
0162 F9      = 688           MOV    A,R1             ;GET NEXT ADDRESS
0163 37      = 689           CPL    A
0164 F25B    = 690           JB7    TRAM50           ;JUMP IF NOT DONE YET, R1 < 80H
             = 691 ;
             = 692 ; CHECK THE 0AAH/055H TEST PATTERN
0166 B802    = 693           MOV    R0,#2            ;USE R0 AS POINTER IN THIS SECTION
0168 F0      = 694 TRAM60:   MOV    A,@R0            ;GET EVEN BYTE DATA, 0AAH
0169 18      = 695           INC    R0
016A 60      = 696           ADD    A,@R0            ;ADD ODD BYTE DATA, 055H
016B 17      = 697           INC    A                ;0AAH+055H+1=000H
016C 9674    = 698           JNZ    TRAMER           ;JUMP IF ERROR
016E 18      = 699           INC    R0
016F F8      = 700           MOV    A,R0             ;GET NEXT ADDRESS
0170 37      = 701           CPL    A
0171 F268    = 702           JB7    TRAM60           ;JUMP IF NOT DONE YET
             = 703 ;
0173 27      = 704           CLR    A                ;A=0 INDICATES TEST PASSED
0174 645B    = 705 TRAMER:   JMP    TRARET           ;RETURN FROM RAM TEST
             706 $           INCLUDE(:F3:TOCIA.SRC)
             = 707 ;****************************************************************
             = 708 ; ROUTINE: TOCIA    07-03-86 10:40  BOB ACTIS
             = 709 ;
             = 710 ; FUNCTION: SEND BYTE TO HOST, THEN CHECK RDATA
             = 711 ;
0176 8901    = 712 TOCIA:    ORL    P1,#ETEST        ;TEST CONTROL ACTIVE
0178 B803    = 713           MOV    R0,#EFCRST
017A 90      = 714           MOVX   @R0,A            ;RESET FCA
             = 715 ;
017B B802    = 716           MOV    R0,#EOCIA
017D 23AA    = 717           MOV    A,#0AAH
017F 90      = 718           MOVX   @R0,A            ;WRITE BYTE TO FCA SR
             = 719 ;
0180 27      = 720           CLR    A
0181 B809    = 721           MOV    R0,#09H          ;LOOP COUNTER
0183 468C    = 722           JNT1   TOC50            ;JUMP IF RDATA NOT HIGH TO START WITH
             = 723 ;
0185 3C      = 724 TOC10:    MOVD   P4,A             ;GENERATE A CLKIN*
0186 E7      = 725           RL     A
0187 468A    = 726           JNT1   TOC20            ;JUMP IF RDATA NOT IN ONE STATE
0189 17      = 727           INC    A
018A E885    = 728 TOC20:    DJNZ   R0,TOC10         ;JUMP TO GENERATE 9 CLKIN* PULSES
             = 729 ;
018C D3AA    = 730 TOC50:    XRL    A,#0AAH          ;COMPARE RECEIVED BYTE
018E 6463    = 731           JMP    TOCRET           ;A=0 IF CHECK WAS GOOD
             732 $           INCLUDE(:F3:PARITY.SRC)
             = 733 ;****************************************************************
             = 734 ;**                    Subroutine Parity                        **
             = 735 ;** Function: From Accumulator, calculate parity bit (7), and place in acc. **
             = 736 ;** Date:  3-4-87                                               **
             = 737 ;** Subroutines Called: None                                    **
             = 738 ;** Registers/Flags affected: *R3,*R0, Accumulator              **
             = 739 ;** Ports affected: None                                        **
             = 740 ;** RAM locations affected: None                                **
             = 741 ;****************************************************************
             = 742 PARITY:
0190 537F    = 743           ANL    A,#7FH           ;CLEAR BIT 7 (PARITY BIT)
```

```
0192 D5        = 744           SEL     RB1
0193 8807      = 745           MOV     R0,#7D                 ;SET BIT COUNTER
0195 AB        = 746           MOV     R3,A                   ;SAVE ACCUMULATOR
0196 E7        = 747 SFTLFT:   RL      A                      ;ROTATE LEFT ACCUMULATOR 1 BIT
0197 DB        = 748           XRL     A,R3                   ;EXCUSIVE-OR R3 AND ACCUMULATOR
0198 E896      = 749           DJNZ    R0,SFTLFT              ;IF ALL 7 BITS DONE, EXIT ROUTINE
019A 37        = 750           CPL     A
019B 5380      = 751           ANL     A,#80H                 ;MASK BITS 6-0. BIT 7 HAS PARITY.
019D 4B        = 752           ORL     A,R3                   ;RESTORE BYTE TO ACCUMULATOR.
               = 753 ;BIT 7 IN ACCUMULATOR NOW REPRESENTS EVEN PARITY OVER BITS 6-0.
019E C5        = 754           SEL     RB0
019F 83        = 755           RET
                 756 $         INCLUDE(:F3:SWSET.SRC)
               = 757 ;**********************************************************************
               = 758 ;**                      Subroutine SWSET.SRC                        **
               = 759 ;** Function: Read current scanner configuration from ram to host.   **
               = 760 ;**           85 will show if switch or ram bit is set.              **
               = 761 ;** Date: 3-15-87                                                    **
               = 762 ;** Subroutines Called: SOCIA, PARITY                                **
               = 763 ;** Registers/Flags affected: *R0, *R2, ACCUMULATOR, R0, R3          **
               = 764 ;** Ports affected: None                                             **
               = 765 ;** RAM locations affected: None                                     **
               = 766 ;**********************************************************************
               = 767 SWSET:
               = 768 ;SEND HEADER 'G' FIRST
01A0 2307      = 769           MOV     A,#07H                 ;'G' HEADER
01A2 34EB      = 770           CALL    SOCIA                  ;SEND BYTE TO HOST
01A4 8908      = 771           MOV     R1,#SWLATC             ;CHECK 85 OF SWITCHES
01A6 81        = 772           MOVX    A,@R1                  ; RETRIEVE SWITCH SETTINGS
01A7 5320      = 773           ANL     A,#00100000B           ; MASK OUT ALL BUT BIT 5
01A9 B95F      = 774           MOV     R1,#SWISET             ;SET RAM POINTER TO SWITCH SETTING STORAGE
01AB 41        = 775           ORL     A,@R1                  ;RETRIEVE SWITCH SETTING FROM RAM
01AC 4340      = 776           ORL     A,#40H                 ;SET LAST BYTE BIT
01AE 3490      = 777           CALL    PARITY                 ;SET PARITY BIT (B7)
01B0 34EB      = 778           CALL    SOCIA                  ;SEND BYTE TO HOST
01B2 83        = 779           RET
                 780 $         INCLUDE(:F3:CKEPRM.SRC)
               = 781 ;**********************************************************************
               = 782 ;**                      Subroutine CKEPRM                           **
               = 783 ;** Function: Clock 8 bits from EEPROM. Result stored in Accumulator **
               = 784 ;** Date: 3-2-87                                                     **
               = 785 ;** Subroutines Called: None                                         **
               = 786 ;** Registers/Flags affected: R0, Accumulator                        **
               = 787 ;** Ports affected: P1                                               **
               = 788 ;** RAM locations affected: None                                     **
               = 789 ;**********************************************************************
               = 790 CKEPRM:
01B3 8808      = 791           MOV     R0,#80                 ;SET BIT COUNTER
01B5 27        = 792           CLR     A                      ;INITIALIZE ACCUMULATOR TO 0
01B6 268A      = 793 CKEPD0:   JNT0    RLACC                  ;IF EEPROM_DO IS 0, DO NOT SET BIT 7. JUMP TO ROTATE AC
01B8 4380      = 794           ORL     A,#80H                 ;EEPROM_DO IS HIGH. SET BIT 7.
01BA E7        = 795 RLACC:    RL      A                      ;SHIFT ACCUMULATOR LEFT ONE BIT. (B7-B0)
01BB 8908      = 796           ORL     P1,#EPRMSK             ;CLOCK EEPROM_SK. SET HIGH.
01BD 99F7      = 797           ANL     P1,#255-EPRMSK         ; SET EEPROM_SK LOW.
01BF E886      = 798           DJNZ    R0,CKEPD0              ;DECREMENT BIT COUNTER (R0); WHEN ALL 8 BITS ARE IN ACC.
01C1 83        = 799           RET
                 800 $         INCLUDE(:F3:WRACC.SRC)
               = 801 ;**********************************************************************
               = 802 ;**                      Subroutine WRACC                            **
               = 803 ;** Function: Write accumulator to EEPROM                            **
               = 804 ;** Date: 2-26-87                                                    **
               = 805 ;** Subroutines Called: None                                         **
               = 806 ;** Registers/Flags affected: R0, Accumulator, F0, Carry             **
               = 807 ;** Ports affected: P1                                               **
               = 808 ;** RAM locations affected: None                                     **
               = 809 ;**********************************************************************
               = 810 ;F0=0 WHEN ROUTINE IS USED FOR SENDING OP CODE (9 BITS)
               = 811 ;F0=1 WHEN ROUTINE IS USED OFR SENDING DATA BITS (8 BITS)
               = 812 WRACC:
01C2 B6CE      = 813           JF0     DATA                   ;IF F0=1 CLOCK OUT 8 DATA BITS
01C4 B809      = 814           MOV     R0,#90                 ;ROUTINE SET TO SEND OP CODE (9 BITS)
01C6 8908      = 815           ORL     P1,#EPRMSK             ;CLOCK EEPROM_SK (SET HIGH)
01C8 99F7      = 816           ANL     P1,#255-EPRMSK         ; SET EEPROM_SK LOW
01CA 97        = 817           CLR     C                      ;SET START BIT
01CB A7        = 818           CPL     C                      ; STORED IN CARRY FLAG
01CC 24D1      = 819           JMP     SETDI
01CE B808      = 820 DATA:     MOV     R0,#80                 ;ROUTINE SET TO SEND DATA. SET COUNTER TO 8 BITS
01D0 F7        = 821           RLC     A                      ;GET MSB INTO CARRY
01D1 F607      = 822 SETDI:    JC      SETDI1                 ;IF CARRY, JUMP TO SET EEPROM_CS
01D3 99FB      = 823           ANL     P1,#255-EPRMDI         ;CARRY NOT SET. SET EEPROM_DI TO '0'
01D5 24D9      = 824           JMP     CLKEPM                 ;JUMP TO CLOCK EEPROM_SK
01D7 8904      = 825 SETDI1:   ORL     P1,#EPRMDI             ;CARRY SET. SET EEPROM_DI TO '1'
01D9 8908      = 826 CLKEPM:   ORL     P1,#EPRMSK             ;CLOCK EEPROM_SK. SET EEPROM_SK HIGH
01DB 99F3      = 827           ANL     P1,#255-EPRMSK-EPRMDI  ;RESET EEPROM_SK AND EEPROM_IN
               = 828 ;
01DD F7        = 829           RLC     A                      ;ROTATE LEFT THROUGH CARRY TO GET NEXT BIT
01DE E801      = 830           DJNZ    R0,SETDI               ;DECREMENT R0 BIT COUNTER AND JUMP IF NOT 0
01E0 83        = 831           RET
                 832 $         INCLUDE(:F3:WAIT.SRC)
               = 833 ;**********************************************************************
               = 834 ;**                      Subroutine WAIT                             **
```

```
                = 835 ;** Function: Wait 'A' milli-seconds                              **
                = 836 ;** Date:  2-26-87                                                **
                = 837 ;** Subroutines Called: None                                      **
                = 838 ;** Registers/Flags affected: *R1, *R2, ACCUMULATOR               **
                = 839 ;** Ports affected: None                                          **
                = 840 ;** RAM locations affected: None                                  **
                = 841 ;***********************************************************************
                = 842 Wait:
01E1 D5         = 843           SEL     RB1
01E2 AA         = 844           MOV     R2,A                    ;SAVE ACCUMULATOR
01E3 B9C8       = 845 WAIT0:    MOV     R1,#2000                ;SET R1 TO EQUAL 1 MILLI-SECOND DELAY
01E5 E9E5       = 846 WAIT1:    DJNZ    R1,WAIT1                ;LOOP FOR 1 MILLI-SECOND
01E7 EAE3       = 847           DJNZ    R2,WAIT0                ;LOOP FOR 'A' MILLI-SECONDS
01E9 C5         = 848           SEL     RB0
01EA 83         = 849           RET
                  850 $         INCLUDE(:F3:SOCIA.SRC)
                = 851 ;***********************************************************************
                = 852 ;**                    Subroutine SOCIA                          **
                = 853 ;** Function: Send Accumulator to VLSI ocia buffer to be transmitted to host**
                = 854 ;** Date: 3-4-87                                                 **
                = 855 ;** Subroutines Called: None                                     **
                = 856 ;** Registers/Flags affected: *R0, *R2, ACCUMULATOR              **
                = 857 ;** Ports affected: None                                         **
                = 858 ;** RAM locations affected: None                                 **
                = 859 ;***********************************************************************
                = 860 SOCIA:
01EB D5         = 861           SEL     RB1                     ;SELECT REGISTER BANK 1
01EC AA         = 862           MOV     R2,A                    ;SAVE ACCUMULATOR
01ED 0A         = 863 CKSENT:   IN      A,P2                    ;CHECK VLSI SENTB LINE
01EE 92ED       = 864           JB4     CKSENT                  ;IF NOT READY, RE-CHECK VLSI CHIP.
                = 865 ;READY TO SEND BYTE.
01F0 B802       = 866           MOV     R0,#EOCIA               ;SET EXTERNAL ADDRESS POINTER TO VLSI CHIP'S OCIA BUFFER
01F2 FA         = 867           MOV     A,R2                    ;RETRIEVE DATA TO BE SENT.
01F3 90         = 868           MOVX    @R0,A                   ;SEND DATA TO VLSI CHIP.
01F4 C5         = 869           SEL     RB0
01F5 83         = 870           RET
                  871 ;***************************************
01F6 A3           872 TROPG1:   MOVP    A,@A
01F7 83           873           RET
0200              874           ORG     200H
                  875 $         INCLUDE(:F3:TTAG.SRC)
                = 876 ;***********************************************************************
                = 877 ; ROUTINE: TTAG  06-19-86 15:30  BOB ACTIS
                = 878 ; UPDATES: MODIFIED 3-17-87 FOR TEC BY RANDY ELLIOTT
                = 879 ; FUNCTION: CHECK DIGITAL LOGIC FOR CAPTURE OF 6 INCREASINGLY
                = 880 ;           LARGER TAGS - 012345 678912 . THE SYMBOL CAPTURE
                = 881 ;           PROCESSING IS USED TO COLLECT THE SEGMENTS FROM THE FCA.
                = 882 ;
0200 FE         = 883 TTATAB:   DB      0FEH,9AH,64H,16H,0B7H,0DDH,0ABH
0201 9A         =
0202 64         =
0203 16         =
0204 B7         =
0205 DD         =
0206 AB         =
0207 3A         = 884           DB      3AH,0B9H,42H,0B6H,59H,2EH,03EH
0208 B9         =
0209 42         =
020A B6         =
020B 59         =
020C 2E         =
020D 3E         =
020E B803       = 885 TTAG:     MOV     R0,#EFCRST
0210 90         = 886           MOVX    @R0,A           ;RESET FCA
0211 8901       = 887           ORL     P1,#ETEST       ;TEST CONTROL ACTIVE
0213 B800       = 888           MOV     R0,#LOW TTATAB          ; R0 POINTS TO CHAR GEN TABLE
0215 BE06       = 889           MOV     R6,#06H ;THIS ROUTINE CHECKS DIGITAL LOGIC
0217 BF06       = 890           MOV     R7,#06H ;FOR CAPTURE OF 6 INCREASINGLY LARGER
0219 B908       = 891           MOV     R1,#08H ;TAGS 012345 678912................
021B BB0E       = 892           MOV     R3,#0EH ;UNPACK DATA CONSTANT
021D F8         = 893 UNPK1:    MOV     A,R0
021E BA04       = 894           MOV     R2,#04H ;UNPACK DATA CONSTANT
0220 A3         = 895           MOVP    A,@A
0221 AC         = 896           MOV     R4,A    ;TEMP STORE
0222 5301       = 897 UNPK2:    ANL     A,#01H  ;STRIP OUT ONE BIT
0224 E7         = 898           RL      A
0225 17         = 899           INC     A
0226 47         = 900           SWAP    A
0227 AD         = 901           MOV     R5,A
0228 FC         = 902           MOV     A,R4
0229 77         = 903           RR      A
022A AC         = 904           MOV     R4,A
022B 5301       = 905           ANL     A,#01H
022D E7         = 906           RL      A
022E 17         = 907           INC     A
022F 60         = 908           ADD     A,R5
0230 A1         = 909           MOV     @R1,A
0231 19         = 910           INC     R1
0232 FC         = 911           MOV     A,R4
0233 77         = 912           RR      A
0234 AC         = 913           MOV     R4,A
```

```
0235 EA22      = 914             DJNZ    R2,UNPK2
0237 18        = 915             INC     R0
0238 EB1D      = 916             DJNZ    R3,UNPK1
               = 917 ;
               = 918 ;   SETUP TEST BIT ON PORT 1
               = 919 ;
023A 2391      = 920             MOV     A,#ETEST+ELASDB+ETONE
023C 39        = 921             OUTL    P1,A
               = 922 ;
023D BB02      = 923             MOV     R3,#02H
023F BD06      = 924             MOV     R5,#06H
0241 BA38      = 925 TEST1:      MOV     R2,#38H  ;START TAG POINTER
0243 B83F      = 926             MOV     R0,#3FH
0245 FD        = 927 TEST2:      MOV     A,R5     ;START TAG OUTPUT
0246 68        = 928             ADD     A,R3
0247 AC        = 929             MOV     R4,A
0248 EC48      = 930 TEST3:      DJNZ    R4,TEST3
024A F0        = 931             MOV     A,@R0
               = 932 ;
024B 3251      = 933             JB1     TST31    ;JUMP = SEND SPACE
024D 99FD      = 934             ANL     P1,#0FFH-ETMARK
024F 4455      = 935             JMP     TST32
0251 8902      = 936 TST31:      ORL     P1,#ETMARK
0253 00        = 937             NOP
0254 00        = 938             NOP
               = 939 ;
0255 FD        = 940 TST32:      MOV     A,R5
0256 68        = 941             ADD     A,R3
0257 AC        = 942             MOV     R4,A
0258 EC58      = 943 TEST4:      DJNZ    R4,TEST4
025A F0        = 944             MOV     A,@R0
               = 945 ;
025B 47        = 946             SWAP    A
025C 3262      = 947             JB1     TST41    ;JUMP = SEND SPACE
025E 99FD      = 948             ANL     P1,#0FFH-ETMARK
0260 4466      = 949             JMP     TST42
0262 8902      = 950 TST41:      ORL     P1,#ETMARK
0264 00        = 951             NOP
0265 00        = 952             NOP
               = 953 ;
0266 C8        = 954 TST42:      DEC     R0
0267 EA45      = 955             DJNZ    R2,TEST2    ;END OF TAG
0269 ED41      = 956             DJNZ    R5,TEST1    ;END OF ALL TAGS
               = 957 ;
026B F5        = 958             SEL     MB1
026C 1400      = 959             CALL    CLR6SG      ;CLEAR 6 CHAR SEG BUFFS & COUNTERS
026E E5        = 960             SEL     MB0
               = 961 ;
026F BE18      = 962             MOV     R6,#24      ;SHOULD BE ONLY 12 SEGS, TRY FOR MORE
0271 FC        = 963             MOV     A,R4
0272 4301      = 964             ORL     A,#ESCNG    ;SET SCAN FLAG SO CKFCA WILL
0274 AC        = 965             MOV     R4,A        ;PUT SEGMENTS INTO THE SCAN BUFF
0275 F5        = 966 GETLUP:     SEL     MB1
0276 14AF      = 967             CALL    CKFCA       ;GET SEG, IF ANY, FROM FCA
0278 5433      = 968             CALL    PROCSG      ;PUT SEG, IF ANY, INTO SEG BUFF
027A E5        = 969             SEL     MB0
027B EE75      = 970             DJNZ    R6,GETLUP   ;GO CHECK FOR MORE SEGMENTS
               = 971 ;
027D 85        = 972             CLR     F0          ;SETUP FOR RIGHT HALF LOOP
027E B82C      = 973             MOV     R0,#L6SCNT
0280 F0        = 974 TCKCNT:     MOV     A,@R0       ;GET L OR R COUNT
0281 18        = 975             INC     R0
0282 60        = 976             ADD     A,@R0       ;GET L OR R TOTAL
0283 03F4      = 977             ADD     A,#-12
0285 96A7      = 978             JNZ     TTA90       ;JUMP IF X6SCNT+X6STOT<>12
               = 979 ;
0287 8834      = 980             MOV     R0,#R6SCNT
0289 95        = 981             CPL     F0
028A B680      = 982             JF0     TCKCNT      ;JUMP TO DO RIGHT HALF
               = 983 ;
028C BA04      = 984             MOV     R2,#4       ;4 BYTES TO COMPARE
028E B824      = 985             MOV     R0,#L6S1
0290 89A9      = 986             MOV     R1,#LOW TTACHK ;DATA CHECK TABLE
0292 F9        = 987 LOOPCK:     MOV     A,R1
0293 A3        = 988             MOVP    A,@A
0294 D0        = 989             XRL     A,@R0
0295 96A7      = 990             JNZ     TTA90       ;JMP IF BAD CHECK OF DATA
               = 991 ;
0297 18        = 992             INC     R0
0298 19        = 993             INC     R1
0299 EA92      = 994             DJNZ    R2,LOOPCK
               = 995 ;
029B B82E      = 996             MOV     R0,#R6S1
029D BA03      = 997             MOV     R2,#3       ;3 BYTES TO COMPARE
029F 95        = 998             CPL     F0
02A0 B692      = 999             JF0     LOOPCK      ;JUMP TO DO RIGHT HALF
               =1000 ;
02A2 B87F      =1001             MOV     R0,#7FH     ;LOOP COUNTER, RAM SIZE
02A4 A0        =1002 CLRRAM:     MOV     @R0,A       ;A=0 AT THIS POINT, TEST PASSED
02A5 E8A4      =1003             DJNZ    R0,CLRRAM   ;CLEAR ALL RAM AFTER TESTING
               =1004 ;
```

```
02A7 6468   =1005 TTA90:  JMP     TTARET          ;A=0 FOR SUCCESFUL COMPLETION
            =1006 ;
02A9 01     =1007 TTACHK: DB      01H,23H,45H,0CH
02AA 23     =
02AB 45     =
02AC 0C     =
02AD 67     =1008         DB      67H,89H,12H
02AE 89     =
02AF 12     =
             1009 $       INCLUDE(:F3:RDEPRM.SRC)
            =1010 ;***********************************************************************
            =1011 ;**                      Subroutine RDEPRM                            **
            =1012 ;** Function: Read EEPROM and store at starting address @R1 (Packed Data) **
            =1013 ;** Date:  3-3-87                                                     **
            =1014 ;** Subroutines Called: WRACC, CKEPRM                                 **
            =1015 ;** Registers/Flags affected: R0, Accumulator, F0, Carry, R1, R2, R3  **
            =1016 ;** Ports affected: P1, P2                                            **
            =1017 ;** RAM locations affected:  @R1 to @R1+16                            **
            =1018 ;***********************************************************************
            =1019 ;R1 stores Ram location to start writing to upon entry into this routine.
            =1020 RDEPRM:
            =1021 ;INITIALIZE REGISTERS AND PORTS
02B0 BB08   =1022         MOV     R3,#8D          ;SET 'LABEL SET' COUNTER TO 8
02B2 BA80   =1023         MOV     R2,#OPREAD      ;SET OPCODE TO READ
02B4 8A80   =1024 SETCS:  ORL     P2,#EPRMCS      ;SET EEPROM_CS HIGH
            =1025 ;SEND OPCODE TO READ DATA
02B6 85     =1026         CLR     F0              ;SET F0=0 FOR OPCODE TO WRITE
02B7 FA     =1027         MOV     A,R2            ;PUT OPCODE AND ADDRESS IN ACCUMULATOR
02B8 34C2   =1028         CALL    WRACC           ;SEND OPCODE/ADDRESS TO EEPROM
            =1029 ;GET RID OF START BIT.  CLOCK SK.
02BA 8908   =1030         ORL     P1,#EPRMSK      ;SET EEPROM_SK HIGH
02BC 99F7   =1031         ANL     P1,#255-EPRMSK  ;SET EEPROM_SK LOW
            =1032 ;RETRIEVE BITS 15-8 FROM EEPROM (LABEL 1)
02BE 3483   =1033         CALL    CKEPRM          ;CLOCK MOST SIGNIFICANT 8 BITS FROM EEPROM
            =1034 ;STORE BITS 15-8 TO RAM @R1 (LABEL 1)
02C0 A1     =1035         MOV     @R1,A           ;STORE ACCUMULATOR TO RAM @R1
02C1 19     =1036         INC     R1              ;INCREMENT RAM POINTER TO NEXT LOCATION
            =1037 ;RETRIEVE BITS 7-0 FROM EEPROM (LABEL 2)
02C2 3483   =1038         CALL    CKEPRM          ;CLOCK LEAST SIGNIFICANT 8 BITS FROM EEPROM
02C4 A1     =1039         MOV     @R1,A           ;STORE ACCUMULATOR TO RAM @R1
            =1040 ;SET EEPROM_CS LOW AND ADJUST COUNTERS AND POINTERS
02C5 9A7F   =1041         ANL     P2,#255-EPRMCS  ;SET EEPROM_CS LOW
02C7 19     =1042         INC     R1              ;INCREMENT RAM POINTER
02C8 1A     =1043         INC     R2              ;INCREMENT EEPROM POINTER
02C9 EB84   =1044         DJNZ    R3,SETCS        ;DECREMENT LABEL SET COUNTER.  IF ZERO, RETURN.
02CB 83     =1045         RET
             1046 $       INCLUDE(:F3:DISLAS.SRC)
            =1047 ;***********************************************************************
            =1048 ;**                      Subroutine DISLAS                            **
            =1049 ;** Function: Clear scan buffer ram and reset VLSI                    **
            =1050 ;** Date:  3-14-87                                                    **
            =1051 ;** Subroutines Called:  None                                         **
            =1052 ;** Registers/Flags affected: R4, R1, Accumulator                     **
            =1053 ;** Ports affected: P1                                                **
            =1054 ;** RAM locations affected:  Version flags and scan buffers           **
            =1055 ;***********************************************************************
            =1056 DISLAS:
02CC 999F   =1057         ANL     P1,#255-EGDLT-EBDLT  ;TURN OFF GDLT AND BDLT
02CE FC     =1058         MOV     A,R4            ;RETRIEVE SCANNING STATUS
02CF 5304   =1059         ANL     A,#EAMBMS       ;MASK ALL BUT AMBIGUITY ENABLE BIT
02D1 AC     =1060         MOV     R4,A            ;DISABLE SCANNING
            =1061 ;CLEAR VLSI CHIP (GET RID OF LEFT OVER DATA FROM HOST)
02D2 B903   =1062         MOV     R1,#EFCRST      ;VLSI RESET ADDRESS
02D4 91     =1063         MOVX    @R1,A           ;  RESET VLSI CHIP
02D5 44E6   =1064         JMP     RAMRT
            =1065 ENLAS:
02D7 999F   =1066         ANL     P1,#255-EGDLT-EBDLT  ;TURN OFF GDLT AND BDLT
02D9 B901   =1067         MOV     R1,#EFRRST      ;RESET FRAME CONTROL (SDATA REGISTER)
02DB 91     =1068         MOVX    @R1,A
02DC FC     =1069         MOV     A,R4            ;RETRIEVE SCANNING STATUS
02DD 4301   =1070         ORL     A,#ESCNG        ;ENABLE SCANNING
02DF AC     =1071         MOV     R4,A            ;SAVE SCANNING STATUS
02E0 F5     =1072         SEL     MB1
02E1 B412   =1073         CALL    CLRVER          ;CLEAR VERSION FLAGS AND DATA
02E3 1420   =1074         CALL    CLRSNB          ;CLEAR SCANNER BUFFERS
02E5 E5     =1075         SEL     MB0
            =1076 ;ALL SCANNER BUFFER RAM CLEARED ALONG WITH SCANNER FLAGS.  RETURN.
02E6 8920   =1077 RAMRT:  ORL     P1,#EGDLT       ;TURN ON GDLT FOR .5 SECONDS
02E8 83     =1078         RET
             1079 ;*****************************************
02E9 A3      1080 TROPG2: MOVP    A,@A
02EA 83      1081         RET
0300         1082         ORG     300H
             1083 $       INCLUDE(:F3:TMOTOR.SRC)
            =1084 ;***********************************************************************
            =1085 ; FILE: TMOTOR.SRC  2-18-87 10:50  BOB ACTIS
            =1086 ; FUNCTION: TEST THE MOTOR AND UP2SPD SIGNAL
            =1087 ; ENTRY: NO SETUP
            =1088 ; EXIT: USES R3,R7
            =1089 ;
```

```
0300 8912    =1090 TMOTOR: ORL    P1,#ELASDB+EMTREB      ;LASER OFF, MOTOR ON
0302 55      =1091         STRT   T
0303 25      =1092         EN     TCNTI                  ;ENABLE THE TIMER
             =1093 ;
0304 BF0A    =1094         MOV    R7,#(5*FACTOR)         ;SET TIMER FOR 100MSEC
0306 FF      =1095 TMOT10: MOV    A,R7
0307 9606    =1096         JNZ    TMOT10                 ;WAIT FOR MOTOR CIRCUIT TO POWER UP
             =1097 ;
0309 0A      =1098         IN     A,P2
030A 37      =1099         CPL    A
030B B231    =1100         JB5    TMOT50                 ;JUMP IF NOT UP2SPD
             =1101 ;
             =1102 ; MOTOR OFF AND WAIT FOR IT TO SLOW. FLASH BOTH LIGHTS.
030D 99FD    =1103         ANL    P1,#255-EMTREB         ;MOTOR OFF
030F BB32    =1104 TMOT20: MOV    R3,#50                 ;SET LOOP COUNTER
0311 BF0A    =1105 TMOT22: MOV    R7,#(5*FACTOR)         ;SET TIMER FOR 100MSEC
0313 1448    =1106 TMOT24: CALL   CK4HRS                 ;CHECK FOR HORSE CONTROL BYTE
0315 FF      =1107         MOV    A,R7                   ;10MSEC*10*50=5SEC
0316 9613    =1108         JNZ    TMOT24                 ;WAIT BETWEEN LIGHT TOGGLES
             =1109 ;
0318 C8      =1110         DEC    R3                     ;DECREMENT LOOP COUNTER
0319 FB      =1111         MOV    A,R3
031A C625    =1112         JZ     TMOT28                 ;JUMP IF FINISHED WAITING
             =1113 ;
031C 09      =1114         IN     A,P1
031D 999F    =1115         ANL    P1,#255-(EGDLT+EBDLT)  ;LIGHTS OFF
031F B211    =1116         JB5    TMOT22                 ;JUMP IF GDLT WAS ON
             =1117 ;
0321 8960    =1118         ORL    P1,#EGDLT+EBDLT        ;LIGHTS ON
0323 6411    =1119         JMP    TMOT22
             =1120 ;
0325 999F    =1121 TMOT28: ANL    P1,#255-(EGDLT+EBDLT)  ;LIGHTS OFF
             =1122 ;
0327 8902    =1123         ORL    P1,#EMTREB             ;MOTOR ON
0329 BF0A    =1124         MOV    R7,#(5*FACTOR)         ;SET TIMER FOR 100 MSEC
032B FF      =1125 TMOT40: MOV    A,R7
032C 962B    =1126         JNZ    TMOT40                 ;WAIT FOR MOTOR CIRCUIT TO POWER UP
             =1127 ;
032E 0A      =1128         IN     A,P2
032F B24A    =1129         JB5    TMOT90                 ;JUMP IF ALREADY UP2SPD ... FAILED
             =1130 ;
             =1131 ; WAIT 30 SECONDS FOR THE MOTOR TO GET UP2SPD. FLASH GREEN LIGHT.
0331 BBFA    =1132 TMOT50: MOV    R3,#250                ;SET LOOP COUNTER
0333 BF0C    =1133 TMOT60: MOV    R7,#(6*FACTOR)         ;SET TIMER FOR 120 MSEC
0335 1448    =1134 TMOT80: CALL   CK4HRS                 ;CHECK FOR HORSE CONTROL BYTE
0337 FF      =1135         MOV    A,R7                   ;10MS*12*250=30SEC
0338 9635    =1136         JNZ    TMOT80                 ;WAIT BETWEEN LIGHT TOGGLES
             =1137 ;
033A 0A      =1138         IN     A,P2
033B B24F    =1139         JB5    TMOT95                 ;JUMP IF MOTOR IS UP2SPD ... PASSED
             =1140 ;
033D C8      =1141         DEC    R3                     ;DECREMENT LOOP COUNTER
033E FB      =1142         MOV    A,R3
033F C64A    =1143         JZ     TMOT90                 ;JUMP IF TIMED OUT ... FAILED
             =1144 ;
0341 09      =1145         IN     A,P1                   ;TOGGLE GDLT WHILE WAITING FOR UP2SPD
0342 990F    =1146         ANL    P1,#255-EGDLT          ;GDLT OFF
0344 B233    =1147         JB5    TMOT60                 ;JUMP IF GDLT WAS ON
             =1148 ;
0346 8920    =1149         ORL    P1,#EGDLT              ;GDLT ON
0348 6433    =1150         JMP    TMOT60                 ;CONTINUE WAITING FOR UP2SPD
             =1151 ;
             =1152 ; COME HERE IF THE TEST FAILED
034A 99FD    =1153 TMOT90: ANL    P1,#255-EMTREB         ;MOTOR OFF
034C 27      =1154         CLR    A
034D 37      =1155         CPL    A                      ;SET FAILED FLAG
034E 83      =1156         RET
             =1157 ;
             =1158 ; COME HERE IS THE TEST PASSED
034F 27      =1159 TMOT95: CLR    A                      ;SET PASSED FLAG
0350 83      =1160         RET
              1161 $       INCLUDE(:F3:TPON.SRC)
             =1162 ;***********************************************************
             =1163 ; FILE: TPON.SRC  7-03-86 10:45  BOB ACTIS
             =1164 ; FUNCTION: PERFORM SELF-TESTS
             =1165 ;
0351 2400    =1166 TPON:   JMP    TROMSM
             =1167 TRORET:
             =1168 ;*******************CHECKSUM OF ROM CHECKED HERE*******************
0353 C659    =1169         JZ     TPON20                 ;JUMP IF THE CHECKSUM PASSED
0355 B800    =1170         MOV    R0,#0                  ;NO BEEPS WITH THIS ERROR
0357 647D    =1171         JMP    TPON90
             =1172 ;*****************************************************************
0359 2431    =1173 TPON20: JMP    TRAM
035B C661    =1174 TRARET: JZ     TPON30                 ;JUMP IF THE RAM TEST PASSED
035D B801    =1175         MOV    R0,#1                  ;ONE BEEP FOR THIS ERROR
035F 647D    =1176         JMP    TPON90
             =1177 ;
0361 2476    =1178 TPON30: JMP    TOCIA
0363 C669    =1179 TOCRET: JZ     TPON40                 ;JUMP IF THE OCIA TEST PASSED
0365 B802    =1180         MOV    R0,#2                  ;TWO BEEPS FOR THIS ERROR
```

```
0367 647D      =1181           JMP      TPON90
               =1182 ;
0369 440E      =1183 TPON40:   JMP      TTAG
036B 99FC      =1184 TTARET:   ANL      P1,#255-(ETEST+ETMARK)  ;CLEAR TEST AND TEST MARK LINES
036D C673      =1185           JZ       TPON50         ;JUMP IF THE TTAG TEST PASSED
036F B803      =1186           MOV      R0,#3          ;THREE BEEPS FOR THIS ERROR
0371 647D      =1187           JMP      TPON90
               =1188 ;
0373 7400      =1189 TPON50:   CALL     TMOTOR
0375 C67B      =1190           JZ       TPON60         ;JUMP IF THE MOTOR TEST PASSED
0377 B804      =1191           MOV      R0,#4          ;FOUR BEEPS FOR THIS ERROR
0379 647D      =1192           JMP      TPON90
               =1193 ;
037B 6487      =1194 TPON60:   JMP      TPORET         ;RETURN FROM THE POWER UP TESTS
               =1195 ;
037D 7481      =1196 TPON90:   CALL     TERRWT         ;ERRORS COME HERE
037F 0400      =1197           JMP      RSTTRP         ;RESTART THE PROGRAM
               1198 $         INCLUDE(:F3:TERRWT.SRC)
               =1199 ;******************************************************************
               =1200 ; FILE: TERRWT.SRC  2-18-87 10:50  BOB ACTIS
               =1201 ; FUNCTION: SELFTEST ERROR ROUTINE
               =1202 ;           BEEP R0 TIMES AND WAIT 1 SECOND
               =1203 ; ENTRY: R0 = NUMBER OF BEEPS
               =1204 ; EXIT:  USES R0, R7
               =1205 ;
0381 99DF      =1206 TERRWT:   ANL      P1,#255-EGDLT  ;GDLT OFF
0383 8940      =1207           ORL      P1,#EBDLT      ;BDLT ON
               =1208 ;
0385 55        =1209           STRT     T
0386 25        =1210           EN       TCNTI          ;ENABLE THE TIMER OPERATION
               =1211 ;
0387 F8        =1212 TERR02:   MOV      A,R0
0388 C69A      =1213           JZ       TERR10         ;JUMP IF NO BEEPS
               =1214 ;
038A D5        =1215 TERR04:   SEL      RB1
038B BD14      =1216           MOV      R5,#ETONCT     ;SET THE TONE CYCLE COUNTER
038D BE04      =1217           MOV      R6,#(2*FACTOR) ;SET BEEP TIMER FOR 40 MSEC
038F FE        =1218 TERR06:   MOV      A,R6
0390 968F      =1219           JNZ      TERR06         ;WAIT FOR BEEP TO END
0392 C5        =1220           SEL      RB0
               =1221 ;
0393 BF06      =1222           MOV      R7,#(3*FACTOR) ;SET TIMER FOR 60 MSEC
0395 FF        =1223 TERR08:   MOV      A,R7
0396 9695      =1224           JNZ      TERR08         ;WAIT BETWEEN BEEPS
               =1225 ;
0398 E88A      =1226           DJNZ     R0,TERR04      ;BEEP LOOP
               =1227 ;
039A BF64      =1228 TERR10:   MOV      R7,#(E1000M*FACTOR)  ;SET TIMER FOR 1 SECOND
039C FF        =1229 TERR12:   MOV      A,R7
039D 969C      =1230           JNZ      TERR12
               =1231 ;
039F B903      =1232           MOV      R1,#EFCRST     ;RESET VLSI CHIP TO GET RID OF GARBAGE.
03A1 91        =1233           MOVX     @R1,A
03A2 83        =1234           RET
               1235 $         INCLUDE(:F3:FPOWUP.SRC)
               =1236 ;******************************************************************
               =1237 ; FILE: FPOWUP.SRC  02-18-87 11:25  BOB ACTIS
               =1238 ; ROUTINE: POWUP
               =1239 ; FUNCTION: INITIALIZE SYSTEM
               =1240 ; UPDATES: 3-17-87 MODIFIED FOR TEC BY RANDY ELLIOTT
               =1241 ;
03A3 93        =1242 POW00:    RETR                    ;RESET THE IIP FLIP-FLOP
03A4           =1243 POWUP     EQU      $
03A4 15        =1244           DIS      I
03A5 35        =1245           DIS      TCNTI
03A6 27        =1246           CLR      A
03A7 D7        =1247           MOV      PSW,A
03A8 74A3      =1248           CALL     POW00          ;RESET IIP BIT
               =1249 ;
               =1250 ; SETUP PORTS
               =1251 ;
03AA 233F      =1252           MOV      A,#255-EVLSIR-EPRMCS  ;PWR RST THE VLSI AND CLEAR EEPROM_CS
03AC 3A        =1253           OUTL     P2,A
03AD 8A40      =1254           ORL      P2,#EVLSIR     ;ENABLE VLSI TO RUN
03AF 2390      =1255           MOV      A,#ETONE+ELASDB
03B1 39        =1256           OUTL     P1,A
               =1257 ;
               =1258 ; RESET THE FRAME CONTROL ARRAY
               =1259 ;
03B2 8803      =1260           MOV      R0,#EFCRST
03B4 90        =1261           MOVX     @R0,A
               =1262 ;
               =1263 ; GO PERFORM THE POWER UP TESTS.
               =1264 ; STICK IN TPON LOOP IF ANY FAILURES.
               =1265 ;
03B5 6451      =1266           JMP      TPON
03B7           =1267 TPORET    EQU      $
               =1268 ;
               =1269 ; CLEAR DATA MEMORY AND PSW
03B7 27        =1270           CLR      A
03B8 D7        =1271           MOV      PSW,A
```

```
0389 B87F    =1272           MOV     R0,#7FH
03BB A0      =1273 POW10:    MOV     @R0,A
03BC E8BB    =1274           DJNZ    R0,POW10
             =1275 ;
             =1276 ;   START THE INTERNAL TIMER
             =1277 ;
03BE D5      =1278           SEL     RB1
             =1279 ;SET THE TONE CYCLE COUNTER
03BF B4AF    =1280           CALL    TON1CT          ;SET R5 ACCORDING TO SWITCH SETTINGS
03C1 C5      =1281           SEL     RB0
03C2 55      =1282           STRT    T
03C3 25      =1283           EN      TCNTI
             =1284 ;
             =1285 ;   GOOD LIGHT, GOOD POWER UP TONE, LASER ON AND WAIT 1 SEC.
             =1286 ;
03C4 8920    =1287           ORL     P1,#EGDLT
03C6 D5      =1288           SEL     RB1
03C7 BE14    =1289           MOV     R6,#(10*FACTOR)         ;200MSEC TONE
03C9 C5      =1290           SEL     RB0
03CA 99EF    =1291           ANL     P1,#255-ELASDB  ;LASER ON, TIME TO START BEFORE RDTAG
03CC BF64    =1292           MOV     R7,#(E1000M*FACTOR)
03CE FF      =1293 TPON15:   MOV     A,R7
03CF 96CE    =1294           JNZ     TPON15          ;WAIT
             =1295 ;
             =1296 ;   REINITIALIZE AFTER TEST SEQUENCE
             =1297 ;
03D1 99CF    =1298 POW20:    ANL     P1,#255-(EGDLT+ELASDB)  ;GOOD LIGHT OFF & LASER ON
03D3 8942    =1299           ORL     P1,#EBDLT+EMTREB        ;BAD LIGHT ON & MOTOR ON
             =1300 ;
03D5 B803    =1301           MOV     R0,#EFCRST
03D7 90      =1302           MOVX    @R0,A           ;RESET THE FCA
03D8 BF04    =1303           MOV     R7,#(2*FACTOR)          ;SET TIMER FOR 40 MSEC
03DA FF      =1304 POW25:    MOV     A,R7
03DB 96DA    =1305           JNZ     POW25           ;WAIT FOR FCA TO SEE SEGS IF ANY
             =1306 ;
             =1307 ;   CLEAR DATA MEMORY AND PSW
03DD 27      =1308           CLR     A
03DE D7      =1309           MOV     PSW,A
03DF B87F    =1310           MOV     R0,#7FH
03E1 A0      =1311 POW30:    MOV     @R0,A
03E2 E8E1    =1312           DJNZ    R0,POW30
             =1313 ;
03E4 D5      =1314           SEL     RB1
             =1315 ;SET TONE CYCLE COUNTER
03E5 B4AF    =1316           CALL    TON1CT          ;SET R5 ACCORDING TO SWITCH SETTING
03E7 C5      =1317           SEL     RB0
             =1318 ;
             =1319 ;LOAD EEPROM TO RAM FOR TWO LABEL READ.
03E8 8961    =1320           MOV     R1,#TWOLAB      ;SET RAM POINTER
03EA 5480    =1321           CALL    RDEPRM          ;TRANSFER EEPROM TO RAM
             =1322 ;LOAD SWITCH SETTINGS TO RAM
03EC 8908    =1323           MOV     R1,#SWLATC      ;SET POINTER TO READ SWITCHES
03EE B85F    =1324           MOV     R0,#SWISET      ;SET RAM POINTER TO SWITCH SETTINGS
03F0 81      =1325           MOVX    A,@R1           ;READ SWITCHES
03F1 53DF    =1326           ANL     A,#11011111B    ;MASK OUT B5, FLAG PROGRAMMING VIA LABLE READ.
03F3 A0      =1327           MOV     @R0,A           ;STORE SWITCH SETTINGS IN RAM.
             =1328 ;INITIALIZATION DONE.  BEGIN READING TAGS.
03F4 F5      =1329           SEL     MB1
03F5 E400    =1330           JMP     RDTAG
             1331 ;************************************
03F7 A3      1332 TROPG3:    MOVP    A,@A
03F8 83      1333           RET
0400         1334           ORG     400H
             1335 $         INCLUDE(:F3:HORSE1.SRC)
             =1336 ;*****************************************************************
             =1337 ;   FILE: HORSE1.SRC    HORSE TEST PART 1 OF 3.
             =1338 ;   07-03-86 09:05 BOB ACTIS
             =1339 ;
             =1340 ;   ROUTINE: THORSE
             =1341 ;
             =1342 ;       HORSE TEST (HOST ORIGINATED SEGMENT EVALUATION) WILL RECEIVE
             =1343 ;       TEST TAG DEFINITION FROM HOST, COUNT THE NUMBER OF TIMES IT
             =1344 ;       'SEES' EACH SEGMENT OF THE TAG AND THEN SEND THE COUNT
             =1345 ;       INFORMATION TO THE HOST....REMAINS IN HORSE TEST UNTIL
             =1346 ;       DSATA=0, OR POWER RESET.
             =1347 ;
             =1348 ; BYTE DEFINITION
             =1349 ;
             =1350 ; TEST CONTROL BYTE = D1H
             =1351 ; THHDR = COUNT HEADER BYTE = 15H (AFTER PARITY INSERT = 95H)
             =1352 ; THTRLR = COUNT TRAILER BYTE = 2AH (AFTER PARITY INSERT = 6AH)
             =1353 ;
0400 85      =1354 TH000:    CLR     F0              ;F0 INDICATES CONTROL BYTE RECEIVED IF ON
0401 A5      =1355           CLR     F1              ;F1 ON INDICATES ODD BYTE RECEIVED
0402 B830    =1356           MOV     R0,#TSEG1       ;R0=SEG TABLE POINTER
0404 BB10    =1357           MOV     R3,#16          ;R3=LOOP COUNTER TO RECEIVE 16 DATA CHAR'S
0406 999F    =1358           ANL     P1,#255-(EGDLT+EBDLT)   ;LIGHTS OFF
0408 8910    =1359           ORL     P1,#ELASDB              ;LASER OFF
040A 860E    =1360 TH005:    JNI     TH010           ;JMP IF FCA HAS DATA
040C 840A    =1361           JMP     TH005
             =1362 ;
```

```
                =1363 ;     FETCH DATA FROM FCA, DO FRAME RESET TO FCA, FETCH COMM DATA
                =1364 ;     IF BIT 7 SET, JMP TO POWER UP RESET IF COMM DATA=0.
                =1365 ;
040E B901       =1366 THO10:  MOV    R1,#01H
0410 81         =1367         MOVX   A,@R1        ;READ FCA S.R.
0411 91         =1368         MOVX   @R1,A        ;DO FCA FRAME RESET
0412 37         =1369         CPL    A
0413 F20A       =1370         JB7    THO05        ;RETURN IF FCA DOES NOT HAVE COMM DATA
                =1371 ;
                =1372 ;     OTHERWISE, FETCH COMM DATA
                =1373 ;
0415 19         =1374         INC    R1           ;TO 02H TO READ COMM REG
0416 81         =1375         MOVX   A,@R1        ;READ FCA COMM REG
0417 A9         =1376         MOV    R1,A         ;R1=COMM DATA
0418 961C       =1377         JNZ    THO14        ;JMP IF DATA NOT=0
041A 0400       =1378 THO12:  JMP    RSTTRP       ;JMP TO POWER UP RESET IF COMM DATA=0
                =1379 ;
041C B40E       =1380 THO14:  CALL   CPARTY       ;CPARTY WILL CHK FOR CORRECT PARITY
041E 17         =1381         INC    A
041F 9600       =1382         JNZ    THO00        ;JMP BACK TO START IF INCORRECT PARITY
0421 F9         =1383         MOV    A,R1         ;R1=COMM DATA
0422 B62D       =1384         JF0    THO15        ;JMP IF CONTROL BYTE ALREADY RECEIVED
                =1385 ;                           ;OTHERWISE, CHECK FOR CONTROL BYTE=D1H
0424 D3D1       =1386         XRL    A,#001H
0426 9600       =1387         JNZ    THO00        ;JMP BACK TO START IF NOT CONTROL BYTE
0428 95         =1388         CPL    F0           ;SET F0=1 TO INDICATE CONTROL BYTE RCVD
0429 8940       =1389         ORL    P1,#EBDLT    ;BD-LT ON SAYS CNTL BYTE RCVD
042B 840A       =1390         JMP    THO05        ;BACK TO THO05 TO GET 16 DATA BYTES
                =1391 ;
                =1392 ;     PUT EVEN BYTES IN HIGH NIBBLE & ODD BYTES IN LOW NIBBLE
                =1393 ;
042D F9         =1394 THO15:  MOV    A,R1         ;R1=COMM DATA
042E 7634       =1395         JF1    THO20        ;JMP IF THIS IS ODD BYTE
0430 47         =1396         SWAP   A
0431 A0         =1397         MOV    @R0,A        ;PUT EVEN BYTE IN HIGH NIBBLE
0432 8436       =1398         JMP    THO29
0434 30         =1399 THO20:  XCHD   A,@R0        ;PUT ODD BYTE IN LOW NIBBLE
0435 18         =1400         INC    R0           ;INC R0 TO NEXT SEG TABLE ADDRESS
                =1401 ;
                =1402 ; CHECK FOR LAST BYTE OF CONTROL BYTE
                =1403 ;
0436 85         =1404 THO29:  CPL    F1
0437 F9         =1405         MOV    A,R1
0438 9200       =1406         JB4    THO00        ;JMP = CONTROL BYTE
043A B240       =1407         JB5    THO30        ;JMP = LAST BYTE RCVD
043C EB0A       =1408         DJNZ   R3,THO05     ;JMP = MORE TO COME
043E 8400       =1409         JMP    THO00
                =1410 ;
                =1411 ; IF 16 BYTES RECEIVED, PERFORM TEST
                =1412 ;
0440 EB00       =1413 THO30:  DJNZ   R3,THO00     ;JMP = NOT 16 BYTES
0442 9462       =1414         CALL   TSCNT        ;GO COLLECT SEGMENTS
                =1415 ;
                =1416 ; SEND HEADER, COUNTS AND LAST BYTE TO COMPUTER
                =1417 ;
0444 B915       =1418         MOV    R1,#15H      ;SEND COUNT HEADER BYTE TO HOST
0446 B400       =1419         CALL   THSND        ;SEND HEADER
                =1420 ;
0448 BB08       =1421         MOV    R3,#8
044A B838       =1422         MOV    R0,#TCNT1    ;R0=COUNT POINTER
044C FB         =1423 THO50:  MOV    A,R3
044D 1253       =1424         JB0    THO55        ;JMP = ODD BYTE
044F F0         =1425         MOV    A,@R0
0450 47         =1426         SWAP   A
0451 8455       =1427         JMP    THO59
0453 30         =1428 THO55:  XCHD   A,@R0
0454 18         =1429         INC    R0
0455 530F       =1430 THO59:  ANL    A,#0FH
0457 A9         =1431         MOV    R1,A
0458 B400       =1432         CALL   THSND
045A EB4C       =1433         DJNZ   R3,THO50
                =1434 ;
045C B92A       =1435         MOV    R1,#2AH      ;2AH = COUNT TRAILER BYTE
045E B400       =1436         CALL   THSND        ;SEND TRAILER BYTE
0460 8400       =1437         JMP    THO00        ;FINISHED WITH THIS REQUEST, START OVER.
                 1438 $       INCLUDE(:F3:HORSE2.SRC)
                =1439 ;****************************************************************
                =1440 ; FILE: HORSE2.SRC  HORSE TEST PART 2 OF 3.
                =1441 ; 11-18-86 13:50 BOB ACTIS
                =1442 ;
                =1443 ; ROUTINE: TSCNT - COUNT TEST SEGMENTS
                =1444 ;
                =1445 ; FUNCTION: COUNT THE NUMBER OF TIMES EACH OF TWO SEGMENTS ARE DETECTED
                =1446 ;           OVER A ONE SECOND PERIOD. TURN THE LASER ON DURING THE TEST.
                =1447 ;           EXIT TO POWER ON ENTRY IF ANYTHING RECEIVED FROM HOST.
                =1448 ;           WILL COMPARE 1ST 2 CHAR'' OF SEGMENT CAPTURED WITH
                =1449 ;           TSEG1 & TSEG2 AND RESET FCA SHIFT REG IF NO COMPARE.
                =1450 ;           4 CHAR SEG'S MUST BE PRECEDED BY 00H IN THE SEG TABLE...
                =1451 ;
                =1452 ; ENTRY:
```

```
                    =1453 ;       TSEG1 = SEGMENT 1 DEFINITION  (4 BYTES)
                    =1454 ;       TSEG2 = SEGMENT 2 DEFINITION  (4 BYTES)
                    =1455 ;
                    =1456 ; EXIT:
                    =1457 ;       TCNT1 = SEGMENT 1 COUNT (2 BYTES)
                    =1458 ;       TCNT2 = SEGMENT 2 COUNT (2 BYTES)
                    =1459 ;
                    =1460 ; *( A)
                    =1461 ; *(R0)
                    =1462 ; *(R1)
                    =1463 ; *(TSCBUF) TO (TSCBUF+3)
                    =1464 ;  RB0 (R7) = SECOND TIMER = 0
                    =1465 ;
                    =1466 ; PARAMETERS:
                    =1467 ;
                    =1468 ;       SEGMENT DEFINITION TABLE
                    =1469 ;
                    =1470 ;       BYTE 0 - 1ST AND 2ND CHAR (AS DETECTED OR ZERO IF 4-CHAR)
                    =1471 ;       BYTE 1 - 3RD AND 4TH CHAR (1ST & 2ND ON 4-CHAR)
                    =1472 ;       BYTE 2 - 5TH AND 6TH CHAR (3RD & 4TH ON 4-CHAR)
                    =1473 ;       BYTE 3 - DECODED PARITY WORD
                    =1474 ;
0462 99EF           =1475 TSCNT:  ANL     P1,#0FFH-ELASDB  ;LASER ON
0464 BF02           =1476         MOV     R7,#(1*FACTOR)
0466 B438           =1477         CALL    TMWAIT           ;WAIT FOR LASER TO TURN ON
0468 BF64           =1478         MOV     R7,#(E1000M*FACTOR)
046A 27             =1479         CLR     A
046B B838           =1480         MOV     R0,#TCNT1
046D B909           =1481         MOV     R1,#9
046F A0             =1482 TSC02:  MOV     @R0,A            ;CLEAR TCNT1 TO TCNT1+9
0470 18             =1483         INC     R0
0471 E96F           =1484         DJNZ    R1,TSC02
                    =1485 ;
                    =1486 ; RESET FCA TO CLEAR ANY SEGMENTS
                    =1487 ;
0473 B803           =1488         MOV     R0,#EFCRST
0475 90             =1489         MOVX    @R0,A
                    =1490 ;
                    =1491 ; IF SYMCAP THEN READ THE SEGMENT; EXIT IF HOST BYTE RECEIVED.
                    =1492 ;
0476 A5             =1493 TSC04:  CLR     F1               ;F1 REMEMBERS TO INC TCNT1 OR TCNT2
0477 B801           =1494         MOV     R0,#ESRRD
0479 8680           =1495 TSC05:  JNI     TSC08            ;JMP IF SYMCAP OR HOST COMM. OCCURED
047B FF             =1496 TSC06:  MOV     A,R7             ;CHECK FOR 1 SECOND TIMEOUT
047C 9676           =1497         JNZ     TSC04
                    =1498 ;
                    =1499 ;    TURN LASER OFF & RETURN TO CALLER
                    =1500 ;
047E 8910           =1501 TSC20:  ORL     P1,#ELASDB
0480 83             =1502         RET
                    =1503 ;
0481 90             =1504 TSC07:  MOVX    @R0,A            ;RESET FCA SHIFT REG
0482 847B           =1505         JMP     TSC06
                    =1506 ;
0484 80             =1507 TSC12:  MOVX    A,@R0            ;SHIFT OUT 2ND CHAR FROM FCA
0485 27             =1508         CLR     A
0486 B950           =1509         MOV     R1,#TSCBUF
0488 A1             =1510         MOV     @R1,A            ;PUT 00 TO R4 FOR 1ST TWO CHAR'S
0489 8499           =1511         JMP     TSC09
048B 0400           =1512 TSC11:  JMP     RSTTRP
048D B950           =1513 TSC08:  MOV     R1,#TSCBUF       ;START OF DATA CAPTURE BUFFER
048F 80             =1514         MOVX    A,@R0            ;READ 1ST CHAR FROM FCA
0490 F288           =1515         JB7     TSC11            ;JMP TO POWER UP SEQ IF COMM. FROM HOST
0492 9284           =1516         JB4     TSC12            ;JMP IF 4 CHAR SEG...1ST 2 CHARS=00
0494 47             =1517         SWAP    A
0495 A1             =1518         MOV     @R1,A
0496 80             =1519         MOVX    A,@R0            ;READ 2ND CHAR FROM FCA
0497 31             =1520         XCHD    A,@R1
0498 F1             =1521         MOV     A,@R1
0499 B930           =1522 TSC09:  MOV     R1,#TSEG1
049B D1             =1523         XRL     A,@R1            ;COMPARE 1ST 2 CHAR'S WITH TSEG1
049C C6A6           =1524         JZ      TSC10            ;JMP IF COMPARED
049E B934           =1525         MOV     R1,#TSEG2
04A0 F1             =1526         MOV     A,@R1
04A1 B950           =1527         MOV     R1,#TSCBUF
04A3 D1             =1528         XRL     A,@R1            ;COMPARE 1ST 2 CHAR'S WITH TSEG2
04A4 9681           =1529         JNZ     TSC07            ;JMP TO RESET FCA S.R. IF NO COMPARE
                    =1530 ;
04A6 B951           =1531 TSC10:  MOV     R1,#TSCBUF+1     ;SET UP TO READ NEXT 4 CHAR'S
04A8 B416           =1532         CALL    NEXT4            ;READ 3RD-6TH CHAR'S
                    =1533 ;
04AA B831           =1534         MOV     R0,#TSEG1+1      ;COMPARE COMPLETE SEG TO TSEG1 & 2
04AC B42A           =1535         CALL    SGMTCH           ;COMPARE LAST 4 CHAR'S OF CAPTURED SEG
                    =1536 ;                                ;TO TSEG1
04AE C6BB           =1537         JZ      SEGONE           ;JMP IF SEG 1 COMPARED
04B0 B5             =1538         CPL     F1               ;F1=1 SAYS TSEG2 BEING COMPARED
04B1 B835           =1539         MOV     R0,#TSEG2+1
04B3 B42A           =1540         CALL    SGMTCH
04B5 967B           =1541         JNZ     TSC06            ;JMP IF NO MATCH
04B7 883B           =1542         MOV     R0,#TCNT2+1
04B9 76BD           =1543         JF1     INCREM           ;JMP IF TSEG 2 MATCHED TO INCREMENT
04BB B839           =1544 SEGONE: MOV     R0,#TCNT1+1      ;SET UP R0 TO INCREMENT TSEG 1 CNTR
```

```
04BD 17      =1545 INCREM: INC   A                ;ACC NOW = 01
04BE 60      =1546         ADD   A,@R0           ;INC LOW BYTE
04BF A0      =1547         MOV   @R0,A
04C0 C8      =1548         DEC   R0
04C1 27      =1549         CLR   A
04C2 70      =1550         ADDC  A,@R0           ;INC HIGH BYTE IF CARRY
04C3 A0      =1551         MOV   @R0,A
04C4 847B    =1552         JMP   TSC06           ;JMP TO CHK FOR 1 SECOND TIMEOUT
              1553 $       INCLUDE(:F3:OVRSET.SRC)
             =1554 ;************************************************************
             =1555 ;**                 Subroutine OVRSET                        **
             =1556 ;** Function: Overide Switch settings by changing RAM from host **
             =1557 ;** Date: 3-15-87                                            **
             =1558 ;** Subroutines Called: ROCIA                                **
             =1559 ;** Registers/Flags affected: F0, CARRY, R2, R1, ACCUMULATOR **
             =1560 ;** Ports affected: None                                     **
             =1561 ;** RAM locations affected: @SWISET                          **
             =1562 ;************************************************************
             =1563 OVRSET:
             =1564 ;GET COMMAND BYTE FROM HOST
04C6 8495    =1565         CALL  ROCIA           ;RECIEVE BYTE FROM HOST
04C8 E6CC    =1566         JNC   CHECLB          ;JUMP TO CHECK FOR LAST BYTE IF NO PARITY ERROR
             =1567 ;PARITY ERROR, GO TO ERROR ROUTINE. WE GOT GARBAGE.
04CA 84DC    =1568         JMP   OVRERR          ;JUMP TO ERROR ROUTINE
             =1569 ;PARITY BYTE CHECKS OK. CHECK FOR LAST BYTE BIT.
04CC D200    =1570 CHECLB: JB6   SAVEBT          ;JUMP IF LAST BYTE BIT SET.
             =1571 ;LAST BYTE BIT NOT SET. SOMETHING IS WRONG.
04CE 84DC    =1572         JMP   OVRERR          ;JUMP TO ERROR ROUTINE
             =1573 ;LAST BYTE BIT SET AND PARITY CHECKED OK. SAVE SWITCH SETTINGS IN RAM.
04D0 530F    =1574 SAVEBT: ANL   A,#0FH          ;MASK OUT UPPER 4 BITS.
04D2 AA      =1575         MOV   R2,A            ;TEMPORATILY STORE RECIEVED BYTE
04D3 B95F    =1576         MOV   R1,#SWISET      ;RAM POINTER
04D5 F1      =1577         MOV   A,@R1           ;SAVE SCANNER SETTINGS
04D6 5340    =1578         ANL   A,#40H          ;SAVE DOUBLE READ BIT
04D8 4A      =1579         ORL   A,R2            ;SET BITS 3-0 ACCORDING TO RECIEVED DATA
04D9 A1      =1580         MOV   @R1,A           ;SAVE RECIEVED BYTE IN RAM.
04DA 84E0    =1581         JMP   OVRRET          ;RETURN
             =1582 ;ERROR ROUTINE. BEEP 6 TIMES AND TURN ON RED LIGHT.
04DC B806    =1583 OVRERR: MOV   R0,#6           ;SET BEEP COUNTER
04DE 7481    =1584         CALL  TERRWT          ;BEEP 6 TIMES
04E0 83      =1585 OVRRET: RET
              1586 $       INCLUDE(:F3:TRNFLG.SRC)
             =1587 ;************************************************************
             =1588 ;**                 Subroutine TRNFLG                        **
             =1589 ;** Function: Transfers label flags from UPC code to RAM     **
             =1590 ;** Date: 7-17-87                                            **
             =1591 ;** Subroutines Called: SHIFTL                               **
             =1592 ;** Registers/Flags affected: R0, R2, R3, ACCUMULATOR, R1    **
             =1593 ;** Ports affected: None                                     **
             =1594 ;** RAM locations affected: @R1                              **
             =1595 ;************************************************************
             =1596 TRNFLG:
             =1597 ;GET FIRST FOUR BYTES OF LABEL (ABCD)
04E1 B824    =1598         MOV   R0,#L6S1        ;SOURCE RAM POINTER
04E3 BB02    =1599         MOV   R3,#2           ;SET FLAG COUNTER
04E5 B4C9    =1600         CALL  SHIFTL          ;SHIFT NIBBLES LEFT ONE NIBBLE
             =1601 ;GET SECOND TWO BYTES OF LABEL (EF)
             =1602 ;TRICK WITH THIS ROUTINE IS THAT THE NIBBLES TO COMPRISE FLAG 'EF' IS SPLIT
             =1603 ;  BETWEEN LEFT AND RIGHT HALF OF LABEL.
04E7 F0      =1604         MOV   A,@R0           ;RETRIEVE DE NIBBLES
04E8 530F    =1605         ANL   A,#0FH          ;MASK OUT 'D' NIBBLE
04EA 47      =1606         SWAP  A               ;E0
04EB AA      =1607         MOV   R2,A            ;SAVE NIBBLE
04EC B82E    =1608         MOV   R0,#R6S1        ;GET RIGHT HALF OF LABEL
04EE F0      =1609         MOV   A,@R0           ;  (RIGHT HALF OF LABEL)
04EF 53F0    =1610         ANL   A,#0F0H         ;MASK LOWER NIBBLE (F0)
04F1 47      =1611         SWAP  A               ;0F
04F2 4A      =1612         ORL   A,R2            ;EF
04F3 A1      =1613         MOV   @R1,A           ;SAVE NIBBLES IN RAM
04F4 19      =1614         INC   R1              ;INCREMENT SOURCE POINTER
             =1615 ;GET BYTES GH INTO RAM.
04F5 BB01    =1616         MOV   R3,#1           ;SET FLAG COUNTER
04F7 84C9    =1617         CALL  SHIFTL
04F9 83      =1618         RET
              1619 ;******************************************
04FA A3       1620 TROPG4: MOVP  A,@A
04FB 83       1621         RET
0500          1622         ORG   500H
              1623 $       INCLUDE(:F3:HORSE3.SRC)
             =1624 ;************************************************************
             =1625 ; FILE: HORSE3.SRC  HORSE TEST FILE 3 OF 3.
             =1626 ; 07-05-86 09:30 BOB ACTIS
             =1627 ;************************************************************
             =1628 ; ROUTINE: THSND
             =1629 ;
             =1630 ; FUNCTION: SEND A BYTE TO HOST. WAITS FOR TRANSMITTER READY.
             =1631 ;
             =1632 ; ENTRY:
             =1633 ;    (R1) = BYTE TO SEND (NO PARITY)
             =1634 ;
             =1635 ; EXIT:
```

```
                    =1636 ;         *(A)
                    =1637 ;         *(R1)
                    =1638 ;         *(R4)
                    =1639 ;
0500 0A             =1640 THSND:  IN      A,P2
0501 9200           =1641         JB4     THSND           ;JMP = HOST COMM. REG. NOT READY
0503 F9             =1642         MOV     A,R1            ;(A) = BYTE
0504 B40E           =1643         CALL    CPARTY
0506 37             =1644         CPL     A               ;SET FOR ODD PARITY
0507 53C0           =1645         ANL     A,#0C0H
0509 49             =1646         ORL     A,R1            ;(A) = FINAL BYTE WITH PARITY
050A B902           =1647         MOV     R1,#EOCIA
050C 91             =1648         MOVX    @R1,A
050D 83             =1649         RET
                    =1650 ;****************************************************************
                    =1651 ; ROUTINE: CPARTY
                    =1652 ;
                    =1653 ; FUNCTION: COMPUTE PARITY OF ALTERNATE BITS OF BYTE
                    =1654 ;
                    =1655 ; ENTRY:
                    =1656 ;         (A) = BYTE
                    =1657 ;
                    =1658 ; EXIT:
                    =1659 ;         (A) = PARITY
                    =1660 ;             B7 = B5 = B3 = B1 = PARITY OF ODD BITS
                    =1661 ;             B6 = B4 = B2 = B0 = PARITY OF EVEN BITS
                    =1662 ;         *(R4)
                    =1663 ;
050E AC             =1664 CPARTY: MOV     R4,A
050F 47             =1665         SWAP    A
0510 DC             =1666         XRL     A,R4
0511 AC             =1667         MOV     R4,A
0512 E7             =1668         RL      A
0513 E7             =1669         RL      A
0514 DC             =1670         XRL     A,R4
0515 83             =1671         RET
                    =1672 ;****************************************************************
                    =1673 ; NEXT4:  READ 3RD-6TH CHARACTERS
                    =1674 ;
0516 80             =1675 NEXT4:  MOVX    A,@R0           ;READ 3RD CHAR FROM LSI3
0517 47             =1676         SWAP    A
0518 A1             =1677         MOV     @R1,A           ;PUT 3RD TO HI NIB. OF TSCBUF+1
0519 80             =1678         MOVX    A,@R0           ;READ 4TH CHAR
051A 31             =1679         XCHD    A,@R1           ;PUT 4TH TO LO TSCBUF+1
051B 19             =1680         INC     R1              ;POINTS TO TSCBUF+2 NOW
051C 80             =1681         MOVX    A,@R0           ;READ 5TH CHAR
051D 47             =1682         SWAP    A
051E A1             =1683         MOV     @R1,A           ;PUT 5TH TO HI TSCBUF+2
051F 80             =1684         MOVX    A,@R0           ;READ 6TH CHAR
0520 31             =1685         XCHD    A,@R1           ;PUT 6TH TO LO TSCBUF+2
0521 19             =1686         INC     R1
0522 B804           =1687         MOV     R0,#04H
0524 80             =1688         MOVX    A,@R0           ;R0=04H,@R0=PARITY DECODE READ OF LSI3
0525 A1             =1689         MOV     @R1,A           ;PUT PARITY DECODE TO TSCBUF+3
0526 B801           =1690         MOV     R0,#01H
0528 90             =1691         MOVX    @R0,A           ;FR.RST TO LSI 3
0529 83             =1692         RET
                    =1693 ;****************************************************************
                    =1694 ; ROUTINE: SGMTCH - MATCH SEGMENTS
                    =1695 ;
                    =1696 ; FUNCTION: DETERMINE IF TWO SEGMENTS HAVE IDENTICAL DATA AND PARITY
                    =1697 ;           (LAST 4 CHARACTERS OF SEG AND PARITY)
                    =1698 ;
                    =1699 ; ENTRY:
                    =1700 ;         (R0) = ADRS OF ONE SEGMENT - SAME FORMAT AS REG 4-7
                    =1701 ;         (TSCBUF+1) = 3RD AND 4TH CHAR
                    =1702 ;         (TSCBUF+2) = 5TH AND 6TH CHAR
                    =1703 ;         (TSCBUF+3) = DECODED PARITY WORD
                    =1704 ;
                    =1705 ; EXIT:
                    =1706 ;         (A) = 0 FOR MATCH
                    =1707 ;         *(R0)
                    =1708 ;
052A F0             =1709 SGMTCH: MOV     A,@R0
052B B951           =1710         MOV     R1,#TSCBUF+1
052D D1             =1711         XRL     A,@R1
052E 963A           =1712         JNZ     SGM90           ;JMP = 2ND BYTE NO MATCH
0530 18             =1713         INC     R0
0531 19             =1714         INC     R1
0532 F0             =1715         MOV     A,@R0
0533 D1             =1716         XRL     A,@R1
0534 963A           =1717         JNZ     SGM90           ;JMP = 3RD BYTE NO MATCH
0536 18             =1718         INC     R0
0537 19             =1719         INC     R1
0538 F0             =1720         MOV     A,@R0
0539 D1             =1721         XRL     A,@R1
053A 83             =1722 SGM90:  RET
                    =1723 ;****************************************************************
                    =1724 ; ROUTINE: TMWAIT
                    =1725 ;
                    =1726 ; FUNCTION: WAIT FOR 20MSEC TIMER TO EXHAUST
```

```
                    =1727 ;
                    =1728 ; ENTRY:
                    =1729 ;     RB0 (R7) = TIMER (20MSEC RES)
                    =1730 ;
                    =1731 ; EXIT:
                    =1732 ;     RB0 (R7) = 0
                    =1733 ;
053B  27            =1734 TMWAIT: CLR    A
053C  62            =1735         MOV    T,A              ;CLEAR THE TIMER COUNTER
053D  25            =1736         EN     TCNTI            ;ENABLE TIMER INTERRUPT
053E  55            =1737         STRT   T                ;CLEAR TIMER PRESCALER
                    =1738 ;
053F  FF            =1739 TMWAIO: MOV    A,R7
0540  963F          =1740         JNZ    TMWAIO
0542  83            =1741         RET
                    1742  $       INCLUDE(:F3:CHKSCN.SRC)
                    =1743 ;***************************************************************
                    =1744 ;**              Subroutine CHKSCN                            **
                    =1745 ;** Function: Check Switch RAM settings for two scan option and set R1 accor.*
                    =1746 ;** Date: 3-18-87                                             **
                    =1747 ;** Subroutines Called: None                                  **
                    =1748 ;** Registers/Flags affected: R1, Accumulator                 **
                    =1749 ;** Ports affected: None                                      **
                    =1750 ;** RAM locations affected: None                              **
                    =1751 ;***************************************************************
                    =1752 ;THIS ROUTINE USED FOR UPCA, EAN8, AND EAN13
                    =1753 CHKSCN:
0543  B95F          =1754         MOV    R1,#SWISET       ;SET RAM POINTER TO SWITCH SETTINGS
0545  F1            =1755         MOV    A,@R1            ;RETRIEVE SETTINGS
0546  530C          =1756         ANL    A,#0CH           ;MASK OUT ALL BUT TWO SCAN SETTINGS
0548  03F4          =1757         ADD    A,#0F4H          ;CHECK FOR B3,B2=11 (750F MODE)
054A  F654          =1758         JC     STOCIA           ;JUMP IF B3,B2=11
054C  0304          =1759         ADD    A,#004H          ;CHECK FOR B3,B2=10 (MODIFIED 2-SCAN)
054E  F658          =1760         JC     SP2SCN           ;JUMP IF B3,B2=10
0550  0304          =1761         ADD    A,#004H          ;CHECK FOR B3,B2=01 (750F-T 2 SCAN)
0552  F661          =1762         JC     ST2SCN           ;JUMP IF B3,B2=01
                    =1763 ;MUST BE B3,B2=00 WHICH IS 750F MODE
0554  B9FF          =1764 STOCIA: MOV    R1,#-1           ;SET FOR 1 SCAN
0556  A463          =1765         JMP    CKSNRT           ;FINISHED, RETURN
0558  B9FE          =1766 SP2SCN: MOV    R1,#-2           ;SET FOR 2 SCAN
055A  F8            =1767         MOV    A,R0             ;CHECK FOR EAN13, OF WHICH WE ONLY WANT 1 SCAN
055B  C663          =1768         JZ     CKSNRT           ;JUMP IF NOT EAN13. OTHER LABELS ARE 2 SCAN
055D  B9FF          =1769         MOV    R1,#-1           ;EAN13, REQUIRE 1 SCAN.
055F  A463          =1770         JMP    CKSNRT           ;FINISHED, RETURN
0561  B9FE          =1771 ST2SCN: MOV    R1,#-2           ;SET FOR 2 SCAN
0563  83            =1772 CKSNRT: RET
                    1773  $       INCLUDE(:F3:WREPRM.SRC)
                    =1774 ;***************************************************************
                    =1775 ;**              Subroutine WREPRM                            **
                    =1776 ;** Function: Write packed RAM to EEPROM                      **
                    =1777 ;** Date: 2-26-87                                             **
                    =1778 ;** Subroutines Called: WRACC, WAIT                           **
                    =1779 ;** Registers/Flags affected: F0, R0, R1, R2, R3, *R1, *R2, Carry, Acc **
                    =1780 ;** Ports affected: P1, P2                                    **
                    =1781 ;** RAM locations affected: None                              **
                    =1782 ;***************************************************************
                    =1783 WREPRM:
                    =1784 ;SEND OP CODE TO ENABLE EEPROM WRITE
0564  B4D9          =1785         CALL   SNDWRT
                    =1786 ;SEND OP CODE TO ERASE ALL OF EEPROM
0566  2320          =1787         MOV    A,#ERAL          ;ERASE ALL OF EEPROM
0568  B4BD          =1788         CALL   ERASFL
                    =1789 ;TRANSFER 16 BYTES FROM RAM TO EEPROM
056A  B961          =1790         MOV    R1,#TWOLAB       ;INITIALIZE RAM POINTER
056C  BA40          =1791         MOV    R2,#OWRITE       ;INITIALIZE EEPROM ADDRESS AND OP CODE
056E  BB08          =1792         MOV    R3,#8D           ;INITIALIZE LABELSET COUNTER
                    =1793 ;SEND OP CODE AND EEPROM ADDRESS
                    =1794 TRNDTA:
0570  8A80          =1795         ORL    P2,#EPRMCS       ;SET EEPROM_CS HIGH
0572  85            =1796         CLR    F0               ;SET F0=0 TO SIGNIFY OP CODE
0573  FA            =1797         MOV    A,R2             ;OP CODE + EEPROM ADDRESS IN ACCUMULATOR
0574  34C2          =1798         CALL   WRACC            ;SEND OP CODE + EEPROM ADDRESS TO EEPROM
                    =1799 ;SEND BITS 15-8 TO EEPROM (LABEL 1)
0576  F1            =1800         MOV    A,@R1            ;GET DATA FROM RAM (LABEL 1)
0577  85            =1801         CLR    F0               ;SET F0
0578  95            =1802         CPL    F0               ; TO '1' TO SIGNIFY DATA TRANSFER
0579  34C2          =1803         CALL   WRACC            ;WRITE DATA BITS 15-8 TO EEPROM
                    =1804 ;SEND BITS 7-0 TO EEPROM (LABEL 2)
057B  19            =1805         INC    R1               ;INCREMENT RAM POINTER TO LABEL 2
057C  F1            =1806         MOV    A,@R1            ;RETREIVE DATA (LABEL 2)
057D  85            =1807         CLR    F0               ;SET F0
057E  95            =1808         CPL    F0               ; TO '1' TO SIGNIFY DATA TRANSFER
057F  34C2          =1809         CALL   WRACC            ;WRITE DATA BITS 7-0
                    =1810 ;SET EEPROM_CS LOW FOR 15MS
0581  9A7F          =1811         ANL    P2,#255-EPRMCS   ;SET EEPROM_CS LOW
0583  230F          =1812         MOV    A,#15D           ;WAIT FOR
0585  34E1          =1813         CALL   WAIT             ; 15 MILLI-SECONDS
                    =1814 ;SET UP POINTERS FOR NEXT LABEL SET
0587  19            =1815         INC    R1               ;INCREMENT RAM POINTER TO LABEL 1 OF NEXT LABEL SET
0588  1A            =1816         INC    R2               ;INCREMENT EEPROM ADDRESS POINTER FOR NEXT 16 BITS
0589  EB70          =1817         DJNZ   R3,TRNDTA        ;IF R3 NOT ZERO, GO BACK TO TRANSFER ANOTHER 16 BITS TO
```

```
                  =1818 ;DATA ALL TRANSFERRED.  SEND OP CODE TO DISABLE ERASE/WRITE TO EEPROM.
058B 8A80         =1819         ORL     P2,#EPRMCS              ;SET EEPROM_CS HIGH
058D 2300         =1820         MOV     A,#EWDS                 ;MOV OP CODE TO DISABLE ERASE/WRITE TO ACCUMULATOR
058F 85           =1821         CLR     F0                      ;SET F0 LOW TO SIGNIFY 9 BITS TO SEND
0590 34C2         =1822         CALL    WRACC                   ;WRITE OP CODE TO EEPROM
0592 9A7F         =1823         ANL     P2,#255-EPRMCS          ;SET EEPROM_CS LOW
                  =1824 ;RETURN BACK
0594 83           =1825         RET
                   1826 $       INCLUDE(:F3:ROCIA.SRC)
                  =1827 ;************************************************************************
                  =1828 ;**                      Subroutine ROCIA                              **
                  =1829 ;** Function: Recieve data from VLSI chip with output in accumulator.  **
                  =1830 ;** Date:  3-15-87                                                     **
                  =1831 ;** Subroutines Called: PARITY                                         **
                  =1832 ;** Registers/Flags affected: F0, *R3, *R0, CARRY, *R2, ACCUMULATOR    **
                  =1833 ;** Ports affected: NONE                                               **
                  =1834 ;** RAM locations affected: NONE                                       **
                  =1835 ;************************************************************************
                  =1836 ;F0=1 MEANS LAST BITE BIT SET IN B6
                  =1837 ;F0=0 MEANS LAST BITE BIT NOT SET IN B6
                  =1838 ;CARRY MEANS THAT PARITY ERROR HAS OCCURED
                  =1839 ;NO CARRY MEANS THAT BYTE RECIEVED PASSED PARITY CHECK
0595 85           =1840 ROCIA:  CLR     F0                      ;INITIALIZE B6 FLAG
0596 97           =1841         CLR     C                       ;INITIALIZE PARITY FLAG
0597 8698         =1842 ROCIA1: JNI     ROCIA2                  ;IF INTERUPT LINE LOW, VLSI HAS OCIA DATA.
0599 A497         =1843         JMP     ROCIA1                  ;NO DATA. JUMP BACK TO CHECK ROCIA.
059B D5           =1844 ROCIA2: SEL     RB1
059C B802         =1845         MOV     R0,#EOCIA               ;SET POINTER TO WRITE TO VLSI CHIP.
059E 80           =1846         MOVX    A,@R0                   ;GET BYTE FROM ACCUMULATOR
059F AA           =1847         MOV     R2,A                    ;TEMPORARILY SAVE BYTE TO CHECK FOR PARITY
                  =1848 ;CHECK FOR CORRECT PARITY
05A0 3490         =1849         CALL    PARITY                  ;CALCULATE PARITY
05A2 D5           =1850         SEL     RB1
05A3 DA           =1851         XRL     A,R2                    ;COMPARE TO RECIEVED BYTE
05A4 C6A7         =1852         JZ      LASTBT                  ;IF ZERO, PARITY IS OK
05A6 A7           =1853         CPL     C                       ;BAD PARITY. SET CARRY FLAG.
                  =1854 ;PARITY CHECKED.  RESTORE RECIEVED BYTE AND CHECK FOR LAST BYTE.
05A7 FA           =1855 LASTBT: MOV     A,R2                    ;RESTORE RECIEVED BYTE
05A8 37           =1856         CPL     A
05A9 D2AC         =1857         JB6     OCIRET                  ;JUMP IF NOT LAST BYTE
05AB 95           =1858         CPL     F0                      ;MUST BE LAST BYTE
                  =1859 ;BYTE RECIEVED AND CHECKED.  RETURN TO ROUTINE.
                  =1860 OCIRET:
05AC FA           =1861         MOV     A,R2                    ;RESTORE RECIEVED DATA
05AD C5           =1862         SEL     RB0
05AE 83           =1863         RET
                   1864 $       INCLUDE(:F3:TON1CT.SRC)
                  =1865 ;************************************************************************
                  =1866 ;**                      SUBROUTINE TON1CT                             **
                  =1867 ;** FUNCTION: SET R5 (RB1) ACCORDING TO SWITCH SETTINGS                **
                  =1868 ;** DATE: 3/15/87                                                      **
                  =1869 ;** SUBROUTINES CALLED: NONE                                           **
                  =1870 ;** REGISTERS/FLAGS AFFECTED: R5 (RB1), R1 (RB1), ACCUMULATOR          **
                  =1871 ;** PORTS AFFECTED: NONE                                               **
                  =1872 ;** RAM LOCATIONS AFFECTED: NONE                                       **
                  =1873 ;************************************************************************
                  =1874 TON1CT:
                  =1875 ;SET TONE CYCLE COUNTER ACCORDING TO RAM (SWITCH SETTINGS)
05AF B95F         =1876         MOV     R1,#SWISET              ;SET RAM POINTER
05B1 F1           =1877         MOV     A,@R1                   ;RETRIEVE SWITCH SETTINGS FROM RAM
05B2 5303         =1878         ANL     A,#03H                  ;MASK ALL BUT TONE BITS
05B4 03B9         =1879         ADD     A,#LOW TONADD           ;SET OF EPROM ADDRESS FETCH
05B6 A3           =1880         MOVP    A,@A                    ;GET TONE CYCLE SETTING
05B7 AD           =1881         MOV     R5,A                    ;SET TONE CYCLE COUNT IN R5
05B8 83           =1882         RET
                  =1883 ;
05B9              =1884 TONADD  EQU     $
05B9 0A           =1885         DB      ETNCT1                  ;TONE CYCLE COUNT FOR 500HZ
05BA 0F           =1886         DB      ETNCT2                  ;TONE CYCLE COUNT FOR 730HZ
05BB 14           =1887         DB      ETNCT3                  ;TONE CYCLE COUNT FOR 960HZ
05BC 1C           =1888         DB      ETNCT4                  ;TONE CYCLE COUNT FOR 1370HZ
                   1889 $       INCLUDE(:F3:ERASFL.SRC)
                  =1890 ;************************************************************************
                  =1891 ;**                      Subroutine ERASFL                             **
                  =1892 ;** Function: Send OP code to enable EEPROM Write                      **
                  =1893 ;** Date: 3-17-87                                                      **
                  =1894 ;** Subroutines Called: WRACC, WAIT                                    **
                  =1895 ;** Registers/Flags affected: F0, R0, Accumulator, Carry, *R1, *R2     **
                  =1896 ;** Ports affected: P2,P1                                              **
                  =1897 ;** RAM locations affected: None                                       **
                  =1898 ;************************************************************************
                  =1899 ERASFL:
05BD 85           =1900         CLR     F0                      ;SET F0=0 TO SIGNIFY 9 BITS FOR OP CODE.
05BE 8A80         =1901         ORL     P2,#EPRMCS              ;SET EEPROM_CS HIGH
05C0 34C2         =1902         CALL    WRACC                   ;WRITE OP CODE TO EEPROM
05C2 9A7F         =1903         ANL     P2,#255-EPRMCS          ;SET EEPROM_CS LOW
05C4 230F         =1904         MOV     A,#15D                  ; FOR
05C6 34E1         =1905         CALL    WAIT                    ;   15 MS
05C8 83           =1906         RET
                   1907 $       INCLUDE(:F3:SHIFTL.SRC)
```

```
            =1908 ;******************************************************************
            =1909 ;**                    Subroutine SHIFTL                         **
            =1910 ;** Function: Shifts characters one nible left from to inputs    **
            =1911 ;** Date: 7-17-87                                                **
            =1912 ;** Subroutines Called: None                                     **
            =1913 ;** Registers/Flags affected: R0, R2, R3, ACCUMULATOR, R1        **
            =1914 ;** Ports affected: None                                         **
            =1915 ;** RAM locations affected: @R1                                  **
            =1916 ;******************************************************************
            =1917 SHIFTL:
05C9 F0     =1918        MOV     A,@R0           ;RETRIEVE WX CHARACTERS
05CA 530F   =1919        ANL     A,#0FH          ;MASK UPPER NIBBLE (0X)
05CC 47     =1920        SWAP    A               ;X0
05CD AA     =1921        MOV     R2,A            ;SAVE NIBBLE TEMPORARILY
05CE 18     =1922        INC     R0              ;INCREMENT SOURCE POINTER
05CF F0     =1923        MOV     A,@R0           ;RETRIEVE 'YZ' CHARACTERS
05D0 53F0   =1924        ANL     A,#0F0H         ;MASK OUT 'C' CHARACTER (Y0)
05D2 47     =1925        SWAP    A               ;0Y
05D3 4A     =1926        ORL     A,R2            ;XY IS RESULT
05D4 A1     =1927        MOV     @R1,A           ;SAVE XY IN RAM @R1 POINTER
05D5 19     =1928        INC     R1              ;INC DESTINATION POINTER
05D6 EBC9   =1929        DJNZ    R3,SHIFTL
05D8 83     =1930        RET
            1931 $       INCLUDE(:F3:SNDWRT.SRC)
            =1932 ;******************************************************************
            =1933 ;**                    Subroutine SNDWRT                         **
            =1934 ;** Function: Send OP code to enable EEPROM Write                **
            =1935 ;** Date: 3-17-87                                                **
            =1936 ;** Subroutines Called: WRACC                                    **
            =1937 ;** Registers/Flags affected: F0, R0, Accumulator, Carry         **
            =1938 ;** Ports affected: P2,P1                                        **
            =1939 ;** RAM locations affected: None                                 **
            =1940 ;******************************************************************
            =1941 SNDWRT:
05D9 2330   =1942        MOV     A,#EWEN         ;SEND OP CODE TO ENABLE EEPROM
05DB 85     =1943        CLR     F0              ;SET FLAG=0 TO SIGNIFY 9 BITS FOR OP CODE
05DC 8A80   =1944        ORL     P2,#EPRMCS      ;SET EEPROM_CS HIGH
05DE 34C2   =1945        CALL    WRACC           ;WRITE OPCODE TO EEPROM
05E0 9A7F   =1946        ANL     P2,#255-EPRMCS  ;SET EEPROM_CS LOW
05E2 83     =1947        RET
            1948 ;********************************************
05E3 A3     1949 TROPG5: MOVP    A,@A
05E4 83     1950        RET
0600        1951        ORG     600H
            1952 $       INCLUDE(:F3:STRRAM.SRC)
            =1953 ;******************************************************************
            =1954 ;**                    Subroutine STRRAM                         **
            =1955 ;** Function: Write two label settings to RAM from host.         **
            =1956 ;** Date: 3-15-87                                                **
            =1957 ;** Subroutines Called: ROCIA                                    **
            =1958 ;** Registers/Flags affected: CARRY, F0, R0, R1, R2, R3, ACCUMULATOR **
            =1959 ;** Ports affected: None                                         **
            =1960 ;** RAM locations affected: @TWOLAB TO @TWOLABEL+8               **
            =1961 ;******************************************************************
            =1962 STRRAM:
            =1963 ;INITIALIZE REGISTERS
0600 B808   =1964        MOV     R0,#8D          ;LABEL SET COUNTER
0602 B961   =1965        MOV     R1,#TWOLAB      ;SET RAM POINTER TO TWO LABEL READ LOCATIONS.
0604 85     =1966        CLR     F0              ;USE F0 TO STORE LAST BYTE BIT
            =1967 ;RETRIEVE 1ST LABEL, MS DIGIT
0605 B495   =1968 RTRLAB: CALL   ROCIA           ;RECIEVE DATA FROM VLSI CHIP
0607 B665   =1969        JF0     ELSTBT          ;IF LAST BYTE BIT SET WE HAVE ERROR. JUMP TO FILL REMAINING RAM
0609 F665   =1970        JC      ELSTBT          ;IF CARRY FLAG SET, WE HAVE TRANSMISSION ERROR. JUMP TO FILL RE
060B 530F   =1971        ANL     A,#0FH          ;MASK UPPER 4 BITS
060D 47     =1972        SWAP    A               ;MS NIBBLE MUST BE IN UPPER 4 BITS OF R2
060E A1     =1973        MOV     @R1,A           ;STORE MASKED BYTE IN R2.
            =1974 ;RETRIEVE 1ST LABEL, LS DIGIT
060F B495   =1975        CALL    ROCIA           ;RECIEVE DATA FROM VLSI CHIP
0611 B665   =1976        JF0     ELSTBT          ;IF LAST BYTE BIT SET WE HAVE ERROR. JUMP TO FILL REMAINING RAM
0613 F665   =1977        JC      ELSTBT          ;IF CARRY FLAG SET, WE HAVE TRANSMISSION ERROR. JUMP TO FILL RE
0615 530F   =1978        ANL     A,#0FH          ;MASK UPPER 4 BITS
0617 41     =1979        ORL     A,@R1           ;PACK MS AND LS DIGITS TOGETHER
0618 A1     =1980        MOV     @R1,A           ;SAVE 1ST LABEL IN R2 FOR TEMPORARY STORAGE.
            =1981 ;RAM POINTER STILL SET AT 1ST LABEL.
            =1982 ;GET 2ND LABEL, MS NIBBLE AND CHECK BEFORE STORING.
0619 B495   =1983        CALL    ROCIA           ;RECIEVE DATA FROM VLSI CHIP
061B B665   =1984        JF0     ELSTBT          ;IF LAST BYTE BIT SET WE HAVE ERROR. JUMP TO FILL REMAINING RAM
061D F665   =1985        JC      ELSTBT          ;IF CARRY FLAG SET, WE HAVE TRANSMISSION ERROR. JUMP TO FILL RE
061F 530F   =1986        ANL     A,#0FH          ;MASK UPPER 4 BITS
0621 47     =1987        SWAP    A               ;MS NIBBLE MUST BE IN UPPER 4 BITS.
0622 19     =1988        INC     R1              ;INCREMENT RAM POINTER
0623 A1     =1989        MOV     @R1,A           ;TEMPORARILY STORE LABEL 2, MS NIBBLE IN R3.
            =1990 ;GET 2ND LABEL, LS NIBBLE AND CHECK BEFORE STORING.
0624 B495   =1991        CALL    ROCIA           ;RECIEVE DATA FROM VLSI CHIP
            =1992 NOLSBT:
0626 F665   =1993        JC      ELSTBT          ;IF CARRY FLAG SET, WE HAVE TRANSMISSION ERROR. JUMP TO FILL RE
0628 530F   =1994        ANL     A,#0FH          ;MASK UPPER 4 BITS
062A 41     =1995        ORL     A,@R1           ;PACK MS NIBBLE WITH LS NIBBLE TO FORM 1 BYTE
062B A1     =1996        MOV     @R1,A           ;STORE 2ND LABEL IN R3 TEMPORARILY.
062C 19     =1997        INC     R1              ;INCREMENT RAM POINTER.
            =1998 ;CHECK FOR LAST BYTE
```

```
062D B631    =1999         JF0    LBDET          ;JUMP IF NO LAST BYTE TO NEXT LABEL SET
062F C441    =2000         JMP    DECR0
             =2001 ;LAST BYTE DETECTED. FILL IN THE REST OF RAM WITH FF'S.
0631 F8      =2002 LBDET:  MOV    A,R0            ;CHECK COUNTER FOR 8 BYTES RECIEVED
0632 D301    =2003         XRL    A,#01D          ;COUNTER SHOULD BE AT 1 IF 8 BYTES DONE
0634 C647    =2004         JZ     RTRCVR          ;IF ZERO, NO RAM TO FILL WITH FF'S.
             =2005 ;FILL REST OF RAM WITH FF'S
0636 C8      =2006         DEC    R0              ;ADJUST LABEL SET COUNTER TO BYTE COUNTER
0637 F8      =2007         MOV    A,R0
0638 E7      =2008         RL     A               ;MULTIPLY COUNT BY 2
0639 A8      =2009         MOV    R0,A
063A B1FF    =2010 FILFF:  MOV    @R1,#0FFH       ;STORE FF IN RAM TO SIGNIFY NO LABEL.
063C 19      =2011         INC    R1              ;INCREMENT RAM POINTER.
063D E83A    =2012         DJNZ   R0,FILFF        ;IF R0 NOT 0, GO TO NEXT RAM LOCATION.
063F C447    =2013         JMP    RTRCVR          ;REST OF RAM FILLED WITH FF'S.
             =2014 ;LABEL SET SAVED IN RAM. REPEAT PROCESS UNTIL ALL BYTES ARE STORED.
             =2015 DECR0:
0641 E805    =2016         DJNZ   R0,RTRLAB       ;DECREMENT LABEL SET COUNTER AND JUMP TO BEGINNING OF ROUTINE IF
             =2017 ;F0 SHOULD BE SET DUE TO LAST BYTE BIT. IF NOT, THERE IS AN ERROR.
0643 B647    =2018         JF0    RTRCVR          ;JUMP IF LAST BYTE BIT OK.
0645 C465    =2019         JMP    ELSTBT          ;JUMP TO ERROR ROUTINE IF NO FLAG.
             =2020 ;CHECK FOR LABEL 1 FLAGS BEING EQUAL TO LABEL 2 FLAGS. IF ERROR OCCURS, BEEP 5 TIMES,
             =2021 ; AND THEN CLEAR RAM WITH FF'S.
0647 BB08    =2022 RTRCVR: MOV    R3,#8D          ;SET LABEL 1 FLAG SET COUNTER
0649 B861    =2023         MOV    R0,#TWOLAB      ;SET RAM POINTER #1 TO LABEL 1 FLAGS
064B BA08    =2024 RDLAB1: MOV    R2,#8D          ;SET LABEL 2 FLAG SET COUNTER
064D 8962    =2025         MOV    R1,#TWOLAB+1    ;SET RAM POINTER #2 TO LABEL 2 FLAGS
064F F0      =2026 RDLAB2: MOV    A,@R0           ;READ LABEL 1 FLAG
0650 37      =2027         CPL    A
0651 C66F    =2028         JZ     FLCKRT          ;JUMP TO END OF CHECK ROUTINE. NO MORE FLAGS TO CHECK.
0653 37      =2029         CPL    A               ;PUT ACCUMULATOR BACK TO LABEL 1 FLAG
0654 D1      =2030         XRL    A,@R1           ;COMPARE LABEL 1 FLAG TO LABEL 2 FLAG
0655 C665    =2031         JZ     ELSTBT          ;JUMP IF ERROR. THERE IS A MATCH.
0657 D0      =2032         XRL    A,@R0           ;GET LABEL 2 FLAG BACK IN ACCUMULATOR
0658 37      =2033         CPL    A
0659 C65F    =2034         JZ     INLAB1          ;JUMP IF LABEL 2 FLAG IS FF
065B 19      =2035         INC    R1
065C 19      =2036         INC    R1              ;INCREMENT RAM POINTER FOR LABEL 2
065D EA4F    =2037         DJNZ   R2,RDLAB2       ;DECREMENT LABEL 2 FLAG COUNTER. JUMP IF ZERO.
065F 18      =2038 INLAB1: INC    R0
0660 18      =2039         INC    R0              ;INCREMENT RAM POINTER FOR LABEL 1
0661 EB4B    =2040         DJNZ   R3,RDLAB1       ;DECREMENT LABEL 1 FLAG COUNTER. JUMP IF ZERO.
0663 C46F    =2041         JMP    FLCKRT          ;TRANSMISSION CHECKS OK. JUMP TO RETURN.
             =2042 ;ERROR. TURN ON RED LIGHT AND BEEP 5 TIMES AFTER CLEARING RAM.
             =2043 ELSTBT:
0665 F4DF    =2044         CALL   ERS2RM          ;FILL FLAG RAM UP WITH FF'S
             =2045 ;
0667 B805    =2046         MOV    R0,#5           ;SET BEEP COUNT
0669 7481    =2047         CALL   TERRWT          ;BEEP 5 TIMES
             =2048 ;
066B FC      =2049         MOV    A,R4            ;RETRIEVE FLAGS
066C 4380    =2050         ORL    A,#80H          ;SET TWO LABEL ERROR FLAG
066E AC      =2051         MOV    R4,A            ;SAVE SET FLAG
             =2052 ;EVERYTHING IS DONE. RETURN.
066F 83      =2053 FLCKRT: RET                    ;RAM IS FULL. RETURN TO MAIN ROUTINE.
             =2054
              2055 $       INCLUDE(:F3:FLGPR1.SRC)
             =2056 ;****************************************************************
             =2057 ;**                    Routine FLGPRG                           **
             =2058 ;** Function: Read UPC codes and check if programming to EEPROM is required **
             =2059 ;** Date: 3-17-87                                               **
             =2060 ;** Subroutines Called: SNDWRT, ERASFL, TRNFLG, SHIFTL, WRACC, WAIT, TRNDTA **
             =2061 ;****************************************************************
             =2062 ;CHECK SWITCH SETTING FOR EEPROM PROGRAMMING. DIP SWITCH 9, BIT 5 IS
             =2063 FLGPRG:
             =2064 ;RESET TWO LABEL ERROR FLAG
0670 FC      =2065         MOV    A,R4
0671 537F    =2066         ANL    A,#7FH          ;RESET ERROR FLAG
0673 AC      =2067         MOV    R4,A            ;RE-SAVE FLAGS
             =2068 ; ENABLE PROGRAMMING SWITCH.
0674 B95F    =2069         MOV    R1,#SWISET      ;SET RAM POINTER TO READ OPTIONS REG.
0676 F1      =2070         MOV    A,@R1           ;RETRIEVE RAM SWITCH SETTINGS
0677 B285    =2071         JB5    PROLAB          ;JUMP TO PROGRAM FLAGS
             =2072 ;CHECK SWITCH 9 FOR PROGRAM FLAGS OPTION
0679 B908    =2073         MOV    R1,#SWLATC      ;SET POINTER TO READ EXTERNAL SWITCHES.
067B 81      =2074         MOVX   A,@R1
067C B285    =2075         JB5    PROLAB
             =2076 ;PROGRAMING FLAGS BY READING LABELS IS NOT A CHOSEN OPTION. CONTINUE TO READ
             =2077 ; GOOD READ AND COMMUNICATE OUT OCIA PORT.
             =2078 ;SET FLAG POINTER TO 0.
067E FE      =2079         MOV    A,R6
067F 538F    =2080         ANL    A,#08FH         ;RESET FLAG POINTER
0681 AE      =2081         MOV    R6,A            ;SAVE POINTERS
0682 F5      =2082         SEL    MB1
0683 E47E    =2083         JMP    GOOD30
             =2084 ;IN 'PROGRAM FLAG' MODE. CHECK FOR UPC A LABEL.
0685 FE      =2085 PROLAB: MOV    A,R6            ;CHECK VERSION FLAGS FOR UPC A
0686 5307    =2086         ANL    A,#07H          ;MASK ALL BUT VERSION POINTERS
0688 D301    =2087         XRL    A,#EVERA        ;CHECK AGAINST UPCA CODE
068A C68F    =2088         JZ     CHKLP1          ;JUMP TO CHECK WHICH LABEL PAIRS ARE ENCODED.
068C F5      =2089         SEL    MB1
```

```
                                           4,861,972
                          53                                              54
  068D E400      =2090          JMP       RDTAG           ;NOT A VALID FLAG LABEL, DO NOT TRANSMIT.
                 =2091 ;
                 =2092 ;CHECK FOR LABEL PAIRS TO LOAD INTO EEPROM.
                 =2093 ;R6S1 REGISTER HOLDS RIGHT TAG WHICH COMPRISES 6 NIBBLES WITH CHECKSUM AS
                 =2094 ; ONE OF THE 6 NIBBLES.  L6S1 REGISTER HOLDS LEFT TAG WHICH COMPRISES 6 NIBBLES.
                 =2095 ; UPC A CODE HAS THE FOLLOWING ENCODED INFORMATION:
                 =2096 ;    0ABCDE  FGHIJ(CHECK DIGIT)
                 =2097 ;     L6S1    R6S1
                 =2098 ; AB SIGNIFIES FIRST PAIR, FIRST LABEL FLAG DIGITS.
                 =2099 ; CD SIGNIFIES FIRST PAIR, SECOND LABEL FLAG DIGITS.
                 =2100 ; EF SIGNIFIES SECOND PAIR, FIRST LABEL FLAG DIGITS.
                 =2101 ; GH SIGNIFIES SECOND PAIR, SECOND LABEL FLAG DIGITS.
                 =2102 ; IJ HAS THE FOLLOWING DEFINITION:
                 =2103 ;        IJ        DEFINITION
                 =2104 ;        01        LABEL PAIRS 1 AND 2
                 =2105 ;        02        LABEL PAIRS 3 AND 4
                 =2106 ;        03        LABEL PAIRS 5 AND 6
                 =2107 ;        04        LABEL PAIRS 7 AND 8
                 =2108 ;
                 =2109 CHKLP1:
  068F 892F      =2110          MOV       R1,#R6S1+1      ;SET POINTER TO RETRIEVE HI NIBBLES
  0691 F1        =2111          MOV       A,@R1           ;RETRIEVE HI NIBBLES
  0692 530F      =2112          ANL       A,#0FH          ;MASK OUT H NIBBLE
  0694 47        =2113          SWAP      A               ;I0
  0695 AA        =2114          MOV       R2,A
  0696 19        =2115          INC       R1              ;SET POINTER TO J (CHECK DIGIT) NIBBLES
  0697 F1        =2116          MOV       A,@R1
  0698 53F0      =2117          ANL       A,#0F0H         ;MASK OUT CHECK DIGIT
  069A 47        =2118          SWAP      A               ;0J
  069B 4A        =2119          ORL       A,R2            ;IJ NIBBLE RETRIEVED
  069C AA        =2120          MOV       R2,A            ;SAVE IJ
                 =2121 ;
                 =2122 ;CHECK IJ FOR BEING 0
  069D 96A1      =2123          JNZ       CHKIJ           ;JUMP ON IJ>00
  069F C4E7      =2124          JMP       RTPRG           ;JUMP AND IGNORE LABEL. IJ IS INVALID.
                 =2125 ;CHECK IJ FOR BEING LESS THAN OR EQUAL TO 4
  06A1 03FB      =2126 CHKIJ:   ADD       A,#0FBH
  06A3 E6A7      =2127          JNC       VALFLG          ;JUMP TO READ LABEL INTO RAM.  TAG IS VALID.
  06A5 C4E7      =2128          JMP       RTPRG           ;JUMP AND IGNORE LABEL. IJ IS INVALID.
                 =2129 ;
                 =2130 ;VALID FLAG LABEL.  CHECK FLAG POINTER.
                 =2131 VALFLG:
  06A7 FE        =2132          MOV       A,R6            ;RETRIEVE FLAG POINTER
  06A8 5370      =2133          ANL       A,#70H          ;MASK ALL BUT FLAG POINTER
  06AA 96B0      =2134          JNZ       FLGCHK          ;JUMP FLAG POINTER >0
                 =2135 ;FLAG POINTER IS 0.  FILL FLAG RAM WITH FF'S.
  06AC F4DF      =2136          CALL      ERS2RM          ;FILL TWO LABEL RAM WITH FF'S
  06AE C4C3      =2137          JMP       INCPNT          ;JUMP TO INC FLAG POINTER
                 =2138 ;CHECK FLAG POINTER FOR BEING GREATER THAN 3. (TOTAL OF 4 UPC CODES)
  06B0 FE        =2139 FLGCHK:  MOV       A,R6            ;RETRIEVE FLAG POINTER
  06B1 5340      =2140          ANL       A,#40H          ;MASK ALL BUT FLAG POINTER (B2)
  06B3 C6B7      =2141          JZ        RTRMRT          ;FLAG POINTER IS <= 3.  ROTATE RAM.
                 =2142 ;FOUR SETS OF LABEL FLAGS HAVE BEEN PROGRAMED.  DO NOT ALLOW ANY MORE READS UNLESS SWITCH 9 IS C
  06B5 C4E7      =2143          JMP       RTPRG           ;GO TO DISPLAY BAD READ.
                 =2144 ;ROTATE RAM 4 BYTES RIGHT.
  06B7 BA0C      =2145 RTRMRT:  MOV       R2,#12          ;SET LOOP COUNTER
  06B9 B970      =2146          MOV       R1,#TWOLAB+15   ;SET DESTINATION POINTER
  06BB B86C      =2147          MOV       R0,#TWOLAB+11   ;SET SOURCE POINTER
  06BD F0        =2148 RTRM1:   MOV       A,@R0           ;RETRIEVE BYTE TO BE SHIFTED
  06BE A1        =2149          MOV       @R1,A           ;SAVE BYTE TO NEW LOCATION
  06BF C9        =2150          DEC       R1              ;DECREMENT DESTINATION POINTER
  06C0 C8        =2151          DEC       R0              ;DECREMENT SOURCE POINTER
  06C1 EABD      =2152          DJNZ      R2,RTRM1
                 =2153 ;INCREMENT FLAG POINTER
                 =2154 INCPNT:
  06C3 FE        =2155          MOV       A,R6            ;RETRIEVE FLAG COUNTER
  06C4 0310      =2156          ADD       A,#10H          ;INCREMENT FLAG COUNTER
  06C6 AE        =2157          MOV       R6,A            ;SAVE FLAG COUNTER
                 =2158 ;PLACE L6S1 AND R6S1 INTO RAM
  06C7 B961      =2159          MOV       R1,#TWOLAB      ;DESTINATION POINTER
  06C9 94E1      =2160          CALL      TRNFLG          ;TRANSFER UPC CODE TO TWO LABEL RAM
  06CB D447      =2161          CALL      RTRCVR          ;CHECK TWO LABEL READ RAM
                 =2162 ;CHECK TWO LABEL ERROR FLAG
  06CD FC        =2163          MOV       A,R4            ;RETRIEVE ERROR FLAG
  06CE 37        =2164          CPL       A
  06CF F2DD      =2165          JB7       WRTPRM          ;NO ERROR FLAG. JUMP TO WRITE TO EEPROM.
                 =2166 ;ERROR.  ERASE RAM AND RESET POINTER.
  06D1 F4DF      =2167          CALL      ERS2RM          ;ERASE RAM
  06D3 FE        =2168          MOV       A,R6            ;RETRIEVE FLAG COUNTER
  06D4 538F      =2169          ANL       A,#8FH          ;CLEAR FLAG COUNTER
  06D6 AE        =2170          MOV       R6,A
                 =2171 ;RETRIEVE AND CLEAR TWO LABEL FLAG ERROR
  06D7 FC        =2172          MOV       A,R4            ;RETRIEVE FLAG
  06D8 537F      =2173          ANL       A,#7FH          ;RESET FLAG
  06DA AC        =2174          MOV       R4,A            ;SAVE FLAG
  06DB C4E7      =2175          JMP       RTPRG           ;JUMP TO RDTAG ROUTINE.
                 =2176 ;
                 =2177 ;ERASE AND PROGRAM EEPROM CONTENTS ACCORDING TO RAM
  06DD B464      =2178 WRTPRM:  CALL      WREPRM          ;WRITE CONTENTS TO EEPROM
  06DF 998F      =2179          ANL       P1,#255-EBDLT   ;BD-LT OFF
  06E1 8920      =2180          ORL       P1,#EGDLT       ;GD-LT ON
```

```
06E3 D5              =2181            SEL     RB1
06E4 BE10            =2182            MOV     R6,#EGDTON*2    ;GOOD TONE LENGTH*2
06E6 C5              =2183            SEL     RB0
06E7 F5              =2184 RTPRG:     SEL     MB1
06E8 E400            =2185            JMP     RDTAG           ;GO READ ANOTHER LABEL
                      2186 ;****************************************
06EA A3              .2187 TROPG6:    MOVP    A,@A
06EB 83               2188            RET
0700                  2189            ORG     700H
                      2190 $          INCLUDE(:F3:COPYRT.SRC)
                     =2191 ;****************************************************************
                     =2192 ;
0700 434F5059        =2193            DB      'COPYRIGHT (C)1987 '
0704 52494748
0708 54202843
070C 29313938
0710 3720
0712 53504543        =2194            DB      'SPECTRA-PHYSICS, INC. '
0716 54524120
071A 50485953
071E 4943532C
0722 20494E43
0726 2E20
0728 414C4C20        =2195            DB      'ALL RIGHTS RESERVED'
072C 52494748
0730 54532052
0734 45534552
0738 564544

=2196 ;
                     =2197 ;****************************************************************
                      2198 $          INCLUDE(:F3:FSDATA.SRC)
                     =2199 ;****************************************************************
                     =2200 ; FILE:    FSDATA.SRC  10-25-83 16:55   BOB ACTIS
                     =2201 ;          MODIFIED    04-02-86         DREW TAUSSIG
                     =2202 ;          MODIFIED    11-18-86 13:50   BOB ACTIS
                     =2203 ;          MODIFIED    02-18-87 10:15   BOB ACTIS
                     =2204 ;          MODIFIED    03-14-87 20:23   RANDY ELLIOTT
                     =2205 ;
                     =2206 ; ROUTINE: SDATA
                     =2207 ; FUNCTION: CHECK SDATA FOR VALID COMMANDS.
                     =2208 ;               IF VALID COMMAND, TAKE APPROPRIATE ACTION.
                     =2209 ;               IF NOT VALID, RESET THE PROGRAM.
                     =2210 ; ENTRY:   RB0
                     =2211 ;          SDATA READY IN FCA
                     =2212 ; EXIT:    USES R0,A
                     =2213 ;
                     =2214 ;
                     =2215 ;RETRIEVE COMMAND BYTE FROM VLSI CHIP AND STORE @STSDTA RAM
073B 8802            =2216 SDATA:     MOV     R0,#EOCIA       ;ENTERED FROM CKFCA ROUTINE
073D 80              =2217            MOVX    A,@R0           ;GET SDATA BYTE
073E B85E            =2218            MOV     R0,#STSDTA      ;SAVE SDATA IN @R0.
0740 A0              =2219            MOV     @R0,A           ;STORE SDATA IN RAM
                     =2220 ;CHECK COMMAND BYTE FOR ENABLE SCAN ('E') BY TURNING ON LASER.
0741 D345            =2221 SDATA1:    XRL     A,#ESEN
0743 9648            =2222            JNZ     SDATA2          ;JUMP IF NOT ENABLE SCAN CHAR
0745 99EF            =2223            ANL     P1,#255-ELASDB  ;LASER ON
0747 83              =2224            RET
                     =2225 ;CHECK COMMAND BYTE FOR DISABLE SCAN ('D') BY TURNING OFF LASER.
0748 B85E            =2226 SDATA2:    MOV     R0,#STSDTA
074A F0              =2227            MOV     A,@R0           ;GET COMMAND BYTE FROM RAM.
074B D3C4            =2228            XRL     A,#ESDIS
074D 9652            =2229            JNZ     SDATA3          ;JUMP IF NOT DISABLE SCAN CHAR
074F 8910            =2230            ORL     P1,#ELASDB      ;LASER OFF
0751 83              =2231            RET
                     =2232 ;CHECK COMMAND BYTE FOR WRITING TWO LABEL SETTINGS ('I') TO RAM FROM HOST.
0752 B85E            =2233 SDATA3:    MOV     R0,#STSDTA
0754 F0              =2234            MOV     A,@R0           ;GET COMMAND BYTE FROM RAM.
0755 D389            =2235            XRL     A,#STRAM1       ; CHECK FOR 'I' CHARACTER.
0757 9660            =2236            JNZ     SDATA4          ;JUMP IF NOT 'I' CHARACTER.
0759 54CC            =2237            CALL    DISLAS          ;TURN LASER OFF AND CLEAR SCAN RAM.
075B D400            =2238            CALL    STRRAM          ;WRITE TWO LABEL SETTINGS FROM HOST TO SCANNER RAM.
075D 5407            =2239            CALL    ENLAS           ;TURN LASER ON AND CLEAR SCAN RAM.
075F 83              =2240            RET
                     =2241 ;CHECK COMMAND BYTE FOR HORSE TEST ('D1')
0760 B85E            =2242 SDATA4:    MOV     R0,#STSDTA
0762 F0              =2243            MOV     A,@R0           ;GET COMMAND BYTE FROM RAM.
0763 D3D1            =2244            XRL     A,#EHCNTL
0765 9677            =2245            JNZ     SDATA5          ;JUMP IF NOT THE HORSE CONTROL BYTE
0767 27              =2246 SDATAH:    CLR     A               ;CLEAR STACK POINTER/RETURN LINKAGE SINCE
0768 D7              =2247            MOV     PSW,A           ;WE WILL JUMP INTO HORSE TEST AND STAY THERE
0769 C5              =2248            SEL     RB0
076A 85              =2249            CLR     F0              ;SETUP FOR HORSE TEST ENTRY
076B 95              =2250            CPL     F0
076C A5              =2251            CLR     F1
076D B830            =2252            MOV     R0,#TSEG1
076F BB10            =2253            MOV     R3,#16
0771 990F            =2254            ANL     P1,#255-EGDLT
0773 8950            =2255            ORL     P1,#EBDLT+ELASDB ;BDLT INDICATES CNTL BYTE RECVD
0775 840A            =2256            JMP     TH005
                     =2257 ;CHECK COMMAND BYTE FOR TO WRITE TWO LABLE SETTINGS IN RAM TO EEPROM ('G').
```

```
0777 B85E     =2258 SDATA5:  MOV    R0,#STSDTA
0779 F0       =2259          MOV    A,@R0          ;RETRIEVE COMMAND BYTE FROM RAM
077A D3C7     =2260          XRL    A,#WRPRM1      ;COMPARE ACC. WITH 'G' CHARACTER
077C 9685     =2261          JNZ    SDATA6         ;JUMP - NOT WRITE SETTINGS TO EEPROM
077E 54CC     =2262          CALL   DISLAS         ;CLEAR SCAN RAM AND TURN OFF LASER
0780 B464     =2263          CALL   WREPRM         ;WRITE RAM DATA TO EEPROM
0782 54D7     =2264          CALL   ENLAS          ;CLEAR SCAN RAM AND TURN ON LASER
0784 83       =2265          RET
              =2266 ;CHECK COMMAND BYTE FOR TO READ EEPROM AND SEND DATA TO HOST ('H')
0785 B85E     =2267 SDATA6:  MOV    R0,#STSDTA
0787 F0       =2268          MOV    A,@R0          ;RETRIEVE COMMAND BYTE FROM RAM
0788 D3C8     =2269          XRL    A,#TRPRM1      ;COMPARE ACC. WITH 'H' CHARACTER
078A 9697     =2270          JNZ    SDATA7         ;JUMP - NOT READ EEPROM AND SEND DATA TO HOST
078C 54CC     =2271          CALL   DISLAS         ;CLEAR SCAN RAM AND TURN OFF LASER
078E D5       =2272          SEL    RB1
078F B920     =2273          MOV    R1,#RCRAM      ;SET RAM POINTER TO SCRATCH PAD RAM
0791 C5       =2274          SEL    RB0
0792 1493     =2275          CALL   TREPRM         ;READ EEPROM AND SEND TO HOST.
0794 54D7     =2276          CALL   ENLAS          ;CLEAR SCAN RAM AND TURN OFF LASER.
0796 83       =2277          RET
              =2278 ;CHECK COMMAND BYTE FOR ENABLE AMB MESSAGE ('A')
0797 B85E     =2279 SDATA7:  MOV    R0,#STSDTA
0799 F0       =2280          MOV    A,@R0          ;RETRIEVE COMMAND BYTE FROM RAM
079A D3C1     =2281          XRL    A,#EAMESE
079C 96A3     =2282          JNZ    SDATA8         ;JUMP IF NOT AMB MESSAGE ENABLE
079E FC       =2283          MOV    A,R4
079F 4304     =2284          ORL    A,#EAMBMS      ;ENABLE AMB LABEL MESSAGE
07A1 AC       =2285          MOV    R4,A
07A2 83       =2286          RET
              =2287 ;CHECK COMMAND BYTE FOR DISABLE AMB MESSAGE ('B')
07A3 B85E     =2288 SDATA8:  MOV    R0,#STSDTA
07A5 F0       =2289          MOV    A,@R0          ;RETRIEVE COMMAND BYTE FROM RAM
07A6 D3C2     =2290          XRL    A,#EAMESD
07A8 96AF     =2291          JNZ    SDATA9         ;JUMP IF NOT AMB MESSAGE DISABLE
07AA FC       =2292          MOV    A,R4
07AB 53FB     =2293          ANL    A,#255-EAMBMS  ;DISABLE AMB LABEL MESSAGE
07AD AC       =2294          MOV    R4,A
07AE 83       =2295          RET
              =2296 ;CHECK COMMAND BYTE FOR READING TWO LABEL READ SETTINGS FROM RAM TO HOST ('J')
07AF B85E     =2297 SDATA9:  MOV    R0,#STSDTA
07B1 F0       =2298          MOV    A,@R0          ;RETRIEVE COMMAND BYTE FROM RAM
07B2 D34A     =2299          XRL    A,#TRPRM2      ;CHECK FOR 'J' CHARACTER
07B4 96C1     =2300          JNZ    SDAT10         ;JUMP IF NOT 'J' CHARACTER
07B6 54CC     =2301          CALL   DISLAS         ;CLEAR SCAN RAM AND TURN LASER OFF
07B8 D5       =2302          SEL    RB1
07B9 B961     =2303          MOV    R1,#TWOLAB     ;SET RAM POINTER TO TWO LABEL READ SETTINGS
07BB C5       =2304          SEL    RB0
07BC 1499     =2305          CALL   TRRAM          ;TRANSMIT RAM TO HOST
07BE 54D7     =2306          CALL   ENLAS          ;CLEAR SCAN RAM AND TURN LASER ON
07C0 83       =2307          RET
              =2308 ;CHECK COMMAND BYTE FOR READING SCANNER CONFIGURATION FROM RAM. ('K')
07C1 B85E     =2309 SDAT10:  MOV    R0,#STSDTA
07C3 F0       =2310          MOV    A,@R0          ;RETRIEVE COMMAND BYTE FROM RAM
07C4 D3CB     =2311          XRL    A,#SWSET1      ;CHECK  FOR 'K' CHARACTER
07C6 96CF     =2312          JNZ    SDAT11         ;JUMP IF NOT 'K' CHARACTER
07C8 54CC     =2313          CALL   DISLAS         ;CLEAR SCAN RAM AND TURN LASER OFF
07CA 34A0     =2314          CALL   SWSET          ;READ SWITCH SETTING FROM RAM AND TRANSMIT TO HOST
07CC 54D7     =2315          CALL   ENLAS          ;CLEAR SCAN RAM AND TURN LASER ON
07CE 83       =2316          RET
              =2317 ;CHECK COMMAND BYTE FOR OVERRIDING SCANNER SETTINGS. ('L')
07CF B85E     =2318 SDAT11:  MOV    R0,#STSDTA
07D1 F0       =2319          MOV    A,@R0          ;RETRIEVE COMMAND BYTE FROM RAM
07D2 D38C     =2320          XRL    A,#OVRST1      ;CHECK FOR 'L' CHARACTER
07D4 96D0     =2321          JNZ    SDAT12         ;JUMP IF NOT 'L' CHARACTER
07D6 54CC     =2322          CALL   DISLAS         ;CLEAR SCAN RAM AND TURN LASER OFF
07D8 94C6     =2323          CALL   OVRSET         ;OVERRIDE SWITCH SETTINGS VIA HOST
07DA 54D7     =2324          CALL   ENLAS          ;CLEAR SCAN RAM AND TURN LASER ON
07DC 83       =2325          RET
              =2326 ;IF WE GET HERE, GOT RESET COMMAND OR NON-VALID COMMAND. JUMP TO RESET SCANNER.
07DD 0400     =2327 SDAT12:  JMP    RSTTRP
               2328 $       INCLUDE(:F3:ERS2RM.SRC)
              =2329 ;******************************************************************
              =2330 ;**                    Subroutine ERS2RM                         **
              =2331 ;** Function: SET TWO LABEL FLAG RAM TO FF'S                     **
              =2332 ;** Date: 7-22-87                                                **
              =2333 ;** Subroutines Called: None                                     **
              =2334 ;** Registers/Flags affected: R0, R2, ACCUMULATOR                **
              =2335 ;** Ports affected: None                                         **
              =2336 ;** RAM locations affected: None                                 **
              =2337 ;******************************************************************
              =2338 ERS2RM:
07DF BA10     =2339          MOV    R2,#16D        ;SET CYCLE COUNTER FOR LABEL FLAGS
07E1 B861     =2340          MOV    R0,#TWOLAB     ;SET RAM POINTER TO LABEL 1 FLAG 1
07E3 B0FF     =2341 ELST1:   MOV    @R0,#0FFH      ;FILL RAM WITH FF'S
07E5 18       =2342          INC    R0
07E6 EAE3     =2343          DJNZ   R2,ELST1
07E8 83       =2344          RET
               2345 ;***************************************
07E9 A3        2346 TROPG7:  MOVP   A,@A
07EA 83        2347          RET
0800           2348          ORG    800H           ;START OF MEMORY BANK 1
```

```
              2349 $       INCLUDE(:F2:VERDLB.SRC)
             =2350 ;*******************************************************************
             =2351 ; FILE:  VERDLB.SRC  11-18-86  12:15   BOB ACTIS
             =2352 ;        MODIFIED    03-25-86       DREW TAUSSIG
             =2353 ;        VERSION "D" FIRMWARE LIBRARY.
             =2354 ;*******************************************************************
             =2355 ; ROUTINE:  CLR6SG
             =2356 ; FUNCTION: CLEAR 6-CHAR SEGMENTS AND COUNTERS.
             =2357 ; ENTRY: START ADDRESS AND COUNT IN DEFS TABLE.
             =2358 ; EXIT:  A = 0
             =2359 ;        R0 = END OF 6-CHAR BUFFER/COUNTER SPACE PLUS 1.
             =2360 ;        R2 = 0
             =2361 ;        6-CHAR BUFFER/COUNTER SPACE = 0'S.
             =2362 ;        ALSO RESETS 2-LABEL ERROR BYTE AND STATUS BYTES
             =2363 ;
0800 B844    =2364 CLR6SG: MOV     R0,#ERRTL
0802 B000    =2365         MOV     @R0,#0           ;RESET TWO LABEL ERROR INDICATOR
0804 B842    =2366         MOV     R0,#STTL13
0806 B0FF    =2367         MOV     @R0,#0FFH        ;RESET JAN13-JAN13 TWO LABEL STATUS
0808 B843    =2368         MOV     R0,#STTL8
080A 23CC    =2369         MOV     A,#0CCH
080C 40      =2370         ORL     A,@R0            ;RESET JAN13-JAN8 LABEL STATUS
080D A0      =2371         MOV     @R0,A            ;(ONLY JAN13 PART)
             =2372 ;
080E B824    =2373         MOV     R0,#BF6CST       ;START OF 6-CHAR BUFFER AREA
0810 BA12    =2374         MOV     R2,#BF6CNT       ;NUMBER OF BYTES IN BUFFER
0812 0424    =2375         JMP     CLRT00           ;JUMP TO THE CLEAR LOOP
             =2376 ;*******************************************************************
             =2377 ; ROUTINE:  CLR4SG
             =2378 ; FUNCTION: CLEAR 4-CHAR SEGMENTS AND COUNTERS.
             =2379 ; ENTRY: START ADDRESS AND COUNT IN DEFS TABLE.
             =2380 ; EXIT:  A = 0
             =2381 ;        R0 = END OF 4-CHAR BUFFER/COUNTER SPACE PLUS 1.
             =2382 ;        R2 = 0
             =2383 ;        4-CHAR BUFFER/COUNTER SPACE = 0'S.
             =2384 ;        ALSO RESETS 2-LABEL STATUS BYTE (STTL8)
             =2385 ;
0814 B843    =2386 CLR4SG: MOV     R0,#STTL8
0816 2333    =2387         MOV     A,#033H          ;DO ONLY THE JAN8 PART OF LABEL
0818 40      =2388         ORL     A,@R0
0819 A0      =2389         MOV     @R0,A
             =2390 ;
081A B836    =2391         MOV     R0,#BF4CST       ;START OF 4-CHAR BUFFER AREA
081C BA0C    =2392         MOV     R2,#BF4CNT       ;NUMBER OF BYTES IN BUFFER
081E 0424    =2393         JMP     CLRT00           ;JUMP TO THE CLEAR LOOP
             =2394 ;*******************************************************************
             =2395 ; ROUTINE:  CLRSNB
             =2396 ; FUNCTION: CLEAR THE SCAN BUFFER.
             =2397 ; ENTRY: START ADDRESS IN DEFS TABLE.
             =2398 ; EXIT:  A = 0
             =2399 ;        R0 = END OF SCAN BUFFER SPACE PLUS 1.
             =2400 ;        R2 = 0
             =2401 ;        SCAN BUFFER SPACE = 0'S.
             =2402 ;
0820 B820    =2403 CLRSNB: MOV     R0,#SCNBUF       ;START OF SCAN BUFFER AREA
0822 BA04    =2404         MOV     R2,#4            ;NUMBER OF BYTES IN BUFFER
0824 27      =2405 CLRT00: CLR     A                ;CLEAR LOOP USED BY OTHER ROUTINES
0825 A0      =2406 CLRSN1: MOV     @R0,A
0826 18      =2407         INC     R0
0827 EA25    =2408         DJNZ    R2,CLRSN1
0829 83      =2409         RET
             =2410 ;*******************************************************************
             =2411 ; ROUTINE:  CLRSBF
             =2412 ; FUNCTION: CLEAR SEND BUFFER, POINTER AND FLAG.
             =2413 ; ENTRY: START ADDRESS AND COUNT IN DEFS TABLE.
             =2414 ;        RB0
             =2415 ; EXIT:  A = 0
             =2416 ;        R0 = END OF SEND BUFFER SPACE PLUS 1.
             =2417 ;        R2 = 0
             =2418 ;        SEND BUFFER SPACE = 0CCH'S. (TERMINATION BYTES)
             =2419 ;        SEND BUFFER FULL FLAG CLEAR. RB0-R4-B3
             =2420 ;        SEND BUFFER POINTER SET TO PACKED DATA START ADDRESS.
             =2421 ;
082A FC      =2422 CLRSBF: MOV     A,R4
082B 53F7    =2423         ANL     A,#255-ESBFUL    ;CLEAR SEND BUFFER FULL FLAG
082D AC      =2424         MOV     R4,A
             =2425 ;
082E B847    =2426         MOV     R0,#SBFPNT
0830 2390    =2427         MOV     A,#SBSTRT
0832 A0      =2428         MOV     @R0,A            ;SET POINTER TO PACKED START ADDRESS
             =2429 ;
0833 B848    =2430         MOV     R0,#SBUF         ;START OF SEND BUFFER AREA
0835 BA12    =2431         MOV     R2,#SBUFSZ       ;NUMBER OF BYTES IN BUFFER
0837 23CC    =2432         MOV     A,#0CCH          ;LOAD TERMINATION BYTES
0839 0425    =2433         JMP     CLRSN1           ;JUMP TO THE CLEAR LOOP
             =2434 ;*******************************************************************
             =2435 ; ROUTINE:  MOV2BY, MOV3BY, MOV4BY
             =2436 ; FUNCTION: MOVE BYTES FROM ONE BUFFER TO ANOTHER BUFFER.
             =2437 ; ENTRY: R0 = FIRST BYTE ADDRESS OF SOURCE BUFFER.
             =2438 ;        R1 = FIRST AVAILABLE BYTE ADDRESS OF DESTINATION BUFFER.
             =2439 ; EXIT:  DATA MOVED FROM SOURCE BUFFER TO DESTINATION BUFFER.
```

```
                    =2440 ;       R0 = END OF SOURCE BUFFER ADDRESS PLUS 1.
                    =2441 ;       R1 = NEXT AVAILABLE BYTE ADDRESS OF DESTINATION BUFFER.
                    =2442 ;       R2 = 0
                    =2443 ;       A = LAST BYTE TRANSFERED
                    =2444 ;
0838 BA02           =2445 MOV2BY: MOV    R2,#2
083D 0445           =2446         JMP    MOVXBY
083F BA03           =2447 MOV3BY: MOV    R2,#3
0841 0445           =2448         JMP    MOVXBY
0843 BA04           =2449 MOV4BY: MOV    R2,#4
0845 F0             =2450 MOVXBY: MOV    A,@R0
0846 A1             =2451         MOV    @R1,A
0847 18             =2452         INC    R0
0848 19             =2453         INC    R1
0849 EA45           =2454         DJNZ   R2,MOVXBY
084B 83             =2455         RET
                    =2456 ;****************************************************************
                    =2457 ; ROUTINE: SGSUM4, SGSUM6
                    =2458 ; FUNCTION: SUM THE DIGITS OF A SEGMENT FOR THE MOD-10 TEST.
                    =2459 ;           ALL ARITHMETIC IS ASSUMED BCD AND ONLY THE UNITS DIGIT
                    =2460 ;           IS VALID IN THE SUMS.
                    =2461 ; ENTRY: R0 = FIRST BYTE ADDRESS OF SEGMENT TO BE SUMMED.
                    =2462 ; EXIT:  R0 = NOT CHANGED
                    =2463 ;        R2 = C1+C3+C5   [C1+C3]
                    =2464 ;        A  = C2+C4+C6   [C2+C4]
                    =2465 ;        F0 IS USED
                    =2466 ;
084C 85             =2467 SGSUM4: CLR    F0
084D 95             =2468         CPL    F0                  ;SET F0 FOR 4-CHAR SUM
084E 0451           =2469         JMP    SGSUMX
                    =2470 ;
0850 85             =2471 SGSUM6: CLR    F0                  ;CLEAR F0 FOR 6-CHAR SUM
0851 BAF0           =2472 SGSUMX: MOV    R2,#0F0H            ;MASK FOR ODD DIGITS
0853 F0             =2473         MOV    A,@R0               ;C1
0854 5A             =2474         ANL    A,R2
0855 18             =2475         INC    R0
0856 60             =2476         ADD    A,@R0               ;C1+C3
0857 57             =2477         DA     A
0858 5A             =2478         ANL    A,R2
0859 B65E           =2479         JF0    SGSUMY              ;JUMP IF 4-CHAR SUM
                    =2480 ;
085B 18             =2481         INC    R0
085C 60             =2482         ADD    A,@R0               ;C1+C3+C5
085D 57             =2483         DA     A
085E 47             =2484 SGSUMY: SWAP   A                   ;PUT SUM IN LOW BYTE
085F AA             =2485         MOV    R2,A                ;SAVE C1+C3+C5  [C1+C3]
                    =2486 ;
0860 F0             =2487         MOV    A,@R0               ;C6  [C4]
0861 C8             =2488         DEC    R0
0862 60             =2489         ADD    A,@R0               ;C6+C4  [C4+C2]
0863 57             =2490         DA     A
0864 B669           =2491         JF0    SGSUMR              ;JUMP IF 4-CHAR SUM
                    =2492 ;
0866 C8             =2493         DEC    R0
0867 60             =2494         ADD    A,@R0               ;C6+C4+C2
0868 57             =2495         DA     A
0869 83             =2496 SGSUMR: RET
                    =2497 ;****************************************************************
                    =2498 ; ROUTINE: APL3R2
                    =2499 ; FUNCTION: ADD 3*R2 TO A.  (BCD)
                    =2500 ; ENTRY: NO SETUP
                    =2501 ; EXIT:  A = A+(3*R2)
                    =2502 ;        R2 = NOT CHANGED
                    =2503 ;
086A 6A             =2504 APL3R2: ADD    A,R2
086B 57             =2505         DA     A
086C 6A             =2506         ADD    A,R2
086D 57             =2507         DA     A
086E 6A             =2508         ADD    A,R2
086F 57             =2509         DA     A
0870 83             =2510         RET
                     2511 $       INCLUDE(:F3:EMOD10.SRC)
                    =2512 ;****************************************************************
                    =2513 ; FILE: EMOD10.SRC  11-18-86 12:15  BOB ACTIS
                    =2514 ; ROUTINE: EMOD10
                    =2515 ; FUNCTION: VERIFY THE EMOD10 CHECK CHARACTER
                    =2516 ; ENTRY: SEGMENT IN SCAN BUFFER
                    =2517 ; EXIT: USES R0,R2,A
                    =2518 ;        A = 0 IF CHECK CHARACTER IS GOOD
                    =2519 ;        A <> 0 IF CHECK CHARACTER IS BAD
                    =2520 ;
0871 8820           =2521 EMOD10: MOV    R0,#SCNBUF
0873 B95A           =2522         MOV    R1,#WRKBUF
0875 143F           =2523         CALL   MOV3BY              ;MOVE SCAN BUFFER DATA TO WORK BUFFER
                    =2524 ;
0877 8822           =2525         MOV    R0,#SCNBUF+2
0879 F0             =2526         MOV    A,@R0               ;GET CHARACTER C6
087A 530F           =2527         ANL    A,#0FH
087C 03FD           =2528         ADD    A,#-3
087E F287           =2529         JB7    ECASE1              ;JUMP IF C6=0,1,2
```

```
0880 C690    =2530           JZ      ECASE2          ;JUMP IF C6=3
0882 07      =2531           DEC     A
0883 C698    =2532           JZ      ECASE3          ;JUMP IF C6=4
0885 04A1    =2533           JMP     ECASE4          ;JUMP IF C6=5,6,7,8,9
             =2534  ;
             =2535  ;        FOR C6=0,1,2 COMPUTE 3*(C2+C3+C5)+C1+C4+C6
             =2536  ;
0887 B85A    =2537  ECASE1:  MOV     R0,#WRKBUF
0889 F0      =2538           MOV     A,@R0
088A 47      =2539           SWAP    A
088B A0      =2540           MOV     @R0,A           ;SWAP C1 AND C2
088C 1450    =2541           CALL    SGSUM6          ;C2,C1,C3,C4,C5,C6
088E 04A6    =2542           JMP     EMODSM
             =2543  ;
             =2544  ;        FOR C6=3  COMPUTE 3*(C2+0+C5)+C1+C3+C4
             =2545  ;
0890 B85B    =2546  ECASE2:  MOV     R0,#WRKBUF+1
0892 27      =2547           CLR     A
0893 30      =2548           XCHD    A,@R0           ;C4=0
0894 18      =2549           INC     R0
0895 30      =2550           XCHD    A,@R0           ;C6=C4
0896 F0      =2551           MOV     A,@R0           ;A=C5,C4
0897 47      =2552           SWAP    A               ;A=C4,C5
0898 A0      =2553           MOV     @R0,A
0899 04A1    =2554           JMP     ECASE4          ;C1,C2,C3,0,C4,C5
             =2555  ;        FOR C6=4  COMPUTE 3*(C2+C4+C5)+C1+C3+0
             =2556  ;
089B B85C    =2557  ECASE3:  MOV     R0,#WRKBUF+2
089D 27      =2558           CLR     A
089E 20      =2559           XCH     A,@R0           ;C5=C6=0
089F 47      =2560           SWAP    A
08A0 30      =2561           XCHD    A,@R0           ;C5=0, C6=C5
             =2562                                   ;C1,C2,C3,C4,0,C5
             =2563  ;
             =2564  ;        FOR C6=5,6,7,8,9  COMPUTE 3*(C2+C4+C6)+C1+C3+C5
             =2565  ;
08A1 B85A    =2566  ECASE4:  MOV     R0,#WRKBUF      ;C1,C2,C3,C4,C5,C6
08A3 1450    =2567           CALL    SGSUM6
08A5 2A      =2568           XCH     A,R2
             =2569  ;
             =2570  ;        FINAL SUM
             =2571  ;
08A6 146A    =2572  EMODSM:  CALL    APL3R2
             =2573  ;
             =2574  ;        CHECK AGAINST THE CHECK CHARACTER
             =2575  ;
08A8 B823    =2576  EMODCK:  MOV     R0,#SCNBUF+3
08AA 60      =2577           ADD     A,@R0
08AB 57      =2578           DA      A
08AC 530F    =2579           ANL     A,#0FH
08AE 83      =2580           RET
             2581  $         INCLUDE(:F3:FCKFCA.SRC)
             =2582  ;************************************************************
             =2583  ;        FILE:  FCKFCA.SRC  10-25-83 17:10  808 ACTIS
             =2584  ;        ROUTINE:  CKFCA
             =2585  ;        FUNCTION: CHECK IF FRAME CONTROL ARRAY HAS DATA.
             =2586  ;                  IF SDATA, PROCESS BYTE.
             =2587  ;                  IF SEGMENT CAPTURE AND SCANNING BIT IS SET, PUT SEGMENT
             =2588  ;                     INTO THE SCAN BUFFER.
             =2589  ;                  IF SEGMENT CAPTURE AND NOT SCANNING, RESET THE FRAME.
             =2590  ;                  IF A SEGMENT IS SEEN, SET R7.
             =2591  ;        ENTRY:  RB0
             =2592  ;        EXIT:   USES R0,R1,A
             =2593  ;                R7 IS SET IF A SEGMENT IS SEEN.
             =2594  ;
08AF 86B2    =2595  CKFCA:   JNI     CKFC10          ;JUMP IF FCA HAS DATA
08B1 83      =2596           RET
             =2597  ;
08B2 B801    =2598  CKFC10:  MOV     R0,#ESRRD
08B4 FC      =2599           MOV     A,R4
08B5 12BE    =2600           JB0     CKFC20          ;JUMP IF SCANNING BIT IS SET
08B7 80      =2601           MOVX    A,@R0           ;READ BYTE
08B8 F2EA    =2602           JB7     CKFC95          ;JUMP IF HOST DATA
08BA 90      =2603           MOVX    @R0,A           ;RESET FRAME CAPTURE
08BB BF0E    =2604           MOV     R7,#EWAIT       ;SET THE "SEG SEEN" TIMER
08BD 83      =2605           RET
             =2606  ;
08BE 80      =2607  CKFC20:  MOVX    A,@R0           ;READ 1ST CHAR OF SEGMENT
08BF F2EA    =2608           JB7     CKFC95          ;JUMP IF HOST DATA
08C1 D2E6    =2609           JB6     CKFC90          ;JUMP IF PERIODICAL CAPTURE
08C3 B920    =2610           MOV     R1,#SCNBUF
             =2611  ;
08C5 47      =2612           SWAP    A
08C6 A1      =2613           MOV     @R1,A           ;STORE 1ST CHAR
08C7 80      =2614           MOVX    A,@R0           ;READ 2ND CHAR OF SEGMENT
08C8 31      =2615           XCHD    A,@R1           ;1ST AND 2ND STORED
08C9 19      =2616           INC     R1
08CA 80      =2617           MOVX    A,@R0           ;READ 3RD CHAR
             =2618  ;
08CB 47      =2619           SWAP    A
```

```
08CC A1      =2620            MOV     @R1,A           ;STORE 3RD CHAR
08CD 80      =2621            MOVX    A,@R0           ;READ 4TH CHAR
08CE 31      =2622            XCHD    A,@R1           ;3RD AND 4TH STORED
08CF 19      =2623            INC     R1
08D0 80      =2624            MOVX    A,@R0           ;READ 5TH CHAR
             =2625 ;
08D1 47      =2626            SWAP    A
08D2 A1      =2627            MOV     @R1,A           ;STORE 5TH CHAR
08D3 80      =2628            MOVX    A,@R0
08D4 31      =2629            XCHD    A,@R1           ;5TH AND 6TH STORED
08D5 19      =2630            INC     R1
             =2631 ;
08D6 B804    =2632            MOV     R0,#EPRDEC
08D8 80      =2633            MOVX    A,@R0           ;READ PARITY DECODE BYTE
08D9 537F    =2634            ANL     A,#07FH         ;MASK OFF THE UNUSED BIT
08DB A1      =2635            MOV     @R1,A           ;STORE PARITY DECODE B0-B6
             =2636 ;
08DC D37F    =2637            XRL     A,#07FH         ;TEST FOR NO DECODE. (BAD PARITY MAP).
08DE 96E4    =2638            JNZ     CKFC80          ;JUMP IF DECODE IS OK.
08E0 1420    =2639            CALL    CLRSNB          ;CLEAR THE SCAN BUFFER
08E2 04E6    =2640            JMP     CKFC90
             =2641 ;
08E4 BF0E    =2642 CKFC80:    MOV     R7,#EWAIT       ;SET THE "SEG SEEN" TIMER
             =2643 ;
08E6 B801    =2644 CKFC90:    MOV     R0,#EFRRST
08E8 90      =2645            MOVX    @R0,A           ;RESET THE FRAME
08E9 83      =2646            RET
             =2647 ;
08EA E5      =2648 CKFC95:    SEL     MB0
08EB F43B    =2649            CALL    SDATA
08ED F5      =2650            SEL     MB1
08EE 83      =2651            RET
             2652 ;************************************
08EF A3      2653 TROPG8:     MOVP    A,@A
08F0 83      2654             RET
             2655             ORG     0900H
0900         2656 $           INCLUDE(:F2:HCOMM.SRC)
             =2657 ;********************************************************************
             =2658 ; FILE: HCOMM.SRC  11-18-86 12:15  BOB ACTIS
             =2659 ; ROUTINE: HCOMM -- FOR THE OCIA INTERFACE
             =2660 ; FUNCTION:  SEND NEXT CHARACTER IN SEND BUFFER TO HOST.
             =2661 ; ENTRY: RB0
             =2662 ; EXIT:  USES R0,R1,R2,R3,A
             =2663 ;
0900 FC      =2664 HCOMM:     MOV     A,R4
0901 7209    =2665            JB3     HCOM10          ;JUMP IF SEND BUFFER HAS DATA
0903 37      =2666            CPL     A
0904 B256    =2667            JB5     HCOM90          ;JUMP IF BUFMAN REQUEST FLAG NOT SET
0906 D425    =2668            CALL    BUFMAN          ;PUT MESSAGE INTO THE COMM BUFFER
0908 83      =2669            RET
             =2670 ;
0909 0A      =2671 HCOM10:    IN      A,P2
090A 9256    =2672            JB4     HCOM90          ;JUMP IF RDATA SR NOT READY
             =2673 ;
090C B947    =2674            MOV     R1,#SBFPNT      ;GET POINTER ADDRESS
090E F1      =2675            MOV     A,@R1           ;GET POINTER
090F 97      =2676            CLR     C
0910 67      =2677            RRC     A               ;PUT NIBBLE POINTER IN CARRY
0911 11      =2678            INC     @R1             ;INCREMENT POINTER
0912 A9      =2679            MOV     R1,A            ;BYTE ADDRESS
0913 17      =2680            INC     A
0914 A8      =2681            MOV     R0,A            ;NEXT BYTE ADDRESS
0915 F1      =2682            MOV     A,@R1           ;GET DATA
0916 D300    =2683            XRL     A,#EAMBBY
0918 C64F    =2684            JZ      HCOM70          ;JUMP IF 2-LABEL AMBIGUITY MESSAGE
             =2685 ;
091A F1      =2686            MOV     A,@R1           ;ONE MORE TIME...
091B F61E    =2687            JC      HCOM20          ;JUMP IF LOW NIBBLE IS NEXT
091D 47      =2688            SWAP    A
             =2689 ;
091E 530F    =2690 HCOM20:    ANL     A,#0FH          ;MASK NIBBLE
0920 AB      =2691            MOV     R3,A            ;SAVE NIBBLE
0921 D30C    =2692            XRL     A,#0CH
0923 C656    =2693            JZ      HCOM90          ;JUMP IF FILLER CHARACTER (DON'T SEND)
0925 27      =2694            CLR     A
0926 A9      =2695            MOV     R1,A            ;CLEAR R1 FOR POSSIBLE LAST CHAR BIT
0927 E63F    =2696            JNC     HCOM30          ;JUMP IF NOT LOW (POSSIBLE LAST) NIBBLE
             =2697 ;
0929 F0      =2698            MOV     A,@R0           ;GET NEXT DATA BYTE
092A D3CC    =2699            XRL     A,#ETRMBY
092C C63B    =2700            JZ      HCOM25          ;JUMP IF TERMINATION BYTE
             =2701 ;
092E F0      =2702            MOV     A,@R0
092F D3AA    =2703            XRL     A,#ETL1BY
0931 963F    =2704            JNZ     HCOM30          ;JUMP IF NOT INTER-LABEL TERMINATION BYTE
             =2705 ;
0933 B847    =2706            MOV     R0,#SBFPNT
0935 10      =2707            INC     @R0
0936 10      =2708            INC     @R0             ;PAST INTER-LABEL TERMINATION BYTE
0937 B940    =2709            MOV     R1,#EBIT6       ;SET 'LAST CHAR' BIT
0939 243F    =2710            JMP     HCOM30
```

```
            =2711 ;
0938 B940   =2712 HCOM25: MOV    R1,#EBIT6         ;PUT IN THE LAST CHAR BIT
093D 142A   =2713         CALL   CLRSBF            ;CLEAR SEND BUFFER, ETC.
            =2714 ;
093F FB     =2715 HCOM30: MOV    A,R3              ;GET NIBBLE
0940 0330   =2716         ADD    A,#00110000B
0942 57     =2717         DA     A
0943 B247   =2718         JB5    HCOM40            ;JUMP IF CHAR IS 0-9
0945 03C1   =2719         ADD    A,#11000001B      ;FORMAT CHARACTERS A-F
            =2720 ;
0947 49     =2721 HCOM40: ORL    A,R1              ;ADD POSSIBLE LAST CHAR BIT
0948 AB     =2722         MOV    R3,A              ;SAVE DATA BYTE
0949 E5     =2723         SEL    MB0
094A 3490   =2724         CALL   PARITY
094C F5     =2725         SEL    MB1
094D 2453   =2726         JMP    HCOM80
            =2727 ;
094F 142A   =2728 HCOM70: CALL   CLRSBF
0951 2358   =2729         MOV    A,#EAMBIG         ;SEND AMBIGUITY MESSAGE BYTE
            =2730 ;
0953 B802   =2731 HCOM80: MOV    R0,#EOCIA
0955 90     =2732         MOVX   @R0,A             ;SEND CHARACTER
            =2733 ;
0956 83     =2734 HCOM90: RET
            2735 $       INCLUDE(:F2:FCKCTS.SRC)
            =2736 ;****************************************************************
            =2737 ; FILE: FCKCNT.SRC  10-25-83 16:50   BOB ACTIS
            =2738 ;       MODIFIED    03-25-86        DREW TAUSSIG
            =2739 ;       MODIFIED    07-17-86        RANDY ELLIOTT
            =2740 ; ROUTINE: CKCNTS
            =2741 ; FUNCTION: CHECK SEGMENT BUFFER TOTAL COUNTS FOR ENOUGH SEGMENTS FOR
            =2742 ;           A POSSIBLE VALID VERSION.
            =2743 ; ENTRY: NO SETUP
            =2744 ; EXIT:  A = 0 IF ENOUGH SEGMENTS
            =2745 ;        A <> 0 IF NOT ENOUGH SEGMENTS
            =2746 ;        USES R0
            =2747 ;
0957        =2748 CKCNTS EQU     $
0957 34A9   =2749         CALL   CKTL              ;CHECK IF SEEN ANY TWO LABEL LEFT HALVES
0959 C662   =2750         JZ     CKCN05            ;JUMP - NO 2-LABEL HALVES SEEN
            =2751 ;
            =2752 ; SEEN 2-LABEL LEFT HALVES - CHECK IF ENOUGH SEGS FOR VALID LABELS
            =2753 ;
095B B842   =2754         MOV    R0,#STTL13
095D F0     =2755         MOV    A,@R0
095E C697   =2756         JZ     CKCNOK            ;JUMP - SEEN JAN13-JAN13 LABEL PAIR
            =2757 ;****************************************************************
            =2758 ;DO NOT READ JAN13-JAN8 PAIRS (7-17-87) RDE
            =2759 ;       MOV    R0,#STTL8
            =2760 ;       MOV    A,@R0
            =2761 ;       JZ     CKCNOK            ;JUMP - SEEN JAN13-JAN8 LABEL PAIR
            =2762 ;****************************************************************
0960 2499   =2763         JMP    CKCNNG            ;NOT ENOUGH SEGS FOR 2-LABEL YET
            =2764 ;
            =2765 ; NO 2-LABEL, CHECK COUNTS FOR NORMAL SINGLE LABEL READ
            =2766 ;
0962 B835   =2767 CKCN05: MOV    R0,#R6STOT
0964 F0     =2768         MOV    A,@R0
0965 03FE   =2769         ADD    A,#-2
0967 F682   =2770         JC     CKCN20            ;JUMP IF R6STOT >= 2
            =2771 ;
0969 B82D   =2772         MOV    R0,#L6STOT
096B F0     =2773         MOV    A,@R0
096C 03FE   =2774         ADD    A,#-2
096E F688   =2775         JC     CKCN30            ;JUMP IF L6STOT >= 2
            =2776 ;
0970 B83B   =2777         MOV    R0,#L4STOT
0972 F0     =2778         MOV    A,@R0
0973 03FE   =2779         ADD    A,#-2
0975 F679   =2780         JC     CKCN10            ;JUMP IF L4STOT >= 2
0977 2499   =2781         JMP    CKCNNG            ;JUMP IF NO POSSIBLE VERSION YET
            =2782 ;
0979 B841   =2783 CKCN10: MOV    R0,#R4STOT
097B F0     =2784         MOV    A,@R0
097C 03FE   =2785         ADD    A,#-2
097E F697   =2786         JC     CKCNOK            ;JUMP IF POSSIBLE EAN-8 VERSION
0980 2499   =2787         JMP    CKCNNG            ;JUMP IF NO POSSIBLE VERSION YET
            =2788 ;
0982 B82D   =2789 CKCN20: MOV    R0,#L6STOT
0984 F0     =2790         MOV    A,@R0
0985 03FE   =2791         ADD    A,#-2
0987 F697   =2792         JC     CKCNOK            ;JUMP IF POSSIBLE UPC-A, OR EAN-13
0989 2499   =2793         JMP    CKCNNG            ;JUMP IF NO POSSIBLE VERSION YET
            =2794 ;
098B B827   =2795 CKCN30: MOV    R0,#L6S1+3
098D F0     =2796         MOV    A,@R0
098E 9297   =2797         JB4    CKCNOK            ;JUMP IF BUFFER 1 IS A UPC-E
            =2798 ;
0990 B82B   =2799         MOV    R0,#L6S2+3
0992 F0     =2800         MOV    A,@R0
0993 9297   =2801         JB4    CKCNOK            ;JUMP IF BUFFER 2 IS A UPC-E
```

```
0995 2499    =2802         JMP     CKCNNG
             =2803 ;
0997 27      =2804 CKCNOK: CLR     A
0998 83      =2805         RET
             =2806 ;
0999 27      =2807 CKCNNG: CLR     A
099A 37      =2808         CPL     A
099B 83      =2809         RET
              2810 $       INCLUDE(:F2:TLRUT.SRC)
             =2811 ;************************************************************
             =2812 ; FILE: TLRUT.SRC  11-18-86 12:15  DREW TAUSSIG, BOB ACTIS
             =2813 ;       TWO LABEL READ SCANNER UTILITIES
             =2814 ; UPDATES: MODIFIED 3-17-87 FOR TEC BY RANDY ELLIOTT
             =2815 ;          MODIFIED 7-17-87 FOR TEC BY RANDY ELLIOTT
             =2816 ;************************************************************
             =2817 ; ROUTINE: GETFLG
             =2818 ; FUNCTION: GET THE F1,F2 CHARACTERS FROM AN EAN(JAN)13 LEFT HALF
             =2819 ;            SEGMENT
             =2820 ; ENTRY: R0 POINTS TO FIRST BYTE OF BUFFER
             =2821 ; EXIT: USES R0,R1
             =2822 ;       A-PACKED BCD BYTE CONTAINING F1,F2 CHARACTERS (F1 IN HIGH NIB)
             =2823 ;
099C         =2824 GETFLG EQU     $
099C F0      =2825         MOV     A,@R0           ;GET BYTE CONTAINING F2 CHAR (HIGH NIB)
099D 53F0    =2826         ANL     A,#0F0H         ;MASK LOW NIBBLE
099F A9      =2827         MOV     R1,A
09A0 18      =2828         INC     R0
09A1 18      =2829         INC     R0
09A2 18      =2830         INC     R0              ;R0 POINTS TO PARITY DECODE (F1)
09A3 F0      =2831         MOV     A,@R0           ;F1 CHARACTER IN LOW NIBBLE
09A4 530F    =2832         ANL     A,#0FH          ;MASK OFF HIGH NIBBLE
09A6 49      =2833         ORL     A,R1            ;COMBINE THE TWO CHARS
09A7 47      =2834         SWAP    A               ;PUT IN RIGHT ORDER
09A8 83      =2835         RET
             =2836 ;
             =2837 ;************************************************************
             =2838 ; ROUTINE: CKTL
             =2839 ; FUNCTION: CHECKS THE 2-LABEL READ STATUS BYTES FOR ANY SCANS OF
             =2840 ;            TWO LABEL LEFT HALVES
             =2841 ; ENTRY: NO SETUP REQUIRED
             =2842 ; EXIT: USES R0
             =2843 ;       A<>0 IF 2-LABEL LEFT HALVES HAVE BEEN SEEN
             =2844 ;       A=0 IF NO TWO LABEL LEFT HALVES HAVE BEEN SEEN
             =2845 ;           OR TWO LABEL SCANNING HAS BEEN DISABLED
             =2846 ;
09A9         =2847 CKTL   EQU     $
             =2848 ;
09A9 B842    =2849         MOV     R0,#STTL13      ;JAN13-JAN13 LABEL PAIR STATUS
09AB F0      =2850         MOV     A,@R0
             =2851 ;************************************************************
             =2852 ;REMOVE RAD CAPABILITY FOR JAN13-JAN8 LABELS
             =2853 ;        MOV     R0,#STTL8       ;JAN13-JAN8 LABEL PAIR STATUS
             =2854 ;        ANL     A,@R0           ;COMBINE THE TWO
             =2855 ;************************************************************
09AC 53F0    =2856         ANL     A,#0F0H         ;MASK OFF LOW NIBBLE (RIGHT HALF STATUS)
09AE D3F0    =2857         XRL     A,#0F0H         ;A<>0 IF ANY HIGH NIBBLE BITS ZERO
09B0 83      =2858         RET
             =2859 ;
09B1 27      =2860 CKTL90: CLR     A
09B2 83      =2861         RET
             =2862 ;
             =2863 ;************************************************************
             =2864 ; ROUTINE: SUM13L
             =2865 ; FUNCTION: CALCULATE PARTIAL CHECKSUM OF THE LEFT HALF OF AN EAN13
             =2866 ;            LABEL
             =2867 ; ENTRY: R0 POINTS TO FIRST BYTE OF SEGMENT BUFFER
             =2868 ; EXIT: USES R0,R1,R2
             =2869 ;       A = PARTIAL CKECKSUM (LOW NIBBLE - HIGH NIBBLE UNDEFINED)
             =2870 ;
0983         =2871 SUM13L EQU     $
0983 1450    =2872         CALL    SGSUM6
0985 146A    =2873         CALL    APL3R2
0987 18      =2874         INC     R0
0988 18      =2875         INC     R0
0989 18      =2876         INC     R0              ;POINT TO PARITY DECODE (F1 CHAR)
098A 60      =2877         ADD     A,@R0           ;ADD PARITY DIGIT
098B 57      =2878         DA      A
098C 83      =2879         RET
             =2880 ;
              2881 $       INCLUDE(:F2:INCHNB.SRC)
             =2882 ;************************************************************
             =2883 ; FILE: INCHNB.SRC 11-20-86 12:20 RANDY ELLIOTT TEC 750SL
             =2884 ;************************************************************
             =2885 ;************************************************************
             =2886 ; ROUTINE: INCHNB, INCLNB
             =2887 ; FUNCTION: INCREMENT SEGMENT COUNTERS.
             =2888 ;            LOW NIBBLE IS SEGMENT ONE COUNTER.
             =2889 ;            HIGH NIBBLE IS SEGMENT TWO COUNTER.
             =2890 ;            TERMINAL COUNT IS 15. (0FH)
             =2891 ;            IF NOT ALREADY TERMINAL COUNT, INCREMENT THE SEGMENT
```

```
                      =2892 ;           COUNTER AND TOTAL COUNTER.
                      =2893 ; ENTRY:  R0 = PACKED SEGMENT COUNTER ADDRESS
                      =2894 ;         R0+1 = SEGMENT TOTAL COUNTER ADDRESS
                      =2895 ; EXIT:   IF NIBBLE WAS INCREMENTED:
                      =2896 ;             R0 = SEGMENT TOTAL COUNTER ADDRESS
                      =2897 ;             A = PACKED COUNTER
                      =2898 ;             CARRY = CLEAR
                      =2899 ;         IF NIBBLE WAS ALREADY 0FH:
                      =2900 ;             R0 = PACKED SEGMENT COUNTER ADDRESS
                      =2901 ;             A = NOT DEFINED
                      =2902 ;             CARRY = SET
                      =2903 ;
098D F0               =2904 INCHNB: MOV    A,@R0           ;GET PACKED COUNTER
098E 97               =2905         CLR    C
098F 0310             =2906         ADD    A,#10H          ;INCREMENT HIGH NIBBLE
09C1 F600             =2907         JC     INCXRT          ;JUMP IF ALREADY 0FOH
09C3 24CD             =2908         JMP    INCX90
                      =2909 ;
09C5 F0               =2910 INCLNB: MOV    A,@R0
09C6 47               =2911         SWAP   A
09C7 97               =2912         CLR    C
09C8 0310             =2913         ADD    A,#10H
09CA F600             =2914         JC     INCXRT          ;JUMP IF ALREADY 00FH
09CC 47               =2915         SWAP   A
                      =2916 ;
09CD A0               =2917 INCX90: MOV    @R0,A           ;UPDATE THE PACKED COUNTER
09CE 18               =2918         INC    R0
09CF 10               =2919         INC    @R0             ;INCREMENT TOTAL COUNTER
                      =2920 ;
09D0 83               =2921 INCXRT: RET
                       2922 ;************************************
09D1 A3                2923 TROPG9: MOVP   A,@A
09D2 83                2924         RET
0A00                   2925         ORG    0A00H
                       2926 $       INCLUDE(:F2:PROCSG.SRC)
                      =2927 ;*****************************************************
                      =2928 ; FILE:  PROCSG.SRC  11-20-86 14:15  BOB ACTIS
                      =2929 ;        MODIFIED    03-25-86       DREW TAUSSIG
                      =2930 ;        MODIFIED    08-21-86       CHANGE LABEL 2 FLAG CHECK
                      =2931 ;        MODIFIED    03-17-87       TEC TWO LABEL READ ENHANCEMENT
                      =2932 ;*****************************************************
                      =2933 ; ROUTINE:  SWP4SN, SWP6SN
                      =2934 ; FUNCTION: SWAP (REVERSE) ORDER OF PACKED CHARACTERS IN SCAN BUFFER.
                      =2935 ;           SWP4SN SWAPS CHARACTERS IN SCNBUF+1 AND SCNBUF+2.
                      =2936 ;           SWP6SN SWAPS CHARACTERS IN SCNBUF, SCNBUF+1 AND SCNBUF+2.
                      =2937 ;           CLEARS BACKWARD BIT IN THE PARITY DECODE BYTE SCNBUF+3.
                      =2938 ; ENTRY:    NO SETUP
                      =2939 ; EXIT:     CHARACTERS SWAPED.
                      =2940 ;           R0 = SCNBUF+3 (PARITY DECODE BYTE ADDRESS)
                      =2941 ;                BACKWARD BIT IS CLEARED.
                      =2942 ;           A = PARITY DECODE BYTE
                      =2943 ;
0A00 B822             =2944 SWP4SN: MOV    R0,#SCNBUF+2
0A02 F0               =2945         MOV    A,@R0
0A03 47               =2946         SWAP   A
0A04 C8               =2947         DEC    R0
0A05 20               =2948         XCH    A,@R0
0A06 47               =2949         SWAP   A
0A07 18               =2950         INC    R0
0A08 A0               =2951         MOV    @R0,A
0A09 4419             =2952         JMP    SWPXEX
                      =2953 ;
0A0B B822             =2954 SWP6SN: MOV    R0,#SCNBUF+2
0A0D F0               =2955         MOV    A,@R0
0A0E 47               =2956         SWAP   A
0A0F C8               =2957         DEC    R0
0A10 20               =2958         XCH    A,@R0
0A11 47               =2959         SWAP   A
0A12 20               =2960         XCH    A,@R0
0A13 C8               =2961         DEC    R0
0A14 20               =2962         XCH    A,@R0
0A15 47               =2963         SWAP   A
0A16 18               =2964         INC    R0
0A17 18               =2965         INC    R0
0A18 A0               =2966         MOV    @R0,A
                      =2967 ;
0A19 18               =2968 SWPXEX: INC    R0
0A1A F0               =2969         MOV    A,@R0
0A1B 53BF             =2970         ANL    A,#255-EDECBK
0A1D A0               =2971         MOV    @R0,A
0A1E 4438             =2972         JMP    SWPXRT
                      =2973 ;*****************************************************
                      =2974 ; ROUTINE:  MCH2BY, MCH3BY, MCH4BY
                      =2975 ; FUNCTION: COMPARE BYTES IN ONE BUFFER WITH A SECOND BUFFER.
                      =2976 ; ENTRY:    R0 = FIRST BYTE ADDRESS OF FIRST BUFFER
                      =2977 ;           R1 = FIRST BYTE ADDRESS OF SECOND BUFFER
                      =2978 ; EXIT:     IF BUFFER ONE EQUALS BUFFER TWO:
                      =2979 ;               R0 = END OF FIRST BUFFER ADDRESS PLUS 1.
                      =2980 ;               R1 = END OF SECOND BUFFER ADDRESS PLUS 1.
                      =2981 ;               R2 = 0
                      =2982 ;               A = 0
```

```
                      =2983 ;        IF BUFFER ONE DOESN'T EQUAL BUFFER TWO:
                      =2984 ;             R0 = BUFFER ONE "NOT EQUAL" BYTE ADDRESS
                      =2985 ;             R1 = BUFFER TWO "NOT EQUAL" BYTE ADDRESS
                      =2986 ;             R2 <> 0
                      =2987 ;             A <> 0
                      =2988 ;
0A20 BA02             =2989 MCH2BY: MOV    R2,#2
0A22 442A             =2990         JMP    MCHXBY
0A24 BA03             =2991 MCH3BY: MOV    R2,#3
0A26 442A             =2992         JMP    MCHXBY
0A28 BA04             =2993 MCH4BY: MOV    R2,#4
0A2A F0               =2994 MCHXBY: MOV    A,@R0
0A2B D1               =2995         XRL    A,@R1
0A2C 9632             =2996         JNZ    MCHXRT          ;JUMP IF NOT EQUAL
0A2E 18               =2997         INC    R0
0A2F 19               =2998         INC    R1
0A30 EA2A             =2999         DJNZ   R2,MCHXBY
0A32 83               =3000 MCHXRT: RET
                      =3001 ;****************************************************
                      =3002 ;   ROUTINE: PROCSG
                      =3003 ;   FUNCTION: CHECK FOR SCAN BUFFER DATA.
                      =3004 ;             SWAP SCAN BUFFER DATA IF BACKWARDS.
                      =3005 ;             CHECK FOR MISMATCHES.
                      =3006 ;             MOVE SCAN BUFFER TO PROPER SEGMENT BUFFER.
                      =3007 ;             INCREMENT SEGMENT AND TOTAL COUNTERS.
                      =3008 ;   ENTRY: NO SETUP
                      =3009 ;   EXIT: USES R0,R1,R2,R3,A,F0
                      =3010 ;
0A33 B823             =3011 PROCSG: MOV    R0,#SCNBUF+3
0A35 F0               =3012         MOV    A,@R0           ;GET PARITY DECODE BYTE
0A36 C66E             =3013         JZ     PROCRT          ;JUMP IF NO DATA
                      =3014 ;
0A38 B26C             =3015 SWPXRT: JB5    PROCEX          ;JUMP IF UPC-D BIT SET
0A3A 925B             =3016         JB4    PROCE           ;JUMP IF UPC-E BIT SET
0A3C 530F             =3017         ANL    A,#0FH
0A3E 0300             =3018         ADD    A,#0            ;SETS CARRY FLAGS FOR DA
0A40 57               =3019         DA     A
0A41 9248             =3020         JB4    PROC05          ;JUMP IF DECODE > 9 (UPC-A OR EAN8)
                      =3021 ;
0A43                  =3022 PROC3L  EQU    $               ;PROCESS AN EAN-13-L
0A43 F0               =3023         MOV    A,@R0
0A44 D208             =3024         JB6    SWP6SN          ;JUMP IF BACKWARDS
0A46 6457             =3025         JMP    PRO7CH
                      =3026 ;
0A48 5303             =3027 PROC05: ANL    A,#03H
0A4A 3263             =3028         JB1    PROCA           ;JUMP IF UPC-A
0A4C F0               =3029 PROC8:  MOV    A,@R0           ;EAN-8 COMES HERE
0A4D 85               =3030         CLR    F0              ;CLEAR F0 TO INDICATE 8-L (DEFAULT)
0A4E D200             =3031         JB6    SWP4SN          ;JUMP IF BACKWARDS
0A50 1256             =3032         JB0    PROC8R          ;JUMP IF EAN-8-R
0A52 BB3A             =3033 PROC8L: MOV    R3,#L4SCNT
0A54 446F             =3034         JMP    PRO4CH          ;GO PROCESS A 4-CHAR SEG
0A56 BB40             =3035 PROC8R: MOV    R3,#R4SCNT
0A58 95               =3036         CPL    F0              ;SET F0 TO INDICATE 8-R
0A59 446F             =3037         JMP    PRO4CH
                      =3038 ;
0A5B D208             =3039 PROCE:  JB6    SWP6SN
0A5D 1471             =3040         CALL   EMOD10
0A5F 966C             =3041         JNZ    PROCEX          ;JUMP IF EMOD10 TEST FAILED
0A61 6457             =3042         JMP    PRO7CH
                      =3043 ;
0A63 F0               =3044 PROCA:  MOV    A,@R0
0A64 D208             =3045         JB6    SWP6SN
0A66 126A             =3046         JB0    PROCAR          ;JUMP IF UPC-A-R
0A68 6457             =3047 PROCAL: JMP    PRO7CH
0A6A 6400             =3048 PROCAR: JMP    PRO6CH
                      =3049 ;
0A6C 1420             =3050 PROCEX: CALL   CLRSNB          ;GO CLEAR THE SCAN BUFFER
0A6E 83               =3051 PROCRT: RET                    ;RETURN FROM PROCESS SEGMENT ROUTINE
                      =3052 ;****************************************************
                      =3053 ;   ROUTINE: PRO4CH
                      =3054 ;   FUNCTION: PROCESS 4-CHAR SEGMENTS (2 BYTES)
                      =3055 ;             CHECKS FOR MISMATCHES.
                      =3056 ;             MOVES SEGMENT FROM SCAN BUFFER TO SEGMENT BUFFER.
                      =3057 ;             INCREMENTS SCAN AND TOTAL COUNTERS.
                      =3058 ;   ENTRY: R3 = PACKED SCAN COUNTER ADDRESS
                      =3059 ;          R3-4 = SCAN 1 BUFFER ADDRESS
                      =3060 ;          R3-2 = SCAN 2 BUFFER ADDRESS
                      =3061 ;          R3+1 = TOTAL COUNTER ADDRESS
                      =3062 ;          F0 = LEFT OR RIGHT HALF (SET=RIGHT, CLR=LEFT)
                      =3063 ;   EXIT: SEGMENT PROCESSED
                      =3064 ;         SCAN BUFFER CLEARED
                      =3065 ;         USES R0,R1,R2,R3,A
                      =3066 ;
0A6F FB               =3067 PRO4CH: MOV    A,R3
0A70 A8               =3068         MOV    R0,A
0A71 F0               =3069         MOV    A,@R0           ;GET S2/S1 PACKED COUNTS
0A72 530F             =3070         ANL    A,#0FH
0A74 B821             =3071         MOV    R0,#SCNBUF+1
0A76 9693             =3072         JNZ    PRO4C2          ;JUMP IF SCAN 1 COUNTER <> 0
                      =3073 ;
```

```
0A78 FB       =3074           MOV     A,R3            ;SCAN 1 COUNTER = 0
0A79 03FC     =3075           ADD     A,#-4
0A7B A9       =3076           MOV     R1,A            ;SCAN 1 BUFFER ADDRESS
0A7C 143B     =3077           CALL    MOV2BY
              =3078 ;
0A7E FB       =3079           MOV     A,R3
0A7F A8       =3080           MOV     R0,A
0A80 34C5     =3081           CALL    INCLNB          ;INCREMENT SCAN 1 COUNTER AND TOTAL
              =3082 ;
              =3083 ;    SET 2-LABEL STATUS BYTE (JAN13-JAN8)
              =3084 ;
0A82 B943     =3085 PRO4C0:   MOV     R1,#STTL8
0A84 BAFD     =3086           MOV     R2,#SETR21      ;JAN8 IS ALWAYS LABEL 2
0A86 B6CC     =3087           JF0     PRO4C7  ;JUMP - RIGHT HALF (ALWAYS SET STATUS BYTE)
0A88 BADF     =3088           MOV     R2,#SETL21
              =3089 ;
              =3090 ;    CHECK IF VALID F1,F2 CHARS IN LEFT HALF BEFORE SETTING BYTE
              =3091 ;
0A8A B821     =3092 PRO4C1:   MOV     R0,#SCNBUF+1
0A8C F0       =3093           MOV     A,@R0           ;GET F1,F2 BYTE
0A8D 74C6     =3094           CALL    CKL2FG          ;CHECK IF LABEL 2 FLAG
0A8F 96CF     =3095           JNZ     PRO4CX          ;JUMP - NO, DONT SET STATUS BYTE
0A91 44CC     =3096           JMP     PRO4C7          ;YES, GO SET BYTE
              =3097 ;
              =3098 ;    SCAN-1 BUFFER HAS DATA, CHECK IF SCNBUF IS SAME
              =3099 ;
0A93 FB       =3100 PRO4C2:   MOV     A,R3            ;SCAN 1 COUNTER <> 0
0A94 03FC     =3101           ADD     A,#-4
0A96 A9       =3102           MOV     R1,A            ;SCAN 1 BUFFER ADDRESS
0A97 5420     =3103           CALL    MCH2BY
0A99 96A9     =3104           JNZ     PRO4C4          ;JUMP IF NO MATCH
              =3105 ;
0A9B FB       =3106           MOV     A,R3
0A9C A8       =3107           MOV     R0,A
0A9D 34C5     =3108           CALL    INCLNB          ;INCREMENT SCAN 1 COUNTER AND TOTAL
              =3109 ;
              =3110 ;    SET 2-LABEL READ STATUS BYTE
              =3111 ;
0A9F B943     =3112 PRO4C3:   MOV     R1,#STTL8
0AA1 BAFE     =3113           MOV     R2,#SETR22      ;SHOW SAW FOR SECOND TIME
0AA3 B6CC     =3114           JF0     PRO4C7          ;JUMP - RIGHT HALF (ALWAYS SET STATUS)
0AA5 BAEF     =3115           MOV     R2,#SETL22      ;LEFT HALF
0AA7 448A     =3116           JMP     PRO4C1          ;GO CHECK IF VALID F1,F2 CHARS
              =3117 ;
              =3118 ;    SCAN-1 FULL, SCNBUF DOESNT MATCH
              =3119 ;
0AA9 FB       =3120 PRO4C4:   MOV     A,R3            ;SCAN 1 BUFFER DOESN'T MATCH
0AAA A8       =3121           MOV     R0,A
0AAB F0       =3122           MOV     A,@R0
0AAC 53F0     =3123           ANL     A,#0F0H
0AAE B821     =3124           MOV     R0,#SCNBUF+1
0AB0 968E     =3125           JNZ     PRO4C6          ;JUMP IF SCAN 2 COUNTER <> 0
              =3126 ;
0AB2 FB       =3127           MOV     A,R3
0AB3 03FE     =3128           ADD     A,#-2
0AB5 A9       =3129           MOV     R1,A            ;SCAN 2 BUFFER ADDRESS
0AB6 143B     =3130           CALL    MOV2BY
              =3131 ;
0AB8 FB       =3132           MOV     A,R3
0AB9 A8       =3133           MOV     R0,A
0ABA 34BD     =3134           CALL    INCHNB          ;INCREMENT SCAN 2 COUNTER AND TOTAL
0ABC 4482     =3135           JMP     PRO4C0          ;GO CHECK AND SET 2-LABEL STATUS
              =3136 ;
0ABE FB       =3137 PRO4C6:   MOV     A,R3            ;SCAN 2 COUNT <> 0
0ABF 03FE     =3138           ADD     A,#-2
0AC1 A9       =3139           MOV     R1,A            ;SCAN 2 BUFFER ADDRESS
0AC2 5420     =3140           CALL    MCH2BY
0AC4 96D1     =3141           JNZ     PRO4C8          ;JUMP IF NO MATCH
              =3142 ;
0AC6 FB       =3143           MOV     A,R3
0AC7 A8       =3144           MOV     R0,A
0AC8 34BD     =3145           CALL    INCHNB          ;INCREMENT SCAN 2 COUNT AND TOTAL
0ACA 449F     =3146           JMP     PRO4C3          ;GO CHECK AND SET 2-LABEL STATUS
              =3147 ;
              =3148 ;    SET STATUS BYTE (@R1) WITH MASK STORED IN R2
              =3149 ;
0ACC FA       =3150 PRO4C7:   MOV     A,R2
0ACD 51       =3151           ANL     A,@R1           ;CLEAR PROPER BIT
0ACE A1       =3152           MOV     @R1,A
0ACF 446C     =3153 PRO4CX:   JMP     PROCEX          ;BACK TO MAIN ROUTINE
              =3154 ;
              =3155 ;    HERE IF NEITHER SCAN BUFFER MATCHED
              =3156 ;
0AD1 FB       =3157 PRO4C8:   MOV     A,R3            ;NEITHER SCAN BUFFER MATCHED
0AD2 17       =3158           INC     A
0AD3 A8       =3159           MOV     R0,A            ;TOTAL COUNTER ADDRESS
0AD4 10       =3160           INC     @R0             ;INCREMENT TOTAL COUNTER
0AD5 446C     =3161           JMP     PROCEX
              =3162 ;*********************************************************
              =3163 ;  03-20-87 12:30  RANDY ELLIOTT (TEC 750SL)
              =3164 ;  PUT HERE BECAUSE PAGE 2 IS SHORT ON MEMORY
```

```
             =3165 ;***************************************************************
             =3166 ;***************************************************************
             =3167 ; ROUTINE: EXSBF2, EXSBF3, EXSBF4
             =3168 ; FUNCTION: EXCHANGE SEGMENT BUFFERS AND COUNTERS. (2,3 OR 4 BYTES)
             =3169 ;           (I.E. EXCHANGE BUFFER 1 DATA WITH BUFFER 2 DATA)
             =3170 ; ENTRY:  R0 = SCAN 1 BUFFER ADDRESS
             =3171 ;         R0+2[3,4] = SCAN 2 BUFFER ADDRESS
             =3172 ;         R0+3[4,5] = SCAN2/SCAN1 PACKED COUNTER ADDRESS
             =3173 ; EXIT:  USES R1,R2
             =3174 ;        SCAN 1 AND SCAN 2 DATA AND COUNTERS EXCHANGED.
             =3175 ;        R0 = SCAN2/SCAN1 COUNTER ADDRESS.
             =3176 ;        A  = SCAN2/SCAN1 COUNTERS
             =3177 ;
0AD7 BA02    =3178 EXSBF2: MOV    R2,#2
0AD9 44E1    =3179         JMP    EXSBFX
0ADB BA03    =3180 EXSBF3: MOV    R2,#3
0ADD 44E1    =3181         JMP    EXSBFX
0ADF BA04    =3182 EXSBF4: MOV    R2,#4
0AE1 F8      =3183 EXSBFX: MOV    A,R0           ;GET SCAN 1 BUFFER ADDRESS
0AE2 A9      =3184         MOV    R1,A           ;SAVE IT
0AE3 6A      =3185         ADD    A,R2           ;CALCULATE SCAN 2 BUFFER ADDRESS
0AE4 A8      =3186         MOV    R0,A           ;SAVE IT
             =3187 ;
0AE5 F0      =3188 EXSBFL: MOV    A,@R0          ;GET SCAN 2 DATA
0AE6 21      =3189         XCH    A,@R1          ;EXCHANGE DATA
0AE7 A0      =3190         MOV    @R0,A          ;STORE SCAN 1 DATA
0AE8 18      =3191         INC    R0
0AE9 19      =3192         INC    R1
0AEA EAE5    =3193         DJNZ   R2,EXSBFL
             =3194 ;
0AEC F0      =3195         MOV    A,@R0          ;GET S2/S1 COUNTERS
0AED 47      =3196         SWAP   A              ;EXCHANGE COUNTERS
0AEE A0      =3197         MOV    @R0,A          ;SAVE COUNTERS
0AEF 83      =3198         RET
             =3199 ;
             =3200 ;***************************************************************
0AF0 A3      =3201 TROPGA: MOVP   A,@A
0AF1 83      =3202         RET
             =3203 ;***************************************************************
             =3204 ; ROUTINE: PRO6CH
             =3205 ; FUNCTION: PROCESS 6-CHAR SEGMENTS (3 BYTES)
             =3206 ;           CHECKS FOR MISMATCHES.
             =3207 ;           MOVES SEGMENT FROM SCAN BUFFER TO SEGMENT BUFFER.
             =3208 ;           INCREMENTS SCAN AND TOTAL COUNTERS.
             =3209 ; ENTRY: NO SETUP
             =3210 ; EXIT:  SEGMENT IS PROCESSED
             =3211 ;        SCAN BUFFER CLEARED
             =3212 ;        USES R0,R1,R2,R3,A
             =3213 ;
0800         =3214         ORG    ((($-2)/100H)+1)*100H
0800 B834    =3215 PRO6CH: MOV    R0,#R6SCNT
0802 F0      =3216         MOV    A,@R0          ;GET S2/S1 PACKED COUNTS
0803 530F    =3217         ANL    A,#0FH
0805 892E    =3218         MOV    R1,#R6S1
0807 B820    =3219         MOV    R0,#SCNBUF
0809 9615    =3220         JNZ    PRO6C2         ;JUMP IF SCAN 1 COUNTER <> 0
             =3221 ;
080B 143F    =3222         CALL   MOV3BY         ;SCAN 1 COUNTER = 0
             =3223 ;
080D B834    =3224         MOV    R0,#R6SCNT
080F 34C5    =3225         CALL   INCLNB         ;INCREMENT SCAN 1 COUNTER AND TOTAL
             =3226 ;
             =3227 ; SET 2-LABEL READ STATUS (BOTH TYPES)
             =3228 ;
0811 BAF7    =3229         MOV    R2,#SETR11     ;FIRST LABEL FIRST SCAN
0813 6442    =3230         JMP    PRO6C7
             =3231 ;
             =3232 ; SCAN-1 BUFFER FULL, CHECK IF MATCH
             =3233 ;
0815 5424    =3234 PRO6C2: CALL   MCH3BY         ;SCAN 1 COUNTER <> 0
0817 9621    =3235         JNZ    PRO6C4         ;JUMP IF NO MATCH
             =3236 ;
             =3237 ; SCAN-1 MATCH, INCREMENT COUNTER AND SET 2-LABEL STATUS
             =3238 ;
0819 B834    =3239         MOV    R0,#R6SCNT
081B 34C5    =3240         CALL   INCLNB         ;INCREMENT SCAN 1 COUNTER AND TOTAL
081D BAFB    =3241         MOV    R2,#SETR12     ;FIRST LABEL - SECOND SCAN
081F 6442    =3242         JMP    PRO6C7         ;DO BOTH TYPES OF 2-LABEL READ
             =3243 ;
             =3244 ; SCAN-1 BUFFER NO MATCH - CHECK SCAN-2 BUFFER
             =3245 ;
             =3246
0821 B834    =3247 PRO6C4: MOV    R0,#R6SCNT     ;SCAN 1 BUFFER DOESN'T MATCH
0823 F0      =3248         MOV    A,@R0
0824 53F0    =3249         ANL    A,#0F0H
0826 8931    =3250         MOV    R1,#R6S2
0828 B820    =3251         MOV    R0,#SCNBUF
082A 9636    =3252         JNZ    PRO6C6         ;JUMP IF SCAN 2 COUNTER <> 0
             =3253 ;
             =3254 ; SCAN-2 BUFFER EMPTY - FILL IT AND SET 2-LABEL READ STATUS
             =3255 ;
```

```
082C 143F        =3256          CALL    MOV3BY
                 =3257 ;
082E B834        =3258          MOV     R0,#R6SCNT
0830 34BD        =3259          CALL    INCHNB          ;INCREMENT SCAN 2 COUNTER AND TOTAL
0832 BAFD        =3260          MOV     R2,#SETR21      ;SECOND LABEL - FIRST SCAN
0834 6447        =3261          JMP     PRO6CX          ;DO ONLY JAN13-JAN13 PAIR TYPE
                 =3262 ;
                 =3263 ;  SCAN-2 BUFFER FULL - CHECK FOR MATCH
                 =3264 ;
0836 5424        =3265 PRO6C6:  CALL    MCH3BY          ;SCAN 2 COUNTER <> 0
0838 964E        =3266          JNZ     PRO6C8          ;JUMP IF NO MATCH
                 =3267 ;
                 =3268 ;  SCAN-2 BUFFER MATCH - INC COUNT AND SET 2-LABEL READ STATUS
                 =3269 ;
083A B834        =3270          MOV     R0,#R6SCNT
083C 34BD        =3271          CALL    INCHNB          ;INCREMENT SCAN 2 COUNT AND TOTAL
083E BAFE        =3272          MOV     R2,#SETR22      ;SECOND LABEL - SECOND SCAN
0840 6447        =3273          JMP     PRO6CX          ;DO ONLY JAN13-JAN13 PAIR TYPE
                 =3274 ;
                 =3275 ;  HERE TO SET JAN13-JAN8 LABEL PAIR STATUS
                 =3276 ;
0842 B843        =3277 PRO6C7:  MOV     R0,#STTL8
0844 F0          =3278          MOV     A,@R0
0845 5A          =3279          ANL     A,R2            ;ZERO APPROPRIATE BIT
0846 A0          =3280          MOV     @R0,A
                 =3281 ;
                 =3282 ;  HERE TO SET JAN13-JAN13 LABEL PAIR STATUS
                 =3283 ;
0847 B842        =3284 PRO6CX:  MOV     R0,#STTL13
0849 F0          =3285          MOV     A,@R0
084A 5A          =3286          ANL     A,R2
084B A0          =3287          MOV     @R0,A
084C 446C        =3288          JMP     PROCEX          ;RETURN TO MAIN SECTION
                 =3289 ;
                 =3290 ;  NEITHER SCAN BUFFER MATCHED - SET 2-LABEL READ (JAN13-JAN13) ERROR
                 =3291 ;
084E B835        =3292 PRO6C8:  MOV     R0,#R6STOT      ;NEITHER SCAN BUFFER MATCHED
0850 10          =3293          INC     @R0             ;INCREMENT TOTAL COUNTER
0851 B844        =3294          MOV     R0,#ERRTL
0853 B0FF        =3295          MOV     @R0,#0FFH       ;SET ERROR CONDITION
0855 446C        =3296          JMP     PROCEX
                 =3297 ;********************************************************************
                 =3298 ;  ROUTINE: PRO7CH
                 =3299 ;  FUNCTION: PROCESS 7-CHAR SEGMENTS (4 BYTES)
                 =3300 ;            CHECKS FOR MISMATCHES.
                 =3301 ;            MOVES SEGMENT FROM SCAN BUFFER TO SEGMENT BUFFER.
                 =3302 ;            INCREMENTS SCAN AND TOTAL COUNTERS.
                 =3303 ;  ENTRY: NO SETUP
                 =3304 ;  EXIT:  SEGMENT IS PROCESSED
                 =3305 ;         SCAN BUFFER CLEARED
                 =3306 ;         USES R0,R1,R2,R3,A,F0,F1
                 =3307 ;
0857             =3308 PRO7CH   EQU     $
                 =3309 ;
                 =3310 ;  CHECK FOR VALID 2-LABEL READ FLAGS
                 =3311 ;      SETS F0 AND F1
                 =3312 ;      IF JAN13 F1,F2 CHARS MATCH LABEL1 OR LABEL2 F1,F2 THEN F0 CLEARED
                 =3313 ;          OTHERWISE F0 SET
                 =3314 ;      IF JAN13 F1,F2 CHARS MATCH LABEL 1 THEN F1 CLEARED
                 =3315 ;      IF JAN13 F1,F2 CHARS MATCH LABEL 2 THEN F1 SET
                 =3316 ;
0857 85          =3317          CLR     F0
0858 A5          =3318          CLR     F1
0859 B820        =3319          MOV     R0,#SCNBUF
085B 349C        =3320          CALL    GETFLG          ;F1,F2 (PACKED BCD) IN ACCUM
085D A9          =3321          MOV     R1,A            ;SAVE IN R1
085E 74C6        =3322          CALL    CKL2FG          ;CHECK IF LABEL 2 FLAG
0860 C68E        =3323          JZ      PRO7C4          ;JUMP - MATCH LABEL2 (SCAN-2 BUFFER)
0862 F9          =3324          MOV     A,R1            ;RESTORE FLAG CHARS
0863 B5          =3325          CPL     F1
0864 740F        =3326          CALL    CKL1FG          ;CHECK IF LABEL 1 FLAG
0866 C669        =3327          JZ      PRO7C0          ;JUMP - FLAGS MATCH LABEL1
0868 95          =3328          CPL     F0              ;SET F0 - FLAGS DONT MATCH
                 =3329 ;
0869 B82C        =3330 PRO7C0:  MOV     R0,#L6SCNT
086B F0          =3331          MOV     A,@R0           ;GET S2/S1 PACKED COUNTS
086C 530F        =3332          ANL     A,#0FH
086E B924        =3333          MOV     R1,#L6S1
0870 B820        =3334          MOV     R0,#SCNBUF
0872 9680        =3335          JNZ     PRO7C2          ;JUMP IF SCAN 1 COUNTER <> 0
                 =3336 ;
                 =3337 ;  SCAN-1 BUFFER EMPTY - FILL AND SET 2-LABEL READ STATUS
                 =3338 ;  (IF FLAGS MATCH)
                 =3339 ;
0874 1443        =3340          CALL    MOV4BY          ;SCAN 1 COUNTER = 0
                 =3341 ;
0876 B82C        =3342          MOV     R0,#L6SCNT
0878 34C5        =3343          CALL    INCLNB          ;INCREMENT SCAN 1 COUNTER AND TOTAL
087A B6C4        =3344          JF0     PRO7CX          ;JUMP - NOT 2-LABEL READ
087C BA7F        =3345          MOV     R2,#SETL11      ;FIRST LABEL - FIRST SCAN
087E 6442        =3346          JMP     PRO6C7          ;GO SET STATUS AND RETURN
```

```
              =3347 ;
              =3348 ;  SCAN-1 BUFFER FULL - CHECK FOR MATCH
              =3349 ;
0880 5428     =3350 PRO7C2: CALL    MCH4BY          ;SCAN 1 COUNTER <> 0
0882 968E     =3351         JNZ     PRO7C4          ;JUMP IF NO MATCH
              =3352 ;
              =3353 ;  SCAN-1 BUFFER MATCH - INCREMENT COUNT AND SET 2-LAB STATUS (IF MATCH)
              =3354 ;
0884 B82C     =3355         MOV     R0,#L6SCNT
0886 34C5     =3356         CALL    INCLNB          ;INCREMENT SCAN 1 COUNTER AND TOTAL
0888 B6C4     =3357         JF0     PRO7CX          ;JUMP - NOT 2-LABEL READ
088A BABF     =3358         MOV     R2,#SETL12      ;FIRST LABEL - SECOND SCAN
088C 6442     =3359         JMP     PRO6C7          ;GO SET STATUS AND RETURN
              =3360 ;
              =3361 ;  SCAN-1 BUFFER DOESN'T MATCH - CHECK SCAN-2 BUFFER
              =3362 ;    ALSO GETS HERE IF FLAG CHARS INDICATE SECOND LABEL OF 2-LAB READ
              =3363 ;
088E B82C     =3364 PRO7C4: MOV     R0,#L6SCNT      ;SCAN 1 BUFFER DOESN'T MATCH
0890 F0       =3365         MOV     A,@R0
0891 53F0     =3366         ANL     A,#0F0H
0893 B928     =3367         MOV     R1,#L6S2
0895 B820     =3368         MOV     R0,#SCNBUF
0897 96A7     =3369         JNZ     PRO7C6          ;JUMP IF SCAN 2 COUNTER <> 0
              =3370 ;
              =3371 ;  SCAN-2 BUFFER EMPTY - FILL AND SET 2-LAB READ STATUS (IF FLAGS MATCH)
              =3372 ;
0899 1443     =3373         CALL    MOV4BY
              =3374 ;
089B B82C     =3375         MOV     R0,#L6SCNT
089D 348D     =3376         CALL    INCHNB          ;INCREMENT SCAN 2 COUNTER AND TOTAL
089F B6C4     =3377         JF0     PRO7CX          ;JUMP - FLAG CHARS DON'T MATCH 2-LABEL READ
08A1 76C4     =3378         JF1     PRO7CX          ;JUMP - IS FLAG CHARS FOR LABEL1
08A3 BADF     =3379         MOV     R2,#SETL21      ;SECOND LABEL - FIRST SCAN
08A5 6447     =3380         JMP     PRO6CX          ;GO SET STATUS AND RETURN
              =3381 ;
              =3382 ;  SCAN-2 BUFFER FULL - CHECK FOR MATCH
              =3383 ;
08A7 5428     =3384 PRO7C6: CALL    MCH4BY          ;SCAN 2 COUNTER <> 0
08A9 9687     =3385         JNZ     PRO7C8          ;JUMP IF NO MATCH
              =3386 ;
              =3387 ;  SCAN-2 BUFFER MATCHES - INC COUNT AND SET STATUS (IF 2-LAB READ)
              =3388 ;
08AB B82C     =3389         MOV     R0,#L6SCNT
08AD 348D     =3390         CALL    INCHNB          ;INCREMENT SCAN 2 COUNT AND TOTAL
08AF B6C4     =3391         JF0     PRO7CX          ;JUMP - FLAG CHARS DON'T MATCH 2-LABEL READ
08B1 76C4     =3392         JF1     PRO7CX          ;JUMP - IS FLAG CHARS FOR LABEL1
08B3 BAEF     =3393         MOV     R2,#SETL22      ;SECOND LABEL - SECOND SCAN
08B5 6447     =3394         JMP     PRO6CX          ;GO SET STATUS AND RETURN
              =3395 ;
              =3396 ;  NEITHER SCAN BUFFER MATCHED - SET 2-LABEL READ (JAN13-JAN13) ERROR
              =3397 ;
08B7 B82D     =3398 PRO7C8: MOV     R0,#L6STOT      ;NEITHER SCAN BUFFER MATCHED
08B9 10       =3399         INC     @R0             ;INCREMENT TOTAL COUNTER
08BA B6C0     =3400         JF0     PRO7C9          ;JUMP - NOT 2-LAB READ FLAG CHARS
              =3401 ;
              =3402 ;  FLAG CHARS FOR 2-LABEL READ SEEN, AND NO MATCH - CLEAR BUFFERS
              =3403 ;
08BC 1400     =3404         CALL    CLR6SG
08BE 446C     =3405         JMP     PROCEX          ;RETURN
              =3406 ;
              =3407 ;  NO FLAG CHARS SEEN HERE, SO JUST SET 2-LAB READ ERROR
              =3408 ;
08C0 B844     =3409 PRO7C9: MOV     R0,#ERRTL
08C2 B0FF     =3410         MOV     @R0,#0FFH
              =3411 ;
08C4 446C     =3412 PRO7CX: JMP     PROCEX          ;RETURN
              =3413 ;
              =3414 ;****************************************************************
              =3415 ;   ROUTINE:    CKL2FG
              =3416 ;   FUNCTION:   CHECK IF FLAG CHARACTERS MATCH A 2-LABEL READ SECOND
              =3417 ;               LABEL FLAG.
              =3418 ;   ENTRY:      ACCUM CONTAINS FLAG TO CHECK
              =3419 ;   EXIT:       A = 0   IF FLAG CHARACTERS MATCH
              =3420 ;               A <> 0  IF NO MATCH
              =3421 ;               USES NOTHING
              =3422 ;
08C6          =3423 CKL2FG  EQU     $
08C6 D5       =3424         SEL     RB1             ;USE REGISTER BANK 1
08C7 AA       =3425         MOV     R2,A            ;SAVE SECOND LABEL FLAGS TO BE CHECKED
08C8 BB08     =3426         MOV     R3,#8D          ;INITIALIZE LOOP COUNTER
08CA B862     =3427         MOV     R0,#TWOLAB+1    ;SET RAM POINTER
08CC F0       =3428 GT2FG:  MOV     A,@R0           ;GET FLAGS TO COMPARE TO
08CD D3FF     =3429         XRL     A,#0FFH         ;CHECK FOR ANY MORE FLAGS
08CF C6DC     =3430         JZ      CKL2ER          ;JUMP IF NO MORE FLAGS
08D1 D3FF     =3431         XRL     A,#0FFH         ;RESTORE ACCUMULATOR
08D3 DA       =3432         XRL     A,R2            ;COMPARE BYTE TO POTENTIAL LABEL 2 FLAGS
08D4 C6DA     =3433         JZ      CKL2RT          ;JUMP IF THERE IS A COMPARISON
08D6 18       =3434         INC     R0              ;INCREMENT RAM POINTER TO NEXT LABEL 2 FLAGS
08D7 18       =3435         INC     R0
08D8 EBCC     =3436         DJNZ    R3,GT2FG
08DA C5       =3437 CKL2RT: SEL     RB0             ;RESET REGISTER BANK TO 0
```

```
0BDB 83        =3438         RET                  ;A=0 IF SECOND LABEL F1F2 MATCH
0BDC 37        =3439 CKL2ER: CPL     A            ;FORCE THE ACCUMULATOR NOT TO HAVE 0
0BDD 64DA      =3440         JMP     CKL2RT       ;JUMP TO RETURN
               =3441 ;
               =3442 ;**********************************************************
               =3443 ;  ROUTINE:   CKL1FG
               =3444 ;  FUNCTION:  CHECK IF FLAG CHARACTERS MATCH A 2-LABEL READ FIRST
               =3445 ;             LABEL FLAG.
               =3446 ;  ENTRY:     ACCUM CONTAINS FLAG TO CHECK
               =3447 ;  EXIT:      A =  0    IF FLAG CHARACTERS MATCH
               =3448 ;             A <> 0    IF NO MATCH
               =3449 ;             USES NOTHING
               =3450 ;
0BDF           =3451 CKL1FG  EQU     $
0BDF D5        =3452         SEL     RB1          ;USE REGISTER BANK 1
0BE0 AA        =3453         MOV     R2,A         ;SAVE SECOND LABEL FLAGS TO BE CHECKED
0BE1 BB08      =3454         MOV     R3,#8D       ;INITIALIZE LOOP COUNTER
0BE3 B861      =3455         MOV     R0,#TWOLAB   ;SET RAM POINTER
0BE5 F0        =3456 GT1FG:  MOV     A,@R0        ;GET FLAGS TO COMPARE TO
0BE6 D3FF      =3457         XRL     A,#0FFH      ;CHECK FOR ANY MORE FLAGS
0BE8 C6F5      =3458         JZ      CKL1ER       ;JUMP IF NO MORE FLAGS
0BEA D3FF      =3459         XRL     A,#0FFH      ;RESTORE ACCUMULATOR
0BEC DA        =3460         XRL     A,R2         ;COMPARE BYTE TO POTENTIAL LABEL 1 FLAGS
0BED C6F3      =3461         JZ      CKL1RT       ;JUMP IF THERE IS A COMPARISON
0BEF 18        =3462         INC     R0           ;INCREMENT RAM POINTER TO NEXT LABEL 1 FLAGS
0BF0 18        =3463         INC     R0
0BF1 EBE5      =3464         DJNZ    R3,GT1FG
0BF3 C5        =3465 CKL1RT: SEL     RB0          ;RESET REGISTER BANK TO 0
0BF4 83        =3466         RET                  ;A=0 IF SECOND LABEL F1F2 MATCH
0BF5 37        =3467 CKL1ER: CPL     A            ;FORCE ACCUMULATOR NOT TO BE 0
0BF6 64F3      =3468         JMP     CKL1RT       ;JUMP TO RETURN
                3469 ;**********************************************
0BF8 A3         3470 TROPGB: MOVP    A,@A
0BF9 83         3471         RET
0C00            3472         ORG     0C00H
                3473 $       INCLUDE(:F2:VERTAG.SRC)
               =3474 ;**********************************************************
               =3475 ; FILE: VERTAG.SRC  11-18-86 13:50  BOB ACTIS
               =3476 ;       MODIFIED 7-17-87 BY RANDY ELLIOTT FOR TEC
               =3477 ;**********************************************************
               =3478 ; ROUTINE: CKMAJ
               =3479 ; FUNCTION: DETERMINE MAJORITY SEGMENT COUNTER
               =3480 ; ENTRY: R0 = PACKED COUNTER ADDRESS
               =3481 ; EXIT:  R0 = NOT CHANGED
               =3482 ;        USES R2,A
               =3483 ;        CARRY SET IF LOW>=HIGH NIBBLE  (S1CNT>=S2CNT)
               =3484 ;        CARRY CLEAR IF LOW<HIGH NIBBLE (S1CNT<S2CNT)
               =3485 ;
0C00 F0        =3486 CKMAJ:  MOV     A,@R0        ;GET PACKED COUNTER
0C01 530F      =3487         ANL     A,#0FH
0C03 AA        =3488         MOV     R2,A         ;S1CNT
0C04 F0        =3489         MOV     A,@R0
0C05 47        =3490         SWAP    A
0C06 530F      =3491         ANL     A,#0FH       ;MASK S2CNT
0C08 C60E      =3492         JZ      CKMAJ9       ;JUMP IF S2CNT=0
0C0A 37        =3493         CPL     A
0C0B 17        =3494         INC     A            ;2'S COMP S2CNT
0C0C 6A        =3495         ADD     A,R2         ;S1CNT-S2CNT
0C0D 83        =3496         RET
               =3497 ;
0C0E 97        =3498 CKMAJ9: CLR     C            ;S2CNT=0 IS A SPECIAL CASE
0C0F A7        =3499         CPL     C
0C10 83        =3500         RET
               =3501 ;**********************************************************
               =3502 ; ROUTINE: CKMISM
               =3503 ; FUNCTION: CHECK FOR EXCESS MISMATCHED SEGMENTS.
               =3504 ;           CLEAR COUNTERS IF EXCESS MISMATCHES.
               =3505 ; ENTRY: SCAN 1 COUNTER HAS THE MAJORITY SEGMENT COUNT.
               =3506 ;        R0 = PACKED SCAN2/SCAN1 SEGMENT COUNTER ADDRESS.
               =3507 ;        R0+1 = TOTAL SEGMENT COUNTER ADDRESS.
               =3508 ; EXIT:  USES R1,R2,A
               =3509 ;        R0 = NOT CHANGED
               =3510 ;        IF TOTAL=MAJORITY (0 MISMATCHES)
               =3511 ;           OR TOTAL-1=MAJORITY (1 MISMATCH) AND MAJORITY>=3
               =3512 ;           OR TOTAL-2=MAJORITY (2 MISMATCH) AND MAJORITY>=15
               =3513 ;        THEN RETURN,
               =3514 ;        ELSE COUNTERS ARE CLEARED.
               =3515 ;
0C11 F0        =3516 CKMISM: MOV     A,@R0
0C12 C638      =3517         JZ      CKMS90       ;JUMP IF S2/S1 COUNTERS=0
               =3518 ;
0C14 F8        =3519         MOV     A,R0
0C15 17        =3520         INC     A
0C16 A9        =3521         MOV     R1,A         ;SCAN TOTAL COUNTER ADDRESS
               =3522 ;
0C17 F0        =3523         MOV     A,@R0
0C18 530F      =3524         ANL     A,#0FH       ;MASK S1 COUNT
0C1A AA        =3525         MOV     R2,A         ;SAVE MAJORITY COUNT
0C1B D1        =3526         XRL     A,@R1
0C1C C638      =3527         JZ      CKMS90       ;JUMP IF TOTAL=MAJORITY (0 MISMATCHES)
               =3528 ;
```

```
OC1E F1     =3529          MOV    A,@R1
OC1F 07     =3530          DEC    A
OC20 DA     =3531          XRL    A,R2
OC21 C62F   =3532          JZ     CKMS30        ;JUMP IF TOTAL-1=MAJORITY (1 MISMATCH)
            =3533 ;
OC23 F1     =3534          MOV    A,@R1
OC24 07     =3535          DEC    A
OC25 07     =3536          DEC    A
OC26 DA     =3537          XRL    A,R2
OC27 9635   =3538          JNZ    CKMS80        ;JUMP IF >2 MISMATCHES
            =3539 ;
            =3540 ; TOTAL-2=MAJORITY (2 MISMATCHES). CHECK FOR MAJORITY>=15.
            =3541 ;
OC29 FA     =3542          MOV    A,R2
OC2A 03F1   =3543          ADD    A,#-15
OC2C E635   =3544          JNC    CKMS80        ;JUMP IF <15
OC2E 83     =3545          RET
            =3546 ;
            =3547 ; TOTAL-1=MAJORITY (1 MISMATCH). CHECK FOR MAJORITY>=3.
            =3548 ;
OC2F FA     =3549 CKMS30:  MOV    A,R2
OC30 03FD   =3550          ADD    A,#-3
OC32 E635   =3551          JNC    CKMS80        ;JUMP IF <3
OC34 83     =3552          RET
            =3553 ;
            =3554 ; FAILED TEST. CLEAR COUNTERS.
            =3555 ;
OC35 27     =3556 CKMS80:  CLR    A
OC36 A0     =3557          MOV    @R0,A         ;CLEAR S2/S1 COUNTERS
OC37 A1     =3558          MOV    @R1,A         ;CLEAR TOTAL COUNTER
OC38 83     =3559 CKMS90:  RET
            =3560 ;****************************************************************
            =3561 ; ROUTINE: SUM12C
            =3562 ; FUNCTION: CALCULATE L6S1 + R6S1 MOD-10 CHECKSUM.
            =3563 ; ENTRY: L6S1 AND R6S1 HAVE DATA TO USE.
            =3564 ; EXIT: A = MOD-10 CHECKSUM CALCULATION FOR 12 CHARACTERS.
            =3565 ;        USES R0,R2,R3
            =3566 ;
OC39 B824   =3567 SUM12C:  MOV    R0,#L6S1
OC3B 1450   =3568          CALL   SGSUM6
OC3D 146A   =3569          CALL   APL3R2
OC3F A8     =3570          MOV    R3,A          ;SAVE LEFT HALF SUM
            =3571 ;
OC40 B82E   =3572          MOV    R0,#R6S1
OC42 1450   =3573          CALL   SGSUM6
OC44 146A   =3574          CALL   APL3R2
OC46 68     =3575          ADD    A,R3          ;RIGHT SUM + LEFT SUM
OC47 57     =3576          DA     A
OC48 530F   =3577          ANL    A,#0FH        ;MASK SUM DIGIT
OC4A 83     =3578          RET
            =3579 ;****************************************************************
            =3580 ; ROUTINE: CK6TOT
            =3581 ; FUNCTION: CHECK L6STOT AND R6STOT FOR COUNTS.
            =3582 ; ENTRY: NO SETUP
            =3583 ; EXIT: A = 0 IF EITHER COUNTER < MINIMUM REQUIRED.
            =3584 ;       A <> 0 IF BOTH COUNTERS >= MINIMUM REQUIRED.
            =3585 ;       USES R0
            =3586 ;
            =3587 CK6TOT:
            =3588 ;
OC4B 882D   =3589 CK6T05:  MOV    R0,#L6STOT
OC4D F0     =3590          MOV    A,@R0         ;GET LEFT SEGMENT TOTAL
OC4E 69     =3591          ADD    A,R1
OC4F F653   =3592          JC     CK6T20        ;JUMP IF L6STOT >= -R1
            =3593 ;
OC51 27     =3594 CK6T10:  CLR    A
OC52 83     =3595          RET                  ;EITHER L6 OR R6 HAD < MINIMUM
            =3596 ;
OC53 B835   =3597 CK6T20:  MOV    R0,#R6STOT
OC55 F0     =3598          MOV    A,@R0         ;GET RIGHT SEGMENT TOTAL
OC56 69     =3599          ADD    A,R1
OC57 E651   =3600          JNC    CK6T10        ;JUMP IF R6STOT < -R1
OC59 27     =3601          CLR    A
OC5A 37     =3602          CPL    A
OC5B 83     =3603          RET                  ;BOTH L6 AND R6 HAD >= MINIMUM
            =3604 ;****************************************************************
            =3605 ; ROUTINE: MAJSGS
            =3606 ; FUNCTION: DETERMINE MAJORITY SEGMENTS.
            =3607 ;           MOVE MAJORITY SEGMENT TO BUFFER #1 IF NECESSARY.
            =3608 ;           (I.E. EXCHANGE BUFFER 1 AND BUFFER 2 DATA AND COUNTERS.)
            =3609 ;           CHECK FOR EXCESS MISMATCHES.
            =3610 ;           IF EXCESS MISMATCHES, CLEAR COUNTERS.
            =3611 ; ENTRY: NO SETUP
            =3612 ; EXIT: IF THE MISMATCH RATIO IS OK,
            =3613 ;           SEGMENT BUFFER 1 AND COUNTER 1 HAS MAJORITY.
            =3614 ;           SEGMENT BUFFER 2 AND COUNTER 2 HAS MINORITY.
            =3615 ;       IF EXCESS MISMATCHES, SEGMENT COUNTERS ARE CLEARED.
            =3616 ;
OC5C B82C   =3617 MAJSGS:  MOV    R0,#L6SCNT
OC5E 9400   =3618          CALL   CKMAJ
OC60 F666   =3619          JC     MAJSG0        ;JUMP IF S1 IS MAJORITY
```

```
0C62 B824   =3620           MOV     R0,#L6S1
0C64 54DF   =3621           CALL    EXSBF4          ;EXCHANGE S2/S1 DATA AND COUNTERS
0C66 9411   =3622 MAJSG0:   CALL    CKMISM
            =3623 ;
0C68 B834   =3624           MOV     R0,#R6SCNT
0C6A 9400   =3625           CALL    CKMAJ
0C6C F672   =3626           JC      MAJSG1
0C6E B82E   =3627           MOV     R0,#R6S1
0C70 54DB   =3628           CALL    EXSBF3
0C72 9411   =3629 MAJSG1:   CALL    CKMISM
            =3630 ;
0C74 BB02   =3631           MOV     R3,#2           ;NUMBER OF 4-CHAR SEGMENT BUFFERS
0C76 B83A   =3632           MOV     R0,#L4SCNT      ;FIRST S2/S1 COUNTER ADDRESS
            =3633 ;
0C78 9400   =3634 MAJSG4:   CALL    CKMAJ
0C7A F682   =3635           JC      MAJSG5          ;JUMP IF S1 IS THE MAJORITY
0C7C F8     =3636           MOV     A,R0
0C7D 03FC   =3637           ADD     A,#-4           ;CALCULATE THE S1 DATA BUFFER ADDRESS
0C7F A8     =3638           MOV     R0,A
0C80 54D7   =3639           CALL    EXSBF2          ;EXCHANGE S2/S1 DATA AND COUNTS
            =3640 ;
0C82 9411   =3641 MAJSG5:   CALL    CKMISM          ;CHECK MISMATCHES
0C84 F8     =3642           MOV     A,R0
0C85 0306   =3643           ADD     A,#6            ;CALCULATE NEXT S2/S1 COUNTER ADDRESS
0C87 A8     =3644           MOV     R0,A
0C88 EB78   =3645           DJNZ    R3,MAJSG4
            =3646 ;
0C8A 83     =3647           RET
            =3648 ;****************************************************************
            =3649 ; ROUTINE: VERTAG
            =3650 ; FUNCTION: TRY TO BUILD 2-LABEL READ, IF NO 2-LABEL READ THEN
            =3651 ;                     PERFORM MISMATCH TEST AND GET MAJORITY SEGMENT AND COUNT
            =3652 ;                     INTO BUFFER AND COUNTER #1. (MAJSGS)
            =3653 ;                     TRY TO BUILD BLOCKS INTO VERSIONS. (TBLKXX)
            =3654 ; ENTRY: NO SETUP
            =3655 ; EXIT: A=0 IF ENOUGH BLOCKS FOR A VERSION ARE FOUND.
            =3656 ;       A=1 IF AMBIGUOUS 2-LABEL READ FOUND
            =3657 ;       A=2 IF NOT ENOUGH BLOCKS FOUND.
            =3658 ;       R6 SET TO INDICATE VALID VERSION IF ONE WAS FOUND.
            =3659 ;
0C8B        =3660 VERTAG    EQU     $
0C8B FE     =3661           MOV     A,R6
0C8C 53F0   =3662           ANL     A,#0F0H         ;CLEAR THE VERSION POINTER/FLAG.
0C8E AE     =3663           MOV     R6,A
            =3664 ;
            =3665 ; CHECK FOR TWO LABEL READ
            =3666 ;
0C8F 34A9   =3667           CALL    CKTL
0C91 C68F   =3668           JZ      VERT05          ;JUMP - NO TWO LABEL VERSIONS CAPTURED
            =3669 ;
            =3670 ; 2-LABEL STUFF FOUND - TRY TO BUILD INTO LABELS
            =3671 ;
            =3672 ;FROM SWITCH SETTINGS (RAM), DETERMINE R1 SETTINGS FOR # OF SCANS
0C93 B95F   =3673           MOV     R1,#SWISET      ;SET RAM POINTER TO SWITCH SETTINGS
0C95 F1     =3674           MOV     A,@R1           ;RETRIEVE SWITCH SETTING
0C96 530C   =3675           ANL     A,#0CH          ;MASK ALL BITS EXCEPT B3 AND B2
0C98 03F4   =3676           ADD     A,#0F4H         ;CHECK FOR OCIA SETTING B3,B2=11
0C9A F6A4   =3677           JC      VTOCIA          ;JUMP IF STANDARD 750F SCANNING
0C9C 0304   =3678           ADD     A,#04H          ;CHECK FOR OCIA SETTING B3,B2=10
0C9E F6A8   =3679           JC      VTSP2C          ;JUMP IF FASTER 2 SCAN
0CA0 0304   =3680           ADD     A,#04H          ;CHECK FOR OCIA SETTING B3,B2=01
0CA2 F6AC   =3681           JC      VTST2C          ;JUMP IF 750F-T PERFORMANCE
            =3682 ;IF WE GET HERE; B3,B2=00 WHICH IS STANDARD 750F OPERATION
0CA4 B9AA   =3683 VTOCIA:   MOV     R1,#EN2SCN      ;SET R1 FOR 1 SCAN MATCH
0CA6 84AE   =3684           JMP     VERT01
0CA8 B9AF   =3685 VTSP2C:   MOV     R1,#EN12SN      ;SET R1 FOR 1 SCAN EAN13, 2 SCANS FOR UPCE, UPCA, AND EA
0CAA 84AE   =3686           JMP     VERT01
0CAC B9FF   =3687 VTST2C:   MOV     R1,#E2SCN       ;SET R1 FOR 2 SCAN ON ALL LABELS
            =3688 ;
            =3689 ; CHECK STATUS BYTES FOR ENOUGH TWO LABEL READS
            =3690 ;
0CAE 8842   =3691 VERT01:   MOV     R0,#STTL13
0CB0 F0     =3692           MOV     A,@R0
0CB1 59     =3693           ANL     A,R1            ;MASK WITH APPROPRIATE SCAN REQ. BYTE
0CB2 96E7   =3694           JNZ     VERT20          ;JUMP - NOT ENOUGH SEGS CAPTURED YET
            =3695 ;
            =3696 ; ENOUGH CAPTURED - CONTINUE BUILDING
            =3697 ;
0CB4 B47F   =3698           CALL    TBTL13          ;TRY JAN13-JAN13 PAIR
0CB6 C6EA   =3699           JZ      VER213          ;JUMP - SUCCESSFUL
0CB8 83     =3700           RET                     ;NOT A GOOD JAN13-JAN13 (OR AMBIGUOUS)
            =3701 ;
            =3702 ; HERE TO TRY FOR A JAN13-JAN8 PAIR
            =3703 ;
            =3704 VERT02:
            =3705 ;****************************************************************
            =3706 ;REMOVE CAPABILITY TO READ JAN13-JAN8 PAIRS
            =3707 ;         MOV     R0,#STTL8
            =3708 ;         MOV     A,@R0
            =3709 ;         ANL     A,R1
            =3710 ;         JNZ     VERT20          ;JUMP - NOT ENOUGH FOR LABEL YET
```

```
                =3711 ;*********************************************************************
                =3712 ;
                =3713 ;   ENOUGH CAPTURED - CONTINUE BUILDING
                =3714 ;
0CB9 84C8       =3715        CALL    TBTL8           ;TRY FOR JAN13-JAN8 PAIR
0CBB C6EB       =3716        JZ      VER2L8          ;JUMP - GOOD LABEL FOUND
0CBD 84E7       =3717        JMP     VERT20
                =3718 ;
                =3719 ;
                =3720 ;   NO 2-LABEL STUFF FOUND - ATTEMPT BUILD OF NORMAL UPC/EAN LABELS
                =3721 ;
0CBF 945C       =3722 VERT05: CALL   MAJSGS          ;MAJORITY/MISMATCH SEGMENT TEST
0CC1 3400       =3723        CALL    HCOMM           ;CHECK COMM. MAJSGS TAKES A WHILE.
                =3724 ;
0CC3 8800       =3725 TRYBLK: MOV    R0,#00H         ;SET TYPE FLAG TO UPCA/EAN8
0CC5 E5         =3726        SEL     MB0
0CC6 8443       =3727        CALL    CHKSCN          ;SET R1 TO # OF SCANS
0CC8 F5         =3728        SEL     MB1
0CC9 B400       =3729        CALL    TBLKA
0CCB C6EF       =3730        JZ      VERA            ;JUMP IF A GOOD UPC-A BLOCK
                =3731 ;
0CCD 88FF       =3732        MOV     R0,#0FFH        ;SET TYPE FLAG TO EAN13
0CCF E5         =3733        SEL     MB0
0CD0 8443       =3734        CALL    CHKSCN          ;SET R1 TO # OF SCANS
0CD2 F5         =3735        SEL     MB1
0CD3 B41D       =3736        CALL    TBLK13
0CD5 C6EE       =3737        JZ      VER13           ;JUMP IF A GOOD EAN-13 BLOCK
                =3738 ;
0CD7 89FE       =3739        MOV     R1,#-2          ;UPC-E IS ALWAYS 2 SCANS
0CD9 B43C       =3740        CALL    TBLKE
0CDB C6ED       =3741        JZ      VERE            ;JUMP IF A GOOD UPC-E BLOCK
                =3742 ;
0CDD B800       =3743        MOV     R0,#00H         ;SET TYPE FLAG TO UPCA/EAN8
0CDF E5         =3744        SEL     MB0
0CE0 8443       =3745        CALL    CHKSCN          ;SET R1 TO # OF SCANS
0CE2 F5         =3746        SEL     MB1
0CE3 B44F       =3747        CALL    TBLK8
0CE5 C6EC       =3748        JZ      VER8            ;JUMP IF A GOOD EAN-8 BLOCK
                =3749 ;
0CE7 2302       =3750 VERT20: MOV    A,#2
0CE9 83         =3751        RET                     ;RETURN IF NOT ENOUGH BLOCKS
                =3752 ;
0CEA 1E         =3753 VER213: INC    R6              ;SET R6=6
0CEB 1E         =3754 VER2L8: INC    R6              ;SET R6=5
0CEC 1E         =3755 VER8:   INC    R6              ;SET R6=4
0CED 1E         =3756 VERE:   INC    R6              ;SET R6=3
0CEE 1E         =3757 VER13:  INC    R6              ;SET R6=2
0CEF 1E         =3758 VERA:   INC    R6              ;SET R6=1
                =3759 ;
0CF0 27         =3760 VERT90: CLR    A
0CF1 83         =3761        RET
                 3762 ;*********************************************************
0CF2 A3          3763 TROPGC: MOVP   A,@A
0CF3 83          3764        RET
                 3765 $      INCLUDE(:F2:TBLKXX.SRC)
                =3766 ;*********************************************************************
                =3767 ; FILE: TBLKXX.SRC  11-18-86 14:50  BOB ACTIS
                =3768 ;        MODIFIED   03-26-86       DREW TAUSSIG
                =3769 ;        MODIFIED   08-21-86       ADD SECOND 2-LABEL CHOICE
                =3770 ;        MODIFIED   03-18-87       RANDY ELLIOTT (TEC MODIFICATION)
                =3771 ;        MODIFIED   06-30-87       RANDY ELLIOTT (CHECKSUM PROBLEM)
                =3772 ;*********************************************************************
                =3773 ; ROUTINE: TBLKA
                =3774 ; FUNCTION:  TRY FOR A VALID UPC-A BLOCK.
                =3775 ;            CHECK THAT L6 AND R6 HAVE ENOUGH DATA.
                =3776 ;            CHECK THAT L6 IS AN A-L.
                =3777 ;            IF OK SO FAR, CALCULATE MOD-10 CHECK CHARACTER.
                =3778 ;            IF STILL OK, RETURN WITH A=0.
                =3779 ;            IF MOD-10 ERROR, CLEAR 4&6-CHAR SEGMENT COUNTERS AND
                =3780 ;                     CLEAR VERSION POINTER/FLAG.
                =3781 ; ENTRY: SCAN 1 BUFFER IS MAJORITY SCAN.
                =3782 ; EXIT:  USES R0,R1,R2,R3,A
                =3783 ;        A=0 IF GOOD BLOCK
                =3784 ;        A<>0 IF NO BLOCK
                =3785 ;
0000            =3786        ORG     (((S-2)/100H)+1)*100H
                =3787 ;
0000 9448       =3788 TBLKA: CALL    CK6TOT
0002 C61A       =3789        JZ      TBNONE          ;JUMP IF NO LEFT AND RIGHT SEGMENTS
                =3790 ;
0004 B827       =3791        MOV     R0,#L6S1+3
0006 F0         =3792        MOV     A,@R0           ;GET PARITY DECODE BYTE
0007 530C       =3793        ANL     A,#0CH
0009 D30C       =3794        XRL     A,#0CH
000B 961A       =3795        JNZ     TBNONE          ;JUMP IF NOT AND AL
                =3796 ;
000D 9439       =3797        CALL    SUM12C          ;GO CALCULATE LEFT + RIGHT CHECKSUM
000F 9612       =3798        JNZ     TBERR6          ;JUMP IF MOD-10 IS BAD
0011 83         =3799        RET
                =3800 ;
                =3801 ; THE FOLLOWING ARE USED BY OTHER TBLKXX ROUTINES, BUFMAN, AND RDTAG.
```

```
              =3802 ;
0012          =3803 CLRVER  EQU     $           ;ENTRY POINT TO CLEAR VERSION FLAGS & DATA
0012 1400     =3804 TBERR6: CALL    CLR6SG      ;CLEAR 6-CHAR SEGMENTS AND COUNTERS
0014 1414     =3805 TBERR4: CALL    CLR4SG      ;CLEAR 4-CHAR SEGMENTS AND COUNTERS
0016 FE       =3806         MOV     A,R6
0017 53F0     =3807         ANL     A,#0F0H     ;CLEAR VERSION POINTER/FLAG
0019 AE       =3808         MOV     R6,A
              =3809 TBNONE:
001A 2302     =3810         MOV     A,#2
001C 83       =3811         RET
              =3812 ;*********************************************************
              =3813 ; ROUTINE: TBLK13
              =3814 ; FUNCTION: TRY FOR A VALID EAN-13 BLOCK.
              =3815 ;           CHECK THAT L6 AND R6 HAVE ENOUGH DATA.
              =3816 ;           CHECK THAT L6 IS AN EAN-13-L.
              =3817 ;           IF OK SO FAR, CALCULATE MOD-10 CHECK CHARACTER.
              =3818 ;           IF STILL OK, RETURN WITH A=0.
              =3819 ;           IF MOD-10 FAILS, CLEAR 4&6-CHAR SEGMENT COUNTER AND
              =3820 ;               CLEAR VERSION POINTER/FLAG.
              =3821 ; ENTRY: SCAN 1 BUFFER IS MAJORITY SCAN.
              =3822 ; EXIT:  USES R0,R1,R2,R3,A
              =3823 ;        A=0 IF GOOD BLOCK.
              =3824 ;        A<>0 IF NO BLOCK FOUND.
              =3825 ;
001D 9448     =3826 TBLK13: CALL    CK6TOT
001F C61A     =3827         JZ      TBNONE      ;JUMP IF NO LEFT AND RIGHT SEGMENTS
              =3828 ;
0021 B827     =3829         MOV     R0,#L6S1+3
0023 F0       =3830         MOV     A,@R0       ;GET PARITY DECODE BYTE
0024 5330     =3831         ANL     A,#EDECE+EDECD ;MASK D AND E SEG BITS
0026 961A     =3832         JNZ     TBNONE      ;JUMP IF D OR E SEGMENT
              =3833 ;
0028 F0       =3834         MOV     A,@R0
0029 530F     =3835         ANL     A,#0FH      ;MASK THE DECODED CHARACTER
002B 03F6     =3836         ADD     A,#-10      ;A>9 IS AN A OR 8 SEGMENT
002D F61A     =3837         JC      TBNONE      ;JUMP IS A OR 8 SEGMENT
              =3838 ;
002F 9439     =3839         CALL    SUM12C
0031 AB       =3840         MOV     R3,A        ;SAVE 12 CHARACTER SUM
              =3841 ;
0032 B827     =3842         MOV     R0,#L6S1+3
0034 F0       =3843         MOV     A,@R0       ;GET PARITY DECODE CHARACTER
0035 68       =3844         ADD     A,R3        ;ADD 13TH CHARACTER
0036 57       =3845         DA      A
0037 530F     =3846         ANL     A,#0FH
0039 9612     =3847         JNZ     TBERR6      ;JUMP IF MOD-10 IS BAD
003B 83       =3848         RET
              =3849 ;*********************************************************
              =3850 ; ROUTINE: TBLKE
              =3851 ; FUNCTION: TRY FOR A VALID UPC-E BLOCK.
              =3852 ;           CHECK THAT L6 HAS ENOUGH DATA.
              =3853 ;           CHECK THAT L6 IS AN E-TAG.
              =3854 ;           CHECK THAT R6 HAS NO DATA.
              =3855 ;           CHECK THE MAJORITY (S1) >= 2.
              =3856 ;           IF OK, RETURN WITH A=0.
              =3857 ;           ELSE, CLEAR 4&6-CHAR SEGMENT COUNTERS AND
              =3858 ;               CLEAR THE VERSION POINTER/FLAG.
              =3859 ; ENTRY: SCAN 1 BUFFER IS THE MAJORITY SCAN.
              =3860 ; EXIT:  USES R0,A
              =3861 ;        A=0 IF GOOD BLOCK.
              =3862 ;        A<>0 IF NO BLOCK.
              =3863 ;
003C B82D     =3864 TBLKE:  MOV     R0,#L6STOT
003E F0       =3865         MOV     A,@R0
003F 69       =3866         ADD     A,R1        ;ADD NUMBER OF SCANS REQUIRED
0040 E61A     =3867         JNC     TBNONE      ;JUMP IF < 2 LEFT SEGMENTS
              =3868 ;
0042 B827     =3869         MOV     R0,#L6S1+3
0044 F0       =3870         MOV     A,@R0       ;GET PARITY DECODE BYTE
0045 5310     =3871         ANL     A,#EDECE
0047 C61A     =3872         JZ      TBNONE      ;JUMP IF NOT AN E-SEG.
              =3873 ;
0049 B835     =3874         MOV     R0,#R6STOT
004B F0       =3875         MOV     A,@R0
004C 9612     =3876         JNZ     TBERR6      ;JUMP IF R6 SEGMENTS ARE PRESENT
              =3877 ;
004E 83       =3878         RET
              =3879 ;*********************************************************
              =3880 ; ROUTINE: TBLK8
              =3881 ; FUNCTION: TRY FOR A VALID EAN-8 BLOCK.
              =3882 ;           IF ANY 6-CHAR SEGMENTS ARE PRESENT, CLEAR 4-CHAR
              =3883 ;               SEGMENT COUNTERS AND VERSION POINTER/FLAG.
              =3884 ;           CHECK THAT L4 AND R4 HAVE ENOUGH DATA.
              =3885 ;           IF OK SO FAR, CALCULATE THE MOD-10 CHECK CHARACTER.
              =3886 ;           IF STILL OK, RETURN WITH A=0.
              =3887 ;           IF MOD-10 ERROR, CLEAR 4-CHAR SEGMENT COUNTERS AND
              =3888 ;               CLEAR VERSION POINTER/FLAG.
              =3889 ; ENTRY: SCAN 1 BUFFER IS THE MAJORITY SCAN.
              =3890 ; EXIT:  USES R0,R1,R2,R3,A
              =3891 ;        A=0 IF GOOD BLOCK
              =3892 ;        A<>0 IF NO BLOCK
```

```
                =3893 ;
004F  B82D      =3894 TBLK8:  MOV     R0,#L6STOT
0051  F0        =3895         MOV     A,@R0
0052  9614      =3896         JNZ     TBERR4           ;JUMP IF ANY 6L SEGMENTS
                =3897 ;
0054  B835      =3898         MOV     R0,#R6STOT
0056  F0        =3899         MOV     A,@R0
0057  9614      =3900         JNZ     TBERR4           ;JUMP IF ANY 6R SEGMENTS
                =3901 ;
                =3902 ; HERE IS ENTRY POINT IF DONT WANT TO THROW AWAY 4-CHAR IF CAPTURED
                =3903 ; 6-CHAR SEGMENTS (AS IN JAN13-JAN8 TWO LABEL READ)
                =3904 ;
                =3905 TBLK8C:
0059  B800      =3906         MOV     R0,#00           ;SET FLAG FOR EAN8/UPCA/UPCE LABELS
005B  E5        =3907         SEL     MB0
005C  B443      =3908         CALL    CHKSCN           ;SET R1 FOR NUMBER OF SCANS FROM SWITCHES
005E  F5        =3909         SEL     MB1
005F  B83B      =3910 TBLK8D: MOV     R0,#L4STOT
0061  F0        =3911         MOV     A,@R0
0062  69        =3912         ADD     A,R1
0063  E61A      =3913         JNC     TBNONE           ;JUMP IF < -R1 LEFT HALF SEGMENTS
                =3914 ;
0065  B841      =3915         MOV     R0,#R4STOT
0067  F0        =3916         MOV     A,@R0
0068  69        =3917         ADD     A,R1
0069  E61A      =3918         JNC     TBNONE           ;JUMP IF < -R1 RIGHT HALF SEGMENTS
                =3919 ;
006B  B836      =3920         MOV     R0,#L4S1
006D  144C      =3921         CALL    SGSUM4
006F  146A      =3922         CALL    APL3R2
0071  AB        =3923         MOV     R3,A             ;SAVE LEFT SUM
0072  B83C      =3924         MOV     R0,#R4S1
0074  144C      =3925         CALL    SGSUM4
0076  146A      =3926         CALL    APL3R2
0078  6B        =3927         ADD     A,R3             ;RIGHT SUM + LEFT SUM
0079  57        =3928         DA      A
007A  530F      =3929         ANL     A,#0FH
007C  9614      =3930         JNZ     TBERR4           ;JUMP IF MOD-10 IS BAD
007E  83        =3931         RET
                =3932 ;***********************************************************
                =3933 ; ROUTINE: TBTL13
                =3934 ; FUNCTION: TRY FOR A VALID 2-LABEL READ OF JAN13-JAN13
                =3935 ;           CHECK THAT NO ERROR SEGMENTS CAPTURES
                =3936 ;           TRY TO MATCH LEFT AND RIGHT HALVES
                =3937 ;           CHECK FOR MATCHING AMBIGUITY
                =3938 ;           IF OK THEN CHECK MOD-10 OF EACH LABEL
                =3939 ;           IF STILL OK, THEN RETURN, ELSE CLEAR 6-CHAR SEGMENTS
                =3940 ; ENTRY: 2-LABEL READ STATUS CHECKED AND ENOUGH SEGS CAPTURED
                =3941 ;     SCAN 1 LEFT CONTAINS LABEL 1 LEFT HALF
                =3942 ;     SCAN 2 LEFT CONTAINS LABEL 2 LEFT HALF
                =3943 ; EXIT: USES R0,R1,R2
                =3944 ;     A=0 IF GOOD BLOCK (HALVES MATCH, NO AMBIGUITY)
                =3945 ;     A=1 IF CHECKSUM AMBIGUITY
                =3946 ;     A=2 IF NO GOOD BLOCK FOUND
                =3947 ;
007F            =3948 TBTL13  EQU     $
007F  B844      =3949         MOV     R0,#ERRTL        ;ERROR BYTE (EXTRA SEGS)
0081  F0        =3950         MOV     A,@R0
0082  96C1      =3951         JNZ     TTL13E           ;JUMP - EXCESS MISMATCH
                =3952 ;
                =3953 ; NOT MISMATCHES - TRY TO MATCH HALVES
                =3954 ;
0084  B824      =3955         MOV     R0,#L6S1
0086  34B3      =3956         CALL    SUM13L           ;LOW NIB OF A CONTAINS HALF CKSUM
0088  47        =3957         SWAP    A
0089  B945      =3958         MOV     R1,#CKSUML
008B  A1        =3959         MOV     @R1,A            ;SAVE IT AWAY (HIGH NIB NOW)
008C  B828      =3960         MOV     R0,#L6S2
008E  34B3      =3961         CALL    SUM13L
0090  31        =3962         XCHD    A,@R1            ;(CKSUML) HAS 2 LEFT HALF CKSUMS
0091  F1        =3963         MOV     A,@R1
0092  47        =3964         SWAP    A
0093  D1        =3965         XRL     A,@R1            ;CHECK IF THE SAME (AMBIGUOUS)
0094  C6C5      =3966         JZ      TTL13A           ;JUMP - AMBIGUOUS CKSUMS
                =3967 ;
                =3968 ; CHECK SUMS DIFFERENT - GET RIGHT HALVES AND TRY TO MATCH
                =3969 ;
0096  B82E      =3970         MOV     R0,#R6S1
0098  1450      =3971         CALL    SGSUM6
009A  146A      =3972         CALL    APL3R2           ;LOW NIB OF A CONTAINS HALF CKSUM
009C  B946      =3973         MOV     R1,#CKSUMR
009E  47        =3974         SWAP    A
009F  A1        =3975         MOV     @R1,A            ;SAVE IT (HIGH NIB)
                =3976 ;
00A0  B831      =3977         MOV     R0,#R6S2
00A2  1450      =3978         CALL    SGSUM6
00A4  146A      =3979         CALL    APL3R2
00A6  31        =3980         XCHD    A,@R1            ;(CKSUMR) HAS 2 RIGHT HALF CKSUMS
00A7  F1        =3981         MOV     A,@R1            ;MOVE TO A
00A8  B845      =3982         MOV     R0,#CKSUML
00AA  B4E7      =3983         CALL    CKMTCH           ;GO CHECK MOD-10 PAIRS
```

```
00AC C688      =3984            JZ      TTL13G          ;JUMP - MATCH (GOOD LABEL)
               =3985 ;
               =3986 ; NO MATCH - TRY SWAPPING HALVES
               =3987 ;
00AE F1        =3988            MOV     A,@R1
00AF 47        =3989            SWAP    A
00B0 B4E7      =3990            CALL    CKMTCH          ;GO CHECK MOD-10 PAIRS
00B2 96C1      =3991            JNZ     TTL13E          ;JUMP - NO MATCH (ERROR)
               =3992 ;
               =3993 ; MATCH BUT BACKWARDS - SWAP
               =3994 ;
00B4 B82E      =3995            MOV     R0,#R6S1
00B6 54DB      =3996            CALL    EXSBF3          ;EXCHANGE SCAN BUFFERS
               =3997 ;
               =3998 ; HERE IF GOOD READ
               =3999 ;
00B8 BBFF      =4000 TTL13G: MOV R3,#0FFH               ;SET R3 AS FLAG FOR 13-13 READ
00BA E5        =4001            SEL     MB0
00BB 145B      =4002            CALL    FLGMTC
00BD F5        =4003            SEL     MB1             ;COMPARE LABEL FLAGS
00BE 96C1      =4004            JNZ     TTL13E          ;JUMP IF NO COMPARISON
00C0 83        =4005            RET
               =4006 ;
               =4007 ; HERE IF BAD READ
               =4008 ;
00C1 2302      =4009 TTL13E: MOV A,#2
00C3 A412      =4010            JMP     TBERR6          ;GO CLEAR SEGS AND RETURN
               =4011 ;
               =4012 ; HERE IF AMBIGUOUS READ
               =4013 ;
00C5 2301      =4014 TTL13A: MOV A,#1
00C7 83        =4015            RET
               =4016 ;
               =4017 ;************************************************************
               =4018 ; ROUTINE: TBTL8
               =4019 ; FUNCTION: TRY FOR A VALID JAN13-JAN8 LABEL PAIR
               =4020 ;           GET MAJORITY SEGMENTS
               =4021 ;           LOOK FOR VALID JAN13 LABEL (TBLK13)
               =4022 ;           IF OK - CHECK THAT IT HAS VALID F1,F2 CHARS
               =4023 ;           IF STILL OK TRY FOR VALID JAN8 (TBLK8)
               =4024 ;           CHECK FOR VALID LABEL 2 F1,F2 CHARS
               =4025 ; ENTRY: 2-LABEL READ STATUS CHECKED AND ENOUGH SEGS CAPTURED
               =4026 ; EXIT: USES R0,R1,R2,R3
               =4027 ;       A=0 IF GOOD PAIR
               =4028 ;       A<>0 IF NO VALID PAIR FOUND
               =4029 ;
00C8           =4030 TBTL8   EQU     $
00C8 945C      =4031            CALL    MAJSGS          ;SORT OUT MAJORITY SEGS
00CA 3400      =4032            CALL    HCOMM           ;MAJSGS TAKES A WHILE
00CC B8FF      =4033            MOV     R0,#0FFH        ;SET FLAG FOR 2 SCAN CHECK OF EAN13 LABELS
00CE E5        =4034            SEL     MB0
00CF B443      =4035            CALL    CHKSCN          ;SET R1 FOR NUMBER OF SCANS NEEDS
00D1 F5        =4036            SEL     MB1
00D2 841D      =4037            CALL    TBLK13          ;TRY FOR VALID JAN13 LABEL
00D4 96E6      =4038            JNZ     TTL8E           ;JUMP - NO VALID LABEL FOUND
               =4039 ;
               =4040 ;
00D6 B800      =4041            MOV     R0,#00          ;SET LABEL TYPE FLAG TO EAN8
00D8 E5        =4042            SEL     MB0
00D9 B443      =4043            CALL    CHKSCN          ;CHECK SWITCH SETTINGS FOR # OF SCANS
00DB F5        =4044            SEL     MB1
00DC B459      =4045            CALL    TBLK8C          ;TRY FOR VALID JAN8
00DE 96E6      =4046            JNZ     TTL8E           ;JUMP - NO VALID JAN8 FOUND
               =4047 ;
               =4048 ;CHECK LABEL FLAGS FOR MATCH
00E0 BB00      =4049            MOV     R3,#00H         ;SET FLAG FOR 13-8 FLAG COMPARISON
00E2 E5        =4050            SEL     MB0
00E3 145B      =4051            CALL    FLGMTC          ;COMPARE FLAGS
00E5 F5        =4052            SEL     MB1
00E6 83        =4053 TTL8E:  RET
               =4054 ;
               =4055 ;************************************************************
               =4056 ; ROUTINE: CKMTCH
               =4057 ; FUNCTION: CHECK MOD-10 LABEL PAIR BYTES FOR MATCHING VALID CHECKSUM
               =4058 ;           IN TWO LABEL READ PAIRS.
               =4059 ; ENTRY: R0 POINTS TO 2 LEFT HALF CHECKSUMS
               =4060 ;        A CONTAINS RIGHT HALF CHECKSUMS
               =4061 ; EXIT:  A = 0 IF MATCH GOOD
               =4062 ;            <> 0 IF MATCH BAD
               =4063 ; USES:  A,R2
               =4064 ;
00E7 60        =4065 CKMTCH: ADD     A,@R0           ;ADD LEFT AND RIGHT HALF PAIRS
00E8 AA        =4066            MOV     R2,A            ;SAVE RESULT
00E9 C6F7      =4067            JZ      CKMTRT          ;JMP IF GOOD
               =4068 ;
00EB D3AA      =4069            XRL     A,#0AAH
00ED C6F7      =4070            JZ      CKMTRT
               =4071 ;
00EF FA        =4072            MOV     A,R2
00F0 D30A      =4073            XRL     A,#00AH
00F2 C6F7      =4074            JZ      CKMTRT
```

```
                   =4075 ;
 00F4 FA           =4076        MOV     A,R2
 00F5 03A0         =4077        XRL     A,#0A0H
                   =4078 ;
 00F7 83           =4079 CKMTRT: RET                    ;A=0 IF GOOD MATCH
                    4080 ;****************************************
TR 00F8 A3          4081 TROPGD: MOVP    A,@A
 00F9 83            4082        RET
 0E00               4083        ORG     0E00H
                    4084 $      INCLUDE(:F2:BUFMAN.SRC)
                   =4085 ;****************************************************************
                   =4086 ; FILE: BUFMAN.SRC 11-18-86 14:45  BOB ACTIS
                   =4087 ;       MODIFIED    03-27-86          DREW TAUSSIG
                   =4088 ;       MODIFIED    02-18-87 08:50  BOB ACTIS FOR THE 750SL
                   =4089 ;       MODIFIED    03-18-87          RANDY ELLIOTT FOR THE TEC 750SL
                   =4090 ;****************************************************************
                   =4091 ; ROUTINE: BUF8C
                   =4092 ; FUNCTION: LOAD 8 CHARACTERS INTO THE COMMUNICATIONS BUFFER.
                   =4093 ;           (LOAD L4 AND R4 DATA)
                   =4094 ; ENTRY: R1 = NEXT AVAILABLE COMM BUFFER BYTE.
                   =4095 ; EXIT:  R1 = NEXT AVAILABLE COMM BUFFER BYTE.
                   =4096 ;        L6 AND R6 DATA MOVED TO COMM BUFFER.
                   =4097 ;
 0E00 B1FF         =4098 BUF8C:  MOV     @R1,#0FFH       ;8-CHAR HEADER BYTE
 0E02 19           =4099        INC     R1              ;INCREMENT TO NEXT AVAILABLE BYTE
 0E03 B836         =4100        MOV     R0,#L4S1
 0E05 143B         =4101        CALL    MOV2BY
 0E07 B83C         =4102        MOV     R0,#R4S1
 0E09 143B         =4103        CALL    MOV2BY
 0E0B 83           =4104        RET
                   =4105 ;****************************************************************
                   =4106 ; ROUTINE: BUF13C
                   =4107 ; FUNCTION: LOAD 13 CHARACTERS INTO THE COMMUNICATIONS BUFFER.
                   =4108 ;           (LOAD L6,R6 AND L6 PARITY DECODE DATA )
                   =4109 ; ENTRY: R1 = NEXT AVAILABLE COMM BUFFER BYTE.
                   =4110 ;        F0 = BUFFER TO USE SET = BUFFER 2, CLR = BUFFER 1
                   =4111 ; EXIT:  R1 = NEXT AVAILABLE COMM BUFFER BYTE.
                   =4112 ;        L6, R6 AND PARITY DATA MOVED TO COMM BUFFER.
                   =4113 ;
 0E0C 882B         =4114 BUF13C: MOV     R0,#L6S2+3
 0E0E 8612         =4115        JF0     BU13C1          ;JUMP - BUFFER 2
 0E10 B827         =4116        MOV     R0,#L6S1+3
 0E12 23F0         =4117 BU13C1: MOV     A,#0F0H         ;HEADER FOR 13 CHARACTER LABEL
 0E14 30           =4118        XCHD    A,@R0           ;MOVE PARITY DIGIT TO ACCUM
 0E15 A1           =4119        MOV     @R1,A
 0E16 19           =4120        INC     R1              ;INCREMENT TO NEXT AVAILABLE BYTE
 0E17 C8           =4121        DEC     R0
 0E18 C8           =4122        DEC     R0
 0E19 C8           =4123        DEC     R0              ;GET TO BEGINNING OF BUFFER (1 OR 2)
 0E1A 143F         =4124        CALL    MOV3BY
 0E1C B831         =4125        MOV     R0,#R6S2
 0E1E B622         =4126        JF0     BU13C2          ;JUMP - BUFFER 2
 0E20 882E         =4127        MOV     R0,#R6S1
 0E22 143F         =4128 BU13C2: CALL   MOV3BY
 0E24 83           =4129        RET
                   =4130 ;
                   =4131 ;****************************************************************
                   =4132 ; ROUTINE: BUFMAN
                   =4133 ; FUNCTION: IF BUFMAN REQUEST FLAG IS NOT SET,
                   =4134 ;                   THEN RETURN,
                   =4135 ;                   ELSE IF COMM BUF IS BUSY
                   =4136 ;                           THEN IF NO VALID VERSIONS, CLR REQ FLAG. RETURN
                   =4137 ;                           ELSE PROCESS MESSAGE BUFFER REQUEST.
                   =4138 ; ENTRY: RB0
                   =4139 ;        R6 VERSION FLAGS SETUP
                   =4140 ; EXIT:  USES R0,R1,A
                   =4141 ;        SPECIAL CHARACTERS
                   =4142 ;                BYTE 0BBH = MISSCAN MESSAGE (EMSNBY)
                   =4143 ;                BYTE 0DDH = AMBIGUOUS 2-LABLE READ MESSAGE (EAMBBY)
                   =4144 ;                DATA "C"   = FILLER CHARACTER
                   =4145 ;                BYTE 0CCH = TERMINATION (ETRMBY)
                   =4146 ;
 0E25 FC           =4147 BUFMAN: MOV     A,R4
 0E26 B229         =4148        JB5     BUFM10          ;JUMP IF BUFMAN REQUEST FLAG IS SET
 0E28 83           =4149        RET
 0E29 7299         =4150 BUFM10: JB3     BUFM93          ;JUMP IF COMM BUFFER IS BUSY
                   =4151 ;
 0E2B FE           =4152        MOV     A,R6
 0E2C 530F         =4153        ANL     A,#0FH
 0E2E C69E         =4154        JZ      BUFM94          ;JUMP IF NOT A VALID VERSION
                   =4155 ;
                   =4156 ;
 0E30 B948         =4157 BUFM20: MOV     R1,#SBUF        ;SEND BUFFER START ADDRESS
 0E32 FE           =4158        MOV     A,R6            ;GET VERSION FLAGS
 0E33 530F         =4159        ANL     A,#0FH          ;MASK VERSION POINTER
 0E35 AE           =4160        MOV     R6,A
 0E36 03F8         =4161        ADD     A,#-(EVERAH+1)
 0E38 F69E         =4162        JC      BUFM94          ;JUMP - POINTER IS ILLEGAL VERSION
                   =4163 ;
                   =4164 ; LEGAL VERSION - BUILD ROUTINE ADDRESS AND JUMP TO IT
                   =4165 ;
```

```
OE3A FE        =4166        MOV     A,R6
OE3B 033E      =4167        ADD     A,#LOW BUFTBL
OE3D 83        =4168        JMPP    @A
OE3E 7A        =4169 BUFTBL: DB     LOW MISSCN
OE3F 46        =4170        DB      LOW BUFMA
OE40 53        =4171        DB      LOW BUFM13
OE41 58        =4172        DB      LOW BUFME
OE42 61        =4173        DB      LOW BUFM8
OE43 65        =4174        DB      LOW BUFT8
OE44 6F        =4175        DB      LOW BUFT13
OE45 7F        =4176        DB      LOW BUFAMB
               =4177 ;
               =4178 ;      UPC-A TAG
               =4179 ;
OE46 B1AC      =4180 BUFMA: MOV     @R1,#0ACH       ;UPC-A HEADER AND FILLER
OE48 19        =4181        INC     R1              ;INCREMENT TO NEXT AVAILABLE BYTE
OE49 B824      =4182        MOV     R0,#L6S1
OE4B 143F      =4183        CALL    MOV3BY
OE4D B82E      =4184        MOV     R0,#R6S1
OE4F 143F      =4185        CALL    MOV3BY
OE51 C48A      =4186        JMP     BUFM90
               =4187 ;
               =4188 ;      EAN(JAN) 13 TAG
               =4189 ;
OE53 85        =4190 BUFM13: CLR    F0              ;USE BUFFER 1
OE54 D40C      =4191        CALL    BUF13C
OE56 C48A      =4192        JMP     BUFM90
               =4193 ;
               =4194 ;      UPC-E TAG
               =4195 ;
OE58 B1E0      =4196 BUFME: MOV     @R1,#0E0H       ;UPC-E HEADER AND N/S 0
OE5A 19        =4197        INC     R1
OE5B B824      =4198        MOV     R0,#L6S1
OE5D 143F      =4199        CALL    MOV3BY
OE5F C48A      =4200        JMP     BUFM90
               =4201 ;
               =4202 ;      EAN(JAN) 8 TAG
               =4203 ;
OE61 D400      =4204 BUFM8: CALL    BUF8C           ;LOAD BUFFER
OE63 C48A      =4205        JMP     BUFM90
               =4206 ;
               =4207 ;      TWO LABEL READ (JAN13-JAN8)
               =4208 ;
OE65 85        =4209 BUFT8: CLR     F0              ;BUFFER 1
OE66 D40C      =4210        CALL    BUF13C
OE68 B1AA      =4211        MOV     @R1,#ETL1BY     ;PUT INTER LABEL TERM BYTE IN BUFFER
OE6A 19        =4212        INC     R1
OE6B D400      =4213        CALL    BUF8C
OE6D C48A      =4214        JMP     BUFM90
               =4215 ;
               =4216 ;      TWO LABEL READ (JAN13-JAN13)
               =4217 ;
OE6F 85        =4218 BUFT13: CLR    F0              ;START WITH BUFFER 1
OE70 D40C      =4219        CALL    BUF13C
OE72 B1AA      =4220        MOV     @R1,#ETL1BY     ;INTER LABEL TERMINATION BYTE
OE74 19        =4221        INC     R1
OE75 95        =4222        CPL     F0              ;THEN BUFFER 2
OE76 D40C      =4223        CALL    BUF13C
OE78 C48A      =4224        JMP     BUFM90
               =4225 ;
               =4226 ;      MIS-SCAN MESSAGE
               =4227 ;
OE7A B1B8      =4228 MISSCN: MOV    @R1,#EMSNBY     ;MISSCAN BYTE
OE7C 19        =4229        INC     R1
OE7D C48A      =4230        JMP     BUFM90
               =4231 ;
               =4232 ;      AMBIGUOUS 2-LABEL READ - CHECK STATUS BIT
               =4233 ;      IF SET, THEN SEND IN BUFFER, ELSE CLEAR VERSION AND EXIT
               =4234 ;
OE7F FC        =4235 BUFAMB: MOV    A,R4
OE80 37        =4236        CPL     A
OE81 529E      =4237        JB2     BUFM94          ;JUMP - NO AMBIGUITY MESSAGE
               =4238 ;
OE83 B1DD      =4239        MOV     @R1,#EAMBBY
OE85 19        =4240        INC     R1
OE86 B1CC      =4241        MOV     @R1,#ETRMBY
OE88 C48E      =4242        JMP     BUFM91          ;DON'T CLEAR VERSION POINTER
               =4243 ;
               =4244 ;      SET TERMINATING CHAR AND BUSY FLAG (CLEAR REQUEST FLAG)
               =4245 ;
OE8A B1CC      =4246 BUFM90: MOV    @R1,#ETRMBY     ;LOAD THE DATA TERMINATION CHARACTER
OE8C B412      =4247        CALL    CLRVER          ;CLEAR THE VERSION POINTER/FLAG & DATA
OE8E B947      =4248 BUFM91: MOV    R1,#SBFPNT      ;SEND BUFFER POINTER ADDRESS
OE90 B190      =4249        MOV     @R1,#SBSTRT     ;PUT PACKED DATA START ADRS IN POINTER
OE92 FC        =4250        MOV     A,R4
OE93 530F      =4251        ANL     A,#255-EBFREQ   ;CLEAR THE BUFMAN REQUEST FLAG
OE95 4308      =4252        ORL     A,#ESBFUL       ;SET THE SEND BUFFER FULL BIT
OE97 AC        =4253        MOV     R4,A
OE98 83        =4254        RET
               =4255 ;
OE99 FE        =4256 BUFM93: MOV    A,R6
```

```
OE9A 530F    =4257            ANL    A,#0FH            ;MASK THE VERSION POINTER/FLAG
OE9C 96A2    =4258            JNZ    BUFM95            ;JUMP IF A VALID VERSION
             =4259 ;
             =4260
OE9E FC      =4261 BUFM94:    MOV    A,R4
OE9F 53DF    =4262            ANL    A,#255-EBFREQ     ;CLEAR THE BUFMAN REQUEST FLAG
OEA1 AC      =4263            MOV    R4,A
             =4264 ;
OEA2 83      =4265 BUFM95:    RET
              4266 $          INCLUDE(:F2:DRSUMT.SRC)
             =4267 ;***********************************************************
             =4268 ; FILE:  DRSUMT.SRC  10-27-83  15:00   BOB ACTIS
             =4269 ;        MODIFIED    03-27-86        - DREW TAUSSIG
             =4270 ;***********************************************************
             =4271 ; ROUTINE: SUM4BY, SUM3BY, SUM2BY
             =4272 ; FUNCTION: ADD 4,3 OR 2 BYTE SEGMENT DATA TO ACCUMULATOR
             =4273 ; ENTRY: R0 = START ADDRESS OF SEGMENT BUFFER TO SUM
             =4274 ; EXIT:  R0 = END ADDRESS OF SEGMENT BUFFER
             =4275 ;        A  = RUNNING SUM (BASE 16) OF SEGMENT BUFFER DATA
             =4276 ;
OEA3 60      =4277 SUM4BY:    ADD    A,@R0
OEA4 18      =4278            INC    R0
OEA5 60      =4279 SUM3BY:    ADD    A,@R0
OEA6 18      =4280            INC    R0
OEA7 60      =4281 SUM2BY:    ADD    A,@R0
OEA8 18      =4282            INC    R0
OEA9 60      =4283            ADD    A,@R0
OEAA 83      =4284            RET
             =4285 ;***********************************************************
             =4286 ; ROUTINE: DRSUMT  DOUBLE READ SUM TEST
             =4287 ; FUNCTION: CALCULATE THE LABEL DATA SUM (BASE 16)
             =4288 ;           COMPARE IT TO THE PREVIOUS LABEL SUM
             =4289 ;           SAVE THE NEW SUM
             =4290 ; ENTRY: A VALID LABEL VERSION HAS BEEN FOUND
             =4291 ; EXIT:  USES R0
             =4292 ;        LABEL DATA SUM STORED IN DRSUM
             =4293 ;        A=0 IF OLD=NEW (CONSECUTIVE LABELS ARE THE SAME)
             =4294 ;        A<>0 IF OLD<>NEW (CONSECUTIVE LABELS ARE DIFFERENT)
             =4295 ;
OEAB FE      =4296 DRSUMT:    MOV    A,R6              ;GET VERSION FLAG
OEAC 530F    =4297            ANL    A,#0FH            ;MASK VERSION POINTER
OEAE A8      =4298            MOV    R0,A
OEAF 03F9    =4299            ADD    A,#-(EVTL13+1)
OEB1 F6F2    =4300            JC     DRVRNG            ;JUMP - ILLEGAL VERSION
             =4301 ;
             =4302 ; LEGAL VERSION - JUMP TO PROPER SUM ROUTINE
             =4303 ;
OEB3 F8      =4304            MOV    A,R0
OEB4 0387    =4305            ADD    A,#LOW DRSTBL     ;ADD OFFSET TO TABEL ADDRESS
OEB6 B3      =4306            JMPP   @A                ;JUMP TO VERSION ROUTINE
OEB7 F2      =4307 DRSTBL:    DB     LOW DRVRNG        ;NO VALID VERSION. POINTER=0.
OEB8 BE      =4308            DB     LOW DRSMA
OEB9 BE      =4309            DB     LOW DRSM13
OEBA C1      =4310            DB     LOW DRSME
OEBB CE      =4311            DB     LOW DRSM8
OEBC D7      =4312            DB     LOW DRST8
OEBD E2      =4313            DB     LOW DRST13
             =4314 ;
OEBE         =4315 DRSMA      EQU    $
OEBE 27      =4316 DRSM13:    CLR    A
OEBF C4C4    =4317            JMP    DRSM7B            ;GO SUM 7 BYTES
             =4318 ;
OEC1 27      =4319 DRSME:     CLR    A
OEC2 C4C8    =4320            JMP    DRSM7C            ;GO SUM 7 CHARACTERS
             =4321 ;
OEC4 B82E    =4322 DRSM7B:    MOV    R0,#R6S1          ;SUM 7 BYTES
OEC6 D4A5    =4323            CALL   SUM3BY
OEC8 B824    =4324 DRSM7C:    MOV    R0,#L6S1          ;SUM 7 CHARACTERS
OECA D4A3    =4325            CALL   SUM4BY
OECC C4ED    =4326            JMP    DRSMON            ;JUMP - THE SUM IS FINISHED
             =4327 ;
OECE 27      =4328 DRSM8:     CLR    A
OECF B836    =4329            MOV    R0,#L4S1
OED1 D4A7    =4330            CALL   SUM2BY
OED3 B83C    =4331            MOV    R0,#R4S1
OED5 D4A7    =4332            CALL   SUM2BY
             =4333 ;
OED7 27      =4334 DRST8:     CLR    A
OED8 B836    =4335            MOV    R0,#L4S1
OEDA D4A7    =4336            CALL   SUM2BY
OEDC B83C    =4337            MOV    R0,#R4S1
OEDE D4A7    =4338            CALL   SUM2BY           ;SUM JAN8 LABEL
OEE0 C4C4    =4339            JMP    DRSM7B           ;GO SUM JAN13 LABEL
             =4340 ;
OEE2 27      =4341 DRST13:    CLR    A
OEE3 8831    =4342            MOV    R0,#R6S2
OEE5 D4A5    =4343            CALL   SUM3BY
OEE7 B828    =4344            MOV    R0,#L6S2
OEE9 D4A3    =4345            CALL   SUM4BY           ;SUM SECOND JAN13 LABEL
OEEB C4C4    =4346            JMP    DRSM7B           ;GO SUM SECOND JAN13 LABEL
             =4347 ;
```

```
OEED 885D    =4348 DRSMON: MOV    R0,#DRSUM
OEEF 20      =4349         XCH    A,@R0              ;SAVE THE NEW SUM IN DRSUM
OEF0 D0      =4350         XRL    A,@R0              ;COMPARE THE OLD AND NEW SUM
OEF1 83      =4351         RET
             =4352 ;
OEF2 27      =4353 DRVRNG: CLR    A                  ;DOUBLE READ VERSION N/G
OEF3 83      =4354         RET
              4355 ;****************************************
OEF4 A3       4356 TROPGE: MOVP   A,@A
OEF5 83       4357         RET
OF00          4358         ORG    0F00H
              4359 $       INCLUDE(:F2:FTRDTG.SRC)
             =4360 ;****************************************
             =4361 ; FILE: FTRDTG.SRC   02-18-87 10:50   BOB ACTIS
             =4362 ; ROUTINE: RDTAG  THIS IS THE MAIN PROGRAM
             =4363 ; MODIFIED 03-18-87 BY RANDY ELLIOTT FOR 750 TEC SL
             =4364 ; MODIFIED 07-20-87 BY RANDY ELLIOTT FOR 750 TEC SL (UPC LABEL PROG)
OF00 FC      =4365 RDTAG:  MOV    A,R4               ;CLEAR SCAN FLAGS EXCEPT SEND BUFFER
OF01 532C    =4366         ANL    A,#ESBFUL+EBFREQ+EAMBMS ;FULL,BUFMAN REQUEST,
OF03 AC      =4367         MOV    R4,A               ;2-LABEL READ, AND AMB MESS ENABLE.
OF04 B208    =4368         JB5    RDT05              ;JUMP IF THE BUFMAN REQUEST FLAG IS SET
             =4369 ;
OF06 B412    =4370         CALL   CLRVER             ;CLEAR THE VERSION POINTER/FLAG & DATA
OF08 1420    =4371 RDT05:  CALL   CLRSNB             ;CLEAR THE SCAN BUFFER
             =4372 ;
             =4373 ; WAIT FOR THE LABEL TO GO AWAY. CHECK MOTOR SPEED
             =4374 ;
OF0A F4B9    =4375 RDT10:  CALL   MTRCHK             ;CHECK MOTOR SPEED
OF0C 3400    =4376         CALL   HCOMM              ;SERVICE THE I/F AND BUFMAN
OF0E 8619    =4377         JNI    RDT20              ;JUMP IF SYMCAP (SEGMENT OR SDATA)
             =4378 ;
OF10 FF      =4379         MOV    A,R7               ;GET THE "SEG SEEN" TIMER
OF11 960A    =4380         JNZ    RDT10              ;JUMP IF A SEG RECENTLY SEEN
             =4381 ;
OF13 BD24    =4382         MOV    R5,#EDRDLY         ;SET THE DOUBLE READ TIMER
OF15 BF56    =4383         MOV    R7,#EGDLTW         ;SET THE GD-LT ON TIMER
OF17 E41F    =4384         JMP    RDT30              ;GO WAIT FOR A LABEL TO READ
             =4385 ;
             =4386 ; RESET THE SYMCAP OR SERVICE SDATA
             =4387 ;
OF19 14AF    =4388 RDT20:  CALL   CKFCA              ;RESET THE SEG, ALSO CHECK FOR SDATA
OF1B 3400    =4389         CALL   HCOMM              ;SERVICE THE I/F AND BUFMAN. ALSO
OF1D E40A    =4390         JMP    RDT10              ;DELAY FOR FCA TO RESET
             =4391 ;
             =4392 ; WAIT FOR A LABEL TO READ. CHECK GD-LT ON TIME & CHECK MOTOR SPEED
             =4393 ;
OF1F FC      =4394 RDT30:  MOV    A,R4
OF20 4301    =4395         ORL    A,#ESCNG           ;SET THE SCAN FLAG SO CKFCA WILL
OF22 AC      =4396         MOV    R4,A               ;PUT THE SEGMENT INTO THE SCAN BUFFER
             =4397 ;
             =4398 RDT35:
OF23 B808    =4399         MOV    R0,#SWLATC         ;CHECK SWITCHES (9) B5 FOR PROGRAM MODE
OF25 80      =4400         MOVX   A,@R0
OF26 B231    =4401         JB5    RDT37              ;JUMP IF IN PROGRAM MODE.
OF28 B85F    =4402         MOV    R0,#SWISET         ;CHECK PROGRAMED SWITCHES (B5) FOR PROGRAM MODE
OF2A F0      =4403         MOV    A,@R0
OF2B B231    =4404         JB5    RDT37              ;JUMP IF IN PROGRAM MODE.
             =4405 ;NOT IN PROGRAM MODE. CLEAR TWO LABEL  FLAG POINTER.
OF2D FE      =4406         MOV    A,R6
OF2E 538F    =4407         ANL    A,#8FH
OF30 AE      =4408         MOV    R6,A
             =4409 ;
             =4410 RDT37:
OF31 3400    =4411         CALL   HCOMM
OF33 14AF    =4412         CALL   CKFCA              ;SERVICE FCA. POSSIBLE SEG OR SDATA.
OF35 B823    =4413         MOV    R0,#SCNBUF+3
OF37 F0      =4414         MOV    A,@R0              ;GET THE SCAN BUF PARITY DECOTE BYTE.
OF38 9645    =4415         JNZ    RDT40              ;JUMP IF SCAN BUFFER HAS DATA
             =4416 ;
OF3A F4B9    =4417         CALL   MTRCHK             ;CHECK MOTOR SPEED
             =4418 ;
OF3C FF      =4419         MOV    A,R7
OF3D 9623    =4420         JNZ    RDT35              ;JUMP IF GD-LT TIMER <> 0
OF3F 990F    =4421         ANL    P1,#255-EGDLT      ;GD-LT OFF
OF41 8940    =4422         ORL    P1,#EBDLT          ;BD-LT ON
OF43 E423    =4423         JMP    RDT35              ;STILL WAITING FOR A LABEL
             =4424 ;
             =4425 ; START READING THE LABEL
             =4426 ;
OF45 3400    =4427 RDT40:  CALL   HCOMM
OF47 990F    =4428         ANL    P1,#255-EGDLT      ;GD-LT OFF
OF49 8940    =4429         ORL    P1,#EBDLT          ;BD-LT ON
OF4B FC      =4430         MOV    A,R4
OF4C B200    =4431         JB5    RDTAG              ;JUMP IF THE BUFMAN REQUEST FLAG IS SET
OF4E E456    =4432         JMP    RDT60              ;GO PROCESS THE FIRST SEGMENT
             =4433 ;
             =4434 ; COLLECT AND PROCESS SEGMENTS. CHECK MOTOR SPEED.
             =4435 ;
OF50 F4B9    =4436 RDT50:  CALL   MTRCHK             ;CHECK MOTOR SPEED
OF52 3400    =4437         CALL   HCOMM
OF54 14AF    =4438         CALL   CKFCA              ;GET SEGMENTS IF ANY
```

```
0F56 5433    =4439 RDT60:  CALL   PROCSG           ;PROCESS SEGMENTS IF ANY
0F58 3457    =4440         CALL   CKCNTS           ;CHK FOR ENOUGH SEGS FOR PSBL VERSION
0F5A C65F    =4441         JZ     RDT70            ;JUMP IF ENOUGH SEGMENTS
             =4442 ;
0F5C FF      =4443         MOV    A,R7
0F5D 9650    =4444         JNZ    RDT50            ;JUMP IF SEGMENTS RECENTLY SEEN
             =4445 ;
             =4446 ;  TRY FOR A VALID LABEL
             =4447 ;
0F5F 3400    =4448 RDT70:  CALL   HCOMM
0F61 9488    =4449         CALL   VERTAG
0F63 C66E    =4450         JZ     GOODRD           ;JUMP IF A GOOD VERSION WAS FOUND
0F65 128E    =4451         JB0    AMBRD            ;JUMP - AMBIGUOUS 2-LABEL READ
             =4452 ;
0F67 FF      =4453         MOV    A,R7
0F68 9650    =4454         JNZ    RDT50            ;JUMP IF SEGMENTS RECENTLY SEEN
             =4455 ;
0F6A 3400    =4456 BADRD:  CALL   HCOMM
0F6C E486    =4457         JMP    RDT90
             =4458 ;
0F6E 3400    =4459 GOODRD: CALL   HCOMM
0F70 FD      =4460         MOV    A,R5             ;GET THE DOUBLE READ TIMER
0F71 C679    =4461         JZ     GOOD10           ;JUMP IF DR TIMER=0 (OK TO DOUBLE READ)
             =4462 ;
0F73 D4AB    =4463         CALL   DRSUMT           ;CALCULATE AND TEST THE DOUBLE READ SUM
0F75 967B    =4464         JNZ    GOOD20           ;JUMP IF OLD<>NEW (NO DOUBLE READ)
0F77 E400    =4465         JMP    RDTAG            ;JUMP IF DOUBLE READ TOO SOON
             =4466 ;
0F79 D4AB    =4467 GOOD10: CALL   DRSUMT           ;CALCULATE AND SAVE THE LABEL SUM
             =4468 GOOD20:
0F7B E5      =4469         SEL    MB0
0F7C C470    =4470         JMP    FLGPRG           ;CHECK EEPROM PROG SEL SWITCH
             =4471 ;
             =4472 GOOD30:
0F7E 998F    =4473         ANL    P1,#255-EBDLT    ;BD-LT OFF
0F80 8920    =4474         ORL    P1,#EGDLT        ;GD-LT ON
0F82 D5      =4475         SEL    RB1
0F83 BE08    =4476         MOV    R6,#EGDTON       ;GOOD TONE LENGHT
0F85 C5      =4477         SEL    RB0
             =4478 ;
             =4479 ;
0F86 FC      =4480 RDT90:  MOV    A,R4
0F87 4320    =4481         ORL    A,#EBFREQ        ;SET THE BUFMAN REQUEST FLAG
0F89 AC      =4482         MOV    R4,A
0F8A D425    =4483         CALL   BUFMAN
0F8C E400    =4484         JMP    RDTAG
             =4485 ;
             =4486 ; AMBIGUOUS READ - FLASH BAD LIGHT AND LOCK OUT SCANNING FOR 3 SECONDS
             =4487 ;
0F8E BE07    =4488 AMBRD:  MOV    R6,#EVERAM       ;SET AMBIGUOUS READ VERSION
0F90 FC      =4489         MOV    A,R4
0F91 4320    =4490         ORL    A,#EBFREQ        ;SET THE BUFMAN REQUEST FLAG
0F93 AC      =4491         MOV    R4,A
0F94 D425    =4492         CALL   BUFMAN
             =4493 ;
             =4494 ;   FLASH BAD-LIGHT FOR AMBIGUITY INDICATION
             =4495 ;
0F96 B844    =4496         MOV    R0,#ERRTL        ;TEMP STORAGE
0F98 B00C    =4497         MOV    @R0,#EAMBCY      ;NUMBER OF FLASH CYLCES
0F9A 99DF    =4498         ANL    P1,#0FFH-EGDLT   ;MAKE SURE GOOD LIGHT IS OFF
0F9C 8940    =4499 AMBRD1: ORL    P1,#EBDLT        ;BAD LIGHT ON
0F9E BF0C    =4500         MOV    R7,#EAMBWT       ;ON TIME (IN 1/100 THS OF SECONDS)
0FA0 3400    =4501 AMBRD2: CALL   HCOMM            ;CHECK WHILE WAITING
0FA2 FF      =4502         MOV    A,R7
0FA3 96A0    =4503         JNZ    AMBRD2           ;LOOP TILL TIMEOUT
             =4504 ;
0FA5 998F    =4505         ANL    P1,#0FFH-EBDLT   ;BAD LIGHT OFF
0FA7 BF0C    =4506         MOV    R7,#EAMBWT
0FA9 3400    =4507 AMBRD3: CALL   HCOMM
0FAB FF      =4508         MOV    A,R7
0FAC 96A9    =4509         JNZ    AMBRD3           ;LOOP TILL TIMEOUT AGAIN
             =4510 ;
0FAE B844    =4511         MOV    R0,#ERRTL
0FB0 F0      =4512         MOV    A,@R0
0FB1 07      =4513         DEC    A                ;DECREMENT CYCLE COUNTER
0FB2 A0      =4514         MOV    @R0,A
0FB3 969C    =4515         JNZ    AMBRD1           ;JUMP - STILL CYCLES LEFT
             =4516 ;
0FB5 8940    =4517         ORL    P1,#EBDLT        ;BAD LIGHT BACK ON
0FB7 E400    =4518         JMP    RDTAG            ;RESTART SCANNING
             =4519 ;
             =4520 ;  CHECK MOTOR UP2SPD* SIGNAL  (UP TO SPEED & OVER SPEED)
             =4521 ;
0FB9 0A      =4522 MTRCHK: IN     A,P2
0FBA 37      =4523         CPL    A
0FBB B2BE    =4524         JB5    MTRC10           ;JUMP IF MOTOR SPEED PROBLEM
0FBD 83      =4525         RET                     ;RETURN IF OK
             =4526 ;
0FBE BFC8    =4527 MTRC10: MOV    R7,#200          ;SET TIMER FOR 2 SECONDS
0FC0 FF      =4528 MTRC20: MOV    A,R7
0FC1 96C0    =4529         JNZ    MTRC20           ;WAIT IN CASE OF SPURIOUS ERROR
```

```
                    ;4530 ;
OFC3 0A             ;4531         IN      A,P2
OFC4 37             ;4532         CPL     A
OFC5 B2C8           ;4533         JB5     MTRERR          ;JUMP IF STILL A PROBLEM AFTER WAIT
OFC7 83             ;4534         RET                     ;REUTRN IF OK
                    ;4535 ;
                    ;4536 ; COME HERE IF THERE IS A MOTOR PROBLEM DURING RDTAG
OFC8 8910           ;4537 MTRERR: ORL     P1,#ELASDB      ;LASER OFF
OFCA 99DD           ;4538         ANL     P1,#255-(EMTREB+EGDLT) ;MOTOR OFF, GREEN LIGHT OFF
OFCC B804           ;4539         MOV     R0,#4
OFCE E5             ;4540         SEL     MB0
OFCF 7481           ;4541         CALL    TERRWT          ;GIVE 4 BEEPS FOR A MOTOR ERROR
OFD1 F5             ;4542         SEL     MB1
                    ;4543 ;
                    ;4544 ; STICK HERE WITH THE RED LIGHT FLASHING
OFD2 BF0A           ;4545 MTRE20: MOV     R7,#10          ;SET TIMER FOR 100MS
OFD4 FF             ;4546 MTRE30: MOV     A,R7
OFD5 9604           ;4547         JNZ     MTRE30          ;WAIT BETWEEN LIGHT TOGGLES
                    ;4548 ;
OFD7 09             ;4549         IN      A,P1
OFD8 99BF           ;4550         ANL     P1,#255-EBDLT   ;RED LIGHT OFF
OFDA D2D2           ;4551         JB6     MTRE20          ;JUMP IF THE RED LIGHT WAS ON
OFDC 8940           ;4552         ORL     P1,#EBDLT       ;RED LIGHT ON
OFDE E4D2           ;4553         JMP     MTRE20
                    4554 ;***********************************
OFE0 A3             4555 TROPGF: MOVP    A,@A
OFE1 83             4556         RET
                    4557 ;*************************************************************
OFF7                4558         ORG     OFF7H
                    4559 ;
                    4560 ; CHECKSUM BYTE
                    4561 ;
OFF7 FF             4562         DB      OFFH
                    4563 ;
                    4564 ; DATE
                    4565 ;
OFF8 07             4566         DB      07H,22H,87H
OFF9 22
OFFA 87
                    4567 ;
                    4568 ; PART NUMBER
                    4569 ;
OFFB 52             4570         DB      'R',096H,001H,030H
OFFC 96
OFFD 01
OFFE 30
                    4571 ;
                    4572 ; REVISION
                    4573 ;
OFFF 30             4574         DB      '0'
                    4575 ;*************************************************************
                    4576         END
```

```
USER SYMBOLS
AMBRD  OF8E   AMBRD1 OF9C   AMBRD2 OFA0   AMBRD3 OFA9   APL3R2 086A   BADRD  OF6A   BF4CNT 000C   BF4CST 0036
BF6CNT 0012   BF6CST 0024   BU13C1 0E12   BU13C2 0E22   BUF13C 0E0C   BUF8C  0E00   BUFMB  0E7F   BUFM10 0E29
BUFM13 0E53   BUFM20 0E30   BUFM8  0E61   BUFM90 0E8A   BUFM91 0E8E   BUFM93 0E99   BUFM94 0E9E   BUFM95 0EA2
BUFMA  0E46   BUFMAN 0E25   BUFME  0E58   BUFT13 0E6F   BUFT8  0E65   BUFTBL 0E3E   CHECLB 04CC   CHKIJ  06A1
CHKLP1 068F   CHKSCN 0543   CK4H10 004A   CK4H20 004B   CK4H30 0052   CK4HRS 0048   CK6T05 0C4B   CK6T10 0C51
CK6T20 0C53   CK6TOT 0C4B   CKCN05 0962   CKCN10 0979   CKCN20 0982   CKCN30 0988   CKCNNG 0999   CKCNOK 0997
CKCNTS 0957   CKEPOO 0186   CKEPRM 0183   CKFC10 0882   CKFC20 088E   CKFC80 08E4   CKFC90 08E6   CKFC95 08EA
CKFCA  08AF   CKL1ER 0BF5   CKL1FG 0BDF   CKL1RT 0BF3   CKL2ER 0BDC   CKL2FG 0BC6   CKL2RT 0BDA   CKMAJ  0C00
CKMAJ9 0C0E   CKMISM 0C11   CKMS30 0C2F   CKMS80 0C35   CKMS90 0C38   CKMTCH 0DE7   CKMTRT 0F7    CKSENT 01ED
CKSNRT 0563   CKSUML 0045   CKSUMR 0046   CKTL   09A9   CKTL90 0981   CLKEPM 01D9   CLR4SG 0814   CLR6SG 0800
CLRRAM 02A4   CLRSBF 082A   CLRSN1 0825   CLRSNB 0820   CLRTOO 0824   CLRVER 0D12   CMPFLG 0083   CPARTY 050E
DATA   01CE   DECR0  0641   DISLAS 02CC   DRSM13 0EBE   DRSM7B 0EC4   DRSM7C 0EC8   DRSM8  0ECE   DRSMA  0EBE
DRSMON 0EED   DRSME  0EC1   DRST13 0EE2   DRST8  0ED7   DRSTBL 0EB7   DRSUM  005D   DRSUMT 0EAB   DRTIMR 0005
DRVRNG 0EF2   E1000M 0032   E2SCN  00FF   E82NDL 0080   EAMBBY 000D   EAMBCY 000C   EAMBIG 0058   EAMBMS 0004
EAMBWT 000C   EAMESD 00C2   EAMESE 00C1   EBDLT  0040   EBDTON 0028   EBFREQ 0020   EBIT6  0040   ECASE1 0887
ECASE2 0890   ECASE3 0898   ECASE4 08A1   EDEC8L 000A   EDEC8R 0008   EDECAL 000C   EDECAR 0000   EDEC87 0080
EDECBE 000E   EDEC8F 000F   EDEC8K 0040   EDECD  0020   EDECE  0010   EDECOD 000F   EDRDLY 0024   EFCRST 0003
EFRRST 0001   EGDLT  0020   EGDLTW 0056   EGDTON 0008   EHCNTL 0001   ELASDB 0010   ELST1  07E3   ELSTBT 0665
EMISCN 000A   EMOD10 0871   EMODCK 08A8   EMODSM 08A6   EMSNBY 00BB   ENTREB 0002   EN12SN 00AF   EN2SCN 00AA
ENLAS  0207   EOCIA  0002   EPARRO 0000   EPRDEC 0004   EPRMCS 0080   EPRMDI 0004   EPRMSK 0008   ER4B4  0010
ER4B6  0040   ER4B7  0080   ER6B4  0010   ER6B5  0020   ER6B6  0040   ER6B7  0080   ERAL   0020   ERASE  00C0
ERASFL 05BD   ERRTL  0044   ERS2RM 07DF   ES8FUL 0008   ESCNG  0001   ESDIS  00C4   ESEN   0045   ESENT  0010
ESR4CH 0010   ESRCHR 000F   ESRF13 0020   ESRPER 0040   ESRRD  0001   ESRSDT 0080   ETEST  0007   ETL1BY 00AA
ETMARK 0002   ETNCT1 000A   ETNCT2 000F   ETNCT3 0014   ETNCT4 001C   ETNFQ1 00F4   ETNFQ2 00F8   ETNFQ3 00FA
ETNFQ4 00FC   ETONCT 0014   ETONE  0080   ETONFQ FFFA   ETRMBY 00CC   EUP2SP 0020   EVER00 0000   EVER13 0002
EVER8  0004   EVERA  0001   EVERAM 0007   EVERE  0003   EVLSIR 0030   EVTL13 0006   EVTL8  0005   EWAIT  000E
EWDS   0000   EWEN   0030   EXSBF2 0AD7   EXSBF3 0ADB   EXSBF4 0ADF   EXSBFL 0AE5   EXSBFX 0AE1   FACTOR 0002
FILFF  063A   FLCKRT 066F   FLGCHK 0680   FLGMTC 005B   FLGPRG 0670   FREQAD 0044   GETFLG 099C   GETLUP 0275
GOOD10 0F79   GOOD20 0F7B   GOOD30 0F7E   GOODRD 0F6E   GT1FG  0BE5   GT2FG  0BCC   GTSFLG 0061   HCOM10 0909
HCOM20 091E   HCOM25 093B   HCOM30 093F   HCOM40 0947   HCOM70 094F   HCOM80 0953   HCOM90 0956   HCOMM  0900
INCHNB 09BD   INCLNB 09C5   INCPNT 06C3   INCREM 04BD   INCX90 09CD   INCXRT 09D0   INLAB1 065F   INTSTR 0060
INTTRP 0003   L4S1   0036   L4S2   0038   L4SCNT 003A   L4STOT 003B   L6S1   0024   L6S2   0028   L6SCNT 002C
L6STOT 002D   LASTBT 05A7   LBDET  0631   LOOPCK 0292   LSTBYT 0007   LSTUSD 0070   MAJSG0 0C66   MAJSG1 0C72
MAJSG4 0C78   MAJSG5 0C82   MAJSGS 0C5C   MCH2BY 0A20   MCH3BY 0A24   MCH4BY 0A28   MCHXBY 0A2A   MCHXRT 0A32
MISSCN 0E7A   MOV2BY 0838   MOV3BY 083F   MOV4BY 0843   MOVXBY 0845   MRB0   0000   MRB1   0018   MRB1R4 001C
```

| | | | | | | | | | |
|---|---|---|---|---|---|---|---|---|---|
| MTRC10 | 0FBE | MTRC20 | 0FC0 | MTRCHK | 0FB9 | MTRE20 | 0FD2 | MTRE30 | 0FD4 |
| MTRERR | 0FC8 | NEXT4 | 0516 | NFLGMC | 0090 | | | | |
| NOLSBT | 0626 | NXTSET | 0088 | OCIRET | 05AC | OPREAD | 0080 | OVRERR | 04DC |
| OVRRET | 04E0 | OVRSET | 04C6 | OVRST1 | 008C | | | | |
| OWRITE | 0040 | PARITY | 0190 | PDATA | 00A7 | POW00 | 03A3 | POW10 | 03BB |
| POW20 | 0301 | POW25 | 03DA | POW30 | 03E1 | | | | |
| POWUP | 03A4 | PRO4C0 | 0A82 | PRO4C1 | 0A8A | PRO4C2 | 0A93 | PRO4C3 | 0A9F |
| PRO4C4 | 0AA9 | PRO4C6 | 0ABE | PRO4C7 | 0ACC | | | | |
| PRO4C8 | 0AD1 | PRO4CH | 0A6F | PRO4CX | 0ACF | PRO6C2 | 0B15 | PRO6C4 | 0B21 |
| PRO6C6 | 0B36 | PRO6C7 | 0B42 | PRO6C8 | 0B4E | | | | |
| PRO6CH | 0B00 | PRO6CX | 0B47 | PRO7C0 | 0B69 | PRO7C2 | 0B80 | PRO7C4 | 0B8E |
| PRO7C6 | 0BA7 | PRO7C8 | 0BB7 | PRO7C9 | 0BC0 | | | | |
| PRO7CH | 0B57 | PRO7CX | 0BC4 | PROC05 | 0A48 | PROC3L | 0A43 | PROC8 | 0A4C |
| PROC8L | 0A52 | PROC8R | 0A56 | PROCA | 0A63 | | | | |
| PROCAL | 0A68 | PROCAR | 0A6A | PROCE | 0A5B | PROCEX | 0A6C | PROCRT | 0A6E |
| PROCSG | 0A33 | PROLAB | 0685 | R4S1 | 003C | | | | |
| R4S2 | 003E | R4SCNT | 0040 | R4STOT | 0041 | R6S1 | 002E | R6S2 | 0031 |
| R6SCNT | 0034 | R6STOT | 0035 | RAMRT | 02E6 | | | | |
| RCRAM | 0020 | RDEPRM | 02B0 | RDLAB1 | 064B | RDLAB2 | 064F | RDT05 | 0F08 |
| RDT10 | 0F0A | RDT20 | 0F19 | RDT30 | 0F1F | | | | |
| RDT35 | 0F23 | RDT37 | 0F31 | RDT40 | 0F45 | RDT50 | 0F50 | RDT60 | 0F56 |
| RDT70 | 0F5F | RDT90 | 0F86 | RDTAG | 0F00 | | | | |
| RLACC | 01BA | ROCIA | 0595 | ROCIA1 | 0597 | ROCIA2 | 0598 | RSTTRP | 0000 |
| RTNFLG | 0092 | RTPRG | 06E7 | RTRCVR | 0647 | | | | |
| RTRLAB | 0605 | RTRM1 | 068D | RTRMRT | 0687 | SAVEBT | 04D0 | SBFEND | 0059 |
| SBFPNT | 0047 | SBSTRT | 0090 | SBUF | 0048 | | | | |
| SBUFAD | 0048 | SBUFSZ | 0012 | SCNBUF | 0020 | SCNFLG | 0004 | SDAT10 | 07C1 |
| SDAT11 | 07CF | SDAT12 | 07DD | SDATA | 0738 | | | | |
| SDATA1 | 0741 | SDATA2 | 0748 | SDATA3 | 0752 | SDATA4 | 0760 | SDATA5 | 0777 |
| SDATA6 | 0785 | SDATA7 | 0797 | SDATA8 | 07A3 | | | | |
| SDATA9 | 07AF | SDATAH | 0767 | SEGBUF | 0020 | SEGONE | 0488 | SETCS | 0284 |
| SETDI | 01D1 | SETDI1 | 01D7 | SETL11 | 007F | | | | |
| SETL12 | 00BF | SETL21 | 000F | SETL22 | 00EF | SETR11 | 00F7 | SETR12 | 00FB |
| SETR21 | 00FD | SETR22 | 00FE | SFTLFT | 0196 | | | | |
| SGM90 | 053A | SGMTCH | 052A | SGSUM4 | 084C | SGSUM6 | 0850 | SGSUMR | 0869 |
| SGSUMX | 0836 | SGSUMY | 085E | SHIFTL | 05C9 | | | | |
| SNDWRT | 05D9 | SOCIA | 01EB | SP2SCN | 0558 | ST2SCN | 0561 | STACK | 0008 |
| STOCIA | 0554 | STRAM1 | 0089 | STRRAM | 0600 | | | | |
| STSDTA | 005E | STTL13 | 0042 | STTL8 | 0043 | SUM12C | 0C39 | SUM13L | 09B3 |
| SUM2BY | 0EA7 | SUM3BY | 0EA5 | SUM4BY | 0EA3 | | | | |
| SWISET | 005F | SWLATC | 0008 | SWP4SN | 0A00 | SWP6SN | 0A08 | SWPXEX | 0A19 |
| SWPXRT | 0A38 | SWSET | 01A0 | SWSET1 | 00CB | | | | |
| T2LNOK | 0002 | TASAVE | 001F | TBERR4 | 0014 | TBERR6 | 0012 | TBNONE | 001A |
| TBTL13 | 007F | TBTL8 | 00C8 | TBLK13 | 001D | TBLK8 | 004F | TBLK8C | 0059 | TBLK8D | 005F |
| TBLKA | 0000 | TBLKE | 003C | | | | | | | | |
| TERR02 | 0387 | TERR04 | 038A | TERR06 | 038F | TERR08 | 0395 | TERR12 | 039C |
| TERR10 | 039A | TERRWT | 0381 | TEST1 | 0241 | | | | |
| TEST2 | 0245 | TEST3 | 0248 | TEST4 | 0258 | TH000 | 0400 | TH005 | 040A |
| TH010 | 040E | TH012 | 041A | TH014 | 041C | | | | |
| TH015 | 042D | TH020 | 0434 | TH029 | 0436 | TH030 | 0440 | TH050 | 044C |
| TH055 | 0453 | TH059 | 0455 | THSND | 0500 | | | | |
| TIME05 | 0015 | TIME10 | 0019 | TIME20 | 0018 | TIME30 | 0023 | TIME40 | 002A |
| TIME50 | 0033 | TIME60 | 003A | TIMER | 0007 | | | | |
| TIMREG | 0007 | TIMTRP | 0007 | TMOT10 | 0306 | TMOT20 | 030F | TMOT22 | 0311 |
| TMOT24 | 0313 | TMOT28 | 0325 | TMOT40 | 0328 | | | | |
| TMOT50 | 0331 | TMOT60 | 0333 | TMOT80 | 0335 | TMOT90 | 034A | TMOT95 | 034F |
| TMOTOR | 0300 | TMWAI0 | 053F | TMWAIT | 053B | | | | |
| TOC10 | 0185 | TOC20 | 018A | TOC50 | 018C | TOCIA | 0176 | TOCRET | 0363 |
| TOM1CT | 05AF | TOMADD | 05B9 | TOMCNT | 001D | | | | |
| TOWLTH | 001E | TPON | 0351 | TPON15 | 03CE | TPON20 | 0359 | TPON30 | 0361 |
| TPON40 | 0369 | TPON50 | 0373 | TPON60 | 037B | | | | |
| TPON90 | 037D | TPORET | 0387 | TRAM | 0131 | TRAM10 | 0133 | TRAM20 | 0139 |
| TRAM30 | 0141 | TRAM40 | 014E | TRAM50 | 015B | | | | |
| TRAM60 | 0168 | TRAMER | 0174 | TRARET | 035B | TREPRM | 0093 | TRNDTA | 0570 |
| TRNFLG | 04E1 | TRO10 | 0109 | TRO20 | 0110 | | | | |
| TRO50 | 011C | TROMSM | 0100 | TROPG0 | 00E4 | TROPG1 | 01F6 | TROPG2 | 02E9 |
| TROPG3 | 03F7 | TROPG4 | 04FA | TROPG5 | 05E3 | | | | |
| TROPG6 | 06EA | TROPG7 | 07E9 | TROPG8 | 08EF | TROPG9 | 0901 | TROPGA | 0AF0 |
| TROPGB | 0BF8 | TROPGC | 0CF2 | TROPGD | 0DF8 | | | | |
| TROPGE | 0EF4 | TROPGF | 0FE0 | TRORET | 0353 | TROTAB | 0121 | TRPRM1 | 00C8 |
| TRPRM2 | 004A | TRRAM | 0099 | TRYBLK | 0CC3 | | | | |
| TSC02 | 046F | TSC04 | 0476 | TSC05 | 0479 | TSC06 | 047B | TSC07 | 0481 |
| TSC08 | 0480 | TSC09 | 0499 | TSC10 | 04A6 | | | | |
| TSC11 | 0488 | TSC12 | 0484 | TSC20 | 047E | TSCBUF | 0050 | TSCNT | 0462 |
| TSEG1 | 0030 | TSEG2 | 0034 | TST31 | 0251 | | | | |
| TST32 | 0255 | TST41 | 0262 | TST42 | 0266 | TTA90 | 02A7 | TTACHK | 02A9 |
| TTAG | 020E | TTARET | 0368 | TTATAB | 0200 | | | | |
| TTL13A | 00C5 | TTL13E | 00C1 | TTL13G | 00B8 | TTL8E | 0DE6 | TWOLAB | 0061 |
| TXRET | 00E3 | UNPACK | 00AB | UNPAK1 | 00AF | | | | |
| UNPK1 | 021D | UNPK2 | 0222 | VALFLG | 06A7 | VER13 | 0CEE | VER213 | 0CEA |
| VER2L8 | 0CEB | VER8 | 0CEC | VERA | 0CEF | | | | |
| VERE | 0CED | VERFLG | 0006 | VERT01 | 0CAE | VERT02 | 0C89 | VERT05 | 0CBF |
| VERT20 | 0CE7 | VERT90 | 0CF0 | VERTAG | 0C88 | | | | |
| VTOCIA | 0CA4 | VTSP2C | 0CA8 | VTST2C | 0CAC | WAIT | 01E1 | WAIT0 | 01E3 |
| WAIT1 | 01E5 | WRACC | 01C2 | WREPRM | 0564 | | | | |
| WRKBUF | 005A | WRPRM1 | 00C7 | WRTPRM | 06DD | | | | | | |

ASSEMBLY COMPLETE,  NO ERRORS

ISIS-II ASSEMBLER SYMBOL CROSS REFERENCE, V2.1

```
AMBRD     4451   4488#
AMBRD1    4499#  4515
AMBRD2    4501#  4503
AMBRD3    4507#  4509
APL3R2    2504#  2572   2873   3569   3574   3922   3926   3972   3979
BADRO     4456#
BF4CNT    278#   2392
BF4CST    267#   278    2391
BF6CNT    265#   2374
BF6CST    255#   265    2373
BU13C1    4115   4117#
BU13C2    4126   4128#
BUF13C    4114#  4191   4210   4219   4223
BUF8C     4098#  4204   4213
BUFAMB    4176   4235#
BUFM10    4148   4150#
BUFM13    4171   4190#
BUFM20    4157#
BUFM8     4173   4204#
BUFM90    4186   4192   4200   4205   4214   4224   4230   4246#
BUFM91    4242   4248#
BUFM93    4150   4256#
BUFM94    4154   4162   4237   4261#
BUFM95    4258   4265#
BUFMA     4170   4180#
BUFMAN    2668   4147#  4483   4492
BUFME     4172   4196#
BUFT13    4175   4218#
BUFT8     4174   4209#
BUFTBL    4167   4169#
CHECLB    1566   1570#
CHKIJ     2123   2126#
CHKLP1    2088   2109#
CHKSCN    1753#  3727   3734   3745   3908   4035   4043
CK4H10    405#   416
CK4H20    404    407#
CK4H30    409    413#
CK4HRS    404#   1106   1134
CK6T05    3589#
CK6T10    3594#  3600
CK6T20    3592   3597#
```

SPR 011 P2

| | | | | | | | | | | | | | | |
|---|---|---|---|---|---|---|---|---|---|---|---|---|---|---|
| CK6TOT | 3587# | 3788 | 3826 | | | | | | | | | | | |
| CKCN05 | 2750 | 2767# | | | | | | | | | | | | |
| CKCN10 | 2780 | 2783# | | | | | | | | | | | | |
| CKCN20 | 2770 | 2789# | | | | | | | | | | | | |
| CKCN30 | 2775 | 2795# | | | | | | | | | | | | |
| CKCNNG | 2763 | 2781 | 2787 | 2793 | 2802 | 2807# | | | | | | | | |
| CKCNOK | 2756 | 2786 | 2792 | 2797 | 2801 | 2804# | | | | | | | | |
| CKCNTS | 2748# | 4440 | | | | | | | | | | | | |
| CKEPDO | 793# | 798 | | | | | | | | | | | | |
| CKEPRM | 790# | 1033 | 1038 | | | | | | | | | | | |
| CKFC10 | 2595 | 2598# | | | | | | | | | | | | |
| CKFC20 | 2600 | 2607# | | | | | | | | | | | | |
| CKFC80 | 2638 | 2642# | | | | | | | | | | | | |
| CKFC90 | 2609 | 2640 | 2644# | | | | | | | | | | | |
| CKFC95 | 2602 | 2608 | 2648# | | | | | | | | | | | |
| CKFCA | 967 | 2595# | 4388 | 4412 | 4438 | | | | | | | | | |
| CKL1ER | 3458 | 3467# | | | | | | | | | | | | |
| CKL1FG | 3326 | 3451# | | | | | | | | | | | | |
| CKL1RT | 3461 | 3465# | 3468 | | | | | | | | | | | |
| CKL2ER | 3430 | 3439# | | | | | | | | | | | | |
| CKL2FG | 3094 | 3322 | 3423# | | | | | | | | | | | |
| CKL2RT | 3433 | 3437# | 3440 | | | | | | | | | | | |
| CKMAJ | 3486# | 3618 | 3625 | 3634 | | | | | | | | | | |
| CKMAJ9 | 3492 | 3498# | | | | | | | | | | | | |
| CKMISM | 3516# | 3622 | 3629 | 3641 | | | | | | | | | | |
| CKMS30 | 3532 | 3549# | | | | | | | | | | | | |
| CKMS80 | 3538 | 3544 | 3551 | 3556# | | | | | | | | | | |
| CKMS90 | 3517 | 3527 | 3559# | | | | | | | | | | | | |
| CKMTCH | 3983 | 3990 | 4065# | | | | | | | | | | | | |
| CKMTRT | 4067 | 4070 | 4074 | 4079# | | | | | | | | | | | |
| CKSENT | 863# | 864 | | | | | | | | | | | | |
| CKSHRT | 1765 | 1768 | 1770 | 1772# | | | | | | | | | | | |
| CKSUML | 285# | 3958 | 3982 | | | | | | | | | | | | |
| CKSUMR | 286# | 3973 | | | | | | | | | | | | | |
| CKTL | 2749 | 2847# | 3667 | | | | | | | | | | | | |
| CKTL90 | 2860# | | | | | | | | | | | | | |
| CLKEPM | 824 | 826# | | | | | | | | | | | | |
| CLR4SG | 2386# | 3805 | | | | | | | | | | | | |
| CLR6SG | 959 | 2364# | 3404 | 3804 | | | | | | | | | | | |
| CLRRAM | 1002# | 1003 | | | | | | | | | | | | |
| CLRSBF | 2422# | 2713 | 2728 | | | | | | | | | | | | |
| CLRSN1 | 2406# | 2408 | 2433 | | | | | | | | | | | | |
| CLRSNB | 1074 | 2403# | 2639 | 3050 | 4371 | | | | | | | | | |
| CLRTOO | 2375 | 2393 | 2405# | | | | | | | | | | | | |
| CLRVER | 1073 | 3803# | 4247 | 4370 | | | | | | | | | | |
| CMPFLG | 459 | 462# | | | | | | | | | | | | |
| CPARTY | 1380 | 1643 | 1664# | | | | | | | | | | | |
| DATA | 813 | 820# | | | | | | | | | | | | |
| DECRO | 2000 | 2015# | | | | | | | | | | | | |
| DISLAS | 1056# | 2237 | 2262 | 2271 | 2301 | 2313 | 2322 | | | | | | | |
| DRSM13 | 4309 | 4316# | | | | | | | | | | | | |
| DRSM7B | 4317 | 4322# | 4339 | 4346 | | | | | | | | | | |
| DRSM7C | 4320 | 4324# | | | | | | | | | | | | |
| DRSM8 | 4311 | 4328# | | | | | | | | | | | | |
| DRSMA | 4308 | 4315# | | | | | | | | | | | | |
| DRSMDN | 4326 | 4348# | | | | | | | | | | | | |
| DRSME | 4310 | 4319# | | | | | | | | | | | | |
| DRST13 | 4313 | 4341# | | | | | | | | | | | | |
| DRST8 | 4312 | 4334# | | | | | | | | | | | | |
| DRSTBL | 4305 | 4307# | | | | | | | | | | | | |
| DRSUM | 302# | 4348 | | | | | | | | | | | | |
| DRSUMT | 4296# | 4463 | 4467 | | | | | | | | | | | |
| DRTIMR | 234# | | | | | | | | | | | | | |
| DRVRNG | 4300 | 4307 | 4353# | | | | | | | | | | | | |
| E1000M | 146# | 1228 | 1292 | 1478 | | | | | | | | | | |
| E2SCN | 193# | 3687 | | | | | | | | | | | | | |
| E82NDL | 454 | 460# | | | | | | | | | | | | |
| EAMBBY | 170# | 2683 | 4239 | | | | | | | | | | | | |
| EAMBCY | 202# | 4497 | | | | | | | | | | | | | |
| EAMBIG | 169# | 2729 | | | | | | | | | | | | | |
| EAMBMS | 112# | 1059 | 2284 | 2293 | 4366 | | | | | | | | | |
| EAMBWT | 201# | 4500 | 4506 | | | | | | | | | | | | |
| EAMESD | 157# | 2290 | | | | | | | | | | | | | |
| EAMESE | 156# | 2281 | | | | | | | | | | | | | |
| EBDLT | 50# | 1057 | 1066 | 1115 | 1118 | 1121 | 1207 | 1299 | 1358 | 1389 | 2179 | 2255 | 4422 | 4429 | 4473 | 4499 | 4 |
| | 4550 | 4552 | | | | | | | | | | | | |
| EBDTON | 149# | | | | | | | | | | | | | |
| EBFREQ | 115# | 4251 | 4262 | 4366 | 4481 | 4490 | | | | | | | | |
| EBIT6 | 165# | 2709 | 2712 | | | | | | | | | | | | |
| ECASE1 | 2529 | 2537# | | | | | | | | | | | | |
| ECASE2 | 2530 | 2546# | | | | | | | | | | | | |
| ECASE3 | 2532 | 2557# | | | | | | | | | | | | |
| ECASE4 | 2533 | 2554 | 2566# | | | | | | | | | | | |
| EDEC8L | 87# | | | | | | | | | | | | | |
| EDEC8R | 88# | | | | | | | | | | | | | |
| EDECAL | 89# | | | | | | | | | | | | | |
| EDECAR | 90# | | | | | | | | | | | | | |
| EDECB7 | 96# | | | | | | | | | | | | | |
| EDECBE | 91# | | | | | | | | | | | | | |
| EDECBF | 92# | | | | | | | | | | | | | |
| EDECBK | 95# | 2970 | | | | | | | | | | | | |

| Symbol | | | | | | | | | | | | | | | |
|---|---|---|---|---|---|---|---|---|---|---|---|---|---|---|---|
| EDECD | 94# | 3831 | | | | | | | | | | | | | |
| EDECE | 93# | 3831 | 3871 | | | | | | | | | | | | |
| EDECOO | 86# | | | | | | | | | | | | | | |
| EDRDLY | 177# | 4382 | | | | | | | | | | | | | |
| EFCRST | 69# | 713 | 885 | 1062 | 1232 | 1260 | 1301 | 1488 | | | | | | | |
| EFRRST | 67# | 1067 | 2644 | | | | | | | | | | | | |
| EGDLT | 49# | 1057 | 1066 | 1077 | 1115 | 1118 | 1121 | 1146 | 1149 | 1206 | 1287 | 1298 | 1358 | 2180 | 2254 | 4421 4 |
| | 4498 | 4538 | | | | | | | | | | | | | |
| EGDLTW | 176# | 4383 | | | | | | | | | | | | | |
| EGDTON | 148# | 2182 | 4476 | | | | | | | | | | | | |
| EHCNTL | 226# | 415 | 2244 | | | | | | | | | | | | |
| ELASDB | 48# | 920 | 1090 | 1255 | 1291 | 1298 | 1359 | 1475 | 1501 | 2223 | 2230 | 2255 | 4537 | | | |
| ELST1 | 2341# | 2343 | | | | | | | | | | | | | |
| ELSTBT | 1969 | 1970 | 1976 | 1977 | 1984 | 1985 | 1993 | 2019 | 2031 | 2043# | | | | | |
| EMISCN | 166# | | | | | | | | | | | | | | |
| EMOD10 | 2521# | 3040 | | | | | | | | | | | | | |
| EMODCK | 2576# | | | | | | | | | | | | | | |
| EMODSW | 2542 | 2572# | | | | | | | | | | | | | |
| EMSNBY | 167# | 4228 | | | | | | | | | | | | | |
| EMTREB | 45# | 1090 | 1103 | 1123 | 1153 | 1299 | 4538 | | | | | | | | |
| EN12SN | 195# | 3685 | | | | | | | | | | | | | |
| EN2SCN | 194# | 3683 | | | | | | | | | | | | | |
| ENLAS | 1065# | 2239 | 2264 | 2276 | 2306 | 2315 | 2324 | | | | | | | | |
| EOCIA | 68# | 413 | 716 | 866 | 1647 | 1845 | 2216 | 2731 | | | | | | | |
| EPARRD | 65# | | | | | | | | | | | | | | |
| EPRDEC | 70# | 2632 | | | | | | | | | | | | | |
| EPRMCS | 58# | 1024 | 1041 | 1252 | 1795 | 1811 | 1819 | 1823 | 1901 | 1903 | 1944 | 1946 | | | |
| EPRMDI | 46# | 823 | 825 | 827 | | | | | | | | | | | |
| EPRMSK | 47# | 796 | 797 | 815 | 816 | 826 | 827 | 1030 | 1031 | | | | | | |
| ER4B4 | 114# | | | | | | | | | | | | | | |
| ER4B6 | 116# | | | | | | | | | | | | | | |
| ER4B7 | 117# | | | | | | | | | | | | | | |
| ER6B4 | 131# | | | | | | | | | | | | | | |
| ER6B5 | 132# | | | | | | | | | | | | | | |
| ER6B6 | 133# | | | | | | | | | | | | | | |
| ER6B7 | 134# | | | | | | | | | | | | | | |
| ERAL | 139# | 1787 | | | | | | | | | | | | | |
| ERASE | 142# | | | | | | | | | | | | | | |
| ERASFL | 1788 | 1899# | | | | | | | | | | | | | |
| ERRTL | 284# | 2364 | 3294 | 3409 | 3949 | 4496 | 4511 | | | | | | | | |
| ERS2RM | 2044 | 2136 | 2167 | 2338# | | | | | | | | | | | |
| ESBFUL | 113# | 2423 | 4252 | 4366 | | | | | | | | | | | |
| ESCNG | 110# | 964 | 1070 | 4395 | | | | | | | | | | | |
| ESDIS | 155# | 2228 | | | | | | | | | | | | | |
| ESEN | 154# | 2221 | | | | | | | | | | | | | |
| ESENT | 55# | | | | | | | | | | | | | | |
| ESR4CH | 101# | | | | | | | | | | | | | | |
| ESRCHR | 100# | | | | | | | | | | | | | | |
| ESRF13 | 102# | | | | | | | | | | | | | | |
| ESRPER | 103# | | | | | | | | | | | | | | |
| ESRRD | 66# | 407 | 1494 | 2598 | | | | | | | | | | | |
| ESRSDT | 104# | | | | | | | | | | | | | | |
| ETEST | 43# | 712 | 887 | 920 | 1184 | | | | | | | | | | |
| ETL1BY | 171# | 2703 | 4211 | 4220 | | | | | | | | | | | |
| ETMARK | 44# | 934 | 936 | 948 | 950 | 1184 | | | | | | | | | |
| ETNCT1 | 207# | 1885 | | | | | | | | | | | | | |
| ETNCT2 | 208# | 1886 | | | | | | | | | | | | | |
| ETNCT3 | 209# | 1887 | | | | | | | | | | | | | |
| ETNCT4 | 210# | 1888 | | | | | | | | | | | | | |
| ETNFQ1 | 211# | 391 | | | | | | | | | | | | | |
| ETNFQ2 | 212# | 392 | | | | | | | | | | | | | |
| ETNFQ3 | 213# | 393 | | | | | | | | | | | | | |
| ETNFQ4 | 214# | 394 | | | | | | | | | | | | | |
| ETONCT | 151# | 1216 | | | | | | | | | | | | | |
| ETONE | 51# | 365 | 367 | 379 | 920 | 1255 | | | | | | | | | |
| ETONFQ | 152# | | | | | | | | | | | | | | |
| ETRMBY | 168# | 2699 | 4241 | 4246 | | | | | | | | | | | |
| EUP2SP | 56# | | | | | | | | | | | | | | |
| EVER00 | 121# | | | | | | | | | | | | | | |
| EVER13 | 123# | | | | | | | | | | | | | | |
| EVER8 | 125# | | | | | | | | | | | | | | |
| EVERA | 122# | 2087 | | | | | | | | | | | | | |
| EVERAM | 128# | 4161 | 4488 | | | | | | | | | | | | |
| EVERE | 124# | | | | | | | | | | | | | | |
| EVLSIR | 57# | 1252 | 1254 | | | | | | | | | | | | |
| EVTL13 | 127# | 4299 | | | | | | | | | | | | | |
| EVTL8 | 126# | | | | | | | | | | | | | | |
| EWAIT | 175# | 176 | 177 | 2604 | 2642 | | | | | | | | | | |
| EWDS | 141# | 1820 | | | | | | | | | | | | | |
| EWEN | 138# | 1942 | | | | | | | | | | | | | |
| EXSBF2 | 3178# | 3639 | | | | | | | | | | | | | |
| EXSBF3 | 3180# | 3628 | 3996 | | | | | | | | | | | | |
| EXSBF4 | 3182# | 3621 | | | | | | | | | | | | | |
| EXSBFL | 3188# | 3193 | | | | | | | | | | | | | |
| EXSBFX | 3179 | 3181 | 3183# | | | | | | | | | | | | |
| FACTOR | 178# | 355 | 1094 | 1105 | 1124 | 1133 | 1217 | 1222 | 1228 | 1289 | 1292 | 1303 | 1476 | 1478 | |
| FILFF | 2010# | 2012 | | | | | | | | | | | | | |
| FLCKRT | 2028 | 2041 | 2053# | | | | | | | | | | | | |
| FLGCHK | 2134 | 2139# | | | | | | | | | | | | | |
| FLGMTC | 429# | 4002 | 4051 | | | | | | | | | | | | |
| FLGPRG | 2063# | 4470 | | | | | | | | | | | | | |

| | | | | | | | | | | | | | | | |
|---|---|---|---|---|---|---|---|---|---|---|---|---|---|---|---|
| FREQAD | 386 | 390# | | | | | | | | | | | | | |
| GETFLG | 444 | 457 | 2824# | 3320 | | | | | | | | | | | |
| GETLUP | 966# | 970 | | | | | | | | | | | | | |
| GOOD10 | 4461 | 4467# | | | | | | | | | | | | | |
| GOOD20 | 4464 | 4468# | | | | | | | | | | | | | |
| GOOD30 | 2083 | 4472# | | | | | | | | | | | | | |
| GOODRD | 4450 | 4459# | | | | | | | | | | | | | |
| GT1FG | 3456# | 3464 | | | | | | | | | | | | | |
| GT2FG | 3428# | 3436 | | | | | | | | | | | | | |
| GTSFLG | 435# | 472 | | | | | | | | | | | | | |
| HCOM10 | 2665 | 2671# | | | | | | | | | | | | | |
| HCOM20 | 2687 | 2690# | | | | | | | | | | | | | |
| HCOM25 | 2700 | 2712# | | | | | | | | | | | | | |
| HCOM30 | 2696 | 2704 | 2710 | 2715# | | | | | | | | | | | |
| HCOM40 | 2718 | 2721# | | | | | | | | | | | | | |
| HCOM70 | 2684 | 2728# | | | | | | | | | | | | | |
| HCOM80 | 2726 | 2731# | | | | | | | | | | | | | |
| HCOM90 | 2667 | 2672 | 2693 | 2734# | | | | | | | | | | | |
| HCOMM | 2664# | 3723 | 4032 | 4376 | 4389 | 4411 | 4427 | 4437 | 4448 | 4456 | 4459 | 4501 | 4507 | | |
| INCHNB | 2904# | 3134 | 3145 | 3259 | 3271 | 3376 | 3390 | | | | | | | | |
| INCLNB | 2910# | 3081 | 3108 | 3225 | 3240 | 3343 | 3356 | | | | | | | | |
| INCPNT | 2137 | 2154# | | | | | | | | | | | | | |
| INCREM | 1543 | 1545# | | | | | | | | | | | | | |
| INCX90 | 2908 | 2917# | | | | | | | | | | | | | |
| INCXRT | 2907 | 2914 | 2921# | | | | | | | | | | | | |
| INLAB1 | 2034 | 2038# | | | | | | | | | | | | | |
| INTSTR | 307# | 343 | 359 | | | | | | | | | | | | |
| INTTRP | 322# | | | | | | | | | | | | | | |
| L4S1 | 268# | 460 | 3920 | 4100 | 4329 | 4335 | | | | | | | | | |
| L4S2 | 269# | | | | | | | | | | | | | | |
| L4SCNT | 270# | 3033 | 3632 | | | | | | | | | | | | |
| L4STOT | 271# | 2777 | 3910 | | | | | | | | | | | | |
| L6S1 | 256# | 442 | 985 | 1598 | 2795 | 3333 | 3567 | 3620 | 3791 | 3829 | 3842 | 3869 | 3955 | 4116 | 4182 | 4198 | 4 |
| L6S2 | 257# | 455 | 2799 | 3367 | 3960 | 4114 | 4344 | | | | | | | | |
| L6SCNT | 258# | 973 | 3330 | 3342 | 3355 | 3364 | 3375 | 3389 | 3617 | | | | | | |
| L6STOT | 259# | 2772 | 2789 | 3398 | 3589 | 3864 | 3894 | | | | | | | | |
| LASTBT | 1852 | 1855# | | | | | | | | | | | | | |
| LBDET | 1999 | 2002# | | | | | | | | | | | | | |
| LOOPCK | 987# | 994 | 999 | | | | | | | | | | | | |
| LSTBYT | 536 | 545 | 557# | | | | | | | | | | | | |
| LSTUSD | 309# | | | | | | | | | | | | | | |
| MAJSG0 | 3619 | 3622# | | | | | | | | | | | | | |
| MAJSG1 | 3626 | 3629# | | | | | | | | | | | | | |
| MAJSG4 | 3634# | 3645 | | | | | | | | | | | | | |
| MAJSG5 | 3635 | 3641# | | | | | | | | | | | | | |
| MAJSGS | 3617# | 3722 | 4031 | | | | | | | | | | | | |
| MCH2BY | 2989# | 3103 | 3140 | | | | | | | | | | | | |
| MCH3BY | 2991# | 3234 | 3265 | | | | | | | | | | | | |
| MCH4BY | 2993# | 3350 | 3384 | | | | | | | | | | | | |
| MCHXBY | 2990 | 2992 | 2994# | 2999 | | | | | | | | | | | |
| MCHXRT | 2996 | 3000# | | | | | | | | | | | | | |
| MISSCN | 4169 | 4228# | | | | | | | | | | | | | |
| MOV2BY | 2445# | 3077 | 3130 | 4101 | 4103 | | | | | | | | | | |
| MOV3BY | 2447# | 2523 | 3222 | 3256 | 4124 | 4128 | 4183 | 4185 | 4199 | | | | | | |
| MOV4BY | 2449# | 3340 | 3373 | | | | | | | | | | | | |
| MOVXBY | 2446 | 2448 | 2450# | 2454 | | | | | | | | | | | |
| MRB0 | 232# | | | | | | | | | | | | | | |
| MRB1 | 242# | | | | | | | | | | | | | | |
| MRB1R4 | 243# | | | | | | | | | | | | | | |
| MTRC10 | 4524 | 4527# | | | | | | | | | | | | | |
| MTRC20 | 4528# | 4529 | | | | | | | | | | | | | |
| MTRCHK | 4375 | 4417 | 4436 | 4522# | | | | | | | | | | | |
| MTRE20 | 4545# | 4551 | 4553 | | | | | | | | | | | | |
| MTRE30 | 4546# | 4547 | | | | | | | | | | | | | |
| MTRERR | 4533 | 4537# | | | | | | | | | | | | | |
| NEXT4 | 1532 | 1675# | | | | | | | | | | | | | |
| NFLGMC | 440 | 474# | | | | | | | | | | | | | |
| NOLSBT | 1992# | | | | | | | | | | | | | | |
| NXTSET | 449 | 465 | 469# | | | | | | | | | | | | |
| OCIRET | 1857 | 1860# | | | | | | | | | | | | | |
| OPREAD | 137# | 1023 | | | | | | | | | | | | | |
| OVRERR | 1568 | 1572 | 1583# | | | | | | | | | | | | |
| OVRRET | 1581 | 1585# | | | | | | | | | | | | | |
| OVRSET | 1563# | 2323 | | | | | | | | | | | | | |
| OVRST1 | 163# | 2320 | | | | | | | | | | | | | |
| OWRITE | 140# | 1791 | | | | | | | | | | | | | |
| PARITY | 548 | 551 | 558 | 562 | 742# | 777 | 1849 | 2724 | | | | | | | |
| PDATA | 505 | 511# | | | | | | | | | | | | | |
| POW00 | 1242# | 1248 | | | | | | | | | | | | | |
| POW10 | 1273# | 1274 | | | | | | | | | | | | | |
| POW20 | 1298# | | | | | | | | | | | | | | |
| POW25 | 1304# | 1305 | | | | | | | | | | | | | |
| POW30 | 1311# | 1312 | | | | | | | | | | | | | |
| POWUP | 319 | 1243# | | | | | | | | | | | | | |
| PRO4C0 | 3085# | 3135 | | | | | | | | | | | | | |
| PRO4C1 | 3092# | 3116 | | | | | | | | | | | | | |
| PRO4C2 | 3072 | 3100# | | | | | | | | | | | | | |
| PRO4C3 | 3112# | 3146 | | | | | | | | | | | | | |
| PRO4C4 | 3104 | 3120# | | | | | | | | | | | | | |
| PRO4C6 | 3125 | 3137# | | | | | | | | | | | | | |
| PRO4C7 | 3087 | 3096 | 3114 | 3150# | | | | | | | | | | | |

| | | | | | | | | | | | | | | | |
|---|---|---|---|---|---|---|---|---|---|---|---|---|---|---|---|
| PRO4C8 | 3141 | 3157# | | | | | | | | | | | | | |
| PRO4CN | 3034 | 3037 | 3067# | | | | | | | | | | | | |
| PRO4CX | 3095 | 3153# | | | | | | | | | | | | | |
| PRO6C2 | 3220 | 3234# | | | | | | | | | | | | | |
| PRO6C4 | 3235 | 3247# | | | | | | | | | | | | | |
| PRO6C6 | 3252 | 3265# | | | | | | | | | | | | | |
| PRO6C7 | 3230 | 3242 | 3277# | 3346 | 3359 | | | | | | | | | | |
| PRO6C8 | 3266 | 3292# | | | | | | | | | | | | | |
| PRO6CN | 3048 | 3215# | | | | | | | | | | | | | |
| PRO6CX | 3261 | 3273 | 3284# | 3380 | 3394 | | | | | | | | | | |
| PRO7C0 | 3327 | 3330# | | | | | | | | | | | | | |
| PRO7C2 | 3335 | 3350# | | | | | | | | | | | | | |
| PRO7C4 | 3323 | 3351 | 3364# | | | | | | | | | | | | |
| PRO7C6 | 3369 | 3384# | | | | | | | | | | | | | |
| PRO7C8 | 3385 | 3398# | | | | | | | | | | | | | |
| PRO7C9 | 3400 | 3409# | | | | | | | | | | | | | |
| PRO7CN | 3025 | 3042 | 3047 | 3308# | | | | | | | | | | | |
| PRO7CX | 3344 | 3357 | 3377 | 3378 | 3391 | 3392 | 3412# | | | | | | | | |
| PROC05 | 3020 | 3027# | | | | | | | | | | | | | |
| PROC3L | 3022# | | | | | | | | | | | | | | |
| PROC8 | 3029# | | | | | | | | | | | | | | |
| PROC8L | 3033# | | | | | | | | | | | | | | |
| PROC8R | 3032 | 3035# | | | | | | | | | | | | | |
| PROCA | 3028 | 3044# | | | | | | | | | | | | | |
| PROCAL | 3047# | | | | | | | | | | | | | | |
| PROCAR | 3046 | 3048# | | | | | | | | | | | | | |
| PROCE | 3016 | 3039# | | | | | | | | | | | | | |
| PROCEX | 3015 | 3041 | 3050# | 3153 | 3161 | 3288 | 3296 | 3405 | 3412 | | | | | | |
| PROCRT | 3013 | 3051# | | | | | | | | | | | | | |
| PROCSG | 968 | 3011# | 4439 | | | | | | | | | | | | |
| PROLAB | 2071 | 2075 | 2085# | | | | | | | | | | | | |
| R4S1 | 273# | 3924 | 4102 | 4331 | 4337 | | | | | | | | | | |
| R4S2 | 274# | | | | | | | | | | | | | | |
| R4SCNT | 275# | 3035 | | | | | | | | | | | | | |
| R4STOT | 276# | 2783 | 3915 | | | | | | | | | | | | |
| R6S1 | 261# | 996 | 1608 | 2110 | 3218 | 3572 | 3627 | 3970 | 3995 | 4127 | 4184 | 4322 | | | |
| R6S2 | 262# | 3250 | 3977 | 4125 | 4342 | | | | | | | | | | |
| R6SCNT | 263# | 980 | 3215 | 3224 | 3239 | 3247 | 3258 | 3270 | 3624 | | | | | | |
| R6STOT | 264# | 2767 | 3292 | 3597 | 3874 | 3898 | | | | | | | | | |
| RAMRT | 1064 | 1077# | | | | | | | | | | | | | |
| RCRAM | 252# | 2273 | | | | | | | | | | | | | |
| RDEPRM | 494 | 1020# | 1321 | | | | | | | | | | | | |
| RDLAB1 | 2024# | 2040 | | | | | | | | | | | | | |
| RDLAB2 | 2026# | 2037 | | | | | | | | | | | | | |
| RDT05 | 4368 | 4371# | | | | | | | | | | | | | |
| RDT10 | 4375# | 4380 | 4390 | | | | | | | | | | | | |
| RDT20 | 4377 | 4388# | | | | | | | | | | | | | |
| RDT30 | 4384 | 4394# | | | | | | | | | | | | | |
| RDT35 | 4398# | 4420 | 4423 | | | | | | | | | | | | |
| RDT37 | 4401 | 4404 | 4410# | | | | | | | | | | | | |
| RDT40 | 4415 | 4427# | | | | | | | | | | | | | |
| RDT50 | 4436# | 4444 | 4454 | | | | | | | | | | | | |
| RDT60 | 4432 | 4439# | | | | | | | | | | | | | |
| RDT70 | 4441 | 4448# | | | | | | | | | | | | | |
| RDT90 | 4457 | 4480# | | | | | | | | | | | | | |
| RDTAG | 1330 | 2090 | 2185 | 4365# | 4431 | 4465 | 4484 | 4518 | | | | | | | |
| RLACC | 793 | 795# | | | | | | | | | | | | | |
| ROCIA | 1565 | 1840# | 1968 | 1975 | 1983 | 1991 | | | | | | | | | |
| ROCIA1 | 1842# | 1843 | | | | | | | | | | | | | |
| ROCIA2 | 1842 | 1844# | | | | | | | | | | | | | |
| RSTTRP | 318# | 1197 | 1378 | 1512 | 2327 | | | | | | | | | | |
| RTNFLG | 468 | 475# | | | | | | | | | | | | | |
| RTPRG | 2124 | 2128 | 2143 | 2175 | 2184# | | | | | | | | | | |
| RTRCVR | 2004 | 2013 | 2018 | 2022# | 2161 | | | | | | | | | | |
| RTRLAB | 1968# | 2016 | | | | | | | | | | | | | |
| RTRM1 | 2148# | 2152 | | | | | | | | | | | | | |
| RTRMRT | 2141 | 2145# | | | | | | | | | | | | | |
| SAVEBT | 1570 | 1574# | | | | | | | | | | | | | |
| SBFEND | 296# | | | | | | | | | | | | | | |
| SBFPNT | 290# | 2426 | 2674 | 2706 | 4248 | | | | | | | | | | |
| SBSTRT | 294# | 2427 | 4249 | | | | | | | | | | | | |
| SBUF | 293# | 294 | 295 | 2430 | 4157 | | | | | | | | | | |
| SBUFAD | 292# | | | | | | | | | | | | | | |
| SBUFSZ | 295# | 2431 | | | | | | | | | | | | | |
| SCNBUF | 253# | 2403 | 2521 | 2525 | 2576 | 2610 | 2944 | 2954 | 3011 | 3071 | 3092 | 3124 | 3219 | 3251 | 3319 | 3334 3 |
| SCNFLG | 233# | | | | | | | | | | | | | | |
| SDAT10 | 2300 | 2309# | | | | | | | | | | | | | |
| SDAT11 | 2312 | 2318# | | | | | | | | | | | | | |
| SDAT12 | 2321 | 2327# | | | | | | | | | | | | | |
| SDATA | 2216# | 2649 | | | | | | | | | | | | | |
| SDATA1 | 2221# | | | | | | | | | | | | | | |
| SDATA2 | 2222 | 2226# | | | | | | | | | | | | | |
| SDATA3 | 2229 | 2233# | | | | | | | | | | | | | |
| SDATA4 | 2236 | 2242# | | | | | | | | | | | | | |
| SDATA5 | 2245 | 2258# | | | | | | | | | | | | | |
| SDATA6 | 2261 | 2267# | | | | | | | | | | | | | |
| SDATA7 | 2270 | 2279# | | | | | | | | | | | | | |
| SDATA8 | 2282 | 2288# | | | | | | | | | | | | | |
| SDATA9 | 2291 | 2297# | | | | | | | | | | | | | |
| SDATAH | 417 | 2246# | | | | | | | | | | | | | |
| SEGBUF | 251# | | | | | | | | | | | | | | |

| | | | | | | | | | | | |
|---|---|---|---|---|---|---|---|---|---|---|---|
| SEGONE | 1537 | 1544# | | | | | | | | | |
| SETCS | 1024# | 1044 | | | | | | | | | |
| SETDI | 819 | 822# | 830 | | | | | | | | |
| SETDI1 | 822 | 825# | | | | | | | | | |
| SETL11 | 184# | 3345 | | | | | | | | | |
| SETL12 | 185# | 3358 | | | | | | | | | |
| SETL21 | 186# | 3088 | 3379 | | | | | | | | |
| SETL22 | 187# | 3115 | 3393 | | | | | | | | |
| SETR11 | 188# | 3229 | | | | | | | | | |
| SETR12 | 189# | 3241 | | | | | | | | | |
| SETR21 | 190# | 3086 | 3260 | | | | | | | | |
| SETR22 | 191# | 3113 | 3272 | | | | | | | | |
| SFTLFT | 747# | 749 | | | | | | | | | |
| SGM90 | 1712 | 1717 | 1722# | | | | | | | | |
| SGMTCH | 1535 | 1540 | 1709# | | | | | | | | |
| SGSUM4 | 2467# | 3921 | 3925 | | | | | | | | |
| SGSUM6 | 2471# | 2541 | 2567 | 2872 | 3568 | 3573 | 3971 | 3978 | | | |
| SGSUMR | 2491 | 2496# | | | | | | | | | |
| SGSUMX | 2469 | 2472# | | | | | | | | | |
| SGSUMY | 2479 | 2484# | | | | | | | | | |
| SHIFTL | 1600 | 1617 | 1917# | 1929 | | | | | | | |
| SNOWRT | 1785 | 1941# | | | | | | | | | |
| SOCIA | 508 | 512 | 549 | 552 | 559 | 563 | 770 | 778 | 860# | | |
| SP2SCN | 1760 | 1766# | | | | | | | | | |
| ST2SCN | 1762 | 1771# | | | | | | | | | |
| STACK | 239# | 580 | | | | | | | | | |
| STOCIA | 1758 | 1764# | | | | | | | | | |
| STRAM1 | 158# | 2235 | | | | | | | | | |
| STRRAM | 1962# | 2238 | | | | | | | | | |
| STSDTA | 305# | 2218 | 2226 | 2233 | 2242 | 2258 | 2267 | 2279 | 2288 | 2297 | 2309 | 2318 |
| STTL13 | 282# | 2366 | 2754 | 2849 | 3284 | 3691 | | | | | |
| STTL8 | 283# | 2368 | 2386 | 3085 | 3112 | 3277 | | | | | |
| SUM12C | 3567# | 3797 | 3839 | | | | | | | | |
| SUM13L | 2871# | 3956 | 3961 | | | | | | | | |
| SUM2BY | 4281# | 4330 | 4332 | 4336 | 4338 | | | | | | |
| SUM3BY | 4279# | 4323 | 4343 | | | | | | | | |
| SUM4BY | 4277# | 4325 | 4345 | | | | | | | | |
| SWISET | 306# | 383 | 774 | 1324 | 1576 | 1754 | 1876 | 2069 | 3673 | 4402 | |
| SWLATC | 71# | 771 | 1323 | 2073 | 4399 | | | | | | |
| SWP4SN | 2944# | 3031 | | | | | | | | | |
| SWP6SN | 2954# | 3024 | 3039 | 3045 | | | | | | | |
| SWPXEX | 2952 | 2968# | | | | | | | | | |
| SWPXRT | 2972 | 3015# | | | | | | | | | |
| SWSET | 767# | 2314 | | | | | | | | | |
| SWSET1 | 162# | 2311 | | | | | | | | | |
| T2LNOK | 111# | | | | | | | | | | |
| TASAVE | 246# | | | | | | | | | | |
| TBERR4 | 3805# | 3896 | 3900 | 3930 | | | | | | | |
| TBERR6 | 3798 | 3804# | 3847 | 3876 | 4010 | | | | | | |
| TBLK13 | 3736 | 3826# | 4037 | | | | | | | | |
| TBLK8 | 3747 | 3894# | | | | | | | | | |
| TBLK8C | 3905# | 4045 | | | | | | | | | |
| TBLK8D | 3910# | | | | | | | | | | |
| TBLKA | 3729 | 3788# | | | | | | | | | |
| TBLKE | 3740 | 3864# | | | | | | | | | |
| TBNONE | 3789 | 3795 | 3809# | 3827 | 3832 | 3837 | 3867 | 3872 | 3913 | 3918 | |
| TBTL13 | 3698 | 3948# | | | | | | | | | |
| TBTL8 | 3715 | 4030# | | | | | | | | | |
| TCKCNT | 974# | 982 | | | | | | | | | |
| TCNT1 | 222# | 1422 | 1480 | 1544 | | | | | | | |
| TCNT2 | 223# | 1542 | | | | | | | | | |
| TERR02 | 1212# | | | | | | | | | | |
| TERR04 | 1215# | 1226 | | | | | | | | | |
| TERR06 | 1218# | 1219 | | | | | | | | | |
| TERR08 | 1223# | 1224 | | | | | | | | | |
| TERR10 | 1213 | 1228# | | | | | | | | | |
| TERR12 | 1229# | 1230 | | | | | | | | | |
| TERRWT | 1196 | 1206# | 1584 | 2047 | 4541 | | | | | | |
| TEST1 | 925# | 956 | | | | | | | | | |
| TEST2 | 927# | 955 | | | | | | | | | |
| TEST3 | 930# | 930 | | | | | | | | | |
| TEST4 | 943# | 943 | | | | | | | | | |
| TH000 | 1354# | 1382 | 1387 | 1406 | 1409 | 1413 | 1437 | | | | |
| TH005 | 1360# | 1361 | 1370 | 1390 | 1408 | 2256 | | | | | |
| TH010 | 1360 | 1366# | | | | | | | | | |
| TH012 | 1378# | | | | | | | | | | |
| TH014 | 1377 | 1380# | | | | | | | | | |
| TH015 | 1384 | 1394# | | | | | | | | | |
| TH020 | 1395 | 1399# | | | | | | | | | |
| TH029 | 1398 | 1404# | | | | | | | | | |
| TH030 | 1407 | 1413# | | | | | | | | | |
| TH050 | 1423# | 1433 | | | | | | | | | |
| TH055 | 1424 | 1428# | | | | | | | | | |
| TH059 | 1427 | 1430# | | | | | | | | | |
| THSND | 1419 | 1432 | 1436 | 1640# | 1641 | | | | | | |
| TIME05 | 350 | 352# | | | | | | | | | |
| TIME10 | 353 | 355# | 380 | | | | | | | | |
| TIME20 | 356# | 388 | | | | | | | | | |
| TIME30 | 347 | 364# | | | | | | | | | |
| TIME40 | 366 | 368# | | | | | | | | | |
| TIME50 | 375 | 377# | | | | | | | | | |

| | | | | | |
|---|---|---|---|---|---|
| TIME60 | 369 | 378 | 381# | | |
| TIMER | 339# | | | | |
| TIMREG | 236# | | | | |
| TIMTRP | 325# | | | | |
| TMOT10 | 1095# | 1096 | | | |
| TMOT20 | 1104# | | | | |
| TMOT22 | 1105# | 1116 | 1119 | | |
| TMOT24 | 1106# | 1108 | | | |
| TMOT28 | 1112 | 1121# | | | |
| TMOT40 | 1125# | 1126 | | | |
| TMOT50 | 1100 | 1132# | | | |
| TMOT60 | 1133# | 1147 | 1150 | | |
| TMOT80 | 1134# | 1136 | | | |
| TMOT90 | 1129 | 1143 | 1153# | | |
| TMOT95 | 1139 | 1159# | | | |
| TMOTOR | 1090# | 1189 | | | |
| TMWAI0 | 1739# | 1740 | | | |
| TMWAIT | 1477 | 1734# | | | |
| TOC10 | 724# | 728 | | | |
| TOC20 | 726 | 728# | | | |
| TOC50 | 722 | 730# | | | |
| TOCIA | 712# | 1178 | | | |
| TOCRET | 731 | 1179# | | | |
| TON1CT | 371 | 1280 | 1316 | 1874# | |
| TONADD | 1879 | 1884# | | | |
| TONCNT | 244# | | | | |
| TONLTH | 245# | | | | |
| TPON | 1166# | 1266 | | | |
| TPON15 | 1293# | 1294 | | | |
| TPON20 | 1169 | 1173# | | | |
| TPON30 | 1174 | 1178# | | | |
| TPON40 | 1179 | 1183# | | | |
| TPON50 | 1185 | 1189# | | | |
| TPON60 | 1190 | 1194# | | | |
| TPON90 | 1171 | 1176 | 1181 | 1187 | 1192 | 1196# |
| TPORET | 1194 | 1267# | | | |
| TRAM | 644# | 1173 | | | |
| TRAM10 | 645# | 647 | | | |
| TRAM20 | 651# | 654 | | | |
| TRAM30 | 658# | 666 | | | |
| TRAM40 | 670# | 678 | | | |
| TRAM50 | 682# | 690 | | | |
| TRAM60 | 694# | 702 | | | |
| TRAMER | 653 | 674 | 698 | 705# | |
| TRARET | 705 | 1174# | | | |
| TREPRM | 486# | 2275 | | | |
| TRNDTA | 1794# | 1817 | | | |
| TRNFLG | 1596# | 2160 | | | |
| TRO10 | 593# | 607 | | | |
| TRO20 | 602# | 605 | | | |
| TRO50 | 602 | 613# | | | |
| TROMSM | 580# | 1166 | | | |
| TROPG0 | 568# | 620 | | | |
| TROPG1 | 621 | 872# | | | |
| TROPG2 | 622 | 1080# | | | |
| TROPG3 | 623 | 1332# | | | |
| TROPG4 | 624 | 1620# | | | |
| TROPG5 | 625 | 1949# | | | |
| TROPG6 | 626 | 2187# | | | |
| TROPG7 | 627 | 2346# | | | |
| TROPG8 | 628 | 2653# | | | |
| TROPG9 | 629 | 2923# | | | |
| TROPGA | 630 | 3201# | | | |
| TROPGB | 631 | 3470# | | | |
| TROPGC | 632 | 3763# | | | |
| TROPGD | 633 | 4081# | | | |
| TROPGE | 634 | 4356# | | | |
| TROPGF | 635 | 4555# | | | |
| TRORET | 609 | 1167# | | | |
| TROTAB | 594 | 620# | | | |
| TRPRM1 | 160# | 2269 | | | |
| TRPRM2 | 161# | 2299 | | | |
| TRRAM | 497# | 2305 | | | |
| TRYBLK | 3725# | | | | |
| TSC02 | 1482# | 1484 | | | |
| TSC04 | 1493# | 1497 | | | |
| TSC05 | 1495# | | | | |
| TSC06 | 1496# | 1505 | 1541 | 1552 | |
| TSC07 | 1504# | 1529 | | | |
| TSC08 | 1495 | 1513# | | | |
| TSC09 | 1511 | 1522# | | | |
| TSC10 | 1524 | 1531# | | | |
| TSC11 | 1512# | 1515 | | | |
| TSC12 | 1507# | 1516 | | | |
| TSC20 | 1501# | | | | |
| TSCBUF | 225 | 1509 | 1513 | 1527 | 1531 | 1710 |
| TSCNT | 1414 | 1475# | | | |
| TSEG1 | 219 | 1356 | 1522 | 1534 | 2252 |
| TSEG2 | 220# | 1525 | 1539 | | |
| TST31 | 933 | 936# | | | |
| TST32 | 935 | 940# | | | |

```
TST41    947    950#
TST42    949    954#
TTA90    978    990    1005#
TTACHK   986    1007#
TTAG     885#   1183
TTARET   1005   1184#
TTATAB   883#   888
TTL13A   3966   4014#
TTL13E   3951   3991   4004   4009#
TTL13G   3984   4000#
TTL8E    4038   4046   4053#
TWOLAB   308#   431    1320   1790   1965   2023   2025   2146   2147   2159   2303   2340   3427   3455
TXRET    509    566#
UNPACK   516#
UNPAK1   522#   554
UNPK1    893#   916
UNPK2    897#   914
VALFLG   2127   2131#
VER13    3737   3757#
VER213   3699   3753#
VER2L8   3716   3754#
VER8     3748   3755#
VERA     3730   3758#
VERE     3741   3756#
VERFLG   235#
VERT01   3684   3686   3691#
VERT02   3704#
VERT05   3668   3722#
VERT20   3694   3717   3750#
VERT90   3760#
VERTAG   3660#  4449
VTOCIA   3677   3683#
VTSP2C   3679   3685#
VTST2C   3681   3687#
WAIT     842#   1813   1905
WAIT0    845#   847
WAIT1    846#   846
WRACC    812#   1028   1798   1803   1809   1822   1902   1945
WREPRM   1783#  2178   2263
WRKBUF   299#   2522   2537   2546   2557   2566
WRPRM1   159#   2260
WRTPRM   2165   2178#
```

CROSS REFERENCE COMPLETE

ISIS-II MCS-48/UPI-41 MACRO ASSEMBLER, V4.2
TEC 750SL BY RANDY ELLIOTT 7-23-87 07:00

LOC  OBJ       LINE       SOURCE STATEMENT                                   SPR 011 P2

```
                 1 ;****************************************************************
                 2 ; FILE: TECSL1.SRC  07-20-87  19:00  RANDY ELLIOTT
                 3 ;         MODIFIED 3-28-87 FOR 750SL TEC MODIFICATION BY RANDY ELLIOTT
                 4 ;         MODIFIED 7-20-87 FOR 750SL TEC MODIFICATION BY RANDY ELLIOTT
                 5 ; FIRMWARE FOR THE GAMMA SCANNER
                 6 ; WILL READ UPC-A,E,D AND EAN/JAN8,13
                 7 ;
                 8 ; S-P PART NUMBER R96-0130  (FIRST 4K OF EPROM FOR 8K PROGRAM)
                 9 ; EPROM PART NUMBER 0438-0800
                10 ;****************************************************************
                11 $      INCLUDE(:F3:HISTRY.SRC)
          =     12 ;****************************************************************
          =     13 ; FILE: HISTRY.SRC  02-18-87  08:30  BOB ACTIS
          =     14 ;
          =     15 ; IVRD53 - 750F IG DEMO, SP-OC, VERSION D3 W/ 2ND CHECK    MAY 1983
          =     16 ;
          =     17 ; FVRD53 - 750F FT DEMO, SP-OC, VERSION D3 W/ 2ND CHECK    OCT 1983
          =     18 ;
          =     19 ; FTLR53 - 750F, TWO LABEL READ, JAN13-JAN13 OR JAN13-JAN-8 MAR 1986
          =     20 ;
          =     21 ; G2L053 - 750SL, TWO LABEL READ, AS ABOVE                 FEB 1987
          =     22 ;
          =     23 ; TEC093 - 750SL TEC VERSION, TWO LABEL READ WITH EEPROM   APR 1987
          =     24 ;
          =     25 ; TEC193 - 750SL TEC VERSION, VERSION D WITH EEPROM        APR 1987
          =     26 ;****************************************************************
                27 $      INCLUDE(:F4:FTDEFS.SRC)
          =     28 ;****************************************************************
          =     29 ; FILE: FTDEFS.SRC  09-11-86  08:40  BOB ACTIS
          =     30 ; MODIFIED 3-21-87 18:00 BY RANDY ELLIOTT FOR 750SL TEC SCANNER
          =     31 ; MODIFIED 7-17-87 10:40 BY RANDY ELLIOTT FOR 750SL TEC SCANNER
          =     32 ;        -CHANGE TO DELETE EAN13-EAN8 TWO LABEL READS
          =     33 ;        -PROGRAM EEPROM VIA ENCODED UPC A CODE
          =     34 ; *** SYSTEM DEFINITION ***
          =     35 ;
          =     36 ; PORT 1 DEFINITION:
          =     37 ;
0001      =     38 ETEST   EQU    00000001B      ;P10-O-ENABLE TEST MODE
0002      =     39 ETMARK  EQU    00000010B      ;P11-O-TEST MARK
0002      =     40 EMTREB  EQU    00000010B      ;P11-O-ENABLE MOTOR
0004      =     41 EPRMDI  EQU    00000100B      ;P12-O-EEPROM IN OUTPUT
```

```
0008        =  42 EPRMSK   EQU     00001000B       ;P13-O-EEPROM_SK OUTPUT
0010        =  43 ELASDB   EQU     00010000B       ;P14-O-DISABLE LASER
0020        =  44 EGDLT    EQU     00100000B       ;P15-O-ENABLE GOOD LIGHT
0040        =  45 EBDLT    EQU     01000000B       ;P16-O-ENABLE BAD LIGHT
0080        =  46 ETONE    EQU     10000000B       ;P17-O-TONE BIT (AC COUPLED)
            =  47 ;
            =  48 ;    PORT 2 DEFINITION:
            =  49 ;
0010        =  50 ESENT    EQU     00010000B       ;P24-I-VLSI DATA SENT* SIGNAL
0020        =  51 EUP2SP   EQU     00100000B       ;P25-I-MOTOR UP2SPD SIGNAL
0040        =  52 EVLSIR   EQU     01000000B       ;P26-O-VLSI POWER RESET*
0080        =  53 EPRMCS   EQU     10000000B       ;P27-O-EEPROM_CS OUTPUT
            =  54 ;
            =  55 ;***********************************************************
            =  56 ;   FRAME CONTROL ARRAY:
            =  57 ;
            =  58 ;       EXTERNAL MEMORY ADDRESSES
            =  59 ;
0000        =  60 EPARRD   EQU     00H             ;R - PARITY BYTE
0001        =  61 ESRRD    EQU     01H             ;R - SEGMENT REGISTER
0001        =  62 EFRRST   EQU     01H             ;W - FRAME RESET (CLEARS SEGMENT)
0002        =  63 EOCIA    EQU     02H             ;R/W - OCIA REGISTERS
0003        =  64 EFCRST   EQU     03H             ;W - RESET FCA
0004        =  65 EPRDEC   EQU     04H             ;R - DECODED PARITY BYTE
0008        =  66 SWLATC   EQU     08H             ;R - DIP SWITCH LATCH
            =  67 ;
            =  68 ;DIPSWITCH DEFINITION
            =  69 ;       DIPSW1-DIPSW2           VOLUME CONTROL
            =  70 ;       DIPSW3                  INTERNAL/EXTERNAL SPEAKER
            =  71 ;       DIPSW4          B0      TONE CONTROL
            =  72 ;       DIPSW5          B1      TONE CONTROL
            =  73 ;       DIPSW6          B6      SPARE
            =  74 ;       DIPSW7          B2      TWO SCAN
            =  75 ;       DIPSW8          B3      TWO SCAN
            =  76 ;       DIPSW9          B5      EEPROM PROGRAM ENABLE VIA UPC CODE
            =  77 ;       DIPSW10         B4      VERSION D/2-SCAN*
            =  78 ;       JUMPER          B7      SPARE
            =  79 ;
            =  80 ;   PARITY DECODE BYTE
            =  81 ;
000F        =  82 EDECOD   EQU     00001111B       ;0-9 IS DECODED DIGIT
000A        =  83 EDEC8L   EQU     00001010B       ;A IS 8L
000B        =  84 EDEC8R   EQU     00001011B       ;B IS 8R
000C        =  85 EDECAL   EQU     00001100B       ;C IS AL
000D        =  86 EDECAR   EQU     00001101B       ;D IS AR
000E        =  87 EDECBE   EQU     00001110B       ;E IS NOT USED
000F        =  88 EDECBF   EQU     00001111B       ;F IS "NO DECODE" (ERROR)
0010        =  89 EDECE    EQU     00010000B       ;E-TAG
0020        =  90 EDECD    EQU     00100000B       ;D-TAG
0040        =  91 EDECBK   EQU     01000000B       ;BACKWARD CAPTURE
0080        =  92 EDECB7   EQU     10000000B       ;NOT USED. ALWAYS=1.
            =  93 ;
            =  94 ;   SHIFT REGISTER READ
            =  95 ;
000F        =  96 ESRCHR   EQU     00001111B       ;BCD CHARACTER
0010        =  97 ESR4CH   EQU     00010000B       ;4-CHAR CAPTURE
0020        =  98 ESRF13   EQU     00100000B       ;FRAME 1 OR 3 CAPTURE
0040        =  99 ESRPER   EQU     01000000B       ;PERIODICAL CAPTURE
0080        = 100 ESRSDT   EQU     10000000B       ;SDATA BYTE AVAILABLE
            = 101 ;***********************************************************
            = 102 ;   FLAG REGISTERS:
            = 103 ;
            = 104 ;       RB0-R4  SCAN FLAGS
            = 105 ;
0001        = 106 ESCNG    EQU     00000001B       ;SCANNING (FLAG CKFCA TO GET SEGMENTS)
0002        = 107 ER4B1    EQU     00000010B       ;NOT USED
0004        = 108 EAMBMS   EQU     00000100B       ;NOT USED
0008        = 109 ESBFUL   EQU     00001000B       ;SEND BUFFER HAS DATA TO SEND
0010        = 110 ER4B4    EQU     00010000B       ;NOT USED
0020        = 111 EBFREQ   EQU     00100000B       ;BUFMAN REQUEST FLAG
0040        = 112 ER4B6    EQU     01000000B       ;NOT USED
0080        = 113 ER4B7    EQU     10000000B       ;TWO LABEL ERROR FLAG
            = 114 ;
            = 115 ;   RB0-R6  VERSION POINTER/FLAG
            = 116 ;
0000        = 117 EVER00   EQU     00H             ;NO VALID VERSIONS
0001        = 118 EVERA    EQU     01H             ;UPC-A
0002        = 119 EVER13   EQU     02H             ;EAN-13
0003        = 120 EVERE    EQU     03H             ;UPC-E
0004        = 121 EVER8    EQU     04H             ;EAN-8
0005        = 122 EVERD1   EQU     05H             ;UPC-D1
0006        = 123 EVERD2   EQU     06H             ;UPC-D2
0007        = 124 EVERD3   EQU     07H             ;UPC-D3
0008        = 125 EVERD4   EQU     08H             ;UPC-D4
0009        = 126 EVERD5   EQU     09H             ;UPC-D5
            = 127 ;
0010        = 128 ER6B4    EQU     00010000B       ;FLAG COUNTER (B0-TWO LABEL)
0020        = 129 ER6B5    EQU     00100000B       ;FLAG COUNTER (B1-TWO LABEL)
0040        = 130 ER6B6    EQU     01000000B       ;FLAG COUNTER (B2-TWO LABEL)
0080        = 131 ER6B7    EQU     10000000B       ;NOT USED
            = 132 ;
```

```
              = 133 ;EEPROM OP CODES
0080          = 134 OPREAD   EQU     80H             ;READ REGISTER
0030          = 135 EWEN     EQU     30H             ;ERASE/WRITE ENABLE
0020          = 136 ERAL     EQU     20H             ;ERASE ALL
0040          = 137 OWRITE   EQU     40H             ;WRITE REGISTER
0000          = 138 EWDS     EQU     00H             ;ERASE/WRITE DISABLE
00C0          = 139 ERASE    EQU     0C0H            ;EEPROM PROGRAM ENABLE VIA UPC CODE
              = 140 ;***************************************************************
              = 141 ; TIMER CONSTANTS:
              = 142 ;
0032          = 143 E1000M   EQU     50              ;1.00 SEC (1000 MILLISECONDS)
              = 144 ;
0004          = 145 EGDTON   EQU     4               ;GOOD TONE ON TIME
0014          = 146 EBDTON   EQU     20              ;BAD TONE ON TIME
              = 147 ;
0028          = 148 ETONCT   EQU     40              ;TONE COUNT (CYCLES/20MS)
FFFA          = 149 ETONFQ   EQU     -6              ;TONE FREQUENCY CONSTANT (500US)
              = 150 ;
              = 151 ; SP-OC INTERFACE CONSTANTS
00C2          = 152 EAMESD   EQU     0C2H            ;DISABLE AMB LABEL MESS (LAST CHAR B)
00C1          = 153 EAMESE   EQU     0C1H            ;ENABLE AMB LABEL MESS (LAST CHAR A)
0045          = 154 ESEN     EQU     045H            ;SCAN ENABLE CHAR (LAST CHAR E)
00C4          = 155 ESDIS    EQU     0C4H            ;SCAN DISABLE CHAR (LAST CHAR D)
0040          = 156 EBIT6    EQU     01000000B       ;LAST CHAR BIT FOR HOST DATA, SP-OC I/F
00C7          = 157 WRPRM1   EQU     0C7H            ;WRITE 'TWO LABEL' SETTINGS TO EEPROM ('G')
00C8          = 158 TRPRM1   EQU     0C8H            ;READ EEPROM 'TWO LABEL' SETTINGS ('H')
00CB          = 159 SWSET1   EQU     0CBH            ;READ CURRENT SCANNER CONFIGURATION FROM RAM ('K')
008C          = 160 OVRST1   EQU     08CH            ;OVERIDE SCANNER SETTINGS ('L')
0089          = 161 STRAM1   EQU     089H            ;WRITE 'TWO LABEL' SETTINGS TO RAM ('I')
004A          = 162 TRPRM2   EQU     04AH            ;READ 'TWO LABEL' SETTINGS FROM RAM ('J')
              = 163 ;
              = 164 ;
              = 165 ; COMMUNICATIONS ROUTINE CONSTANTS
00BB          = 166 EAMBBY   EQU     0BBH            ;AMBIGUOUS READ BYTE FOR SEND BUFFER
00CC          = 167 ETRMBY   EQU     0CCH            ;TERMINATION BYTE FOR SEND BUFFER
              = 168 ;
              = 169 ;AMBIGUITY (2 LABEL PROGRAM) CONSTANTS)
              = 170
              = 171
              = 172 ; FLATTOP TIME CONSTANTS
0008          = 173 EWAIT    EQU     8               ;VALUE FOR "NO SEGS" WAIT
002A          = 174 EGDLTW   EQU     50-EWAIT        ;GD-LT ON WAIT CONSTANT
0016          = 175 EDRDLY   EQU     30-EWAIT        ;DOUBLE READ WAIT CONSTANT
0001          = 176 FACTOR   EQU     1               ;TIMER FACTOR (FOR 10/20 MS DIFFERENCES BETWEEN SOFTWARES)
              = 177 ;
              = 178 ; RAM POINTERS AND CONSTANTS USED IN THE HORSE TEST
0030          = 179 TSEG1    EQU     30H             ;SEGMENT BUFFER
0034          = 180 TSEG2    EQU     34H
0038          = 181 TCNT1    EQU     38H             ;SEGMENT COUNTER
003A          = 182 TCNT2    EQU     3AH
0050          = 183 TSCBUF   EQU     50H             ;FCA READ BUFFER
0001          = 184 EHCNTL   EQU     001H            ;HORSE CONTROL BYTE
              = 185 ;TONE CONSTANTS
0014          = 186 ETNCT1   EQU     014H            ;CYCLE COUNT FOR 500HZ
001E          = 187 ETNCT2   EQU     01EH            ;CYCLE COUNT FOR 730HZ
0028          = 188 ETNCT3   EQU     028H            ;CYCLE COUNT FOR 960HZ
0038          = 189 ETNCT4   EQU     038H            ;CYCLE COUNT FOR 1370HZ
00F4          = 190 ETNFQ1   EQU     0F4H            ;FREQUENCY FOR 500HZ
00F8          = 191 ETNFQ2   EQU     0F8H            ;FREQUENCY FOR 730HZ
00FA          = 192 ETNFQ3   EQU     0FAH            ;FREQUENCY FOR 960HZ
00FC          = 193 ETNFQ4   EQU     0FCH            ;FREQUENCY FOR 1370HZ
              = 194 ;***************************************************************
              = 195 ; DATA MEMORY MAP - RAM - 8039 NEEDED
              = 196 ;
              = 197 ;     REGISTER BANK 0  (NON-INTERRUPT USEAGE)
0000          = 198        ORG       000H
0000          = 199 MRB0:   DS        4               ;R0 TO R3 - SCRATCH
0004          = 200 SCNFLG: DS        1               ;R4 - SCAN FLAGS
0005          = 201 DRTIMR: DS        1               ;R5 - DOUBLE READ TIMER
0006          = 202 VERFLG: DS        1               ;R6 - VERSION POINTER/FLAG
0007          = 203 TIMREG: DS        1               ;R7 - GENERAL PURPOSE TIMER/COUNTER
              = 204 ;
              = 205 ;     STACK AREA
0008          = 206 STACK:  DS        16              ;8 LEVELS OF SUBROUTINES ALLOWED
              = 207 ;
              = 208 ;     REGISTER BANK 1  (INTERRUPT USEAGE)
0018          = 209 MRB1:   DS        4               ;R0 TO R3 - SCRATCH (NOT USED)
001C          = 210 MRB1R4: DS        1               ;R4 - NOT USED
001D          = 211 TONCNT: DS        1               ;R5 - TONE CYCLE COUNTER (CYCLES/20MS)
001E          = 212 TONLTH: DS        1               ;R6 - TONE LENGTH COUNTER
001F          = 213 TASAVE: DS        1               ;R7 - TIMER "A" SAVE REGISTER
              = 214 ;
              = 215 ;     FREE MEMORY AREA
              = 216 ;
              = 217 ;     SEGMENT BUFFERS
0020          = 218 RCRAM   EQU       $
0020          = 219 SEGBUF  EQU       $
0020          = 220 SCNBUF: DS        4               ;SCAN BUFFER
              = 221 ;
0024          = 222 BF6CST  EQU       $
```

```
0024         = 223 L6S1:   DS    4              ;SCAN 1 BUFFER
0028         = 224 L6S2:   DS    4              ;SCAN 2 BUFFER
002C         = 225 L6SCNT: DS    1              ;PACKED SCAN COUNTER (SCAN2/SCAN1)
002D         = 226 L6STOT: DS    1              ;TOTAL COUNTER
             = 227 ;
002E         = 228 R6S1:   DS    3
0031         = 229 R6S2:   DS    3
0034         = 230 R6SCNT: DS    1
0035         = 231 R6STOT: DS    1
0012         = 232 BF6CNT  EQU   $-BF6CST
             = 233 ;
0036         = 234 BF4CST  EQU   $
0036         = 235 L4S1:   DS    2
0038         = 236 L4S2:   DS    2
003A         = 237 L4SCNT: DS    1
003B         = 238 L4STOT: DS    1
             = 239 ;
003C         = 240 R4S1:   DS    2
003E         = 241 R4S2:   DS    2
0040         = 242 R4SCNT: DS    1
0041         = 243 R4STOT: DS    1
             = 244 ;
0042         = 245 N1S1:   DS    2
0044         = 246 N1S2:   DS    2
0046         = 247 N1SCNT: DS    1
0047         = 248 N1STOT: DS    1
             = 249 ;
0048         = 250 N2S1:   DS    2
004A         = 251 N2S2:   DS    2
004C         = 252 N2SCNT: DS    1
004D         = 253 N2STOT: DS    1
             = 254 ;
004E         = 255 N3S1:   DS    2
0050         = 256 N3S2:   DS    2
0052         = 257 N3SCNT: DS    1
0053         = 258 N3STOT: DS    1
             = 259 ;
0054         = 260 N4S1:   DS    2
0056         = 261 N4S2:   DS    2
0058         = 262 N4SCNT: DS    1
0059         = 263 N4STOT: DS    1
             = 264 ;
005A         = 265 N5S1:   DS    2
005C         = 266 N5S2:   DS    2
005E         = 267 N5SCNT: DS    1
005F         = 268 N5STOT: DS    1
             = 269 ;
0060         = 270 N6S1:   DS    2
0062         = 271 N6S2:   DS    2
0064         = 272 N6SCNT: DS    1
0065         = 273 N6STOT: DS    1
0030         = 274 BF4CNT  EQU   $-BF4CST
             = 275 ;
             = 276 ;       SEND BUFFER
0066         = 277 SBFPNT: DS    1              ;POINTER
             = 278 ;
0067         = 279 TWOLAB  EQU   $              ;16 BYTES FOR RAM TO EEPROM
0067         = 280 SBUFAD  EQU   $              ;FIRST DATA BYTE ADDRESS
0067         = 281 SBUF:   DS    18             ;DATA BUFFER
00CE         = 282 SBSTRT  EQU   2*SBUF         ;PACKED BUFFER START POINTER
0012         = 283 SBUFSZ  EQU   $-SBUF         ;BYTES IN SEND BUFFER
0078         = 284 SBFEND  EQU   $-1            ;LAST RAM LOCATION IN BUFFER
             = 285 ;
             = 286 ; WORK AREA USED BY EMOD10 ROUTINE
0079         = 287 WRKBUF: DS    3
             = 288 ;
             = 289 ; DOUBLE READ LABEL DATA SUM LOCATION
007C         = 290 DRSUM:  DS    1
             = 291 ;
             = 292 ; SCANNER CONFIGURATION STORAGE
007D         = 293 SWISET: DS    1              ;SWITCH SETTINGS
007E         = 294 STSDTA: DS    1              ;COMMAND BYTE
007F         = 295 INTSTR: DS    1              ;SCRATCH PAD STORAGE FOR R1 (TIMER INTERUPT)
             = 296 ;
007F         = 297 LSTUSD  EQU   $-1            ;LAST USED RAM LOCATION
             = 298 ; FVECTR.SRC INCLUDES FTIMER.SRC
             = 299 $       INCLUDE(:F3:FVECTR.SRC)
             = 300 ;****************************************************************
             = 301 ;  FILE: FVECTR.SRC  11-18-86 12:00  BOB ACTIS
             = 302 ;
             = 303 ;  RESET AND INTERRUPT VECTORS
             = 304 ;
0000         = 305         ORG   000H           ;RESET TRAP
0000 E5      = 306 RSTTRP: SEL   MB0
0001 64A4    = 307         JMP   POWUP          ;GO START PROGRAM
             = 308 ;
0003         = 309         ORG   003H           ;EXTERNAL INTERRUPT TRAP
0003 93      = 310 INTTRP: RETR                 ;RETURN FROM SPURIOUS INTERRUPTS
             = 311 ;
0007         = 312         ORG   007H           ;INTERNAL TIMER INTERRUPT TRAP
0007         = 313 TIMTRP  EQU   $              ;GO TO TIMER ROUTINE
```

```
                   = 314 $       INCLUDE(:F3:FTIMER.SRC)
                   1= 315 ;***********************************************************
                   1= 316 ; FILE:  FTIMER.SRC  03-15-87 24:00  RANDY ELLIOTT  (TEC MOD.)
                   1= 317 ; FUNCTION: IF NO TONE IN PROGRESS, DECREMENT RB0-R7 UNTIL 0.
                   1= 318 ;           IF TONE IN PROGRESS, DECREMENT RB1-R6 UNTIL 0.
                   1= 319 ; ENTRY:  RB1-R6 = TONE LENGTH IN 10'S OF MS.
                   1= 320 ;         RB0-R5 = DOUBLE READ TIMER COUNTER
                   1= 321 ;         RB0-R7 = GENERAL PURPOSE TIMER COUNTER
                   1= 322 ; EXIT:   RB1-R7 = ACCUMULATOR SAVE
                   1= 323 ;         RB1-R5 = TONE CYCLE COUNTER
                   1= 324 ;         RB1-R6 = DECREMENTED UNTIL 0
                   1= 325 ;         RB0-R5 = DECREMENTED UNTIL 0
                   1= 326 ;         RB0-R7 = DECREMENTED UNTIL 0
0007 D5            1= 327 TIMER:  SEL     RB1
0008 AF            1= 328         MOV     R7,A                ;SAVE A
                   1= 329 ;SAVE R1 IN RAM SO AS TO RESTORE WHEN EXITING INTERUPT.
0009 F9            1= 330         MOV     A,R1
000A B97F          1= 331         MOV     R1,#INTSTR          ;SET RAM POINTER
000C A1            1= 332         MOV     @R1,A               ;SAVE R1 (RB1)
                   1= 333 ;
000D FE            1= 334         MOV     A,R6                ;GET TONE COUNTER
000E 9623          1= 335         JNZ     TIME30              ;JUMP IF TONE IN PROGRESS
0010 C5            1= 336         SEL     RB0
0011 FF            1= 337         MOV     A,R7
0012 C615          1= 338         JZ      TIME05              ;JUMP IF TIMER COUNTER IS 0
0014 CF            1= 339         DEC     R7
0015 FD            1= 340 TIME05: MOV     A,R5
0016 C619          1= 341         JZ      TIME10              ;JUMP IF DOUBLE READ TIMER IS 0
0018 CD            1= 342         DEC     R5
0019 2306          1= 343 TIME10: MOV     A,#-(250/FACTOR)    ;10MS/80US = 125
001B 62            1= 344 TIME20: MOV     T,A                 ;SET TIMER COUNTER
001C D5            1= 345         SEL     RB1
                   1= 346 ;RESTORE ACCUMULATOR AND R1 (RB1) BEFORE RETURNING.
001D B97F          1= 347         MOV     R1,#INTSTR          ;SET RAM POINTER
001F F1            1= 348         MOV     A,@R1               ;RETRIEVE R1 (RB1) FROM RAM
0020 A9            1= 349         MOV     R1,A                ;RESTORE R1
0021 FF            1= 350         MOV     A,R7                ;RESTORE A
0022 93            1= 351         RETR
0023 09            1= 352 TIME30: IN      A,P1                ;GET TONE BIT
0024 997F          1= 353         ANL     P1,#255-ETONE       ;SET TONE BIT LOW
0026 F22A          1= 354         JB7     TIME40              ;JUMP IF TONE BIT WAS HIGH
0028 8980          1= 355         ORL     P1,#ETONE           ;SET TONE BIT HIGH
                   1= 356 TIME40:
002A ED3A          1= 357         DJNZ    R5,TIME60           ;JUMP IF NOT 10MS YET
                   1= 358 ;SET TONE CYCLE COUNTER ACCORDING TO RAM (SWITCH SETTINGS)
002C B46C          1= 359         CALL    TON1CT              ;SET TONE CYCLE COUNTER (R5)
                   1= 360 ;
002E C5            1= 361         SEL     RB0
002F FF            1= 362         MOV     A,R7
0030 C633          1= 363         JZ      TIME50
0032 CF            1= 364         DEC     R7
0033 D5            1= 365 TIME50: SEL     RB1
0034 EE3A          1= 366         DJNZ    R6,TIME60           ;JUMP IF TONE NOT FINISHED
0036 8980          1= 367         ORL     P1,#ETONE           ;LEAVE TONE LINE HIGH
0038 0419          1= 368         JMP     TIME10
                   1= 369 TIME60:
                   1= 370 ;SET TONE FREQUENCY CONSTANT ACCORDING TO SWITCH SETTING
003A B97D          1= 371         MOV     R1,#SWISET          ;SET RAM POINTER
003C F1            1= 372         MOV     A,@R1               ;RETRIEVE SWITCH SETTING
003D 5303          1= 373         ANL     A,#03H              ;MASK ALL BUT TONE BITS
003F 0344          1= 374         ADD     A,#LOW FREQAD       ;SET EPROM ADDRESS FETCH
0041 A3            1= 375         MOVP    A,@A                ;GET TONE FREQUENCY
0042 041B          1= 376         JMP     TIME20
                   1= 377 ;
0044               1= 378 FREQAD  EQU     $
0044 F4            1= 379         DB      ETNFQ1              ;TONE FREQUENCY FOR 500HZ
0045 F8            1= 380         DB      ETNFQ2              ;TONE FREQUENCY FOR 730HZ
0046 FA            1= 381         DB      ETNFQ3              ;TONE FREQUENCY FOR 960HZ
0047 FC            1= 382         DB      ETNFQ4              ;TONE FREQUENCY FOR 1370HZ
                   1= 383 ;
                     384 $       INCLUDE(:F3:CK4HRS.SRC)
                   = 385 ;***********************************************************
                   = 386 ; FILE:  CK4HRS.SRC  7-07-86 15:05  BOB ACTIS
                   = 387 ; FUNCTION: CHECK SDATA FOR THE HORSE CONTROL BYTE
                   = 388 ; ENTRY: NO SETUP
                   = 389 ; EXIT:  USES R0,A
                   = 390 ;        GOES INTO HORSE TEST IF CONTROL BYTE IS RECEIVED
                   = 391 ;
0048 864B          = 392 CK4HRS: JNI     CK4H20              ;JUMP IF FCA HAS DATA
004A 83            = 393 CK4H10: RET
                   = 394 ;
004B B801          = 395 CK4H20: MOV     R0,#ESRRD
004D 80            = 396         MOVX    A,@R0               ;READ BYTE
004E F252          = 397         JB7     CK4H30              ;JUMP IF SDATA
0050 90            = 398         MOVX    @R0,A               ;RESET FRAME CAPTURE
0051 83            = 399         RET
                   = 400 ;
0052 B802          = 401 CK4H30: MOV     R0,#EOCIA
0054 80            = 402         MOVX    A,@R0               ;GET SDATA
0055 D3D1          = 403         XRL     A,#EHCNTL
0057 964A          = 404         JNZ     CK4H10              ;JUMP IF NOT HORSE CONTROL BYTE
```

```
0059 842C      = 405          JMP     SDATAH          ;GO ENTER THE HORSE TEST
               = 406 $        INCLUDE(:F3:TREPRM.SRC)
               = 407 ;**********************************************************************
               = 408 ;**                    Subroutine TREPRM                              **
               = 409 ;** Function: Transmit EEPROM contents to Host or transmit Ram contents **
               = 410 ;** Date: 3-4-87                                                      **
               = 411 ;** Subroutines Called: RDEPRM, SOCIA, PARITY                         **
               = 412 ;** Registers/Flags affected: *R2, ACCUMULATOR, R0, F0, CARRY, R1, R2, R3,*R1* **
               = 413 ;** Ports affected: P2, P1                                            **
               = 414 ;** RAM locations affected: EXT. RAM EOCIA(VLSI), @*R1 TO @*R1+16     **
               = 415 ;**********************************************************************
               = 416 TREPRM:
               = 417 ;READ EEPROM TO SCRATCH PAD RAM (16 BYTES PACKED)
               = 418          ;SET RAM POINTER TO TRANSFER EEPROM DATA TO.
005B D5        = 419          SEL     RB1             ;SELECT REGISTER BANK 1
005C F9        = 420          MOV     A,R1            ;RETRIEVE RAM POINTER FROM *R1
005D C5        = 421          SEL     RB0             ;SELECT REGISTER BANK 0
005E A9        = 422          MOV     R1,A            ;SET RAM POINTER
               = 423 ;
005F 5480      = 424          CALL    RDEPRM          ;TRANSFER EEPROM DATA TO RAM.
               = 425 ;CHECK THAT EEPROM HAS BEEN PROGRAMMED. ;SET UP HEADER CHARACTER.
               = 426          ;SET RAM POINTER TO TRANSFER EEPROM DATA TO.
               = 427 TRRAM:
0061 D5        = 428          SEL     RB1             ;SELECT REGISTER BANK 1
0062 F9        = 429          MOV     A,R1            ;RETRIEVE RAM POINTER FROM *R1
0063 C5        = 430          SEL     RB0             ;SELECT REGISTER BANK 0
0064 A9        = 431          MOV     R1,A            ;SET RAM POINTER
               = 432 ;
0065 F1        = 433          MOV     A,@R1           ;READ RAM
0066 37        = 434          CPL     A
0067 966F      = 435          JNZ     PDATA           ;IF NOT ZERO, WE HAVE DATA IN RAM. JUMP SEND DATA.
               = 436 ;NO DATA IS IN EEPROM. SEND HEADER CHARACTER WITH LAST BYTE BIT SET HIGH.
0069 23C7      = 437          MOV     A,#0C7H         ;HEADER CHAR. 'G' WITH LAST BYTE BIT SET.
006B 34EB      = 438          CALL    SOCIA           ;TRANSFER ACCUMULATOR TO VLSI CHIP OCIA BUFFER.
006D 04A8      = 439          JMP     TXRET           ;JUMP TO RETURN. EXIT ROUTINE.
               = 440 ;LABEL FLAGS ARE IN RAM. SEND HEADER CHARACTER.
006F 2307      = 441 PDATA:   MOV     A,#07H          ;HEADER CHAR. 'G'
0071 34EB      = 442          CALL    SOCIA           ;TRANSFER ACCUMULATOR TO VLSI CHIP OCIA BUFFER.
               = 443 ;
               = 444 ;BEGIN UNPACKING RAM DATA AND SEND OVER OCIA.
               = 445 ;SET RAM POINTER TO TRANSFER EEPROM DATA TO.
               = 446 UNPACK:
0073 D5        = 447          SEL     RB1             ;SELECT REGISTER BANK 1
0074 F9        = 448          MOV     A,R1            ;RETRIEVE RAM POINTER FROM *R1
0075 C5        = 449          SEL     RB0             ;SELECT REGISTER BANK 0
0076 A9        = 450          MOV     R1,A            ;SET RAM POINTER
               = 451 ;
               = 452 UNPAK1:
0077 F1        = 453          MOV     A,@R1           ;RETRIEVE ONE BYTE FROM RAM
0078 530F      = 454          ANL     A,#0FH          ;MASK MS DIGIT OFF.
007A 4330      = 455          ORL     A,#30H          ;CONVERT LS DIGIT TO ASCII.
007C A8        = 456          MOV     R0,A            ;STORE LS DIGIT IN R0.
007D F1        = 457          MOV     A,@R1           ;RETRIEVE SAME BYTE AGAIN TO GET MS DIGIT.
007E 47        = 458          SWAP    A               ;SWAP NIBBLES AROUND
007F 530F      = 459          ANL     A,#0FH          ;MASK LS DIGIT OFF.
0081 4330      = 460          ORL     A,#30H          ;CONVERT MS DIGIT TO ASCII.
0083 AA        = 461          MOV     R2,A            ;SAVE MS DIGIT IN R2.
               = 462 ;LOOK AT NEXT BYTE IN RAM TO CHECK FOR LAST BYTE.
0084 19        = 463          INC     R1              ;INCREMENT RAM POINTER
0085 F1        = 464          MOV     A,@R1           ;RETRIEVE NEXT BYTE
0086 37        = 465          CPL     A
0087 C69F      = 466          JZ      LSTBYT          ;IF ZERO, PREVIOUS RAM LOCATION HAD LAST BYTE.
               = 467 ;CHECK RAM POINTER IN THAT IT DOES NOT EXCEED 16. (16 BYTES TRANSMITTED)
0089 D5        = 468          SEL     RB1
008A F9        = 469          MOV     A,R1            ;SET RAM POINTER TO FIRST BYTE OF DATA
008B C5        = 470          SEL     RB0
008C 37        = 471          CPL     A               ;SUBTRACT BEGINNING OF RAM TO PRESENT POINTER
008D 69        = 472          ADD     A,R1
008E 17        = 473          INC     A               ;RESULT OF SUBTRACTION IN ACCUMULATOR
008F D310      = 474          XRL     A,#16D          ;CHECK FOR 16.
0091 C69F      = 475          JZ      LSTBYT          ;IF ZERO, PREVIOUS RAM LOCATION HAD LAST BYTE.
               = 476 ;MORE DATA TO SEND. NOT 17TH BYTE NOR IS NEXT BYTE LAST BYTE.
0093 FA        = 477          MOV     A,R2            ;GET MS BYTE TO SEND
0094 3490      = 478          CALL    PARITY          ;CALCULATE PARITY
0096 34EB      = 479          CALL    SOCIA           ;SEND MS BYTE TO HOST
0098 F8        = 480          MOV     A,R0            ;GET LS BYTE TO SEND
0099 3490      = 481          CALL    PARITY          ;CALCULATE PARITY
009B 34EB      = 482          CALL    SOCIA           ;SEND LS BYTE TO HOST
               = 483 ;MORE DATA TO RETRIEVE, LOOP BACK.
009D 0477      = 484          JMP     UNPAK1
               = 485 ;
               = 486 ;LAST BYTE COMMING UP. SEND MS BYTE AND LS BYTE WITH LAST BYTE BIT SET.
009F FA        = 487 LSTBYT:  MOV     A,R2            ;GET MS BYTE.
00A0 3490      = 488          CALL    PARITY          ;CALCULATE PARITY
00A2 34EB      = 489          CALL    SOCIA           ;SEND MS BYTE TO HOST
00A4 F8        = 490          MOV     A,R0            ;GET LS BYTE.
00A5 4340      = 491          ORL     A,#40H          ;SET LAST BYTE BIT
00A7 3490      = 492          CALL    PARITY          ;CALCULATE PARITY
00A9 34EB      = 493          CALL    SOCIA           ;SEND LS BYTE WITH LAST BYTE BIT SET.
               = 494 ;
               = 495 ;ALL DONE. RETURN TO MAIN ROUTINE.
00AB 83        = 496 TXRET:   RET
```

```
              497 ;****************************************
00AC A3       498 TROPG0:  MOVP    A,@A
00AD 83       499          RET
0100          500          ORG     100H
              501 $   INCLUDE(:F3:TROMSM.SRC)
            = 502 ;
            = 503 ; ROUTINE: TROMSM   11-22-82 10:15  BOB ACTIS
            = 504 ;
            = 505 ; FUNCTION - SUM ALL BYTES IN BOTH MEMORY BANKS
            = 506 ;           ASSUMES THAT EACH OF THE SIXTEEN PAGES CONTAINS THE
            = 507 ;           SEQUENCE "TROPGX: MOVP A,@A ; RET" FOR PAGE X.
            = 508 ;
0100 B908   = 509 TROMSM: MOV     R1,#STACK+3     ; R1 POINTS TO SECOND STACK ENTRY
            = 510 ;
            = 511 ; DO SIXTEEN PAGES WITH 256 BYTES PER PAGE
            = 512 ;
0102 27     = 513         CLR     A
0103 A1     = 514         MOV     @R1,A           ; STACK+3 = PAGE 0 TO START
0104 AA     = 515         MOV     R2,A            ; R2 = BYTE ADDRESS
0105 BB10   = 516         MOV     R3,#16          ; R3 = PAGES TO DO
0107 A8     = 517         MOV     R0,A            ; R0 = SUM OF BYTES
0108 D7     = 518         MOV     PSW,A           ; INSURE STACK IS EMPTY
            = 519 ;
            = 520 ; PUT PAGE ACCESS ADDRESS IN STACK
            = 521 ;
0109 F1     = 522 TRO10:  MOV     A,@R1
010A 0321   = 523         ADD     A,#LOW TROTAB
010C A3     = 524         MOVP    A,@A
010D C9     = 525         DEC     R1
010E A1     = 526         MOV     @R1,A
010F 19     = 527         INC     R1
            = 528 ;
            = 529 ; DO A PAGE
            = 530 ;
0110 341C   = 531 TRO20:  CALL    TRO50           ; FETCH BYTE
0112 68     = 532         ADD     A,R0            ; ADD TO SUM
0113 A8     = 533         MOV     R0,A
0114 EA10   = 534         DJNZ    R2,TRO20        ; JMP = NOT DONE WITH PAGE
0116 11     = 535         INC     @R1             ; PAGE NUMBER INCREMENTED
0117 E309   = 536         DJNZ    R3,TRO10        ; JMP = NOT THRU WITH PAGES
0119 17     = 537         INC     A               ; (A) = ZERO FOR CORRECT SUM
011A 6453   = 538         JMP     TRORET
            = 539 ;
            = 540 ; LINK TO EACH PAGE
            = 541 ;
011C 2302   = 542 TRO50:  MOV     A,#02
011E D7     = 543         MOV     PSW,A           ; SET STACK POINTER AHEAD
011F FA     = 544         MOV     A,R2            ; A = ADDRESS OF BYTE TO FETCH
0120 83     = 545         RET                     ; JMP TO SELECTED PAGE
            = 546 ;
            = 547 ; TABLE FOR ADDRESS OF FETCH ROUTINE IN EACH PAGE
            = 548 ;
0121 AC     = 549 TROTAB: DB      LOW TROPG0
0122 F6     = 550         DB      LOW TROPG1
0123 E9     = 551         DB      LOW TROPG2
0124 F7     = 552         DB      LOW TROPG3
0125 E4     = 553         DB      LOW TROPG4
0126 D8     = 554         DB      LOW TROPG5
0127 EA     = 555         DB      LOW TROPG6
0128 F6     = 556         DB      LOW TROPG7
0129 E4     = 557         DB      LOW TROPG8
012A 90     = 558         DB      LOW TROPG9
012B CC     = 559         DB      LOW TROPGA
012C D8     = 560         DB      LOW TROPGB
012D D4     = 561         DB      LOW TROPGC
012E E3     = 562         DB      LOW TROPGD
012F 89     = 563         DB      LOW TROPGE
0130 87     = 564         DB      LOW TROPGF
              565 $   INCLUDE(:F3:TRAM.SRC)
            = 566 ;***************************************************************
            = 567 ;  FILE: TRAM.SRC   6-19-86 11:20  BOB ACTIS
            = 568 ; FUNCTION:  TEST THE 8039 RAM LOCATIONS 0 TO 7FH
            = 569 ; ENTRY:  NO SETUP
            = 570 ; EXIT:  RAM HAS GARBAGE (TEST PATTERN)
            = 571 ;
            = 572 ; START BY WRITTING EACH RAM ADDRESS INTO ITSELF
0131 B87F   = 573 TRAM:   MOV     R0,#7FH         ;SIZE OF 8039 RAM
0133 F8     = 574 TRAM10: MOV     A,R0            ;GET RAM ADDRESS
0134 A0     = 575         MOV     @R0,A           ;STORE RAM ADDRESS IN IT'S LOCATION
0135 E833   = 576         DJNZ    R0,TRAM10       ;DO ALL LOCATIONS
            = 577 ;
            = 578 ; CHECK IF EACH LOCATION HAS IT'S OWN ADDRESS
0137 B87F   = 579         MOV     R0,#7FH
0139 F8     = 580 TRAM20: MOV     A,R0            ;GET RAM ADRESS
013A D0     = 581         XRL     A,@R0           ;COMPARE ADDRESS TO CONTENTS
013B 9674   = 582         JNZ     TRAMER          ;JUMP IF ERROR
013D E839   = 583         DJNZ    R0,TRAM20       ;DO ALL LOCATIONS
            = 584 ;
            = 585 ; TRY A 055H/0AAH CHECKER BOARD PATTERN
013F B802   = 586         MOV     R0,#2           ;POINTER WILL GO FROM 2 TO 7FH
0141 2355   = 587 TRAM30: MOV     A,#055H
```

```
0143 A0        = 588           MOV     @R0,A           ;WRITE EVEN LOCATION
0144 37        = 589           CPL     A               ;PATTERN IS NOW 0AAH
0145 18        = 590           INC     R0
0146 A0        = 591           MOV     @R0,A           ;WRITE ODD LOCATION
0147 18        = 592           INC     R0
0148 F8        = 593           MOV     A,R0            ;GET NEXT ADDRESS
0149 37        = 594           CPL     A
014A F241      = 595           JB7     TRAM30          ;JUMP IF NOT DONE YET, R0 < 80H
               = 596 ;
               = 597 ; CHECK THE 055H/0AAH TEST PATTERN
014C B902      = 598           MOV     R1,#2           ;USE R1 AS POINTER IN THIS SECTION
014E F1        = 599 TRAM40:   MOV     A,@R1           ;GET EVEN BYTE DATA, 055H
014F 19        = 600           INC     R1
0150 61        = 601           ADD     A,@R1           ;ADD ODD BYTE DATA, 0AAH
0151 17        = 602           INC     A               ;055H+0AAH+1=000H
0152 9674      = 603           JNZ     TRAMER          ;JUMP IF ERROR
0154 19        = 604           INC     R1
0155 F9        = 605           MOV     A,R1            ;GET NEXT ADDRESS
0156 37        = 606           CPL     A
0157 F24E      = 607           JB7     TRAM40          ;JUMP IF NOT DONE YET
               = 608 ;
               = 609 ; TRY A 0AAH/055H CHECKER BOARD PATTERN
0159 B902      = 610           MOV     R1,#2           ;POINTER WILL GO FROM 2 TO 7FH
015B 23AA      = 611 TRAM50:   MOV     A,#0AAH
015D A1        = 612           MOV     @R1,A           ;WRITE EVEN LOCATION
015E 37        = 613           CPL     A               ;PATTERN IS NOW 055H
015F 19        = 614           INC     R1
0160 A1        = 615           MOV     @R1,A           ;WRITE ODD LOCATION
0161 19        = 616           INC     R1
0162 F9        = 617           MOV     A,R1            ;GET NEXT ADDRESS
0163 37        = 618           CPL     A
0164 F25B      = 619           JB7     TRAM50          ;JUMP IF NOT DONE YET, R1 < 80H
               = 620 ;
               = 621 ; CHECK THE 0AAH/055H TEST PATTERN
0166 B802      = 622           MOV     R0,#2           ;USE R0 AS POINTER IN THIS SECTION
0168 F0        = 623 TRAM60:   MOV     A,@R0           ;GET EVEN BYTE DATA, 0AAH
0169 18        = 624           INC     R0
016A 60        = 625           ADD     A,@R0           ;ADD ODD BYTE DATA, 055H
016B 17        = 626           INC     A               ;0AAH+055H+1=000H
016C 9674      = 627           JNZ     TRAMER          ;JUMP IF ERROR
016E 18        = 628           INC     R0
016F F8        = 629           MOV     A,R0            ;GET NEXT ADDRESS
0170 37        = 630           CPL     A
0171 F268      = 631           JB7     TRAM60          ;JUMP IF NOT DONE YET
               = 632 ;
0173 27        = 633           CLR     A               ;A=0 INDICATES TEST PASSED
0174 6458      = 634 TRAMER:   JMP     TRARET          ;RETURN FROM RAM TEST
               = 635 $         INCLUDE(:F3:TOCIA.SRC)
               = 636 ;************************************************************
               = 637 ; ROUTINE: TOCIA    07-03-86 10:40   BOB ACTIS
               = 638 ;
               = 639 ; FUNCTION: SEND BYTE TO HOST, THEN CHECK RDATA
               = 640 ;
0176 8901      = 641 TOCIA:    ORL     P1,#ETEST       ;TEST CONTROL ACTIVE
0178 8803      = 642           MOV     R0,#EFCRST
017A 90        = 643           MOVX    @R0,A           ;RESET FCA
               = 644 ;
017B 8802      = 645           MOV     R0,#EOCIA
017D 23AA      = 646           MOV     A,#0AAH
017F 90        = 647           MOVX    @R0,A           ;WRITE BYTE TO FCA SR
               = 648 ;
0180 27        = 649           CLR     A
0181 B809      = 650           MOV     R0,#09H         ;LOOP COUNTER
0183 468C      = 651           JNT1    TOC50           ;JUMP IF RDATA NOT HIGH TO START WITH
               = 652 ;
0185 3C        = 653 TOC10:    MOVD    P4,A            ;GENERATE A CLKIN*
0186 E7        = 654           RL      A
0187 468A      = 655           JNT1    TOC20           ;JUMP IF RDATA NOT IN ONE STATE
0189 17        = 656           INC     A
018A E285      = 657 TOC20:    DJNZ    R0,TOC10        ;JUMP TO GENERATE 9 CLKIN* PULSES
               = 658 ;
018C D3AA      = 659 TOC50:    XRL     A,#0AAH         ;COMPARE RECEIVED BYTE
018E 6463      = 660           JMP     TOCRET          ;A=0 IF CHECK WAS GOOD
               = 661 $         INCLUDE(:F3:PARITY.SRC)
               = 662 ;************************************************************
               = 663 ;**               Subroutine Parity                        **
               = 664 ;** Function: From Accumulator, calculate parity bit (7), and place in acc. **
               = 665 ;** Date: 3-4-87                                            **
               = 666 ;** Subroutines Called: None                                **
               = 667 ;** Registers/Flags affected: *R3,*R0, Accumulator          **
               = 668 ;** Ports affected: None                                    **
               = 669 ;** RAM locations affected: None                            **
               = 670 ;************************************************************
               = 671 PARITY:
0190 537F      = 672           ANL     A,#7FH          ;CLEAR BIT 7 (PARITY BIT)
0192 D5        = 673           SEL     RB1
0193 B807      = 674           MOV     R0,#7D          ;SET BIT COUNTER
0195 AB        = 675           MOV     R3,A            ;SAVE ACCUMULATOR
0196 E7        = 676 SFTLFT:   RL      A               ;ROTATE LEFT ACCUMULATOR 1 BIT
0197 DB        = 677           XRL     A,R3            ;EXCUSIVE-OR R3 AND ACCUMULATOR
0198 E896      = 678           DJNZ    R0,SFTLFT       ;IF ALL 7 BITS DONE, EXIT ROUTINE
```

```
019A 37      = 679              CPL     A
019B 5380    = 680              ANL     A,#80H            ;MASK BITS 6-0. BIT 7 HAS PARITY.
019D 4B      = 681              ORL     A,R3              ;RESTORE BYTE TO ACCUMULATOR.
             = 682 ;BIT 7 IN ACCUMULATOR NOW REPRESENTS EVEN PARITY OVER BITS 6-0.
019E C5      = 683              SEL     RB0
019F 83      = 684              RET
               685 S     INCLUDE(:F3:SWSET.SRC)
             = 686 ;****************************************************************
             = 687 ;**                    Subroutine SWSET.SRC                    **
             = 688 ;** Function: Read current scanner configuration from ram to host. **
             = 689 ;**           B5 will show if switch or ram bit is set.        **
             = 690 ;** Date: 3-15-87                                              **
             = 691 ;** Subroutines Called: SOCIA, PARITY                          **
             = 692 ;** Registers/Flags affected: *R0, *R2, ACCUMULATOR, R0, R3    **
             = 693 ;** Ports affected: None                                       **
             = 694 ;** RAM locations affected: None                               **
             = 695 ;****************************************************************
             = 696 SWSET:
             = 697 ;SEND HEADER 'G' FIRST
01A0 2307    = 698              MOV     A,#07H            ;'G' HEADER
01A2 34EB    = 699              CALL    SOCIA             ;SEND BYTE TO HOST
01A4 8908    = 700              MOV     R1,#SWLATC        ;CHECK B5 OF SWITCHES
01A6 81      = 701              MOVX    A,@R1             ; RETRIEVE SWITCH SETTINGS
01A7 5320    = 702              ANL     A,#00100000B      ; MASK OUT ALL BUT BIT 5
01A9 B97D    = 703              MOV     R1,#SWISET        ;SET RAM POINTER TO SWITCH SETTING STORAGE
01AB 41      = 704              ORL     A,@R1             ;RETRIEVE SWITCH SETTING FROM RAM
01AC 4340    = 705              ORL     A,#40H            ;SET LAST BYTE BIT
01AE 3490    = 706              CALL    PARITY            ;SET PARITY BIT (B7)
01B0 34EB    = 707              CALL    SOCIA             ;SEND BYTE TO HOST
01B2 83      = 708              RET
               709 S     INCLUDE(:F3:CKEPRM.SRC)
             = 710 ;****************************************************************
             = 711 ;**                    Subroutine CKEPRM                       **
             = 712 ;** Function: Clock 8 bits from EEPROM. Result stored in Accumulator **
             = 713 ;** Date: 3-2-87                                               **
             = 714 ;** Subroutines Called: None                                   **
             = 715 ;** Registers/Flags affected: R0, Accumulator                  **
             = 716 ;** Ports affected: P1                                         **
             = 717 ;** RAM locations affected: None                               **
             = 718 ;****************************************************************
             = 719 CKEPRM:
01B3 B808    = 720              MOV     R0,#8             ;SET BIT COUNTER
01B5 27      = 721              CLR     A                 ;INITIALIZE ACCUMULATOR TO 0
01B6 268A    = 722 CKEP00: JNT0 RLACC             ;IF EEPROM_DO IS 0, DO NOT SET BIT 7. JUMP TO ROTATE AC
01B8 4380    = 723              ORL     A,#80H            ;EEPROM_DO IS HIGH. SET BIT 7.
01BA E7      = 724 RLACC: RL    A                 ;SHIFT ACCUMULATOR LEFT ONE BIT. (B7-B0)
01BB 8908    = 725              ORL     P1,#EPRMSK        ;CLOCK EEPROM_SK. SET HIGH.
01BD 99F7    = 726              ANL     P1,#255-EPRMSK    ; SET EEPROM_SK LOW.
01BF E8B6    = 727              DJNZ    R0,CKEP00         ;DECREMENT BIT COUNTER (R0); WHEN ALL 8 BITS ARE IN ACC.
01C1 83      = 728              RET
               729 S     INCLUDE(:F3:WRACC.SRC)
             = 730 ;****************************************************************
             = 731 ;**                    Subroutine WRACC                        **
             = 732 ;** Function: Write accumulator to EEPROM                      **
             = 733 ;** Date: 2-26-87                                              **
             = 734 ;** Subroutines Called: None                                   **
             = 735 ;** Registers/Flags affected: R0, Accumulator, F0, Carry       **
             = 736 ;** Ports affected: P1                                         **
             = 737 ;** RAM locations affected: None                               **
             = 738 ;****************************************************************
             = 739 ;F0=0 WHEN ROUTINE IS USED FOR SENDING OP CODE (9 BITS)
             = 740 ;F0=1 WHEN ROUTINE IS USED OFR SENDING DATA BITS (8 BITS)
             = 741 WRACC:
01C2 B6CE    = 742              JF0     DATA              ;IF F0=1 CLOCK OUT 8 DATA BITS
01C4 B809    = 743              MOV     R0,#9             ;ROUTINE SET TO SEND OP CODE (9 BITS)
01C6 8908    = 744              ORL     P1,#EPRMSK        ;CLOCK EEPROM_SK (SET HIGH)
01C8 99F7    = 745              ANL     P1,#255-EPRMSK    ; SET EEPROM_SK LOW
01CA 97      = 746              CLR     C                 ;SET START BIT
01CB A7      = 747              CPL     C                 ; STORED IN CARRY FLAG
01CC 24D1    = 748              JMP     SETDI
01CE B808    = 749 DATA:  MOV    R0,#8             ;ROUTINE SET TO SEND DATA. SET COUNTER TO 8 BITS
01D0 F7      = 750              RLC     A                 ;GET MSB INTO CARRY
01D1 F6D7    = 751 SETDI: JC    SETDI1            ;IF CARRY, JUMP TO SET EEPROM_CS
01D3 99FB    = 752              ANL     P1,#255-EPRMDI   .;CARRY NOT SET. SET EEPROM_DI TO '0'
01D5 24D9    = 753              JMP     CLKEPM            ;JUMP TO CLOCK EEPROM_SK
01D7 8904    = 754 SETDI1: ORL   P1,#EPRMDI        ;CARRY SET. SET EEPROM_DI TO '1'
01D9 8908    = 755 CLKEPM: ORL   P1,#EPRMSK        ;CLOCK EEPROM_SK. SET EEPROM_SK HIGH
01DB 99F3    = 756              ANL     P1,#255-EPRMSK-EPRMDI   ;RESET EEPROM_SK AND EEPROM_IN
             = 757 ;
01DD F7      = 758              RLC     A                 ;ROTATE LEFT THROUGH CARRY TO GET NEXT BIT
01DE E8D1    = 759              DJNZ    R0,SETDI          ;DECREMENT R0 BIT COUNTER AND JUMP IF NOT 0
01E0 83      = 760              RET
               761 S     INCLUDE(:F3:WAIT.SRC)
             = 762 ;****************************************************************
             = 763 ;**                    Subroutine WAIT                         **
             = 764 ;** Function: Wait 'A' milli-seconds                           **
             = 765 ;** Date: 2-26-87                                              **
             = 766 ;** Subroutines Called: None                                   **
             = 767 ;** Registers/Flags affected: *R1, *R2, ACCUMULATOR            **
             = 768 ;** Ports affected: None                                       **
             = 769 ;** RAM locations affected: None                               **
```

```
                = 770 ;******************************************************************
                = 771 Wait:
01E1 D5         = 772           SEL     RB1
01E2 AA         = 773           MOV     R2,A                    ;SAVE ACCUMULATOR
01E3 B9C8       = 774 WAIT0:    MOV     R1,#2C0D                ;SET R1 TO EQUAL 1 MILLI-SECOND DELAY
01E5 E9E5       = 775 WAIT1:    DJNZ    R1,WAIT1                ;LOOP FOR 1 MILLI-SECOND
01E7 EAE3       = 776           DJNZ    R2,WAIT0                ;LOOP FOR 'A' MILLI-SECONDS
01E9 C5         = 777           SEL     RB0
01EA 83         = 778           RET
                  779 $         INCLUDE(:F3:SOCIA.SRC)
                = 780 ;******************************************************************
                = 781 ;**                     Subroutine SOCIA                          **
                = 782 ;** Function: Send Accumulator to VLSI ocia buffer to be transmitted to host**
                = 783 ;** Date:  3-4-87                                                 **
                = 784 ;** Subroutines Called: None                                      **
                = 785 ;** Registers/Flags affected:  *R0, *R2, ACCUMULATOR              **
                = 786 ;** Ports affected: None                                          **
                = 787 ;** RAM locations affected: None                                  **
                = 788 ;******************************************************************
                = 789 SOCIA:
01EB D5         = 790           SEL     RB1                     ;SELECT REGISTER BANK 1
01EC AA         = 791           MOV     R2,A                    ;SAVE ACCUMULATOR
01ED 0A         = 792 CKSENT:   IN      A,P2                    ;CHECK VLSI SENTB LINE
01EE 92ED       = 793           JB4     CKSENT                  ;IF NOT READY, RE-CHECK VLSI CHIP.
                = 794 ;READY TO SEND BYTE.
01F0 B802       = 795           MOV     R0,#EOCIA               ;SET EXTERNAL ADDRESS POINTER TO VLSI CHIP'S OCIA BUFFER
01F2 FA         = 796           MOV     A,R2                    ;RETRIEVE DATA TO BE SENT.
01F3 90         = 797           MOVX    @R0,A                   ;SEND DATA TO VLSI CHIP.
01F4 C5         = 798           SEL     RB0
01F5 83         = 799           RET
                  800 ;****************************************************
01F6 A3           801 TROPG1:   MOVP    A,@A
01F7 83           802           RET
0200              803           ORG     200H
                  804 $         INCLUDE(:F3:TTAG.SRC)
                = 805 ;******************************************************************
                = 806 ; ROUTINE: TTAG  06-19-86 15:30 BOB ACTIS
                = 807 ; UPDATES: MODIFIED 3-17-87 FOR TEC BY RANDY ELLIOTT
                = 808 ; FUNCTION: CHECK DIGITAL LOGIC FOR CAPTURE OF 6 INCREASINGLY
                = 809 ;           LARGER TAGS - 012345 678912 . THE SYMBOL CAPTURE
                = 810 ;           PROCESSING IS USED TO COLLECT THE SEGMENTS FROM THE FCA.
                = 811 ;
0200 FE         = 812 TTATAB:   DB      0FEH,9AH,64H,16H,0B7H,0DDH,0ABH
0201 9A         =
0202 64         =
0203 16         =
0204 B7         =
0205 DD         =
0206 AB         =
0207 3A         = 813           DB      3AH,0B9H,42H,0B6H,59H,2EH,03EH
0208 B9         =
0209 42         =
020A B6         =
020B 59         =
020C 2E         =
020D 3E         =
020E B803       = 814 TTAG:     MOV     R0,#EFCRST
0210 90         = 815           MOVX    @R0,A                   ;RESET FCA
0211 8901       = 816           ORL     P1,#ETEST               ;TEST CONTROL ACTIVE
0213 B800       = 817           MOV     R0,#LOW TTATAB          ; R0 POINTS TO CHAR GEN TABLE
0215 BE06       = 818           MOV     R6,#06H ;THIS ROUTINE CHECKS DIGITAL LOGIC
0217 BF06       = 819           MOV     R7,#06H ;FOR CAPTURE OF 6 INCREASINGLY LARGER
0219 B908       = 820           MOV     R1,#08H ;TAGS 012345 678912..................
021B BB0E       = 821           MOV     R3,#0EH ;UNPACK DATA CONSTANT
021D F8         = 822 UNPK1:    MOV     A,R0
021E BA04       = 823           MOV     R2,#04H ;UNPACK DATA CONSTANT
0220 A3         = 824           MOVP    A,@A
0221 AC         = 825           MOV     R4,A    ;TEMP STORE
0222 5301       = 826 UNPK2:    ANL     A,#01H  ;STRIP OUT ONE BIT
0224 E7         = 827           RL      A
0225 17         = 828           INC     A
0226 47         = 829           SWAP    A
0227 AD         = 830           MOV     R5,A
0228 FC         = 831           MOV     A,R4
0229 77         = 832           RR      A
022A AC         = 833           MOV     R4,A
022B 5301       = 834           ANL     A,#01H
022D E7         = 835           RL      A
022E 17         = 836           INC     A
022F 60         = 837           ADD     A,R5
0230 A1         = 838           MOV     @R1,A
0231 19         = 839           INC     R1
0232 FC         = 840           MOV     A,R4
0233 77         = 841           RR      A
0234 AC         = 842           MOV     R4,A
0235 EA22       = 843           DJNZ    R2,UNPK2
0237 18         = 844           INC     R0
0238 E81D       = 845           DJNZ    R3,UNPK1
                = 846 ;
                = 847 ;  SETUP TEST BIT ON PORT 1
                = 848 ;
```

```
023A 2391      = 849           MOV     A,#ETEST+ELASDB+ETONE
023C 39        = 850           OUTL    P1,A
               = 851 ;
023D BB02      = 852           MOV     R3,#02H
023F BD06      = 853           MOV     R5,#06H
0241 BA38      = 854 TEST1:    MOV     R2,#38H      ;START TAG POINTER
0243 B83F      = 855           MOV     R0,#3FH
0245 FD        = 856 TEST2:    MOV     A,R5         ;START TAG OUTPUT
0246 6B        = 857           ADD     A,R3
0247 AC        = 858           MOV     R4,A
0248 EC48      = 859 TEST3:    DJNZ    R4,TEST3
024A F0        = 860           MOV     A,@R0
               = 861 ;
024B 3251      = 862           JB1     TST31        ;JUMP = SEND SPACE
024D 99FD      = 863           ANL     P1,#0FFH-ETMARK
024F 4455      = 864           JMP     TST32
0251 8902      = 865 TST31:    ORL     P1,#ETMARK
0253 00        = 866           NOP
0254 00        = 867           NOP
               = 868 ;
0255 FD        = 869 TST32:    MOV     A,R5
0256 6B        = 870           ADD     A,R3
0257 AC        = 871           MOV     R4,A
0258 EC58      = 872 TEST4:    DJNZ    R4,TEST4
025A F0        = 873           MOV     A,@R0
               = 874 ;
025B 47        = 875           SWAP    A
025C 3262      = 876           JB1     TST41        ;JUMP = SEND SPACE
025E 99FD      = 877           ANL     P1,#0FFH-ETMARK
0260 4466      = 878           JMP     TST42
0262 8902      = 879 TST41:    ORL     P1,#ETMARK
0264 00        = 880           NOP
0265 00        = 881           NOP
               = 882 ;
0266 C8        = 883 TST42:    DEC     R0
0267 EA45      = 884           DJNZ    R2,TEST2     ;END OF TAG
0269 ED41      = 885           DJNZ    R5,TEST1     ;END OF ALL TAGS
               = 886 ;
026B F5        = 887           SEL     MB1
026C 1400      = 888           CALL    CLR6SG       ;CLEAR 6 CHAR SEG BUFFS & COUNTERS
026E E5        = 889           SEL     MB0
               = 890 ;
026F BE18      = 891           MOV     R6,#24       ;SHOULD BE ONLY 12 SEGS, TRY FOR MORE
0271 FC        = 892           MOV     A,R4
0272 4301      = 893           ORL     A,#ESCNG     ;SET SCAN FLAG SO CKFCA WILL
0274 AC        = 894           MOV     R4,A         ;PUT SEGMENTS INTO THE SCAN BUFF
0275 F5        = 895 GETLUP:   SEL     MB1
0276 14A4      = 896           CALL    CKFCA        ;GET SEG, IF ANY, FROM FCA
0278 5404      = 897           CALL    PROCSG       ;PUT SEG, IF ANY, INTO SEG BUFF
027A E5        = 898           SEL     MB0
027B EE75      = 899           DJNZ    R6,GETLUP    ;GO CHECK FOR MORE SEGMENTS
               = 900 ;
027D 85        = 901           CLR     F0           ;SETUP FOR RIGHT HALF LOOP
027E 82C       = 902           MOV     R0,#L6SCNT
0280 F0        = 903 TCKCNT:   MOV     A,@R0        ;GET L OR R COUNT
0281 18        = 904           INC     R0
0282 60        = 905           ADD     A,@R0        ;GET L OR R TOTAL
0283 03F4      = 906           ADD     A,#-12
0285 96A7      = 907           JNZ     TTA90        ;JUMP IF X6SCNT+X6STOT<>12
               = 908 ;
0287 B834      = 909           MOV     R0,#R6SCNT
0289 95        = 910           CPL     F0
028A B680      = 911           JF0     TCKCNT       ;JUMP TO DO RIGHT HALF
               = 912 ;
028C BA04      = 913           MOV     R2,#4        ;4 BYTES TO COMPARE
028E B824      = 914           MOV     R0,#L6S1
0290 B9A9      = 915           MOV     R1,#LOW TTACHK ;DATA CHECK TABLE
0292 F9        = 916 LOOPCK:   MOV     A,R1
0293 A3        = 917           MOVP    A,@A
0294 D0        = 918           XRL     A,@R0
0295 96A7      = 919           JNZ     TTA90        ;JMP IF BAD CHECK OF DATA
               = 920 ;
0297 18        = 921           INC     R0
0298 19        = 922           INC     R1
0299 EA92      = 923           DJNZ    R2,LOOPCK
               = 924 ;
029B 82E       = 925           MOV     R0,#R6S1
029D BA03      = 926           MOV     R2,#3        ;3 BYTES TO COMPARE
029F 95        = 927           CPL     F0
02A0 B692      = 928           JF0     LOOPCK       ;JUMP TO DO RIGHT HALF
               = 929 ;
02A2 B87F      = 930           MOV     R0,#7FH      ;LOOP COUNTER, RAM SIZE
02A4 A0        = 931 CLRRAM:   MOV     @R0,A        ;A=0 AT THIS POINT, TEST PASSED
02A5 E8A4      = 932           DJNZ    R0,CLRRAM    ;CLEAR ALL RAM AFTER TESTING
               = 933 ;
02A7 6468      = 934 TTA90:    JMP     TTARET       ;A=0 FOR SUCCESFUL COMPLETION
               = 935 ;
02A9 01        = 936 TTACHK:   DB      01H,23H,45H,0CH
02AA 23        =
02AB 45        =
02AC 0C        =
02AD 67        = 937           DB      67H,89H,12H
```

```
02AE 89           =
02AF 12           =
             938 $       INCLUDE(:F3:RDEPRM.SRC)
           = 939 ;****************************************************************
           = 940 ;**               Subroutine RDEPRM                             **
           = 941 ;** Function: Read EEPROM and store at starting address @R1 (Packed Data)  **
           = 942 ;** Date:  3-3-87                                               **
           = 943 ;** Subroutines Called:  WRACC, CKEPRM                          **
           = 944 ;** Registers/Flags affected:  R0, Accumulator, F0, Carry, R1, R2, R3  **
           = 945 ;** Ports affected:  P1, P2                                     **
           = 946 ;** RAM locations affected:  @R1 to @R1+16                      **
           = 947 ;****************************************************************
           = 948 ;R1 stores Ram location to start writing to upon entry into this routine.
           = 949 RDEPRM:
           = 950 ;INITIALIZE REGISTERS AND PORTS
02B0 BB08  = 951        MOV    R3,#8D              ;SET 'LABEL SET' COUNTER TO 8
02B2 BA80  = 952        MOV    R2,#OPREAD          ;SET OPCODE TO READ
02B4 8A80  = 953 SETCS: ORL    P2,#EPRMCS          ;SET EEPROM_CS HIGH
           = 954 ;SEND OPCODE TO READ DATA
02B6 85    = 955        CLR    F0                  ;SET F0=0 FOR OPCODE TO WRITE
02B7 FA    = 956        MOV    A,R2                ;PUT OPCODE AND ADDRESS IN ACCUMULATOR
02B8 34C2  = 957        CALL   WRACC               ;SEND OPCODE/ADDRESS TO EEPROM
           = 958 ;GET RID OF START BIT.  CLOCK SK.
02BA 8908  = 959        ORL    P1,#EPRMSK          ;SET EEPROM_SK HIGH
02BC 99F7  = 960        ANL    P1,#255-EPRMSK      ;SET EEPROM_SK LOW
           = 961 ;RETRIEVE BITS 15-8 FROM EEPROM (LABEL 1)
02BE 3483  = 962        CALL   CKEPRM              ;CLOCK MOST SIGNIFICANT 8 BITS FROM EEPROM
           = 963 ;STORE BITS 15-8 TO RAM @R1 (LABEL 1)
02C0 A1    = 964        MOV    @R1,A               ;STORE ACCUMULATOR TO RAM @R1
02C1 19    = 965        INC    R1                  ;INCREMENT RAM POINTER TO NEXT LOCATION
           = 966 ;RETRIEVE BITS 7-0 FROM EEPROM (LABEL 2)
02C2 3483  = 967        CALL   CKEPRM              ;CLOCK LEAST SIGNIFICANT 8 BITS FROM EEPROM
02C4 A1    = 968        MOV    @R1,A               ;STORE ACCUMULATOR TO RAM @R1
           = 969 ;SET EEPROM_CS LOW AND ADJUST COUNTERS AND POINTERS
02C5 9A7F  = 970        ANL    P2,#255-EPRMCS      ;SET EEPROM_CS LOW
02C7 19    = 971        INC    R1                  ;INCREMENT RAM POINTER
02C8 1A    = 972        INC    R2                  ;INCREMENT EEPROM POINTER
02C9 EBB4  = 973        DJNZ   R3,SETCS            ;DECREMENT LABEL SET COUNTER.  IF ZERO, RETURN.
02CB 83    = 974        RET
             975 $      INCLUDE(:F3:DISLAS.SRC)
           = 976 ;****************************************************************
           = 977 ;**               Subroutine DISLAS                             **
           = 978 ;** Function: Clear scan buffer ram and reset VLSI              **
           = 979 ;** Date:  3-14-87                                              **
           = 980 ;** Subroutines Called:  None                                   **
           = 981 ;** Registers/Flags affected:  R4, R1, Accumulator              **
           = 982 ;** Ports affected:  P1                                         **
           = 983 ;** RAM locations affected:  Version flags and scan buffers     **
           = 984 ;****************************************************************
           = 985 DISLAS:
02CC 999F  = 986        ANL    P1,#255-EGDLT-EBDLT ;TURN OFF GDLT AND BDLT
02CE FC    = 987        MOV    A,R4                ;RETRIEVE SCANNING STATUS
02CF 5304  = 988        ANL    A,#EAMBMS           ;MASK ALL BUT AMBIGUITY ENABLE BIT
02D1 AC    = 989        MOV    R4,A                ;DISABLE SCANNING
           = 990 ;CLEAR VLSI CHIP (GET RID OF LEFT OVER DATA FROM HOST)
02D2 B903  = 991        MOV    R1,#EFCRST          ;VLSI RESET ADDRESS
02D4 91    = 992        MOVX   @R1,A               ;  RESET VLSI CHIP
02D5 44E6  = 993        JMP    RAMRT
           = 994 ENLAS:
02D7 999F  = 995        ANL    P1,#255-EGDLT-EBDLT ;TURN OFF GDLT AND BDLT
02D9 B901  = 996        MOV    R1,#EFRRST          ;RESET FRAME CONTROL (SDATA REGISTER)
02D8 91    = 997        MOVX   @R1,A
02DC FC    = 998        MOV    A,R4                ;RETRIEVE SCANNING STATUS
02DD 4301  = 999        ORL    A,#ESCNG            ;ENABLE SCANNING
02DF AC    =1000        MOV    R4,A                ;SAVE SCANNING STATUS
02E0 F5    =1001        SEL    MB1
02E1 9461  =1002        CALL   CLRVER              ;CLEAR VERSION FLAGS AND DATA
02E3 140C  =1003        CALL   CLRSNB              ;CLEAR SCANNER BUFFERS
02E5 E5    =1004        SEL    MB0
           =1005 ;ALL SCANNER BUFFER RAM CLEARED ALONG WITH SCANNER FLAGS.  RETURN.
02E6 8920  =1006 RAMRT: ORL    P1,#EGDLT           ;TURN ON GDLT FOR .5 SECONDS
02E8 83    =1007        RET
            1008 ;*********************************************
02E9 A3     1009 TROPG2: MOVP  A,@A
02EA 83     1010        RET
0300        1011        ORG    300H
            1012 $      INCLUDE(:F3:THOTOR.SRC)
           =1013 ;****************************************************************
           =1014 ;  FILE: THOTOR.SRC  2-18-87 10:50  BOB ACTIS
           =1015 ;  FUNCTION:  TEST THE MOTOR AND UP2SPD SIGNAL
           =1016 ;  ENTRY:  NO SETUP
           =1017 ;  EXIT:  USES R3,R7
           =1018 ;
0300 8912  =1019 THOTOR: ORL   P1,#ELASDB+EMTREB   ;LASER OFF, MOTOR ON
0302 55    =1020        STRT   T
0303 25    =1021        EN     TCNTI               ;ENABLE THE TIMER
           =1022 ;
0304 BF05  =1023        MOV    R7,#(5*FACTOR)      ;SET TIMER FOR 100MSEC
0306 FF    =1024 THOT10: MOV   A,R7
0307 9606  =1025        JNZ    THOT10              ;WAIT FOR MOTOR CIRCUIT TO POWER UP
           =1026 ;
```

```
0309 0A       =1027           IN      A,P2
030A 37       =1028           CPL     A
030B B231     =1029           J85     TMOT50          ;JUMP IF NOT UP2SPD
              =1030 ;
              =1031 ; MOTOR OFF AND WAIT FOR IT TO SLOW. FLASH BOTH LIGHTS.
030D 99FD     =1032           ANL     P1,#255-EMTREB  ;MOTOR OFF
030F B832     =1033 TMOT20:   MOV     R3,#50          ;SET LOOP COUNTER
0311 BF05     =1034 TMOT22:   MOV     R7,#(5*FACTOR)  ;SET TIMER FOR 100MSEC
0313 1448     =1035 TMOT24:   CALL    CK4HRS          ;CHECK FOR HORSE CONTROL BYTE
0315 FF       =1036           MOV     A,R7            ;10MSEC*10*50=5SEC
0316 9613     =1037           JNZ     TMOT24          ;WAIT BETWEEN LIGHT TOGGLES
              =1038 ;
0318 CB       =1039           DEC     R3              ;DECREMENT LOOP COUNTER
0319 FB       =1040           MOV     A,R3
031A C625     =1041           JZ      TMOT28          ;JUMP IF FINISHED WAITING
              =1042 ;
031C 09       =1043           IN      A,P1
031D 999F     =1044           ANL     P1,#255-(EGDLT+EBDLT)  ;LIGHTS OFF
031F B211     =1045           J85     TMOT22          ;JUMP IF GDLT WAS ON
              =1046 ;
0321 8960     =1047           ORL     P1,#EGDLT+EBDLT ;LIGHTS ON
0323 6411     =1048           JMP     TMOT22
              =1049 ;
0325 999F     =1050 TMOT28:   ANL     P1,#255-(EGDLT+EBDLT)  ;LIGHTS OFF
              =1051 ;
0327 8902     =1052           ORL     P1,#EMTREB      ;MOTOR ON
0329 BF05     =1053           MOV     R7,#(5*FACTOR)  ;SET TIMER FOR 100 MSEC
032B FF       =1054 TMOT40:   MOV     A,R7
032C 962B     =1055           JNZ     TMOT40          ;WAIT FOR MOTOR CIRCUIT TO POWER UP
              =1056 ;
032E 0A       =1057           IN      A,P2
032F B24A     =1058           J85     TMOT90          ;JUMP IF ALREADY UP2SPD ... FAILED
              =1059 ;
              =1060 ; WAIT 30 SECONDS FOR THE MOTOR TO GET UP2SPD. FLASH GREEN LIGHT.
0331 BBFA     =1061 TMOT50:   MOV     R3,#250         ;SET LOOP COUNTER
0333 BF06     =1062 TMOT60:   MOV     R7,#(6*FACTOR)  ;SET TIMER FOR 120 MSEC
0335 1448     =1063 TMOT80:   CALL    CK4HRS          ;CHECK FOR HORSE CONTROL BYTE
0337 FF       =1064           MOV     A,R7            ;10MS*12*250=30SEC
0338 9635     =1065           JNZ     TMOT80          ;WAIT BETWEEN LIGHT TOGGLES
              =1066 ;
033A 0A       =1067           IN      A,P2
033B B24F     =1068           J85     TMOT95          ;JUMP IF MOTOR IS UP2SPD ... PASSED
              =1069 ;
033D CB       =1070           DEC     R3              ;DECREMENT LOOP COUNTER
033E FB       =1071           MOV     A,R3
033F C64A     =1072           JZ      TMOT90          ;JUMP IF TIMED OUT ... FAILED
              =1073 ;
0341 09       =1074           IN      A,P1            ;TOGGLE GDLT WHILE WAITING FOR UP2SPD
0342 990F     =1075           ANL     P1,#255-EGDLT   ;GDLT OFF
0344 B233     =1076           J85     TMOT60          ;JUMP IF GDLT WAS ON
              =1077 ;
0346 8920     =1078           ORL     P1,#EGDLT       ;GDLT ON
0348 6433     =1079           JMP     TMOT60          ;CONTINUE WAITING FOR UP2SPD
              =1080 ;
              =1081 ; COME HERE IF THE TEST FAILED
034A 99FD     =1082 TMOT90:   ANL     P1,#255-EMTREB  ;MOTOR OFF
034C 27       =1083           CLR     A
034D 37       =1084           CPL     A               ;SET FAILED FLAG
034E 83       =1085           RET
              =1086 ;
              =1087 ; COME HERE IS THE TEST PASSED
034F 27       =1088 TMOT95:   CLR     A               ;SET PASSED FLAG
0350 83       =1089           RET
              1090 $          INCLUDE(:F3:TPON.SRC)
              =1091 ;****************************************************
              =1092 ; FILE: TPON.SRC  7-03-86 10:45  BOB ACTIS
              =1093 ; FUNCTION: PERFORM SELF-TESTS
              =1094 ;
0351 2400     =1095 TPON:     JMP     TROMSM
              =1096 TRORET:
              =1097 ;******************CHECKSUM OF ROM CHECKED HERE******************
0353 C659     =1098           JZ      TPON20          ;JUMP IF THE CHECKSUM PASSED
0355 B800     =1099           MOV     R0,#0           ;NO BEEPS WITH THIS ERROR
0357 647D     =1100           JMP     TPON90
              =1101 ;****************************************************
0359 2431     =1102 TPON20:   JMP     TRAM
035B C661     =1103 TRARET:   JZ      TPON30          ;JUMP IF THE RAM TEST PASSED
035D B801     =1104           MOV     R0,#1           ;ONE BEEP FOR THIS ERROR
035F 647D     =1105           JMP     TPON90
              =1106 ;
0361 2476     =1107 TPON30:   JMP     TOCIA
0363 C669     =1108 TOCRET:   JZ      TPON40          ;JUMP IF THE OCIA TEST PASSED
0365 B802     =1109           MOV     R0,#2           ;TWO BEEPS FOR THIS ERROR
0367 647D     =1110           JMP     TPON90
              =1111 ;
0369 440E     =1112 TPON40:   JMP     TTAG
036B 99FC     =1113 TTARET:   ANL     P1,#255-(ETEST+ETMARK)  ;CLEAR TEST AND TEST MARK LINES
036D C673     =1114           JZ      TPON50          ;JUMP IF THE TTAG TEST PASSED
036F B803     =1115           MOV     R0,#3           ;THREE BEEPS FOR THIS ERROR
0371 647D     =1116           JMP     TPON90
              =1117 ;
0373 7400     =1118 TPON50:   CALL    TMOTOR
```

```
0375 C67B    =1119           JZ      TPOM60          ;JUMP IF THE MOTOR TEST PASSED
0377 B804    =1120           MOV     R0,#4           ;FOUR BEEPS FOR THIS ERROR
0379 647D    =1121           JMP     TPON90
             =1122   ;
037B 6487    =1123   TPOM60: JMP     TPORET          ;RETURN FROM THE POWER UP TESTS
             =1124   ;
037D 7481    =1125   TPON90: CALL    TERRWT          ;ERRORS COME HERE
037F 0400    =1126           JMP     RSTTRP          ;RESTART THE PROGRAM
             1127 $  INCLUDE(:F3:TERRWT.SRC)
             =1128   ;*******************************************************
             =1129   ; FILE: TERRWT.SRC  2-18-87 10:50  BOB ACTIS
             =1130   ; FUNCTION: SELFTEST ERROR ROUTINE
             =1131   ;           BEEP R0 TIMES AND WAIT 1 SECOND
             =1132   ; ENTRY: R0 = NUMBER OF BEEPS
             =1133   ; EXIT: USES R0, R7
             =1134   ;
0381 990F    =1135   TERRWT: ANL     P1,#255-EGOLT   ;GOLT OFF
0383 8940    =1136           ORL     P1,#EBOLT       ;BOLT ON
             =1137   ;
0385 55      =1138           STRT    T
0386 25      =1139           EN      TCNTI           ;ENABLE THE TIMER OPERATION
             =1140   ;
0387 F8      =1141   TERR02: MOV     A,R0
0388 C69A    =1142           JZ      TERR10          ;JUMP IF NO BEEPS
             =1143   ;
038A D5      =1144   TERR04: SEL     RB1
038B B028    =1145           MOV     R5,#ETONCT      ;SET THE TONE CYCLE COUNTER
038D BE02    =1146           MOV     R6,#(2*FACTOR)  ;SET BEEP TIMER FOR 40 MSEC
038F FE      =1147   TERR06: MOV     A,R6
0390 968F    =1148           JNZ     TERR06          ;WAIT FOR BEEP TO END
0392 C5      =1149           SEL     RB0
             =1150   ;
0393 BF03    =1151           MOV     R7,#(3*FACTOR)  ;SET TIMER FOR 60 MSEC
0395 FF      =1152   TERR08: MOV     A,R7
0396 9695    =1153           JNZ     TERR08          ;WAIT BETWEEN BEEPS
             =1154   ;
0398 E88A    =1155           DJNZ    R0,TERR04       ;BEEP LOOP
             =1156   ;
039A BF32    =1157   TERR10: MOV     R7,#(E1000M*FACTOR)  ;SET TIMER FOR 1 SECOND
039C FF      =1158   TERR12: MOV     A,R7
039D 969C    =1159           JNZ     TERR12
             =1160   ;
039F B903    =1161           MOV     R1,#EFCRST      ;RESET VLSI CHIP TO GET RID OF GARBAGE.
03A1 91      =1162           MOVX    @R1,A
03A2 83      =1163           RET
             1164 $  INCLUDE(:F3:FPOWUP.SRC)
             =1165   ;*******************************************************
             =1166   ; FILE: FPOWUP.SRC  02-18-87 11:25  BOB ACTIS
             =1167   ; ROUTINE: POWUP
             =1168   ; FUNCTION: INITIALIZE SYSTEM
             =1169   ; UPDATES: 3-17-87 MODIFIED FOR TEC BY RANDY ELLIOTT
             =1170   ;
03A3 93      =1171   POW00:  RETR                    ;RESET THE IIP FLIP-FLOP
03A4         =1172   POWUP   EQU     $
03A4 15      =1173           DIS     I
03A5 35      =1174           DIS     TCNTI
03A6 27      =1175           CLR     A
03A7 D7      =1176           MOV     PSW,A
03A8 74A3    =1177           CALL    POW00           ;RESET IIP BIT
             =1178   ;
             =1179   ; SETUP PORTS
             =1180   ;
03AA 233F    =1181           MOV     A,#255-EVLSIR-EPRMCS  ;PWR RST THE VLSI AND CLEAR EEPROM_CS
03AC 3A      =1182           OUTL    P2,A
03AD 8A40    =1183           ORL     P2,#EVLSIR      ;ENABLE VLSI TO RUN
03AF 2390    =1184           MOV     A,#ETONE+ELASDB
03B1 39      =1185           OUTL    P1,A
             =1186   ;
             =1187   ; RESET THE FRAME CONTROL ARRAY
             =1188   ;
03B2 B803    =1189           MOV     R0,#EFCRST
03B4 90      =1190           MOVX    @R0,A
             =1191   ;
             =1192   ; GO PERFORM THE POWER UP TESTS.
             =1193   ; STICK IN TPON LOOP IF ANY FAILURES.
             =1194   ;
03B5 6451    =1195           JMP     TPON
03B7         =1196   TPORET  EQU     $
             =1197   ;
             =1198   ; CLEAR DATA MEMORY AND PSW
03B7 27      =1199           CLR     A
03B8 D7      =1200           MOV     PSW,A
03B9 B87F    =1201           MOV     R0,#7FH
03BB A0      =1202   POW10:  MOV     @R0,A
03BC E8BB    =1203           DJNZ    R0,POW10
             =1204   ;
             =1205   ; START THE INTERNAL TIMER
             =1206   ;
03BE D5      =1207           SEL     RB1
             =1208   ;SET THE TONE CYCLE COUNTER
03BF 846C    =1209           CALL    TON1CT          ;SET R5 ACCORDING TO SWITCH SETTINGS
```

```
03C1 C5        =1210          SEL     RB0
03C2 55        =1211          STRT    T
03C3 25        =1212          EN      TCNTI
               =1213 ;
               =1214 ; GOOD LIGHT, GOOD POWER UP TONE, LASER ON AND WAIT 1 SEC.
               =1215 ;
03C4 8920      =1216          ORL     P1,#EGDLT
03C6 D5        =1217          SEL     RB1
03C7 BE0A      =1218          MOV     R6,#(10*FACTOR)       ;200MSEC TONE
03C9 C5        =1219          SEL     RB0
03CA 99EF      =1220          ANL     P1,#255-ELASDB        ;LASER ON, TIME TO START BEFORE ROTAG
03CC BF32      =1221          MOV     R7,#(E1000H*FACTOR)
03CE FF        =1222 TPON15:  MOV     A,R7
03CF 96CE      =1223          JNZ     TPON15                ;WAIT
               =1224 ;
               =1225 ; REINITIALIZE AFTER TEST SEQUENCE
               =1226 ;
03D1 99CF      =1227 POW20:   ANL     P1,#255-(EGDLT+ELASDB)  ;GOOD LIGHT OFF & LASER ON
03D3 8942      =1228          ORL     P1,#EBDLT+EMTREB        ;BAD LIGHT ON & MOTOR ON
               =1229 ;
03D5 B803      =1230          MOV     R0,#EFCRST
03D7 90        =1231          MOVX    @R0,A                 ;RESET THE FCA
03D8 BF02      =1232          MOV     R7,#(2*FACTOR)        ;SET TIMER FOR 40 MSEC
03DA FF        =1233 POW25:   MOV     A,R7
03DB 96DA      =1234          JNZ     POW25                 ;WAIT FOR FCA TO SEE SEGS IF ANY
               =1235 ;
               =1236 ; CLEAR DATA MEMORY AND PSW
03DD 27        =1237          CLR     A
03DE D7        =1238          MOV     PSW,A
03DF 887F      =1239          MOV     R0,#7FH
03E1 A0        =1240 POW30:   MOV     @R0,A
03E2 E8E1      =1241          DJNZ    R0,POW30
               =1242 ;
03E4 D5        =1243          SEL     RB1
               =1244 ;SET TONE CYCLE COUNTER
03E5 846C      =1245          CALL    TON1CT                ;SET R5 ACCORDING TO SWITCH SETTING
03E7 C5        =1246          SEL     RB0
               =1247 ;
               =1248 ;LOAD EEPROM TO RAM FOR TWO LABEL READ.
03E8 8967      =1249          MOV     R1,#TWOLAB            ;SET RAM POINTER
03EA 5480      =1250          CALL    RDEPRM                ;TRANSFER EEPROM TO RAM
               =1251 ;LOAD SWITCH SETTINGS TO RAM
03EC 8908      =1252          MOV     R1,#SWLATC            ;SET POINTER TO READ SWITCHES
03EE 8870      =1253          MOV     R0,#SWISET            ;SET RAM POINTER TO SWITCH SETTINGS
03F0 81        =1254          MOVX    A,@R1                 ;READ SWITCHES
03F1 530F      =1255          ANL     A,#11011111B          ;MASK OUT B5, FLAG PROGRAMMING VIA LABLE READ.
03F3 A0        =1256          MOV     @R0,A                 ;STORE SWITCH SETTINGS IN RAM.
               =1257 ;INITIALIZATION DONE. BEGIN READING TAGS.
03F4 F5        =1258          SEL     MB1
03F5 C400      =1259          JMP     ROTAG
               1260 ;************************************
03F7 A3        1261 TROPG3:   MOVP    A,@A
03F8 83        1262          RET
0400           1263          ORG     400H
               1264 $        INCLUDE(:F3:FSDATA.SRC)
               =1265 ;***************************************************
               =1266 ; FILE:   FSDATA.SRC   10-25-83 16:55  BOB ACTIS
               =1267 ;         MODIFIED     04-02-86        DREW TAUSSIG
               =1268 ;         MODIFIED     11-18-86 13:50  BOB ACTIS
               =1269 ;         MODIFIED     02-18-87 10:15  BOB ACTIS
               =1270 ;         MODIFIED     03-14-87 20:23  RANDY ELLIOTT
               =1271 ;
               =1272 ; ROUTINE: SDATA
               =1273 ; FUNCTION: CHECK SDATA FOR VALID COMMANDS.
               =1274 ;           IF VALID COMMAND, TAKE APPROPRIATE ACTION.
               =1275 ;           IF NOT VALID, RESET THE PROGRAM.
               =1276 ; ENTRY:  RB0
               =1277 ;         SDATA READY IN FCA
               =1278 ; EXIT:   USES R0,A
               =1279 ;
               =1280 ;
               =1281 ;RETRIEVE COMMAND BYTE FROM VLSI CHIP AND STORE @STSDTA RAM
0400 B802      =1282 SDATA:   MOV     R0,#EOCIA             ;ENTERED FROM CKFCA ROUTINE
0402 80        =1283          MOVX    A,@R0                 ;GET SDATA BYTE
0403 B87E      =1284          MOV     R0,#STSDTA            ;SAVE SDATA IN @R0.
0405 A0        =1285          MOV     @R0,A                 ;STORE SDATA IN RAM
               =1286 ;CHECK COMMAND BYTE FOR ENABLE SCAN ('E') BY TURNING ON LASER.
0406 D345      =1287 SDATA1:  XRL     A,#ESEN
0408 9600      =1288          JNZ     SDATA2                ;JUMP IF NOT ENABLE SCAN CHAR
040A 99EF      =1289          ANL     P1,#255-ELASDB        ;LASER ON
040C 83        =1290          RET
               =1291 ;CHECK COMMAND BYTE FOR DISABLE SCAN ('D') BY TURNING OFF LASER.
040D B87E      =1292 SDATA2:  MOV     R0,#STSDTA
040F F0        =1293          MOV     A,@R0                 ;GET COMMAND BYTE FROM RAM.
0410 D3C4      =1294          XRL     A,#ESDIS
0412 9617      =1295          JNZ     SDATA3                ;JUMP IF NOT DISABLE SCAN CHAR
0414 8910      =1296          ORL     P1,#ELASDB            ;LASER OFF
0416 83        =1297          RET
               =1298 ;CHECK COMMAND BYTE FOR WRITING TWO LABEL SETTINGS ('I') TO RAM FROM HOST.
0417 B87E      =1299 SDATA3:  MOV     R0,#STSDTA
0419 F0        =1300          MOV     A,@R0                 ;GET COMMAND BYTE FROM RAM.
```

```
041A D389    =1301           XRL    A,#STRAM1          ;CHECK FOR 'I' CHARACTER.
041C 9625    =1302           JNZ    SDATA4             ;JUMP IF NOT 'I' CHARACTER.
041E 54CC    =1303           CALL   DISLAS             ;TURN LASER OFF AND CLEAR SCAN RAM.
0420 D400    =1304           CALL   STRRAM             ;WRITE TWO LABEL SETTINGS FROM HOST TO SCANNER RAM.
0422 54D7    =1305           CALL   ENLAS              ;TURN LASER ON AND CLEAR SCAN RAM.
0424 83      =1306           RET
             =1307 ;CHECK COMMAND BYTE FOR HORSE TEST ('D1')
0425 B87E    =1308 SDATA4:   MOV    R0,#STSDTA
0427 F0      =1309           MOV    A,@R0              ;GET COMMAND BYTE FROM RAM.
0428 D3D1    =1310           XRL    A,#EHCNTL
042A 963C    =1311           JNZ    SDATA5             ;JUMP IF NOT THE HORSE CONTROL BYTE
042C 27      =1312 SDATAH:   CLR    A                  ;CLEAR STACK POINTER/RETURN LINKAGE SINCE
042D D7      =1313           MOV    PSW,A              ;WE WILL JUMP INTO HORSE TEST AND STAY THERE
042E C5      =1314           SEL    RB0
042F 85      =1315           CLR    F0                 ;SETUP FOR HORSE TEST ENTRY
0430 95      =1316           CPL    F0
0431 A5      =1317           CLR    F1
0432 8830    =1318           MOV    R0,#TSEG1
0434 BB10    =1319           MOV    R3,#16
0436 990F    =1320           ANL    P1,#255-EGDLT
0438 8950    =1321           ORL    P1,#EBOLT+ELASD8   ;BDLT INDICATES CNTL BYTE RECVD
043A 84A4    =1322           JMP    THO05
             =1323 ;CHECK COMMAND BYTE FOR TO WRITE TWO LABLE SETTINGS IN RAM TO EEPROM ('G').
043C B87E    =1324 SDATA5:   MOV    R0,#STSDTA
043E F0      =1325           MOV    A,@R0              ;RETRIEVE COMMAND BYTE FROM RAM
043F D3C7    =1326           XRL    A,#WRPRM1          ;COMPARE ACC. WITH 'G' CHARACTER
0441 964A    =1327           JNZ    SDATA6             ;JUMP - NOT WRITE SETTINGS TO EEPROM
0443 54CC    =1328           CALL   DISLAS             ;CLEAR SCAN RAM AND TURN OFF LASER
0445 8421    =1329           CALL   WREPRM             ;WRITE RAM DATA TO EEPROM
0447 54D7    =1330           CALL   ENLAS              ;CLEAR SCAN RAM AND TURN ON LASER
0449 83      =1331           RET
             =1332 ;CHECK COMMAND BYTE FOR TO READ EEPROM AND SEND DATA TO HOST ('H')
044A B87E    =1333 SDATA6:   MOV    R0,#STSDTA
044C F0      =1334           MOV    A,@R0              ;RETRIEVE COMMAND BYTE FROM RAM
044D D3C8    =1335           XRL    A,#TRPRM1          ;COMPARE ACC. WITH 'H' CHARACTER
044F 965C    =1336           JNZ    SDATA7             ;JUMP - NOT READ EEPROM AND SEND DATA TO HOST
0451 54CC    =1337           CALL   DISLAS             ;CLEAR SCAN RAM AND TURN OFF LASER
0453 D5      =1338           SEL    RB1
0454 B920    =1339           MOV    R1,#RCRAM          ;SET RAM POINTER TO SCRATCH PAD RAM
0456 C5      =1340           SEL    RB0
0457 145B    =1341           CALL   TREPRM             ;READ EEPROM AND SEND TO HOST.
0459 54D7    =1342           CALL   ENLAS              ;CLEAR SCAN RAM AND TURN OFF LASER.
045B 83      =1343           RET
             =1344 ;CHECK COMMAND BYTE FOR ENABLE AMB MESSAGE ('A')
045C B87E    =1345 SDATA7:   MOV    R0,#STSDTA
045E F0      =1346           MOV    A,@R0              ;RETRIEVE COMMAND BYTE FROM RAM
045F D3C1    =1347           XRL    A,#EAMESE
0461 9668    =1348           JNZ    SDATA8             ;JUMP IF NOT AMB MESSAGE ENABLE
0463 FC      =1349           MOV    A,R4
0464 4304    =1350           ORL    A,#EAMBMS          ;ENABLE AMB LABEL MESSAGE
0466 AC      =1351           MOV    R4,A
0467 83      =1352           RET
             =1353 ;CHECK COMMAND BYTE FOR DISABLE AMB MESSAGE ('B')
0468 B87E    =1354 SDATA8:   MOV    R0,#STSDTA
046A F0      =1355           MOV    A,@R0              ;RETRIEVE COMMAND BYTE FROM RAM
046B D3C2    =1356           XRL    A,#EAMESD
046D 9674    =1357           JNZ    SDATA9             ;JUMP IF NOT AMB MESSAGE DISABLE
046F FC      =1358           MOV    A,R4
0470 53FB    =1359           ANL    A,#255-EAMBMS      ;DISABLE AMB LABEL MESSAGE
0472 AC      =1360           MOV    R4,A
0473 83      =1361           RET
             =1362 ;CHECK COMMAND BYTE FOR READING TWO LABEL READ SETTINGS FROM RAM TO HOST ('J')
0474 B87E    =1363 SDATA9:   MOV    R0,#STSDTA
0476 F0      =1364           MOV    A,@R0              ;RETRIEVE COMMAND BYTE FROM RAM
0477 D34A    =1365           XRL    A,#TRPRM2          ;CHECK FOR 'J' CHARACTER
0479 9686    =1366           JNZ    SDAT10             ;JUMP IF NOT 'J' CHARACTER
047B 54CC    =1367           CALL   DISLAS             ;CLEAR SCAN RAM AND TURN LASER OFF
047D D5      =1368           SEL    RB1
047E B967    =1369           MOV    R1,#TWOLAB         ;SET RAM POINTER TO TWO LABEL READ SETTINGS
0480 C5      =1370           SEL    RB0
0481 1461    =1371           CALL   TRRAM              ;TRANSMIT RAM TO HOST
0483 54D7    =1372           CALL   ENLAS              ;CLEAR SCAN RAM AND TURN LASER ON
0485 83      =1373           RET
             =1374 ;CHECK COMMAND BYTE FOR READING SCANNER CONFIGURATION FROM RAM. ('K')
0486 B87E    =1375 SDAT10:   MOV    R0,#STSDTA
0488 F0      =1376           MOV    A,@R0              ;RETRIEVE COMMAND BYTE FROM RAM
0489 D3CB    =1377           XRL    A,#SWSET1          ;CHECK FOR 'K' CHARACTER
048B 9694    =1378           JNZ    SDAT11             ;JUMP IF NOT 'K' CHARACTER
048D 54CC    =1379           CALL   DISLAS             ;CLEAR SCAN RAM AND TURN LASER OFF
048F 34A0    =1380           CALL   SWSET              ;READ SWITCH SETTING FROM RAM AND TRANSMIT TO HOST
0491 54D7    =1381           CALL   ENLAS              ;CLEAR SCAN RAM AND TURN LASER ON
0493 83      =1382           RET
             =1383 ;CHECK COMMAND BYTE FOR OVERRIDING SCANNER SETTINGS. ('L')
0494 B87E    =1384 SDAT11:   MOV    R0,#STSDTA
0496 F0      =1385           MOV    A,@R0              ;RETRIEVE COMMAND BYTE FROM RAM
0497 D38C    =1386           XRL    A,#OVRST1          ;CHECK FOR 'L' CHARACTER
0499 96A2    =1387           JNZ    SDAT12             ;JUMP IF NOT 'L' CHARACTER
049B 54CC    =1388           CALL   DISLAS             ;CLEAR SCAN RAM AND TURN LASER OFF
049D 94A6    =1389           CALL   OVRSET             ;OVERRIDE SWITCH SETTINGS VIA HOST
049F 54D7    =1390           CALL   ENLAS              ;CLEAR SCAN RAM AND TURN LASER ON
04A1 83      =1391           RET
```

```
                    =1392 ;IF WE GET HERE, GOT RESET COMMAND OR NON-VALID COMMAND.  JUMP TO RESET SCANNER.
04A2 0400           =1393 SDAT12: JMP     RSTTRP
04A4 84A2            1394 TH005:  JMP     SDAT12
                     1395 $       INCLUDE(:F3:OVRSET.SRC)
                    =1396 ;**********************************************************************
                    =1397 ;**                   Subroutine OVRSET                              **
                    =1398 ;** Function: Overide Switch settings by changing RAM from host      **
                    =1399 ;** Date: 3-15-87                                                    **
                    =1400 ;** Subroutines Called: ROCIA                                        **
                    =1401 ;** Registers/Flags affected: F0, CARRY, R2, R1, ACCUMULATOR         **
                    =1402 ;** Ports affected: None                                             **
                    =1403 ;** RAM locations affected: @SWISET                                  **
                    =1404 ;**********************************************************************
                    =1405 OVRSET:
                    =1406 ;GET COMMAND BYTE FROM HOST
04A6 B452           =1407         CALL    ROCIA           ;RECIEVE BYTE FROM HOST
04A8 E6AC           =1408         JNC     CHECLB          ;JUMP TO CHECK FOR LAST BYTE IF NO PARITY ERROR
                    =1409 ;PARITY ERROR, GO TO ERROR ROUTINE.  WE GOT GARBAGE.
04AA 84BC           =1410         JMP     OVRERR          ;JUMP TO ERROR ROUTINE
                    =1411 ;PARITY BYTE CHECKS OK.  CHECK FOR LAST BYTE BIT.
04AC D2B0           =1412 CHECLB: JB6     SAVEBT          ;JUMP IF LAST BYTE BIT SET.
                    =1413 ;LAST BYTE BIT NOT SET.  SOMETHING IS WRONG.
04AE 84BC           =1414         JMP     OVRERR          ;JUMP TO ERROR ROUTINE
                    =1415 ;LAST BYTE BIT SET AND PARITY CHECKED OK.  SAVE SWITCH SETTINGS IN RAM.
04B0 530F           =1416 SAVEBT: ANL     A,#0FH          ;MASK OUT UPPER 4 BITS.
04B2 AA             =1417         MOV     R2,A            ;TEMPORATILY STORE RECIEVED BYTE
04B3 B97D           =1418         MOV     R1,#SWISET      ;RAM POINTER
04B5 F1             =1419         MOV     A,@R1           ;SAVE SCANNER SETTINGS
04B6 5340           =1420         ANL     A,#40H          ;SAVE DOUBLE READ BIT
04B8 4A             =1421         ORL     A,R2            ;SET BITS 3-0 ACCORDING TO RECIEVED DATA
04B9 A1             =1422         MOV     @R1,A           ;SAVE RECIEVED BYTE IN RAM.
04BA 84C0           =1423         JMP     OVRRET          ;RETURN
                    =1424 ;ERROR ROUTINE.  BEEP 6 TIMES AND TURN ON RED LIGHT.
04BC B806           =1425 OVRERR: MOV     R0,#6           ;SET BEEP COUNTER
04BE 7481           =1426         CALL    TERRWT          ;BEEP 6 TIMES
04C0 83             =1427 OVRRET: RET
                     1428 $       INCLUDE(:F3:TRNFLG.SRC)
                    =1429 ;**********************************************************************
                    =1430 ;**                   Subroutine TRNFLG                              **
                    =1431 ;** Function: Transfers label flags from UPC code to RAM             **
                    =1432 ;** Date: 7-17-87                                                    **
                    =1433 ;** Subroutines Called: SHIFTL                                       **
                    =1434 ;** Registers/Flags affected: R0, R2, R3, ACCUMULATOR, R1            **
                    =1435 ;** Ports affected: None                                             **
                    =1436 ;** RAM locations affected: @R1                                      **
                    =1437 ;**********************************************************************
                    =1438 TRNFLG:
                    =1439 ;GET FIRST FOUR BYTES OF LABEL (ABCD)
04C1 B824           =1440         MOV     R0,#L6S1        ;SOURCE RAM POINTER
04C3 BB02           =1441         MOV     R3,#2           ;SET FLAG COUNTER
04C5 B4C1           =1442         CALL    SHIFTL          ;SHIFT NIBBLES LEFT ONE NIBBLE
                    =1443 ;GET SECOND TWO BYTES OF LABEL (EF)
                    =1444 ;TRICK WITH THIS ROUTINE IS THAT THE NIBBLES TO COMPRISE FLAG 'EF' IS SPLIT
                    =1445 ; BETWEEN LEFT AND RIGHT HALF OF LABEL.
04C7 F0             =1446         MOV     A,@R0           ;RETRIEVE DE NIBBLES
04C8 530F           =1447         ANL     A,#0FH          ;MASK OUT 'D' NIBBLE
04CA 47             =1448         SWAP    A               ;E0
04CB AA             =1449         MOV     R2,A            ;SAVE NIBBLE
04CC B82E           =1450         MOV     R0,#R6S1        ;GET RIGHT HALF OF LABEL
04CE F0             =1451         MOV     A,@R0           ; (RIGHT HALF OF LABEL)
04CF 53F0           =1452         ANL     A,#0F0H         ;MASK LOWER NIBBLE (F0)
04D1 47             =1453         SWAP    A               ;0F
04D2 4A             =1454         ORL     A,R2            ;EF
04D3 A1             =1455         MOV     @R1,A           ;SAVE NIBBLES IN RAM
04D4 19             =1456         INC     R1              ;INCREMENT SOURCE POINTER
                    =1457 ;GET BYTES GH INTO RAM.
04D5 BB01           =1458         MOV     R3,#1           ;SET FLAG COUNTER
04D7 B4C1           =1459         CALL    SHIFTL
04D9 83             =1460         RET
                     1461 $       INCLUDE(:F3:ERS2RM.SRC)
                    =1462 ;**********************************************************************
                    =1463 ;**                   Subroutine ERS2RM                              **
                    =1464 ;** Function: SET TWO LABEL FLAG RAM TO FF'S                         **
                    =1465 ;** Date: 7-22-87                                                    **
                    =1466 ;** Subroutines Called: None                                         **
                    =1467 ;** Registers/Flags affected: R0, R2, ACCUMULATOR                    **
                    =1468 ;** Ports affected: None                                             **
                    =1469 ;** RAM locations affected: None                                     **
                    =1470 ;**********************************************************************
                    =1471 ERS2RM:
04DA BA10           =1472         MOV     R2,#160         ;SET CYCLE COUNTER FOR LABEL FLAGS
04DC B867           =1473         MOV     R0,#TWOLAB      ;SET RAM POINTER TO LABEL 1 FLAG 1
04DE B0FF           =1474 ELST1:  MOV     @R0,#0FFH       ;FILL RAM WITH FF'S
04E0 18             =1475         INC     R0
04E1 EADE           =1476         DJNZ    R2,ELST1
04E3 83             =1477         RET
                     1478 ;*******************************************
04E4 A3              1479 TROPG4: MOVP    A,@A
04E5 83              1480         RET
0500                 1481         ORG     500H
                     1482 $       INCLUDE(:F3:CHKSCN.SRC)
```

```
                  ;************************************************************
=1483
=1484             ;**              Subroutine CHKSCN                          **
=1485             ;** Function: Check Switch RAM settings for two scan option and set R1 accor.*
=1486             ;** Date: 3-18-87                                            **
=1487             ;** Subroutines Called: None                                 **
=1488             ;** Registers/Flags affected: R1, Accumulator                **
=1489             ;** Ports affected: None                                     **
=1490             ;** RAM locations affected: None                             **
=1491             ;************************************************************
=1492             ;THIS ROUTINE USED FOR UPCA, EAN8, AND EAN13
=1493             CHKSCN:
0500 B97D  =1494         MOV     R1,#SWISET          ;SET RAM POINTER TO SWITCH SETTINGS
0502 F1    =1495         MOV     A,@R1               ;RETRIEVE SETTINGS
0503 530C  =1496         ANL     A,#0CH              ;MASK OUT ALL BUT TWO SCAN SETTINGS
0505 03F4  =1497         ADD     A,#0F4H             ;CHECK FOR B3,B2=11 (750F MODE)
0507 F611  =1498         JC      STOCIA              ;JUMP IF B3,B2=11
0509 0304  =1499         ADD     A,#004H             ;CHECK FOR B3,B2=10 (MODIFIED 2-SCAN)
050B F615  =1500         JC      SP2SCN              ;JUMP IF B3,B2=10
050D 0304  =1501         ADD     A,#004H             ;CHECK FOR B3,B2=01 (750F-T 2 SCAN)
050F F61E  =1502         JC      ST2SCN              ;JUMP IF B3,B2=01
           =1503 ;MUST BE B3,B2=00 WHICH IS 750F MODE
0511 B9FF  =1504 STOCIA: MOV     R1,#-1              ;SET FOR 1 SCAN
0513 A420  =1505         JMP     CKSNRT              ;FINISHED, RETURN
0515 B9FE  =1506 SP2SCN: MOV     R1,#-2              ;SET FOR 2 SCAN
0517 F8    =1507         MOV     A,R0                ;CHECK FOR EAN13, OF WHICH WE ONLY WANT 1 SCAN
0518 C620  =1508         JZ      CKSNRT              ;JUMP IF NOT EAN13. OTHER LABELS ARE 2 SCAN
051A B9FF  =1509         MOV     R1,#-1              ;EAN13, REQUIRE 1 SCAN.
051C A420  =1510         JMP     CKSNRT              ;FINISHED, RETURN
051E B9FE  =1511 ST2SCN: MOV     R1,#-2              ;SET FOR 2 SCAN
0520 83    =1512 CKSNRT: RET
            1513 $       INCLUDE(:F3:WREPRM.SRC)
=1514             ;************************************************************
=1515             ;**              Subroutine WREPRM                          **
=1516             ;** Function: Write packed RAM to EEPROM                    **
=1517             ;** Date: 2-26-87                                           **
=1518             ;** Subroutines Called: WRACC, WAIT                         **
=1519             ;** Registers/Flags affected: F0, R0, R1, R2, R3, *R1, *R2, Carry, Acc **
=1520             ;** Ports affected: P1, P2                                  **
=1521             ;** RAM locations affected: None                            **
=1522             ;************************************************************
=1523             WREPRM:
=1524             ;SEND OP CODE TO ENABLE EEPROM WRITE
0521 B4D1  =1525         CALL    SNDWRT
           =1526 ;SEND OP CODE TO ERASE ALL OF EEPROM
0523 2320  =1527         MOV     A,#ERAL             ;ERASE ALL OF EEPROM
0525 B4B5  =1528         CALL    ERASFL
           =1529 ;TRANSFER 16 BYTES FROM RAM TO EEPROM
0527 B967  =1530         MOV     R1,#TWOLAB          ;INITIALIZE RAM POINTER
0529 BA40  =1531         MOV     R2,#OWRITE          ;INITIALIZE EEPROM ADDRESS AND OP CODE
052B B808  =1532         MOV     R3,#8D              ;INITIALIZE LABELSET COUNTER
           =1533 ;SEND OP CODE AND EEPROM ADDRESS
           =1534 TRNDTA:
052D 8A80  =1535         ORL     P2,#EPRMCS          ;SET EEPROM_CS HIGH
052F 85    =1536         CLR     F0                  ;SET F0=0 TO SIGNIFY OP CODE
0530 FA    =1537         MOV     A,R2                ;OP CODE + EEPROM ADDRESS IN ACCUMULATOR
0531 34C2  =1538         CALL    WRACC               ;SEND OP CODE + EEPROM ADDRESS TO EEPROM
           =1539 ;SEND BITS 15-8 TO EEPROM (LABEL 1)
0533 F1    =1540         MOV     A,@R1               ;GET DATA FROM RAM (LABEL 1)
0534 85    =1541         CLR     F0                  ;SET F0
0535 95    =1542         CPL     F0                  ; TO '1' TO SIGNIFY DATA TRANSFER
0536 34C2  =1543         CALL    WRACC               ;WRITE DATA BITS 15-8 TO EEPROM
           =1544 ;SEND BITS 7-0 TO EEPROM (LABEL 2)
0538 19    =1545         INC     R1                  ;INCREMENT RAM POINTER TO LABEL 2
0539 F1    =1546         MOV     A,@R1               ;RETREIVE DATA (LABEL 2)
053A 85    =1547         CLR     F0                  ;SET F0
053B 95    =1548         CPL     F0                  ; TO '1' TO SIGNIFY DATA TRANSFER
053C 34C2  =1549         CALL    WRACC               ;WRITE DATA BITS 7-0
           =1550 ;SET EEPROM_CS LOW FOR 15MS
053E 9A7F  =1551         ANL     P2,#255-EPRMCS      ;SET EEPROM_CS LOW
0540 230F  =1552         MOV     A,#15D              ;WAIT FOR
0542 34E1  =1553         CALL    WAIT                ; 15 MILLI-SECONDS
           =1554 ;SET UP POINTERS FOR NEXT LABEL SET
0544 19    =1555         INC     R1                  ;INCREMENT RAM POINTER TO LABEL 1 OF NEXT LABEL SET
0545 1A    =1556         INC     R2                  ;INCREMENT EEPROM ADDRESS POINTER FOR NEXT 16 BITS
0546 EB2D  =1557         DJNZ    R3,TRNDTA           ;IF R3 NOT ZERO, GO BACK TO TRANSFER ANOTHER 16 BITS TO
           =1558 ;DATA ALL TRANSFERRED. SEND OP CODE TO DISABLE ERASE/WRITE TO EEPROM.
0548 8A80  =1559         ORL     P2,#EPRMCS          ;SET EEPROM_CS HIGH
054A 2300  =1560         MOV     A,#EWDS             ;MOV OP CODE TO DISABLE ERASE/WRITE TO ACCUMULATOR
054C 85    =1561         CLR     F0                  ;SET F0 LOW TO SIGNIFY 9 BITS TO SEND
054D 34C2  =1562         CALL    WRACC               ;WRITE OP CODE TO EEPROM
054F 9A7F  =1563         ANL     P2,#255-EPRMCS      ;SET EEPROM_CS LOW
           =1564 ;RETURN BACK
0551 83    =1565         RET
            1566 $       INCLUDE(:F3:ROCIA.SRC)
=1567             ;************************************************************
=1568             ;**              Subroutine ROCIA                           **
=1569             ;** Function: Recieve data from VLSI chip with output in accumulator. **
=1570             ;** Date: 3-15-87                                           **
=1571             ;** Subroutines Called: PARITY                              **
=1572             ;** Registers/Flags affected: F0, *R3, *R0, CARRY, *R2, ACCUMULATOR **
=1573             ;** Ports affected: NONE                                    **
```

```
                =1574 ;** RAM locations affected: NONE                                    **
                =1575 ;*********************************************************************
                =1576 ;F0=1 MEANS LAST BITE BIT SET IN B6
                =1577 ;F0=0 MEANS LAST BITE BIT NOT SET IN B6
                =1578 ;CARRY MEANS THAT PARITY ERROR HAS OCCURED
                =1579 ;NO CARRY MEANS THAT BYTE RECIEVED PASSED PARITY CHECK
0552 85         =1580 ROCIA:   CLR    F0              ;INITIALIZE B6 FLAG
0553 97         =1581          CLR    C               ;INITIALIZE PARITY FLAG
0554 8658       =1582 ROCIA1:  JNI    ROCIA2          ;IF INTERUPT LINE LOW, VLSI HAS OCIA DATA.
0556 A454       =1583          JMP    ROCIA1          ;NO DATA. JUMP BACK TO CHECK ROCIA.
0558 D5         =1584 ROCIA2:  SEL    RB1
0559 B802       =1585          MOV    R0,#EOCIA       ;SET POINTER TO WRITE TO VLSI CHIP.
055B 80         =1586          MOVX   A,@R0           ;GET BYTE FROM ACCUMULATOR
055C AA         =1587          MOV    R2,A            ;TEMPORARILY SAVE BYTE TO CHECK FOR PARITY
                =1588 ;CHECK FOR CORRECT PARITY
055D 3490       =1589          CALL   PARITY          ;CALCULATE PARITY
055F D5         =1590          SEL    RB1
0560 DA         =1591          XRL    A,R2            ;COMPARE TO RECIEVED BYTE
0561 C664       =1592          JZ     LASTBT          ;IF ZERO, PARITY IS OK
0563 A7         =1593          CPL    C               ;BAD PARITY. SET CARRY FLAG.
                =1594 ;PARITY CHECKED.  RESTORE RECIEVED BYTE AND CHECK FOR LAST BYTE.
0564 FA         =1595 LASTBT:  MOV    A,R2            ;RESTORE RECIEVED BYTE
0565 37         =1596          CPL    A
0566 D269       =1597          JB6    OCIRET          ;JUMP IF NOT LAST BYTE
0568 95         =1598          CPL    F0              ;MUST BE LAST BYTE
                =1599 ;BYTE RECIEVED AND CHECKED.  RETURN TO ROUTINE.
                =1600 OCIRET:
0569 FA         =1601          MOV    A,R2            ;RESTORE RECIEVED DATA
056A C5         =1602          SEL    RB0
056B 83         =1603          RET
                 1604 $        INCLUDE(:F3:TON1CT.SRC)
                =1605 ;*********************************************************************
                =1606 ;**                     SUBROUTINE TON1CT                            **
                =1607 ;** FUNCTION: SET R5 (RB1) ACCORDING TO SWITCH SETTINGS              **
                =1608 ;** DATE:  3/15/87                                                   **
                =1609 ;** SUBROUTINES CALLED: NONE                                         **
                =1610 ;** REGISTERS/FLAGS AFFECTED: R5 (RB1), R1 (RB1), ACCUMULATOR        **
                =1611 ;** PORTS AFFECTED: NONE                                             **
                =1612 ;** RAM LOCATIONS AFFECTED: NONE                                     **
                =1613 ;*********************************************************************
                =1614 TON1CT:
                =1615 ;SET TONE CYCLE COUNTER ACCORDING TO RAM (SWITCH SETTINGS)
056C B97D       =1616          MOV    R1,#SWISET      ;SET RAM POINTER
056E F1         =1617          MOV    A,@R1           ;RETRIEVE SWITCH SETTINGS FROM RAM
056F 5303       =1618          ANL    A,#03H          ;MASK ALL BUT TONE BITS
0571 0376       =1619          ADD    A,#LOW TONADD   ;SET OF EPROM ADDRESS FETCH
0573 A3         =1620          MOVP   A,@A            ;GET TONE CYCLE SETTING
0574 AD         =1621          MOV    R5,A            ;SET TONE CYCLE COUNT IN R5
0575 83         =1622          RET
                =1623 ;
0576            =1624 TONADD   EQU    $
0576 14         =1625          DB     ETNCT1          ;TONE CYCLE COUNT FOR 500HZ
0577 1E         =1626          DB     ETNCT2          ;TONE CYCLE COUNT FOR 730HZ
0578 28         =1627          DB     ETNCT3          ;TONE CYCLE COUNT FOR 960HZ
0579 38         =1628          DB     ETNCT4          ;TONE CYCLE COUNT FOR 1370HZ
                 1629 $        INCLUDE(:F3:COPYRT.SRC)
                =1630 ;*********************************************************************
                =1631 ;
057A 434F5059   =1632          DB     'COPYRIGHT (C)1987 '
057E 52494748
0582 54202843
0586 29313938
058A 3720
058C 53504543   =1633          DB     'SPECTRA-PHYSICS, INC. '
0590 5452412D
0594 50485953
0598 4943532C
059C 20494E43
05A0 2E20
05A2 414C4C20   =1634          DB     'ALL RIGHTS RESERVED'
05A6 52494748
05AA 54532052
05AE 45534552
05B2 564544

=1635 ;
                =1636 ;*********************************************************************
                 1637 $        INCLUDE(:F3:ERASFL.SRC)
                =1638 ;*********************************************************************
                =1639 ;**                     Subroutine ERASFL                            **
                =1640 ;** Function: Send OP code to enable EEPROM Write                    **
                =1641 ;** Date:  3-17-87                                                   **
                =1642 ;** Subroutines Called: WRACC, WAIT                                  **
                =1643 ;** Registers/Flags affected: F0, R0, Accumulator, Carry, *R1, *R2   **
                =1644 ;** Ports affected: P2,P1                                            **
                =1645 ;** RAM locations affected: None                                     **
                =1646 ;*********************************************************************
                =1647 ERASFL:
05B5 85         =1648          CLR    F0              ;SET F0=0 TO SIGNIFY 9 BITS FOR OP CODE.
05B6 8A80       =1649          ORL    P2,#EPRMCS      ;SET EEPROM_CS HIGH
05B8 34C2       =1650          CALL   WRACC           ;WRITE OP CODE TO EEPROM
05BA 9A7F       =1651          ANL    P2,#255-EPRMCS  ;SET EEPROM_CS LOW
```

```
05BC 230F    =1652            MOV     A,#15D          ; FOR
058E 34E1    =1653            CALL    WAIT            ;   15 MS
05C0 83      =1654            RET
              1655 $          INCLUDE(:F3:SHIFTL.SRC)
             =1656 ;**********************************************************************
             =1657 ;**                        Subroutine SHIFTL                         **
             =1658 ;** Function: Shifts characters one nible left from to inputs        **
             =1659 ;** Date:  7-17-87                                                   **
             =1660 ;** Subroutines Called:  None                                        **
             =1661 ;** Registers/Flags affected:  R0, R2, R3, ACCUMULATOR, R1           **
             =1662 ;** Ports affected:  None                                            **
             =1663 ;** RAM locations affected:  @R1                                     **
             =1664 ;**********************************************************************
             =1665 SHIFTL:
05C1 F0      =1666            MOV     A,@R0           ;RETRIEVE WX CHARACTERS
05C2 530F    =1667            ANL     A,#0FH          ;MASK UPPER NIBBLE (0X)
05C4 47      =1668            SWAP    A               ;X0
05C5 AA      =1669            MOV     R2,A            ;SAVE NIBBLE TEMPORARILY
05C6 18      =1670            INC     R0              ;INCREMENT SOURCE POINTER
05C7 F0      =1671            MOV     A,@R0           ;RETRIEVE 'YZ' CHARACTERS
05C8 53F0    =1672            ANL     A,#0F0H         ;MASK OUT 'C' CHARACTER (Y0)
05CA 47      =1673            SWAP    A               ;0Y
05CB 4A      =1674            ORL     A,R2            ;XY IS RESULT
05CC A1      =1675            MOV     @R1,A           ;SAVE XY IN RAM @R1 POINTER
05CD 19      =1676            INC     R1              ;INC DESTINATION POINTER
05CE EBC1    =1677            DJNZ    R3,SHIFTL
05D0 83      =1678            RET
              1679 $          INCLUDE(:F3:SNDWRT.SRC)
             =1680 ;**********************************************************************
             =1681 ;**                        Subroutine SNDWRT                         **
             =1682 ;** Function: Send OP code to enable EEPROM Write                    **
             =1683 ;** Date:  3-17-87                                                   **
             =1684 ;** Subroutines Called:  WRACC                                       **
             =1685 ;** Registers/Flags affected:  F0, R0, Accumulator, Carry            **
             =1686 ;** Ports affected:  P2,P1                                           **
             =1687 ;** RAM locations affected:  None                                    **
             =1688 ;**********************************************************************
             =1689 SNDWRT:
05D1 2330    =1690            MOV     A,#EWEN         ;SEND OP CODE TO ENABLE EEPROM
05D3 85      =1691            CLR     F0              ;SET FLAG=0 TO SIGNIFY 9 BITS FOR OP CODE
05D4 8A80    =1692            ORL     P2,#EPRMCS      ;SET EEPROM_CS HIGH
05D6 34C2    =1693            CALL    WRACC           ;WRITE OPCODE TO EEPROM
05D8 9A7F    =1694            ANL     P2,#255-EPRMCS  ;SET EEPROM_CS LOW
05DA 83      =1695            RET
              1696 ;*****************************************
05DB A3       1697 TROPG5: MOVP A,@A
05DC 83       1698            RET
0600          1699            ORG     600H
              1700 $          INCLUDE(:F3:STRRAM.SRC)
             =1701 ;**********************************************************************
             =1702 ;**                        Subroutine STRRAM                         **
             =1703 ;** Function: Write two label settings to RAM from host.             **
             =1704 ;** Date:  3-15-87                                                   **
             =1705 ;** Subroutines Called:  ROCIA                                       **
             =1706 ;** Registers/Flags affected:  CARRY, F0, R0, R1, R2, R3, ACCUMULATOR **
             =1707 ;** Ports affected:  None                                            **
             =1708 ;** RAM locations affected:  @TWOLAB TO @TWOLABEL+8                  **
             =1709 ;**********************************************************************
             =1710 STRRAM:
             =1711 ;INITIALIZE REGISTERS
0600 B808    =1712            MOV     R0,#8D          ;LABEL SET COUNTER
0602 B967    =1713            MOV     R1,#TWOLAB      ;SET RAM POINTER TO TWO LABEL READ LOCATIONS.
0604 85      =1714            CLR     F0              ;USE F0 TO STORE LAST BYTE BIT
             =1715 ;RETRIEVE 1ST LABEL, MS DIGIT
0605 B452    =1716 RTRLAB:    CALL    ROCIA           ;RECIEVE DATA FROM VLSI CHIP
0607 B665    =1717            JF0     ELSTBT          ;IF LAST BYTE BIT SET WE HAVE ERROR.  JUMP TO FILL REMAINING RAM
0609 F665    =1718            JC      ELSTBT          ;IF CARRY FLAG SET, WE HAVE TRANSMISSION ERROR.  JUMP TO FILL RE
060B 530F    =1719            ANL     A,#0FH          ;MASK UPPER 4 BITS
060D 47      =1720            SWAP    A               ;MS NIBBLE MUST BE IN UPPER 4 BITS OF R2
060E A1      =1721            MOV     @R1,A           ;STORE MASKED BYTE IN R2.
             =1722 ;RETRIEVE 1ST LABEL, LS DIGIT
060F B452    =1723            CALL    ROCIA           ;RECIEVE DATA FROM VLSI CHIP
0611 B665    =1724            JF0     ELSTBT          ;IF LAST BYTE BIT SET WE HAVE ERROR.  JUMP TO FILL REMAINING RAM
0613 F665    =1725            JC      ELSTBT          ;IF CARRY FLAG SET, WE HAVE TRANSMISSION ERROR.  JUMP TO FILL RE
0615 530F    =1726            ANL     A,#0FH          ;MASK UPPER 4 BITS
0617 41      =1727            ORL     A,@R1           ;PACK MS AND LS DIGITS TOGETHER
0618 A1      =1728            MOV     @R1,A           ;SAVE 1ST LABEL IN R2 FOR TEMPORARY STORAGE.
             =1729 ;RAM POINTER STILL SET AT 1ST LABEL.
             =1730 ;GET 2ND LABEL, MS NIBBLE AND CHECK BEFORE STORING.
0619 B452    =1731            CALL    ROCIA           ;RECIEVE DATA FROM VLSI CHIP
061B B665    =1732            JF0     ELSTBT          ;IF LAST BYTE BIT SET WE HAVE ERROR.  JUMP TO FILL REMAINING RAM
061D F665    =1733            JC      ELSTBT          ;IF CARRY FLAG SET, WE HAVE TRANSMISSION ERROR.  JUMP TO FILL RE
061F 530F    =1734            ANL     A,#0FH          ;MASK UPPER 4 BITS
0621 47      =1735            SWAP    A               ;MS NIBBLE MUST BE IN UPPER 4 BITS.
0622 19      =1736            INC     R1              ;INCREMENT RAM POINTER
0623 A1      =1737            MOV     @R1,A           ;TEMPORARILY STORE LABEL 2, MS NIBBLE IN R3.
             =1738 ;GET 2ND LABEL, LS NIBBLE AND CHECK BEFORE STORING.
0624 B452    =1739            CALL    ROCIA           ;RECIEVE DATA FROM VLSI CHIP
             =1740 NOLSBT:
0626 F665    =1741            JC      ELSTBT          ;IF CARRY FLAG SET, WE HAVE TRANSMISSION ERROR.  JUMP TO FILL RE
0628 530F    =1742            ANL     A,#0FH          ;MASK UPPER 4 BITS
```

```
062A 41       =1743           ORL     A,@R1           ;PACK MS NIBBLE WITH LS NIBBLE TO FORM 1 BYTE
062B A1       =1744           MOV     @R1,A           ;STORE 2ND LABEL IN R3 TEMPORARILY.
062C 19       =1745           INC     R1              ;INCREMENT RAM POINTER.
              =1746 ;CHECK FOR LAST BYTE
062D B631     =1747           JF0     LBDET           ;JUMP IF NO LAST BYTE TO NEXT LABEL SET
062F C441     =1748           JMP     DECRO
              =1749 ;LAST BYTE DETECTED. FILL IN THE REST OF RAM WITH FF'S.
0631 F8       =1750 LBDET:    MOV     A,R0            ;CHECK COUNTER FOR 8 BYTES RECIEVED
0632 D301     =1751           XRL     A,#01D          ;COUNTER SHOULD BE AT 1 IF 8 BYTES DONE
0634 C647     =1752           JZ      RTRCVR          ;IF ZERO, NO RAM TO FILL WITH FF'S.
              =1753 ;FILL REST OF RAM WITH FF'S
0636 C8       =1754           DEC     R0              ;ADJUST LABEL SET COUNTER TO BYTE COUNTER
0637 F8       =1755           MOV     A,R0
0638 E7       =1756           RL      A               ;MULTIPLY COUNT BY 2
0639 A8       =1757           MOV     R0,A
063A B1FF     =1758 FILFF:    MOV     @R1,#0FFH       ;STORE FF IN RAM TO SIGNIFY NO LABEL.
063C 19       =1759           INC     R1              ;INCREMENT RAM POINTER.
063D E83A     =1760           DJNZ    R0,FILFF        ;IF R0 NOT 0, GO TO NEXT RAM LOCATION.
063F C447     =1761           JMP     RTRCVR          ;REST OF RAM FILLED WITH FF'S.
              =1762 ;LABEL SET SAVED IN RAM. REPEAT PROCESS UNTIL ALL BYTES ARE STORED.
              =1763 DECRO:
0641 E805     =1764           DJNZ    R0,RTRLAB       ;DECREMENT LABEL SET COUNTER AND JUMP TO BEGINNING OF ROUTINE IF
              =1765 ;F0 SHOULD BE SET DUE TO LAST BYTE BIT. IF NOT, THERE IS AN ERROR.
0643 B647     =1766           JF0     RTRCVR          ;JUMP IF LAST BYTE BIT OK.
0645 C465     =1767           JMP     ELSTBT          ;JUMP TO ERROR ROUTINE IF NO FLAG.
              =1768 ;CHECK FOR LABEL 1 FLAGS BEING EQUAL TO LABEL 2 FLAGS. IF ERROR OCCURS, BEEP 5 TIMES,
              =1769 ; AND THEN CLEAR RAM WITH FF'S.
0647 BB08     =1770 RTRCVR:   MOV     R3,#80          ;SET LABEL 1 FLAG SET COUNTER
0649 B867     =1771           MOV     R0,#TWOLAB      ;SET RAM POINTER #1 TO LABEL 1 FLAGS
064B BA08     =1772 RDLAB1:   MOV     R2,#80          ;SET LABEL 2 FLAG SET COUNTER
064D B968     =1773           MOV     R1,#TWOLAB+1    ;SET RAM POINTER #2 TO LABEL 2 FLAGS
064F F0       =1774 RDLAB2:   MOV     A,@R0           ;READ LABEL 1 FLAG
0650 37       =1775           CPL     A
0651 C66F     =1776           JZ      FLCKRT          ;JUMP TO END OF CHECK ROUTINE. NO MORE FLAGS TO CHECK.
0653 37       =1777           CPL     A               ;PUT ACCUMULATOR BACK TO LABEL 1 FLAG
0654 D1       =1778           XRL     A,@R1           ;COMPARE LABEL 1 FLAG TO LABEL 2 FLAG
0655 C665     =1779           JZ      ELSTBT          ;JUMP IF ERROR. THERE IS A MATCH.
0657 D0       =1780           XRL     A,@R0           ;GET LABEL 2 FLAG BACK IN ACCUMULATOR
0658 37       =1781           CPL     A
0659 C65F     =1782           JZ      INLAB1          ;JUMP IF LABEL 2 FLAG IS FF
065B 19       =1783           INC     R1
065C 19       =1784           INC     R1              ;INCREMENT RAM POINTER FOR LABEL 2
065D EA4F     =1785           DJNZ    R2,RDLAB2       ;DECREMENT LABEL 2 FLAG COUNTER. JUMP IF ZERO.
065F 18       =1786 INLAB1:   INC     R0
0660 18       =1787           INC     R0              ;INCREMENT RAM POINTER FOR LABEL 1
0661 EB4B     =1788           DJNZ    R3,RDLAB1       ;DECREMENT LABEL 1 FLAG COUNTER. JUMP IF ZERO.
0663 C46F     =1789           JMP     FLCKRT          ;TRANSMISSION CHECKS OK. JUMP TO RETURN.
              =1790 ;ERROR. TURN ON RED LIGHT AND BEEP 5 TIMES AFTER CLEARING RAM.
              =1791 ELSTBT:
0665 940A     =1792           CALL    ERS2RM          ;FILL FLAG RAM UP WITH FF'S
              =1793 ;
0667 B805     =1794           MOV     R0,#5           ;SET BEEP COUNT
0669 7481     =1795           CALL    TERRWT          ;BEEP 5 TIMES
              =1796 ;
066B FC       =1797           MOV     A,R4            ;RETRIEVE FLAGS
066C 4380     =1798           ORL     A,#80H          ;SET TWO LABEL ERROR FLAG
066E AC       =1799           MOV     R4,A            ;SAVE SET FLAG
              =1800 ;EVERYTHING IS DONE. RETURN.
066F 83       =1801 FLCKRT:   RET                     ;RAM IS FULL. RETURN TO MAIN ROUTINE.
              =1802
              1803 $    INCLUDE(:F3:FLGPR1.SRC)
              =1804 ;************************************************************************
              =1805 ;**                        Routine FLGPRG                              **
              =1806 ;** Function: Read UPC codes and check if programming to EEPROM is required **
              =1807 ;** Date: 3-17-87
              =1808 ;** Subroutines Called: SNDWRT, ERASFL, TRNFLG, SHIFTL, WRACC, WAIT, TRNOTA **
              =1809 ;************************************************************************
              =1810 ;CHECK SWITCH SETTING FOR EEPROM PROGRAMMING. DIP SWITCH 9, BIT 5 IS
              =1811 ; FLGPRG:
              =1812 ;RESET TWO LABEL ERROR FLAG
0670 FC       =1813           MOV     A,R4
0671 537F     =1814           ANL     A,#7FH          ;RESET ERROR FLAG
0673 AC       =1815           MOV     R4,A            ;RE-SAVE FLAGS
              =1816 ; ENABLE PROGRAMMING SWITCH.
0674 B97D     =1817           MOV     R1,#SWISET      ;SET RAM POINTER TO READ OPTIONS REG.
0676 F1       =1818           MOV     A,@R1           ;RETRIEVE RAM SWITCH SETTINGS
0677 B285     =1819           JB5     PROLAB          ;JUMP TO PROGRAM FLAGS
              =1820 ;CHECK SWITCH 9 FOR PROGRAM FLAGS OPTION
0679 B908     =1821           MOV     R1,#SWLATC      ;SET POINTER TO READ EXTERNAL SWITCHES.
067B 81       =1822           MOVX    A,@R1
067C B285     =1823           JB5     PROLAB
              =1824 ;PROGRAMMING FLAGS BY READING LABELS IS NOT A CHOSEN OPTION. CONTINUE TO READ
              =1825 ; GOOD READ AND COMMUNICATE OUT OCIA PORT.
              =1826 ;SET FLAG POINTER TO 0.
067E FE       =1827           MOV     A,R6
067F 538F     =1828           ANL     A,#08FH         ;RESET FLAG POINTER
0681 AE       =1829           MOV     R6,A            ;SAVE POINTERS
0682 F5       =1830           SEL     MB1
0683 C482     =1831           JMP     GOOD30
              =1832 ;IN 'PROGRAM FLAG' MODE. CHECK FOR UPC A LABEL.
0685 FE       =1833 PROLAB:   MOV     A,R6            ;CHECK VERSION FLAGS FOR UPC A
```

```
0686 5307    =1834         ANL     A,#07H          ;MASK ALL BUT VERSION POINTERS
0688 D301    =1835         XRL     A,#EVERA        ;CHECK AGAINST UPCA CODE
068A C68F    =1836         JZ      CHKLP1          ;JUMP TO CHECK WHICH LABEL PAIRS ARE ENCODED.
068C F5      =1837         SEL     MB1
068D C400    =1838         JMP     RDTAG           ;NOT A VALID FLAG LABEL, DO NOT TRANSMIT.
             =1839 ;
             =1840 ;CHECK FOR LABEL PAIRS TO LOAD INTO EEPROM.
             =1841 ;R6S1 REGISTER HOLDS RIGHT TAG WHICH COMPRISES 6 NIBBLES WITH CHECKSUM AS
             =1842 ; ONE OF THE 6 NIBBLES.  L6S1 REGISTER HOLDS LEFT TAG WHICH COMPRISES 6 NIBBLES.
             =1843 ; UPC A CODE HAS THE FOLLOWING ENCODED INFORMATION:
             =1844 ;    OABCDE FGHIJ(CHECK DIGIT)
             =1845 ;    L6S1     R6S1
             =1846 ; AB SIGNIFIES FIRST PAIR, FIRST LABEL FLAG DIGITS.
             =1847 ; CD SIGNIFIES FIRST PAIR, SECOND LABEL FLAG DIGITS.
             =1848 ; EF SIGNIFIES SECOND PAIR, FIRST LABEL FLAG DIGITS.
             =1849 ; GH SIGNIFIES SECOND PAIR, SECOND LABEL FLAG DIGITS.
             =1850 ; IJ HAS THE FOLLOWING DEFINITION:
             =1851 ;    IJ       DEFINITION
             =1852 ;    01       LABEL PAIRS 1 AND 2
             =1853 ;    02       LABEL PAIRS 3 AND 4
             =1854 ;    03       LABEL PAIRS 5 AND 6
             =1855 ;    04       LABEL PAIRS 7 AND 8
             =1856 ;
             =1857 CHKLP1:
068F B92F    =1858         MOV     R1,#R6S1+1      ;SET POINTER TO RETRIEVE HI NIBBLES
0691 F1      =1859         MOV     A,@R1           ;RETRIEVE HI NIBBLES
0692 530F    =1860         ANL     A,#0FH          ;MASK OUT H NIBBLE
0694 47      =1861         SWAP    A               ;I0
0695 AA      =1862         MOV     R2,A
0696 19      =1863         INC     R1              ;SET POINTER TO J (CHECK DIGIT) NIBBLES
0697 F1      =1864         MOV     A,@R1
0698 53F0    =1865         ANL     A,#0F0H         ;MASK OUT CHECK DIGIT
069A 47      =1866         SWAP    A               ;0J
069B 4A      =1867         ORL     A,R2            ;IJ NIBBLE RETRIEVED
069C AA      =1868         MOV     R2,A            ;SAVE IJ
             =1869 ;
             =1870 ;CHECK IJ FOR BEING 0
069D 96A1    =1871         JNZ     CHKIJ           ;JUMP ON IJ>00
069F C4E7    =1872         JMP     RTPRG           ;JUMP AND IGNORE LABEL. IJ IS INVALID.
             =1873 ;CHECK IJ FOR BEING LESS THAN OR EQUAL TO 4
06A1 03FB    =1874 CHKIJ:  ADD     A,#0FBH
06A3 E6A7    =1875         JNC     VALFLG          ;JUMP TO READ LABEL INTO RAM.  TAG IS VALID.
06A5 C4E7    =1876         JMP     RTPRG           ;JUMP AND IGNORE LABEL. IJ IS INVALID.
             =1877 ;
             =1878 ;VALID FLAG LABEL.  CHECK FLAG POINTER.
             =1879 VALFLG:
06A7 FE      =1880         MOV     A,R6            ;RETRIEVE FLAG POINTER
06A8 5370    =1881         ANL     A,#70H          ;MASK ALL BUT FLAG POINTER
06AA 9680    =1882         JNZ     FLGCHK          ;JUMP FLAG POINTER >0
             =1883 ;FLAG POINTER IS 0.  FILL FLAG RAM WITH FF'S.
06AC 94DA    =1884         CALL    ERS2RM          ;FILL TWO LABEL RAM WITH FF'S
06AE C4C3    =1885         JMP     INCPNT          ;JUMP TO INC FLAG POINTER
             =1886 ;CHECK FLAG POINTER FOR BEING GREATER THAN 3. (TOTAL OF 4 UPC CODES)
06B0 FE      =1887 FLGCHK: MOV     A,R6            ;RETRIEVE FLAG POINTER
06B1 5340    =1888         ANL     A,#40H          ;MASK ALL BUT FLAG POINTER (B2)
06B3 C687    =1889         JZ      RTRMRT          ;FLAG POINTER IS <= 3. ROTATE RAM.
             =1890 ;FOUR SETS OF LABEL FLAGS HAVE BEEN PROGRAMED.  DO NOT ALLOW ANY MORE READS UNLESS SWITCH 9 IS C
06B5 C4E7    =1891         JMP     RTPRG           ;GO TO DISPLAY BAD READ.
             =1892 ;ROTATE RAM 4 BYTES RIGHT.
06B7 BA0C    =1893 RTRMRT: MOV     R2,#12          ;SET LOOP COUNTER
06B9 B976    =1894         MOV     R1,#TWOLAB+15   ;SET DESTINATION POINTER
06BB B872    =1895         MOV     R0,#TWOLAB+11   ;SET SOURCE POINTER
06BD F0      =1896 RTRM1:  MOV     A,@R0           ;RETRIEVE BYTE TO BE SHIFTED
06BE A1      =1897         MOV     @R1,A           ;SAVE BYTE TO NEW LOCATION
06BF C9      =1898         DEC     R1              ;DECREMENT DESTINATION POINTER
06C0 C8      =1899         DEC     R0              ;DECREMENT SOURCE POINTER
06C1 EABD    =1900         DJNZ    R2,RTRM1
             =1901 ;INCREMENT FLAG POINTER
             =1902 INCPNT:
06C3 FE      =1903         MOV     A,R6            ;RETRIEVE FLAG COUNTER
06C4 0310    =1904         ADD     A,#10H          ;INCREMENT FLAG COUNTER
06C6 AE      =1905         MOV     R6,A            ;SAVE FLAG COUNTER
             =1906 ;PLACE L6S1 AND R6S1 INTO RAM
06C7 B967    =1907         MOV     R1,#TWOLAB      ;DESTINATION POINTER
06C9 94C1    =1908         CALL    TRNFLG          ;TRANSFER UPC CODE TO TWO LABEL RAM
06CB D447    =1909         CALL    RTRCVR          ;CHECK TWO LABEL READ RAM
             =1910 ;CHECK TWO LABEL ERROR FLAG
06CD FC      =1911         MOV     A,R4            ;RETRIEVE ERROR FLAG
06CE 37      =1912         CPL     A
06CF F2DD    =1913         JB7     WRTPRM          ;NO ERROR FLAG. JUMP TO WRITE TO EEPROM.
             =1914 ;ERROR.  ERASE RAM AND RESET POINTER.
06D1 94DA    =1915         CALL    ERS2RM          ;ERASE RAM
06D3 FE      =1916         MOV     A,R6            ;RETRIEVE FLAG COUNTER
06D4 538F    =1917         ANL     A,#8FH          ;CLEAR FLAG COUNTER
06D6 AE      =1918         MOV     R6,A
             =1919 ;RETRIEVE AND CLEAR TWO LABEL FLAG ERROR
06D7 FC      =1920         MOV     A,R4            ;RETRIEVE FLAG
06D8 537F    =1921         ANL     A,#7FH          ;RESET FLAG
06DA AC      =1922         MOV     R4,A            ;SAVE FLAG
06DB C4E7    =1923         JMP     RTPRG           ;JUMP TO RDTAG ROUTINE.
             =1924 ;
```

```
                    =1925 ;ERASE AND PROGRAM EEPROM CON..NTS ACCORDING TO RAM
06DD B421           =1926 WRTPRM: CALL    WREPRM          ;WRITE CONTENTS TO EEPROM
06DF 998F           =1927         ANL     P1,#255-EBDLT   ;BD-LT OFF
06E1 8920           =1928         ORL     P1,#EGDLT       ;GD-LT ON
06E3 D5             =1929         SEL     RB1
06E4 BE08           =1930         MOV     R6,#EGDTON*2    ;GOOD TONE LENGTH*2
06E6 C5             =1931         SEL     RB0
06E7 F5             =1932 RTPRG:  SEL     MB1
06E8 C400           =1933         JMP     RDTAG           ;GO READ ANOTHER LABEL
                    1934 ;**************************************
06EA A3             1935 TROPG6: MOVP    A,@A
06EB 83             1936         RET
0700                1937         ORG     700H
                    1938 $       INCLUDE(:F4:FCKCTS.SRC)
                    =1939 ;****************************************************************
                    =1940 ; FILE: FCKCTS.SRC  09-11-86 09:00  BOB ACTIS
                    =1941 ; ROUTINE: CKCNTS
                    =1942 ; FUNCTION: CHECK SEGMENT BUFFER TOTAL COUNTS FOR ENOUGH SEGMENTS FOR
                    =1943 ;           A POSSIBLE VALID VERSION.
                    =1944 ; ENTRY: NO SETUP
                    =1945 ; EXIT:  A = 0 IF ENOUGH SEGMENTS
                    =1946 ;        A <> 0 IF NOT ENOUGH SEGMENTS
                    =1947 ;        USES R0,R1
                    =1948 ;
0700 B9FE           =1949 CKCNTS: MOV     R1,#-2          ;SETUP MINIMUM SCANS REQUIRED VALUE
0702 B835           =1950         MOV     R0,#R6STOT
0704 F0             =1951         MOV     A,@R0
0705 69             =1952         ADD     A,R1
0706 F61C           =1953         JC      CKCN20          ;POSSIBLE UPC-A, EAN-13 OR UPC-D-BLK2
                    =1954 ;
0708 882D           =1955         MOV     R0,#L6STOT
070A F0             =1956         MOV     A,@R0
070B 69             =1957         ADD     A,R1
070C F629           =1958         JC      CKCN30          ;POSSIBLE UPC-E OR UPC-D-BLK1
                    =1959 ;
070E 883B           =1960         MOV     R0,#L4STOT
0710 F0             =1961         MOV     A,@R0
0711 69             =1962         ADD     A,R1
0712 E685           =1963         JNC     CKCNNG
                    =1964 ;
0714 8841           =1965 CKCN10: MOV     R0,#R4STOT
0716 F0             =1966         MOV     A,@R0
0717 69             =1967         ADD     A,R1
0718 F683           =1968         JC      CKCNOK          ;POSSIBLE EAN-8 VERSION
071A E485           =1969         JMP     CKCNNG
                    =1970 ;
071C B82D           =1971 CKCN20: MOV     R0,#L6STOT
071E F0             =1972         MOV     A,@R0
071F 69             =1973         ADD     A,R1
0720 E685           =1974         JNC     CKCNNG
                    =1975 ;
0722 B827           =1976         MOV     R0,#L6S1+3
0724 F0             =1977         MOV     A,@R0           ;GET THE PARITY DECODE BYTE
0725 B247           =1978         JB5     CKCN50          ;JUMP IF UPC-D SEGMENT
0727 E483           =1979         JMP     CKCNOK          ;POSSIBLE UPC-A OR EAN-13
                    =1980 ;
0729 B827           =1981 CKCN30: MOV     R0,#L6S1+3      ;CHECK L6 BUFFER 1
072B F0             =1982         MOV     A,@R0
072C B239           =1983         JB5     CKCN40          ;JUMP IF UPC-D SEGMENT
072E 9283           =1984         JB4     CKCNOK          ;POSSIBLE UPC-E
                    =1985 ;
0730 B82B           =1986         MOV     R0,#L6S2+3      ;CHECK L6 BUFFER 2
0732 F0             =1987         MOV     A,@R0
0733 B239           =1988         JB5     CKCN40          ;JUMP IF UPC-D SEGMENT
0735 9283           =1989         JB4     CKCNOK          ;POSSIBLE UPC-E
0737 E485           =1990         JMP     CKCNNG
                    =1991 ;
0739 B865           =1992 CKCN40: MOV     R0,#N6STOT
073B F0             =1993         MOV     A,@R0
073C 69             =1994         ADD     A,R1
073D E685           =1995         JNC     CKCNNG
                    =1996 ;
073F B83B           =1997 CKCN45: MOV     R0,#L4STOT
0741 F0             =1998         MOV     A,@R0
0742 69             =1999         ADD     A,R1
0743 F683           =2000         JC      CKCNOK          ;POSSIBLE UPC-D1
0745 E485           =2001         JMP     CKCNNG
                    =2002 ;
0747 8841           =2003 CKCN50: MOV     R0,#R4STOT
0749 F0             =2004         MOV     A,@R0
074A 69             =2005         ADD     A,R1
074B E685           =2006         JNC     CKCNNG
                    =2007 ;
074D B859           =2008         MOV     R0,#N4STOT
074F F0             =2009         MOV     A,@R0
0750 69             =2010         ADD     A,R1
0751 F669           =2011         JC      CKCN70          ;POSSIBLE UPC-D4 OR D5
                    =2012 ;
0753 B85F           =2013         MOV     R0,#N5STOT
0755 F0             =2014         MOV     A,@R0
0756 69             =2015         ADD     A,R1
```

```
0757 F661    =2016           JC      CKCN60
             =2017 ;
0759 B84D    =2018           MOV     R0,#N2STOT
075B F0      =2019           MOV     A,@R0
075C 69      =2020           ADD     A,R1
075D F683    =2021           JC      CKCNOK          ;POSSIBLE UPC-D2
075F E485    =2022           JMP     CKCNNG
             =2023 ;
0761 B853    =2024 CKCN60:   MOV     R0,#N3STOT
0763 F0      =2025           MOV     A,@R0
0764 69      =2026           ADD     A,R1
0765 F683    =2027           JC      CKCNOK          ;POSSIBLE UPC-D3
0767 E485    =2028           JMP     CKCNNG
             =2029 ;
0769 B847    =2030 CKCN70:   MOV     R0,#N1STOT
076B F0      =2031           MOV     A,@R0
076C 69      =2032           ADD     A,R1
076D E685    =2033           JNC     CKCNNG
             =2034 ;
076F B865    =2035           MOV     R0,#N6STOT
0771 F0      =2036           MOV     A,@R0
0772 69      =2037           ADD     A,R1
0773 F67D    =2038           JC      CKCN80
             =2039 ;
0775 B85F    =2040           MOV     R0,#N5STOT
0777 F0      =2041           MOV     A,@R0
0778 69      =2042           ADD     A,R1
0779 F683    =2043           JC      CKCNOK          ;POSSIBLE UPC-D4
077B E485    =2044           JMP     CKCNNG
             =2045 ;
077D B853    =2046 CKCN80:   MOV     R0,#N3STOT
077F F0      =2047           MOV     A,@R0
0780 69      =2048           ADD     A,R1
0781 E685    =2049           JNC     CKCNNG          ;FALL THRU POSSIBLE UPC-D5
             =2050 ;
0783 27      =2051 CKCNOK:   CLR     A               ;ENOUGH SCANS FOR A POSSIBLE SEGMENT
0784 83      =2052           RET
             =2053 ;
0785 27      =2054 CKCNNG:   CLR     A               ;NO POSSIBLE VERSIONS YET
0786 37      =2055           CPL     A
0787 83      =2056           RET
             =2057 $         INCLUDE(:F4:DRSUMT.SRC)
             =2058 ;****************************************************************
             =2059 ; FILE: DRSUMT  05-28-86  11:00  BOB ACTIS
             =2060 ;****************************************************************
             =2061 ; ROUTINE: SUM4BY, SUM3BY, SUM2BY
             =2062 ; FUNCTION: ADD 4,3 OR 2 BYTE SEGMENT DATA TO ACCUMULATOR
             =2063 ; ENTRY: R0 = START ADDRESS OF SEGMENT BUFFER TO SUM
             =2064 ; EXIT:  R0 = END ADDRESS OF SEGMENT BUFFER
             =2065 ;        A = RUNNING SUM (BASE 256) OF SEGMENT BUFFER DATA
             =2066 ;
0788 60      =2067 SUM4BY:   ADD     A,@R0
0789 18      =2068           INC     R0
078A 60      =2069 SUM3BY:   ADD     A,@R0
078B 18      =2070           INC     R0
078C 60      =2071 SUM2BY:   ADD     A,@R0
078D 18      =2072           INC     R0
078E 60      =2073           ADD     A,@R0
078F 83      =2074           RET
             =2075 ;****************************************************************
             =2076 ; ROUTINE: DRSUMT  DOUBLE READ SUM TEST
             =2077 ; FUNCTION: CALCULATE THE LABEL DATA SUM (BASE 256)
             =2078 ;           COMPARE IT TO THE PREVIOUS LABEL SUM
             =2079 ;           SAVE THE NEW SUM
             =2080 ; ENTRY: A VALID LABEL VERSION HAS BEEN FOUND
             =2081 ; EXIT:  USES R0
             =2082 ;        LABEL DATA SUM STORED IN DRSUM
             =2083 ;        A=0 IF OLD=NEW (CONSECUTIVE LABELS ARE THE SAME)
             =2084 ;        A<>0 IF OLD<>NEW (CONSECUTIVE LABELS ARE DIFFERENT)
             =2085 ;
0790 FE      =2086 DRSUMT:   MOV     A,R6            ;GET VERSION FLAG
0791 530F    =2087           ANL     A,#0FH          ;MASK VERSION POINTER
0793 0300    =2088           ADD     A,#0            ;SETUP CARRY FOR DA
0795 57      =2089           DA      A
0796 92F4    =2090           JB4     DRVRNG          ;JUMP IF POINTER > 9. ILLEGAL VERSION.
             =2091 ;
0798 039B    =2092           ADD     A,#LOW DRSTBL   ;ADD OFFSET TO TABEL ADDRESS
079A B3      =2093           JMPP    @A              ;JUMP TO VERSION ROUTINE
079B F4      =2094 DRSTBL:   DB      LOW DRVRNG      ;NO VALID VERSION. POINTER=0.
079C A5      =2095           DB      LOW DRSMA
079D A5      =2096           DB      LOW DRSM13
079E A8      =2097           DB      LOW DRSME
079F E6      =2098           DB      LOW DRSM8
07A0 CA      =2099           DB      LOW DRSMD1
07A1 D3      =2100           DB      LOW DRSMD2
07A2 C1      =2101           DB      LOW DRSMD3
07A3 B4      =2102           DB      LOW DRSMD4
07A4 A8      =2103           DB      LOW DRSMD5
             =2104 ;
07A5         =2105 DRSMA     EQU     $
07A5 27      =2106 DRSM13:   CLR     A
```

```
07A6 E4DC        =2107           JMP     DRSM7B      ;GO SUM 7 BYTES
                 =2108 ;
07A8 27          =2109 DRSME:    CLR     A
07A9 E4E0        =2110           JMP     DRSM7C      ;GO SUM 7 CHARACTERS
                 =2111 ;
07AB 27          =2112 DRSMD5:   CLR     A
07AC B860        =2113           MOV     R0,#N6S1
07AE F48C        =2114           CALL    SUM2BY
07B0 B84E        =2115           MOV     R0,#N3S1
07B2 E4B7        =2116           JMP     DRSM5X      ;GO FINISH THE D5 SUM
                 =2117 ;
07B4 27          =2118 DRSMD4:   CLR     A
07B5 B85A        =2119           MOV     R0,#N5S1
07B7 F48C        =2120 DRSM5X:   CALL    SUM2BY
07B9 B854        =2121           MOV     R0,#N4S1
07BB F48C        =2122           CALL    SUM2BY
07BD B842        =2123           MOV     R0,#N1S1
07BF E4D6        =2124           JMP     DRSM4X      ;GO FINISH THE D4 OR D5 SUM
                 =2125 ;
07C1 27          =2126 DRSMD3:   CLR     A
07C2 B85A        =2127           MOV     R0,#N5S1
07C4 F48C        =2128           CALL    SUM2BY
07C6 B84E        =2129           MOV     R0,#N3S1
07C8 E4D6        =2130           JMP     DRSM3X      ;GO FINISH THE D3 SUM
                 =2131 ;
07CA 27          =2132 DRSMD1:   CLR     A
07CB B860        =2133           MOV     R0,#N6S1
07CD F48C        =2134           CALL    SUM2BY
07CF B836        =2135           MOV     R0,#L4S1
07D1 E4DE        =2136           JMP     DRSM1X      ;GO FINISH THE D1 SUM
                 =2137 ;
07D3 27          =2138 DRSMD2:   CLR     A
07D4 B848        =2139           MOV     R0,#N2S1
07D6             =2140 DRSM3X    EQU     $
07D6 F48C        =2141 DRSM4X:   CALL    SUM2BY
07D8 B83C        =2142           MOV     R0,#R4S1
07DA F48C        =2143           CALL    SUM2BY
07DC B82E        =2144 DRSM7B:   MOV     R0,#R6S1    ;SUM 7 BYTES
07DE F48A        =2145 DRSM1X:   CALL    SUM3BY
07E0 B824        =2146 DRSM7C:   MOV     R0,#L6S1    ;SUM 7 CHARACTERS
07E2 F488        =2147           CALL    SUM4BY
07E4 E4EF        =2148           JMP     DRSMDN      ;JUMP - THE SUM IS FINISHED
                 =2149 ;
07E6 27          =2150 DRSM8:    CLR     A
07E7 B836        =2151           MOV     R0,#L4S1
07E9 F48C        =2152           CALL    SUM2BY
07EB B83C        =2153           MOV     R0,#R4S1
07ED F48C        =2154           CALL    SUM2BY
                 =2155 ;
07EF B87C        =2156 DRSMDN:   MOV     R0,#DRSUM
07F1 20          =2157           XCH     A,@R0       ;SAVE THE NEW SUM IN DRSUM
07F2 D0          =2158           XRL     A,@R0       ;COMPARE THE OLD AND NEW SUM
07F3 83          =2159           RET
                 =2160 ;
07F4 27          =2161 DRVRNG:   CLR     A           ;DOUBLE READ VERSION N/G
07F5 83          =2162           RET
                 2163 ;************************************
07F6 A3          2164 TROPG7:   MOVP    A,@A
07F7 83          2165           RET
0800             2166           ORG     800H        ;START OF MEMORY BANK 1
                 2167 $         INCLUDE(:F4:VERDLB.SRC)
                 =2168 ;*********************************************************
                 =2169 ; FILE: VERDLB.SRC  6-17-86 17:15  BOB ACTIS
                 =2170 ;       VERSION "D" FIRMWARE LIBRARY.
                 =2171 ;*********************************************************
                 =2172 ; ROUTINE: CLR6SG
                 =2173 ; FUNCTION: CLEAR 6-CHAR SEGMENTS AND COUNTERS.
                 =2174 ; ENTRY: START ADDRESS AND COUNT IN DEFS TABLE.
                 =2175 ; EXIT:  A = 0
                 =2176 ;        R0 = END OF 6-CHAR BUFFER/COUNTER SPACE PLUS 1.
                 =2177 ;        R2 = 0
                 =2178 ;        6-CHAR BUFFER/COUNTER SPACE = 0'S.
                 =2179 ;
0800 B824        =2180 CLR6SG:  MOV    R0,#BF6CST    ;START OF 6-CHAR BUFFER AREA
0802 BA12        =2181          MOV    R2,#BF6CNT    ;NUMBER OF BYTES IN BUFFER
0804 0410        =2182          JMP    CLRTOO        ;JUMP TO THE CLEAR LOOP
                 =2183 ;*********************************************************
                 =2184 ; ROUTINE: CLR4SG
                 =2185 ; FUNCTION: CLEAR 4-CHAR SEGMENTS AND COUNTERS.
                 =2186 ; ENTRY: START ADDRESS AND COUNT IN DEFS TABLE.
                 =2187 ; EXIT:  A = 0
                 =2188 ;        R0 = END OF 4-CHAR BUFFER/COUNTER SPACE PLUS 1.
                 =2189 ;        R2 = 0
                 =2190 ;        4-CHAR BUFFER/COUNTER SPACE = 0'S.
                 =2191 ;
0806 B836        =2192 CLR4SG:  MOV    R0,#BF4CST    ;START OF 4-CHAR BUFFER AREA
0808 BA30        =2193          MOV    R2,#BF4CNT    ;NUMBER OF BYTES IN BUFFER
080A 0410        =2194          JMP    CLRTOO        ;JUMP TO THE CLEAR LOOP
                 =2195 ;*********************************************************
                 =2196 ; ROUTINE: CLRSNB
                 =2197 ; FUNCTION: CLEAR THE SCAN BUFFER.
```

```
                =2198 ; ENTRY: START ADDRESS IN DEFS TABLE.
                =2199 ; EXIT:  A = 0
                =2200 ;        R0 = END OF SCAN BUFFER SPACE PLUS 1.
                =2201 ;        R2 = 0
                =2202 ;        SCAN BUFFER SPACE = 0'S.
                =2203 ;
080C B820       =2204 CLRSNB: MOV    R0,#SCNBUF     ;START OF SCAN BUFFER AREA
080E BA04       =2205         MOV    R2,#4          ;NUMBER OF BYTES IN BUFFER
0810 27         =2206 CLRTO0: CLR    A              ;CLEAR LOOP USED BY OTHER ROUTINES
0811 A0         =2207 CLRSN1: MOV    @R0,A
0812 18         =2208         INC    R0
0813 EA11       =2209         DJNZ   R2,CLRSN1
0815 83         =2210         RET
                =2211 ;********************************************************************
                =2212 ; ROUTINE: CLRSBF
                =2213 ; FUNCTION: CLEAR SEND BUFFER, POINTER AND FLAG.
                =2214 ; ENTRY: START ADDRESS AND COUNT IN DEFS TABLE.
                =2215 ;        RB0
                =2216 ; EXIT:  A = 0
                =2217 ;        R0 = END OF SEND BUFFER SPACE PLUS 1.
                =2218 ;        R2 = 0
                =2219 ;        SEND BUFFER SPACE = 0CCH'S. (TERMINATION BYTES)
                =2220 ;        SEND BUFFER FULL FLAG CLEAR. RB0-R4-B3
                =2221 ;        SEND BUFFER POINTER SET TO PACKED DATA START ADDRESS.
                =2222 ;
0816 FC         =2223 CLRSBF: MOV    A,R4
0817 53F7       =2224         ANL    A,#255-ESBFUL  ;CLEAR SEND BUFFER FULL FLAG
0819 AC         =2225         MOV    R4,A
                =2226 ;
081A 8866       =2227         MOV    R0,#SBFPNT
081C B0CE       =2228         MOV    @R0,#SBSTRT    ;SET POINTER TO PACKED START ADDRESS
                =2229 ;
081E 8867       =2230         MOV    R0,#SBUF       ;START OF SEND BUFFER AREA
0820 BA12       =2231         MOV    R2,#SBUFSZ     ;NUMBER OF BYTES IN BUFFER
0822 23CC       =2232         MOV    A,#0CCH        ;LOAD TERMINATION BYTES
0824 0411       =2233         JMP    CLRSN1         ;JUMP TO THE CLEAR LOOP
                =2234 ;********************************************************************
                =2235 ; ROUTINE: MOV2BY, MOV3BY, MOV4BY
                =2236 ; FUNCTION: MOVE BYTES FROM ONE BUFFER TO ANOTHER BUFFER.
                =2237 ; ENTRY: R0 = FIRST BYTE ADDRESS OF SOURCE BUFFER.
                =2238 ;        R1 = FIRST AVAILABLE BYTE ADDRESS OF DESTINATION BUFFER.
                =2239 ; EXIT:  DATA MOVED FROM SOURCE BUFFER TO DESTINATION BUFFER.
                =2240 ;        R0 = END OF SOURCE BUFFER ADDRESS PLUS 1.
                =2241 ;        R1 = NEXT AVAILABLE BYTE ADDRESS OF DESTINATION BUFFER.
                =2242 ;        R2 = 0
                =2243 ;        A = LAST BYTE TRANSFERED
                =2244 ;
0826 BA02       =2245 MOV2BY: MOV    R2,#2
0828 0430       =2246         JMP    MOVXBY
082A BA03       =2247 MOV3BY: MOV    R2,#3
082C 0430       =2248         JMP    MOVXBY
082E BA04       =2249 MOV4BY: MOV    R2,#4
0830 F0         =2250 MOVXBY: MOV    A,@R0
0831 A1         =2251         MOV    @R1,A
0832 18         =2252         INC    R0
0833 19         =2253         INC    R1
0834 EA30       =2254         DJNZ   R2,MOVXBY
0836 83         =2255         RET
                =2256 ;********************************************************************
                =2257 ; ROUTINE: SGSUM4, SGSUM6
                =2258 ; FUNCTION: SUM THE DIGITS OF A SEGMENT FOR THE MOD-10 TEST.
                =2259 ;           ALL ARITHMETIC IS ASSUMED BCD AND ONLY THE UNITS DIGIT
                =2260 ;           IS VALID IN THE SUMS.
                =2261 ; ENTRY: R0 = FIRST BYTE ADDRESS OF SEGMENT TO BE SUMMED.
                =2262 ; EXIT:  R0 = NOT CHANGED
                =2263 ;        R2 = C1+C3+C5  [C1+C3]
                =2264 ;        A  = C2+C4+C6  [C2+C4]
                =2265 ;        F0 IS USED
                =2266 ;
0837 85         =2267 SGSUM4: CLR    F0
0838 95         =2268         CPL    F0             ;SET F0 FOR 4-CHAR SUM
0839 043C       =2269         JMP    SGSUMX
                =2270 ;
083B 85         =2271 SGSUM6: CLR    F0             ;CLEAR F0 FOR 6-CHAR SUM
083C BAF0       =2272 SGSUMX: MOV    R2,#0F0H       ;MASK FOR ODD DIGITS
083E F0         =2273         MOV    A,@R0          ;C1
083F 5A         =2274         ANL    A,R2
0840 18         =2275         INC    R0
0841 60         =2276         ADD    A,@R0          ;C1+C3
0842 57         =2277         DA     A
0843 5A         =2278         ANL    A,R2
0844 B649       =2279         JF0    SGSUMY         ;JUMP IF 4-CHAR SUM
                =2280 ;
0846 18         =2281         INC    R0
0847 60         =2282         ADD    A,@R0          ;C1+C3+C5
0848 57         =2283         DA     A
0849 47         =2284 SGSUMY: SWAP   A              ;PUT SUM IN LOW BYTE
084A AA         =2285         MOV    R2,A           ;SAVE C1+C3+C5  [C1+C3]
                =2286 ;
084B F0         =2287         MOV    A,@R0          ;C6  [C4]
084C C8         =2288         DEC    R0
```

```
084D 60      =2289           ADD     A,@R0           ;C6+C4  [C4+C2]
084E 57      =2290           DA      A
084F B654    =2291           JF0     SGSUMR          ;JUMP IF 4-CHAR SUM
             =2292 ;
0851 C8      =2293           DEC     R0
0852 60      =2294           ADD     A,@R0           ;C6+C4+C2
0853 57      =2295           DA      A
0854 83      =2296 SGSUMR:   RET
             =2297 ;****************************************************************
             =2298 ; ROUTINE: APL3R2
             =2299 ; FUNCTION: ADD 3*R2 TO A. (BCD)
             =2300 ; ENTRY: NO SETUP
             =2301 ; EXIT:   A = A+(3*R2)
             =2302 ;         R2 = NOT CHANGED
             =2303 ;
0855 6A      =2304 APL3R2:   ADD     A,R2
0856 57      =2305           DA      A
0857 6A      =2306           ADD     A,R2
0858 57      =2307           DA      A
0859 6A      =2308           ADD     A,R2
085A 57      =2309           DA      A
085B 83      =2310           RET
             =2311 ;****************************************************************
             =2312 ; ROUTINE: MOD104  6-2-86  14:25  BOB ACTIS
             =2313 ; FUNCTION: CALCULATE 4 CHARACTER MODULO 10 CHECKSUM VALUE
             =2314 ; ENTRY: R0 = FIRST BYTE ADDRESS OF SEGMENT TO BE PROCESSED
             =2315 ; EXIT:  A = CALCULATED VALUE
             =2316 ;
085C 1437    =2317 MOD104: CALL    SGSUM4
085E 1455    =2318         CALL    APL3R2
0860 83      =2319         RET
             =2320 ;****************************************************************
             =2321 ; ROUTINE: MOD106  6-2-86  14:25  BOB ACTIS
             =2322 ; FUNCTION: CALCULATE 6 CHARACTER MODULO 10 CHECKSUM VALUE
             =2323 ; ENTRY: R0 = FIRST BYTE ADDRESS OF SEGMENT TO BE PROCESSED
             =2324 ; EXIT:  A = CALCULATED VALUE
             =2325 ;
0861 1438    =2326 MOD106: CALL    SGSUM6
0863 1455    =2327         CALL    APL3R2
0865 83      =2328         RET
             =2329 $        INCLUDE(:F3:EMOD10.SRC)
             =2330 ;****************************************************************
             =2331 ; FILE: EMOD10.SRC  11-18-86 12:15  BOB ACTIS
             =2332 ; ROUTINE: EMOD10
             =2333 ; FUNCTION: VERIFY THE EMOD10 CHECK CHARACTER
             =2334 ; ENTRY: SEGMENT IN SCAN BUFFER
             =2335 ; EXIT:  USES R0,R2,A
             =2336 ;        A = 0 IF CHECK CHARACTER IS GOOD
             =2337 ;        A <> 0 IF CHECK CHARACTER IS BAD
             =2338 ;
0866 B820    =2339 EMOD10: MOV     R0,#SCNBUF
0868 B979    =2340         MOV     R1,#WRKBUF
086A 142A    =2341         CALL    MOV3BY          ;MOVE SCAN BUFFER DATA TO WORK BUFFER
             =2342 ;
086C B822    =2343         MOV     R0,#SCNBUF+2
086E F0      =2344         MOV     A,@R0           ;GET CHARACTER C6
086F 530F    =2345         ANL     A,#0FH
0871 03FD    =2346         ADD     A,#-3
0873 F27C    =2347         JB7     ECASE1          ;JUMP IF C6=0,1,2
0875 C685    =2348         JZ      ECASE2          ;JUMP IF C6=3
0877 07      =2349         DEC     A
0878 C690    =2350         JZ      ECASE3          ;JUMP IF C6=4
087A 0496    =2351         JMP     ECASE4          ;JUMP IF C6=5,6,7,8,9
             =2352 ;
             =2353 ; FOR C6=0,1,2 COMPUTE 3*(C2+C3+C5)+C1+C4+C6
             =2354 ;
087C B879    =2355 ECASE1: MOV     R0,#WRKBUF
087E F0      =2356         MOV     A,@R0
087F 47      =2357         SWAP    A               ;SWAP C1 AND C2
0880 A0      =2358         MOV     @R0,A
0881 1438    =2359         CALL    SGSUM6          ;C2,C1,C3,C4,C5,C6
0883 0498    =2360         JMP     EMODSM
             =2361 ;
             =2362 ; FOR C6=3 COMPUTE 3*(C2+0+C5)+C1+C3+C4
             =2363 ;
0885 B87A    =2364 ECASE2: MOV     R0,#WRKBUF+1
0887 27      =2365         CLR     A
0888 30      =2366         XCHD    A,@R0           ;C4=0
0889 18      =2367         INC     R0
088A 30      =2368         XCHD    A,@R0           ;C6=C4
088B F0      =2369         MOV     A,@R0           ;A=C5,C4
088C 47      =2370         SWAP    A               ;A=C4,C5
088D A0      =2371         MOV     @R0,A
088E 0496    =2372         JMP     ECASE4          ;C1,C2,C3,0,C4,C5
             =2373 ; FOR C6=4 COMPUTE 3*(C2+C4+C5)+C1+C3+0
             =2374 ;
0890 B87B    =2375 ECASE3: MOV     R0,#WRKBUF+2
0892 27      =2376         CLR     A
0893 20      =2377         XCH     A,@R0           ;C5=C6=0
0894 47      =2378         SWAP    A
0895 30      =2379         XCHD    A,@R0           ;C5=0, C6=C5
```

```
                  =2380                          ;C1,C2,C3,C4,0,C5
                  =2381 ;
                  =2382 ; FOR C6=5,6,7,8,9  COMPUTE 3*(C2+C4+C6)+C1+C3+C5
                  =2383 ;
0896 B879         =2384 ECASE4: MOV    R0,#WRKBUF    ;C1,C2,C3,C4,C5,C6
0898 1438         =2385         CALL   SGSUM6
089A 2A           =2386         XCH    A,R2
                  =2387 ;
                  =2388 ; FINAL SUM
                  =2389 ;
089B 1455         =2390 EMODSM: CALL   APL3R2
                  =2391 ;
                  =2392 ; CHECK AGAINST THE CHECK CHARACTER
                  =2393 ;
089D B823         =2394 EMODCK: MOV    R0,#SCNBUF+3
089F 60           =2395         ADD    A,@R0
08A0 57           =2396         DA     A
08A1 530F         =2397         ANL    A,#0FH
08A3 83           =2398         RET
                  2399  $       INCLUDE(:F3:FCKFCA.SRC)
                  =2400 ;****************************************************************
                  =2401 ; FILE: FCKFCA.SRC  10-25-83 17:10  BOB ACTIS
                  =2402 ; ROUTINE: CKFCA
                  =2403 ; FUNCTION: CHECK IF FRAME CONTROL ARRAY HAS DATA.
                  =2404 ;           IF SDATA, PROCESS BYTE.
                  =2405 ;           IF SEGMENT CAPTURE AND SCANNING BIT IS SET, PUT SEGMENT
                  =2406 ;              INTO THE SCAN BUFFER.
                  =2407 ;           IF SEGMENT CAPTURE AND NOT SCANNING, RESET THE FRAME.
                  =2408 ;           IF A SEGMENT IS SEEN, SET R7.
                  =2409 ; ENTRY: RB0
                  =2410 ; EXIT:  USES R0,R1,A
                  =2411 ;        R7 IS SET IF A SEGMENT IS SEEN.
                  =2412 ;
08A4 86A7         =2413 CKFCA:  JNI    CKFC10        ;JUMP IF FCA HAS DATA
08A6 83           =2414         RET
                  =2415 ;
08A7 B801         =2416 CKFC10: MOV    R0,#ESRRD
08A9 FC           =2417         MOV    A,R4
08AA 12B3         =2418         JB0    CKFC20        ;JUMP IF SCANNING BIT IS SET
08AC 80           =2419         MOVX   A,@R0         ;READ BYTE
08AD F2DF         =2420         JB7    CKFC95        ;JUMP IF HOST DATA
08AF 90           =2421         MOVX   @R0,A         ;RESET FRAME CAPTURE
08B0 BF08         =2422         MOV    R7,#EWAIT     ;SET THE "SEG SEEN" TIMER
08B2 83           =2423         RET
                  =2424 ;
08B3 80           =2425 CKFC20: MOVX   A,@R0         ;READ 1ST CHAR OF SEGMENT
08B4 F2DF         =2426         JB7    CKFC95        ;JUMP IF HOST DATA
08B6 D2DB         =2427         JB6    CKFC90        ;JUMP IF PERIODICAL CAPTURE
08B8 B920         =2428         MOV    R1,#SCNBUF
                  =2429 ;
08BA 47           =2430         SWAP   A
08BB A1           =2431         MOV    @R1,A         ;STORE 1ST CHAR
08BC 80           =2432         MOVX   A,@R0         ;READ 2ND CHAR OF SEGMENT
08BD 31           =2433         XCHD   A,@R1         ;1ST AND 2ND STORED
08BE 19           =2434         INC    R1
08BF 80           =2435         MOVX   A,@R0         ;READ 3RD CHAR
                  =2436 ;
08C0 47           =2437         SWAP   A
08C1 A1           =2438         MOV    @R1,A         ;STORE 3RD CHAR
08C2 80           =2439         MOVX   A,@R0         ;READ 4TH CHAR
08C3 31           =2440         XCHD   A,@R1         ;3RD AND 4TH STORED
08C4 19           =2441         INC    R1
08C5 80           =2442         MOVX   A,@R0         ;READ 5TH CHAR
                  =2443 ;
08C6 47           =2444         SWAP   A
08C7 A1           =2445         MOV    @R1,A         ;STORE 5TH CHAR
08C8 80           =2446         MOVX   A,@R0
08C9 31           =2447         XCHD   A,@R1         ;5TH AND 6TH STORED
08CA 19           =2448         INC    R1
                  =2449 ;
08CB B804         =2450         MOV    R0,#EPRDEC
08CD 80           =2451         MOVX   A,@R0         ;READ PARITY DECODE BYTE
08CE 537F         =2452         ANL    A,#07FH       ;MASK OFF THE UNUSED BIT
08D0 A1           =2453         MOV    @R1,A         ;STORE PARITY DECODE B0-B6
                  =2454 ;
08D1 D37F         =2455         XRL    A,#07FH       ;TEST FOR NO DECODE. (BAD PARITY MAP)
08D3 9609         =2456         JNZ    CKFC80        ;JUMP IF DECODE IS OK.
08D5 140C         =2457         CALL   CLRSNB        ;CLEAR THE SCAN BUFFER
08D7 04DB         =2458         JMP    CKFC90
                  =2459 ;
08D9 BF08         =2460 CKFC80: MOV    R7,#EWAIT     ;SET THE "SEG SEEN" TIMER
                  =2461 ;
08DB B801         =2462 CKFC90: MOV    R0,#EFRRST
08DD 90           =2463         MOVX   @R0,A         ;RESET THE FRAME
08DE 83           =2464         RET
                  =2465 ;
08DF E5           =2466 CKFC95: SEL    MB0
08E0 9400         =2467         CALL   SDATA
08E2 F5           =2468         SEL    MB1
08E3 83           =2469         RET
                  2470 ;***************************************
```

```
08E4 A3        2471 TROPG8: MOVP    A,@A
08E5 83        2472         RET
0900           2473         ORG     0900H
               2474 $       INCLUDE(:F4:HCOMM.SRC)
              =2475 ;************************************************************
              =2476 ; FILE: HCOMM.SRC  11-18-86 12:15  BOB ACTIS
              =2477 ; ROUTINE: HCOMM -- FOR THE OCIA INTERFACE
              =2478 ; FUNCTION: SEND NEXT CHARACTER IN SEND BUFFER TO HOST.
              =2479 ; ENTRY: RB0
              =2480 ; EXIT: USES R0,R1,R2,R3,A
              =2481 ;
0900 FC       =2482 HCOMM:  MOV     A,R4
0901 7209     =2483         JB3     HCOM10          ;JUMP IF SEND BUFFER HAS DATA
0903 37       =2484         CPL     A
0904 B248     =2485         JB5     HCOM90          ;JUMP IF BUFMAN REQUEST FLAG NOT SET
0906 F40A     =2486         CALL    BUFMAN          ;PUT MESSAGE INTO THE COMM BUFFER
0908 83       =2487         RET
              =2488 ;
0909 0A       =2489 HCOM10: IN      A,P2
090A 9248     =2490         JB4     HCOM90          ;JUMP IF RDATA SR NOT READY
              =2491 ;
090C B966     =2492         MOV     R1,#SBFPNT      ;GET POINTER ADDRESS
090E F1       =2493         MOV     A,@R1           ;GET POINTER
090F 97       =2494         CLR     C
0910 67       =2495         RRC     A               ;PUT NIBBLE POINTER IN CARRY
0911 11       =2496         INC     @R1             ;INCREMENT POINTER
0912 A9       =2497         MOV     R1,A            ;BYTE ADDRESS
0913 17       =2498         INC     A
0914 A8       =2499         MOV     R0,A            ;NEXT BYTE ADDRESS
0915 F1       =2500         MOV     A,@R1           ;GET DATA
0916 D3CC     =2501         XRL     A,#ETRMBY
0918 C642     =2502         JZ      HCOM55          ;JUMP IF TERMINATION BYTE TOO SOON
              =2503 ;
091A F1       =2504         MOV     A,@R1           ;ONE MORE TIME...
091B F61E     =2505         JC      HCOM20          ;JUMP IF LOW NIBBLE IS NEXT
091D 47       =2506         SWAP    A
              =2507 ;
091E 530F     =2508 HCOM20: ANL     A,#0FH          ;MASK NIBBLE
0920 AB       =2509         MOV     R3,A            ;SAVE NIBBLE
0921 D30C     =2510         XRL     A,#0CH
0923 C648     =2511         JZ      HCOM90          ;JUMP IF FILLER CHARACTER (DON'T SEND)
0925 27       =2512         CLR     A
0926 A9       =2513         MOV     R1,A            ;CLEAR R1 FOR POSSIBLE LAST CHAR BIT
0927 E632     =2514         JNC     HCOM30          ;JUMP IF NOT LOW (POSSIBLE LAST) NIBBLE
              =2515 ;
0929 F0       =2516         MOV     A,@R0           ;GET NEXT DATA BYTE
092A D3CC     =2517         XRL     A,#ETRMBY
092C 9632     =2518         JNZ     HCOM30          ;JUMP IF NOT TERMINATION BYTE
              =2519 ;
092E B940     =2520         MOV     R1,#EBIT6       ;PUT IN THE LAST CHAR BIT
0930 1416     =2521         CALL    CLRSBF          ;CLEAR SEND BUFFER, ETC.
              =2522 ;
0932 FB       =2523 HCOM30: MOV     A,R3            ;GET NIBBLE
0933 0330     =2524         ADD     A,#00110000B
0935 57       =2525         DA      A
0936 823A     =2526         JB5     HCOM40          ;JUMP IF CHAR IS 0-9
0938 03C1     =2527         ADD     A,#11000001B    ;FORMAT CHARACTERS A-F
              =2528 ;
093A 49       =2529 HCOM40: ORL     A,R1            ;ADD POSSIBLE LAST CHAR BIT
093B AB       =2530         MOV     R3,A            ;SAVE DATA BYTE
093C E5       =2531         SEL     MB0
093D 3490     =2532         CALL    PARITY
093F F5       =2533         SEL     MB1
0940 2445     =2534         JMP     HCOM80
              =2535 ;
0942 1416     =2536 HCOM55: CALL    CLRSBF          ;CLEAR, TERMINATION BYTE TOO SOON
0944 83       =2537         RET
              =2538 ;
0945 B802     =2539 HCOM80: MOV     R0,#EOCIA
0947 90       =2540         MOVX    @R0,A           ;SEND CHARACTER
              =2541 ;
0948 83       =2542 HCOM90: RET
               2543 $       INCLUDE(:F4:PROCSG.SRC)
              =2544 ;************************************************************
              =2545 ; FILE: PROCSG.SRC  07-03-86 15:15  BOB ACTIS
              =2546 ;************************************************************
              =2547 ; ROUTINE: SWP4SN, SWP6SN
              =2548 ; FUNCTION: SWAP (REVERSE) ORDER OF PACKED CHARACTERS IN SCAN BUFFER.
              =2549 ;           SWP4SN SWAPS CHARACTERS IN SCNBUF+1 AND SCNBUF+2.
              =2550 ;           SWP6SN SWAPS CHARACTERS IN SCNBUF, SCNBUF+1 AND SCNBUF+2.
              =2551 ;           CLEARS BACKWARD BIT IN THE PARITY DECODE BYTE SCNBUF+3.
              =2552 ; ENTRY: NO SETUP
              =2553 ; EXIT: CHARACTERS SWAPED.
              =2554 ;       R0 = SCNBUF+3 (PARITY DECODE BYTE ADDRESS)
              =2555 ;            BACKWARD BIT IS CLEARED.
              =2556 ;       A = PARITY DECODE BYTE
              =2557 ;
0949 B822     =2558 SWP4SN: MOV     R0,#SCNBUF+2
094B F0       =2559         MOV     A,@R0
094C 47       =2560         SWAP    A
094D C8       =2561         DEC     R0
```

```
094E 20        =2562              XCH    A,@R0
094F 47        =2563              SWAP   A
0950 18        =2564              INC    R0
0951 A0        =2565              MOV    @R0,A
0952 2462      =2566              JMP    SWPXEX
               =2567 ;
0954 B822      =2568 SWP6SW: MOV   R0,#SCNBUF+2
0956 F0        =2569              MOV    A,@R0
0957 47        =2570              SWAP   A
0958 C8        =2571              DEC    R0
0959 20        =2572              XCH    A,@R0
095A 47        =2573              SWAP   A
095B 20        =2574              XCH    A,@R0
095C C8        =2575              DEC    R0
095D 20        =2576              XCH    A,@R0
095E 47        =2577              SWAP   A
095F 18        =2578              INC    R0
0960 18        =2579              INC    R0
0961 A0        =2580              MOV    @R0,A
               =2581 ;
0962 18        =2582 SWPXEX: INC   R0
0963 F0        =2583              MOV    A,@R0
0964 53BF      =2584              ANL    A,#255-EDECBK
0966 A0        =2585              MOV    @R0,A
0967 4409      =2586              JMP    SWPRT
               =2587 ;****************************************************************
               =2588 ; ROUTINE:  INCHNB, INCLNB
               =2589 ; FUNCTION: INCREMENT SEGMENT COUNTERS.
               =2590 ;             LOW NIBBLE IS SEGMENT ONE COUNTER.
               =2591 ;             HIGH NIBBLE IS SEGMENT TWO COUNTER.
               =2592 ;             TERMINAL COUNT IS 15. (0FH)
               =2593 ;             IF NOT ALREADY TERMINAL COUNT, INCREMENT THE SEGMENT
               =2594 ;             COUNTER AND TOTAL COUNTER.
               =2595 ; ENTRY:  R0 = PACKED SEGMENT COUNTER ADDRESS
               =2596 ;         R0+1 = SEGMENT TOTAL COUNTER ADDRESS
               =2597 ; EXIT:   IF NIBBLE WAS INCREMENTED:
               =2598 ;             R0 = SEGMENT TOTAL COUNTER ADDRESS
               =2599 ;             A = PACKED COUNTER
               =2600 ;             CARRY = CLEAR
               =2601 ;         IF NIBBLE WAS ALREADY 0FH:
               =2602 ;             R0 = PACKED SEGMENT COUNTER ADDRESS
               =2603 ;             A = NOT DEFINED
               =2604 ;             CARRY = SET
               =2605 ;
0969 F0        =2606 INCHNB: MOV   A,@R0           ;GET PACKED COUNTER
096A 97        =2607              CLR    C
096B 0310      =2608              ADD    A,#10H    ;INCREMENT HIGH NIBBLE
096D F67C      =2609              JC     INCXRT    ;JUMP IF ALREADY 0FH
096F 2479      =2610              JMP    INCX90
               =2611 ;
0971 F0        =2612 INCLNB: MOV   A,@R0
0972 47        =2613              SWAP   A
0973 97        =2614              CLR    C
0974 0310      =2615              ADD    A,#10H
0976 F67C      =2616              JC     INCXRT    ;JUMP IF ALREADY 00FH
0978 47        =2617              SWAP   A
               =2618 ;
0979 A0        =2619 INCX90: MOV   @R0,A           ;UPDATE THE PACKED COUNTER
097A 18        =2620              INC    R0
097B 10        =2621              INC    @R0       ;INCREMENT TOTAL COUNTER
               =2622 ;
097C 83        =2623 INCXRT: RET
               =2624 ;****************************************************************
               =2625 ; ROUTINE:  MCH2BY, MCH3BY, MCH4BY
               =2626 ; FUNCTION: COMPARE BYTES IN ONE BUFFER WITH A SECOND BUFFER.
               =2627 ; ENTRY:  R0 = FIRST BYTE ADDRESS OF FIRST BUFFER
               =2628 ;         R1 = FIRST BYTE ADDRESS OF SECOND BUFFER
               =2629 ; EXIT:   IF BUFFER ONE EQUALS BUFFER TWO:
               =2630 ;             R0 = END OF FIRST BUFFER ADDRESS PLUS 1.
               =2631 ;             R1 = END OF SECOND BUFFER ADDRESS PLUS 1.
               =2632 ;             R2 = 0
               =2633 ;             A = 0
               =2634 ;         IF BUFFER ONE DOESN'T EQUAL BUFFER TWO:
               =2635 ;             R0 = BUFFER ONE "NOT EQUAL" BYTE ADDRESS
               =2636 ;             R1 = BUFFER TWO "NOT EQUAL" BYTE ADDRESS
               =2637 ;             R2 <> 0
               =2638 ;             A <> 0
               =2639 ;
097D BA02      =2640 MCH2BY: MOV   R2,#2
097F 2487      =2641              JMP    MCHXBY
0981 BA03      =2642 MCH3BY: MOV   R2,#3
0983 2487      =2643              JMP    MCHXBY
0985 BA04      =2644 MCH4BY: MOV   R2,#4
0987 F0        =2645 MCHXBY: MOV   A,@R0
0988 D1        =2646              XRL    A,@R1
0989 968F      =2647              JNZ    MCHXRT    ;JUMP IF NOT EQUAL
098B 18        =2648              INC    R0
098C 19        =2649              INC    R1
098D EA87      =2650              DJNZ   R2,MCHXBY
098F 83        =2651 MCHXRT: RET
               =2652 ;****************************************************
```

```
0990 A3      =2653 TROPG9: MOVP    A,@A
0991 83      =2654         RET
0A00         =2655         ORG     0A00H
             =2656 ;****************************************************************
             =2657 ; ROUTINE: PROCSG
             =2658 ; FUNCTION: CHECK FOR SCAN BUFFER DATA.
             =2659 ;           SWAP SCAN BUFFER DATA IF BACKWARDS.
             =2660 ;           CHECK FOR MISMATCHES.
             =2661 ;           MOVE SCAN BUFFER TO PROPER SEGMENT BUFFER.
             =2662 ;           INCREMENT SEGMENT AND TOTAL COUNTERS.
             =2663 ; ENTRY: NO SETUP
             =2664 ; EXIT:  USES R0,R1,R2,R3,A
             =2665 ;
0A00 2449    =2666 SWP4SJ: JMP     SWP4SN
0A02 2454    =2667 SWP6SJ: JMP     SWP6SN
             =2668 ;
0A04 B823    =2669 PROCSG: MOV     R0,#SCNBUF+3
0A06 F0      =2670         MOV     A,@R0           ;GET PARITY DECODE BYTE
0A07 C650    =2671         JZ      PROCRT          ;JUMP IF NO DATA
             =2672 ;
0A09 B228    =2673 SWPXRT: JB5     PROCDX          ;JUMP IF UPC-D BIT SET
0A0B 923D    =2674         JB4     PROCE           ;JUMP IF UPC-E BIT SET
0A0D 530F    =2675         ANL     A,#0FH
0A0F 0300    =2676         ADD     A,#0            ;SETS CARRY FLAGS FOR DA
0A11 57      =2677         DA      A
0A12 9219    =2678         JB4     PROC05          ;JUMP IF DECODE > 9
             =2679 ;
0A14         =2680 PROC3L  EQU     $               ;PROCESS AN EAN-13-L
0A14 F0      =2681 PROCD:  MOV     A,@R0           ;PROCESS A D-SEGMENT
0A15 D202    =2682         JB6     SWP6SJ          ;JUMP IF BACKWARDS
0A17 6400    =2683         JMP     PRO7CH
             =2684 ;
0A19 3245    =2685 PROC05: JB1     PROCA           ;JUMP IF UPC-A
0A1B F0      =2686 PROC8:  MOV     A,@R0           ;EAN-8 COMES HERE
0A1C D200    =2687         JB6     SWP4SJ          ;JUMP IF BACKWARDS
0A1E 1224    =2688         JB0     PROC8R          ;JUMP IF EAN-8-R
0A20 BB3A    =2689 PROC8L: MOV     R3,#L4SCNT
0A22 4451    =2690         JMP     PRO4CH          ;GO PROCESS A 4-CHAR SEG
0A24 BB40    =2691 PROC8R: MOV     R3,#R4SCNT
0A26 4451    =2692         JMP     PRO4CH
             =2693 ;
0A28 530F    =2694 PROCDX: ANL     A,#0FH
0A2A C614    =2695         JZ      PROCD           ;JUMP IF UPC-D SEG
0A2C F0      =2696 PROCDN: MOV     A,@R0
0A2D D200    =2697         JB6     SWP4SJ
0A2F 530F    =2698         ANL     A,#0FH          ;PROCESS N(1) TO N(6) SEGS
0A31 0336    =2699         ADD     A,#LOW PROCNT-1
0A33 A3      =2700         MOVP    A,@A            ;GET THE SEGMENT COUNTER ADDRESS
0A34 AB      =2701         MOV     R3,A
0A35 4451    =2702         JMP     PRO4CH
0A37 46      =2703 PROCNT: DB      LOW N1SCNT
0A38 4C      =2704         DB      LOW N2SCNT
0A39 52      =2705         DB      LOW N3SCNT
0A3A 58      =2706         DB      LOW N4SCNT
0A3B 5E      =2707         DB      LOW N5SCNT
0A3C 64      =2708         DB      LOW N6SCNT
             =2709 ;
0A3D D202    =2710 PROCE:  JB6     SWP6SJ
0A3F 1466    =2711         CALL    EMOD10
0A41 964E    =2712         JNZ     PROCEX          ;JUMP IF EMOD10 TEST FAILED
0A43 6400    =2713         JMP     PRO7CH
             =2714 ;
0A45 F0      =2715 PROCA:  MOV     A,@R0
0A46 D202    =2716         JB6     SWP6SJ
0A48 124C    =2717         JB0     PROCAR          ;JUMP IF UPC-A-R
0A4A 6400    =2718 PROCAL: JMP     PRO7CH
0A4C 4495    =2719 PROCAR: JMP     PRO6CH
             =2720 ;
0A4E 140C    =2721 PROCEX: CALL    CLRSNB          ;GO CLEAR THE SCAN BUFFER
0A50 83      =2722 PROCRT: RET                     ;RETURN FROM PROCESS SEGMENT ROUTINE
             =2723 ;****************************************************************
             =2724 ; ROUTINE: PRO4CH
             =2725 ; FUNCTION: PROCESS 4-CHAR SEGMENTS (2 BYTES)
             =2726 ;           CHECKS FOR MISMATCHES.
             =2727 ;           MOVES SEGMENT FROM SCAN BUFFER TO SEGMENT BUFFER.
             =2728 ;           INCREMENTS SCAN AND TOTAL COUNTERS.
             =2729 ; ENTRY: R3 = PACKED SCAN COUNTER ADDRESS
             =2730 ;        R3-4 = SCAN 1 BUFFER ADDRESS
             =2731 ;        R3-2 = SCAN 2 BUFFER ADDRESS
             =2732 ;        R3+1 = TOTAL COUNTER ADDRESS
             =2733 ; EXIT:  SEGMENT PROCESSED
             =2734 ;        SCAN BUFFER CLEARED
             =2735 ;        USES R0,R1,R2,R3,A
             =2736 ;
0A51 FB      =2737 PRO4CH: MOV     A,R3
0A52 A8      =2738         MOV     R0,A
0A53 F0      =2739         MOV     A,@R0           ;GET S2/S1 PACKED COUNTS
0A54 530F    =2740         ANL     A,#0FH
0A56 B821    =2741         MOV     R0,#SCNBUF+1
0A58 9662    =2742         JNZ     PRO4C2          ;JUMP IF SCAN 1 COUNTER <> 0
             =2743 ;
```

```
0A5A FB      =2744            MOV    A,R3        ;SCAN 1 COUNTER = 0
0A5B 03FC    =2745            ADD    A,#-4
0A5D A9      =2746            MOV    R1,A        ;SCAN 1 BUFFER ADDRESS
0A5E 1426    =2747            CALL   MOV2BY
0A60 446A    =2748            JMP    PRO4C3
             =2749 ;
0A62 FB      =2750 PRO4C2:    MOV    A,R3        ;SCAN 1 COUNTER <> 0
0A63 03FC    =2751            ADD    A,#-4
0A65 A9      =2752            MOV    R1,A        ;SCAN 1 BUFFER ADDRESS
0A66 347D    =2753            CALL   MCH2BY
0A68 9670    =2754            JNZ    PRO4C4      ;JUMP IF NO MATCH
             =2755 ;
0A6A FB      =2756 PRO4C3:    MOV    A,R3
0A6B A8      =2757            MOV    R0,A
0A6C 3471    =2758            CALL   INCLNB      ;INCREMENT SCAN 1 COUNTER AND TOTAL
0A6E 444E    =2759            JMP    PROCEX
             =2760 ;
0A70 FB      =2761 PRO4C4:    MOV    A,R3        ;SCAN 1 BUFFER DOESN'T MATCH
0A71 A8      =2762            MOV    R0,A
0A72 F0      =2763            MOV    A,@R0
0A73 53F0    =2764            ANL    A,#0F0H
0A75 B821    =2765            MOV    R0,#SCNBUF+1
0A77 9681    =2766            JNZ    PRO4C6      ;JUMP IF SCAN 2 COUNTER <> 0
             =2767 ;
0A79 FB      =2768            MOV    A,R3
0A7A 03FE    =2769            ADD    A,#-2
0A7C A9      =2770            MOV    R1,A        ;SCAN 2 BUFFER ADDRESS
0A7D 1426    =2771            CALL   MOV2BY
0A7F 4489    =2772            JMP    PRO4C7
             =2773 ;
0A81 FB      =2774 PRO4C6:    MOV    A,R3        ;SCAN 2 COUNT <> 0
0A82 03FE    =2775            ADD    A,#-2
0A84 A9      =2776            MOV    R1,A        ;SCAN 2 BUFFER ADDRESS
0A85 347D    =2777            CALL   MCH2BY
0A87 968F    =2778            JNZ    PRO4C8      ;JUMP IF NO MATCH
             =2779 ;
0A89 FB      =2780 PRO4C7:    MOV    A,R3
0A8A A8      =2781            MOV    R0,A
0A8B 3469    =2782            CALL   INCHNB      ;INCREMENT SCAN 2 COUNT AND TOTAL
0A8D 444E    =2783            JMP    PROCEX
             =2784 ;
0A8F FB      =2785 PRO4C8:    MOV    A,R3        ;NEITHER SCAN BUFFER MATCHED
0A90 17      =2786            INC    A
0A91 A8      =2787            MOV    R0,A        ;TOTAL COUNTER ADDRESS
0A92 10      =2788            INC    @R0         ;INCREMENT TOTAL COUNTER
0A93 444E    =2789            JMP    PROCEX
             =2790 ;****************************************************************
             =2791 ;  ROUTINE:  PRO6CH
             =2792 ;  FUNCTION: PROCESS 6-CHAR SEGMENTS (3 BYTES)
             =2793 ;            CHECKS FOR MISMATCHES.
             =2794 ;            MOVES SEGMENT FROM SCAN BUFFER TO SEGMENT BUFFER.
             =2795 ;            INCREMENTS SCAN AND TOTAL COUNTERS.
             =2796 ;  ENTRY:  NO SETUP
             =2797 ;  EXIT:   SEGMENT IS PROCESSED
             =2798 ;          SCAN BUFFER CLEARED
             =2799 ;          USES R0,R1,R2,R3,A
             =2800 ;
0A95 B834    =2801 PRO6CH:    MOV    R0,#R6SCNT
0A97 F0      =2802            MOV    A,@R0       ;GET S2/S1 PACKED COUNTS
0A98 530F    =2803            ANL    A,#0FH
0A9A B92E    =2804            MOV    R1,#R6S1
0A9C B820    =2805            MOV    R0,#SCNBUF
0A9E 96A4    =2806            JNZ    PRO6C2      ;JUMP IF SCAN 1 COUNTER <> 0
             =2807 ;
0AA0 142A    =2808            CALL   MOV3BY      ;SCAN 1 COUNTER = 0
0AA2 44A8    =2809            JMP    PRO6C3
             =2810 ;
0AA4 3481    =2811 PRO6C2:    CALL   MCH3BY      ;SCAN 1 COUNTER <> 0
0AA6 96AE    =2812            JNZ    PRO6C4      ;JUMP IF NO MATCH
             =2813 ;
0AA8 B834    =2814 PRO6C3:    MOV    R0,#R6SCNT
0AAA 3471    =2815            CALL   INCLNB      ;INCREMENT SCAN 1 COUNTER AND TOTAL
0AAC 444E    =2816            JMP    PROCEX
             =2817 ;
0AAE B834    =2818 PRO6C4:    MOV    R0,#R6SCNT  ;SCAN 1 BUFFER DOESN'T MATCH
0AB0 F0      =2819            MOV    A,@R0
0AB1 53F0    =2820            ANL    A,#0F0H
0AB3 B931    =2821            MOV    R1,#R6S2
0AB5 B820    =2822            MOV    R0,#SCNBUF
0AB7 968D    =2823            JNZ    PRO6C6      ;JUMP IF SCAN 2 COUNTER <> 0
             =2824 ;
0AB9 142A    =2825            CALL   MOV3BY
0ABB 44C1    =2826            JMP    PRO6C7
             =2827 ;
0ABD 3481    =2828 PRO6C6:    CALL   MCH3BY      ;SCAN 2 COUNTER <> 0
0ABF 96C7    =2829            JNZ    PRO6C8      ;JUMP IF NO MATCH
             =2830 ;
0AC1 B834    =2831 PRO6C7:    MOV    R0,#R6SCNT
0AC3 3469    =2832            CALL   INCHNB      ;INCREMENT SCAN 2 COUNT AND TOTAL
0AC5 444E    =2833            JMP    PROCEX
             =2834 ;
```

```
OAC7 B835    =2835 PRO6C8: MOV    RO,#R6STOT      ;NEITHER SCAN BUFFER MATCHED
OAC9 10      =2836         INC    @RO             ;INCREMENT TOTAL COUNTER
OACA 444E    =2837         JMP    PROCEX
             =2838 ;****************************************
OACC A3      =2839 TROPGA: MOVP   A,@A
OACD 83      =2840         RET
0800         =2841         ORG    0800H
             =2842 ;****************************************
             =2843 ; ROUTINE: PRO7CH
             =2844 ; FUNCTION: PROCESS 7-CHAR SEGMENTS (4 BYTES)
             =2845 ;                CHECKS FOR MISMATCHES.
             =2846 ;                MOVES SEGMENT FROM SCAN BUFFER TO SEGMENT BUFFER.
             =2847 ;                INCREMENTS SCAN AND TOTAL COUNTERS.
             =2848 ; ENTRY: NO SETUP
             =2849 ; EXIT:  SEGMENT IS PROCESSED
             =2850 ;        SCAN BUFFER CLEARED
             =2851 ;        USES R0,R1,R2,R3,A
             =2852 ;
0800 B82C    =2853 PRO7CH: MOV    RO,#L6SCNT
0802 F0      =2854         MOV    A,@RO           ;GET S2/S1 PACKED COUNTS
0803 530F    =2855         ANL    A,#0FH
0805 B924    =2856         MOV    R1,#L6S1
0807 B820    =2857         MOV    RO,#SCNBUF
0809 960F    =2858         JNZ    PRO7C2          ;JUMP IF SCAN 1 COUNTER <> 0
             =2859 ;
080B 142E    =2860         CALL   MOV4BY          ;SCAN 1 COUNTER = 0
080D 6413    =2861         JMP    PRO7C3
             =2862 ;
080F 3485    =2863 PRO7C2: CALL   MCH4BY          ;SCAN 1 COUNTER <> 0
0811 9619    =2864         JNZ    PRO7C4          ;JUMP IF NO MATCH
             =2865 ;
0813 B82C    =2866 PRO7C3: MOV    RO,#L6SCNT
0815 3471    =2867         CALL   INCLNB          ;INCREMENT SCAN 1 COUNTER AND TOTAL
0817 444E    =2868         JMP    PROCEX
             =2869 ;
0819 B82C    =2870 PRO7C4: MOV    RO,#L6SCNT      ;SCAN 1 BUFFER DOESN'T MATCH
081B F0      =2871         MOV    A,@RO
081C 53F0    =2872         ANL    A,#0F0H
081E 8928    =2873         MOV    R1,#L6S2
0820 B820    =2874         MOV    RO,#SCNBUF
0822 9628    =2875         JNZ    PRO7C6          ;JUMP IF SCAN 2 COUNTER <> 0
             =2876 ;
0824 142E    =2877         CALL   MOV4BY
0826 642C    =2878         JMP    PRO7C7
             =2879 ;
0828 3485    =2880 PRO7C6: CALL   MCH4BY          ;SCAN 2 COUNTER <> 0
082A 9632    =2881         JNZ    PRO7C8          ;JUMP IF NO MATCH
             =2882 ;
082C B82C    =2883 PRO7C7: MOV    RO,#L6SCNT
082E 3469    =2884         CALL   INCHNB          ;INCREMENT SCAN 2 COUNT AND TOTAL
0830 444E    =2885         JMP    PROCEX
             =2886 ;
0832 B82D    =2887 PRO7C8: MOV    RO,#L6STOT      ;NEITHER SCAN BUFFER MATCHED
0834 10      =2888         INC    @RO             ;INCREMENT TOTAL COUNTER
0835 444E    =2889         JMP    PROCEX
              2890 $       INCLUDE(:F4:VERTAG.SRC)
             =2891 ;****************************************************************
             =2892 ; FILE: VERTAG.SRC  09-11-86 09:05  BOB ACTIS
             =2893 ;****************************************************************
             =2894 ; ROUTINE: CKMAJ
             =2895 ; FUNCTION: DETERMINE MAJORITY SEGMENT COUNTER
             =2896 ; ENTRY: RO = PACKED COUNTER ADDRESS
             =2897 ; EXIT:  RO = NOT CHANGED
             =2898 ;        USES R2,A
             =2899 ;        CARRY SET IF LOW>=HIGH NIBBLE  (S1CNT>=S2CNT)
             =2900 ;        CARRY CLEAR IF LOW<HIGH NIBBLE (S1CNT<S2CNT)
             =2901 ;
0837 F0      =2902 CKMAJ:  MOV    A,@RO           ;GET PACKED COUNTER
0838 530F    =2903         ANL    A,#0FH
083A AA      =2904         MOV    R2,A            ;S1CNT
083B F0      =2905         MOV    A,@RO
083C 47      =2906         SWAP   A
083D 530F    =2907         ANL    A,#0FH          ;MASK S2CNT
083F C645    =2908         JZ     CKMAJ9          ;JUMP IF S2CNT=0
0841 37      =2909         CPL    A
0842 17      =2910         INC    A               ;2'S COMP S2CNT
0843 6A      =2911         ADD    A,R2            ;S1CNT-S2CNT
0844 83      =2912         RET
             =2913 ;
0845 97      =2914 CKMAJ9: CLR    C               ;S2CNT=0 IS A SPECIAL CASE
0846 A7      =2915         CPL    C
0847 83      =2916         RET
             =2917 ;****************************************************************
             =2918 ; ROUTINE: CKMISM
             =2919 ; FUNCTION: CHECK FOR EXCESS MISMATCHED SEGMENTS.
             =2920 ;           CLEAR COUNTERS IF EXCESS MISMATCHES.
             =2921 ; ENTRY: SCAN 1 COUNTER HAS THE MAJORITY SEGMENT COUNT.
             =2922 ;        RO = PACKED SCAN2/SCAN1 SEGMENT COUNTER ADDRESS.
             =2923 ;        RO+1 = TOTAL SEGMENT COUNTER ADDRESS.
             =2924 ; EXIT:  USES R1,R2,A
             =2925 ;        RO = NOT CHANGED
```

```
                  =2926 ;        IF TOTAL=MAJORITY (0 MISMATCHES)
                  =2927 ;            OR TOTAL-1=MAJORITY (1 MISMATCH) AND MAJORITY>=3
                  =2928 ;            OR TOTAL-2=MAJORITY (2 MISMATCH) AND MAJORITY>=15
                  =2929 ;        THEN RETURN,
                  =2930 ;        ELSE COUNTERS ARE CLEARED.
                  =2931 ;
0848 F0           =2932 CKMISM:  MOV    A,@R0
0849 C66F         =2933          JZ     CKMS90          ;JUMP IF S2/S1 COUNTERS=0
                  =2934 ;
084B F8           =2935          MOV    A,R0
084C 17           =2936          INC    A
084D A9           =2937          MOV    R1,A            ;SCAN TOTAL COUNTER ADDRESS
                  =2938 ;
084E F0           =2939          MOV    A,@R0
084F 530F         =2940          ANL    A,#0FH          ;MASK S1 COUNT
0851 AA           =2941          MOV    R2,A            ;SAVE MAJORITY COUNT
0852 D1           =2942          XRL    A,@R1
0853 C66F         =2943          JZ     CKMS90          ;JUMP IF TOTAL=MAJORITY (0 MISMATCHES)
                  =2944 ;
0855 F1           =2945          MOV    A,@R1
0856 07           =2946          DEC    A
0857 DA           =2947          XRL    A,R2
0858 C666         =2948          JZ     CKMS30          ;JUMP IF TOTAL-1=MAJORITY (1 MISMATCH)
                  =2949 ;
085A F1           =2950          MOV    A,@R1
085B 07           =2951          DEC    A
085C 07           =2952          DEC    A
085D DA           =2953          XRL    A,R2
085E 966C         =2954          JNZ    CKMS80          ;JUMP IF >2 MISMATCHES
                  =2955 ;
                  =2956 ; TOTAL-2=MAJORITY (2 MISMATCHES). CHECK FOR MAJORITY>=15.
                  =2957 ;
0860 FA           =2958          MOV    A,R2
0861 03F1         =2959          ADD    A,#-15
0863 E66C         =2960          JNC    CKMS80          ;JUMP IF <15
0865 83           =2961          RET
                  =2962 ;
                  =2963 ; TOTAL-1=MAJORITY (1 MISMATCH). CHECK FOR MAJORITY>=3.
                  =2964 ;
0866 FA           =2965 CKMS30:  MOV    A,R2
0867 03FD         =2966          ADD    A,#-3
0869 E66C         =2967          JNC    CKMS80          ;JUMP IF <3
086B 83           =2968          RET
                  =2969 ;
                  =2970 ; FAILED TEST. CLEAR COUNTERS.
                  =2971 ;
086C 27           =2972 CKMS80:  CLR    A
086D A0           =2973          MOV    @R0,A           ;CLEAR S2/S1 COUNTERS
086E A1           =2974          MOV    @R1,A           ;CLEAR TOTAL COUNTER
086F 83           =2975 CKMS90:  RET
                  =2976 ;****************************************************************
                  =2977 ; ROUTINE: EXSBF2, EXSBF3, EXSBF4
                  =2978 ; FUNCTION: EXCHANGE SEGMENT BUFFERS AND COUNTERS. (2,3 OR 4 BYTES)
                  =2979 ;           (I.E. EXCHANGE BUFFER 1 DATA WITH BUFFER 2 DATA)
                  =2980 ; ENTRY: R0 = SCAN 1 BUFFER ADDRESS
                  =2981 ;        R0+2[3,4] = SCAN 2 BUFFER ADDRESS
                  =2982 ;        R0+3[4,5] = SCAN2/SCAN1 PACKED COUNTER ADDRESS
                  =2983 ; EXIT:  USES R1,R2
                  =2984 ;        SCAN 1 AND SCAN 2 DATA AND COUNTERS EXCHANGED.
                  =2985 ;        R0 = SCAN2/SCAN1 COUNTER ADDRESS.
                  =2986 ;        A = SCAN2/SCAN1 COUNTERS
                  =2987 ;
0870 BA02         =2988 EXSBF2:  MOV    R2,#2
0872 647A         =2989          JMP    EXSBFX
0874 BA03         =2990 EXSBF3:  MOV    R2,#3
0876 647A         =2991          JMP    EXSBFX
0878 BA04         =2992 EXSBF4:  MOV    R2,#4
087A F8           =2993 EXSBFX:  MOV    A,R0            ;GET SCAN 1 BUFFER ADDRESS
087B A9           =2994          MOV    R1,A            ;SAVE IT
087C 6A           =2995          ADD    A,R2            ;CALCULATE SCAN 2 BUFFER ADDRESS
087D A8           =2996          MOV    R0,A            ;SAVE IT
                  =2997 ;
087E F0           =2998 EXSBFL:  MOV    A,@R0           ;GET SCAN 2 DATA
087F 21           =2999          XCH    A,@R1           ;EXCHANGE DATA
0880 A0           =3000          MOV    @R0,A           ;STORE SCAN 1 DATA
0881 18           =3001          INC    R0
0882 19           =3002          INC    R1
0883 EA7E         =3003          DJNZ   R2,EXSBFL
                  =3004 ;
0885 F0           =3005          MOV    A,@R0           ;GET S2/S1 COUNTERS
0886 47           =3006          SWAP   A               ;EXCHANGE COUNTERS
0887 A0           =3007          MOV    @R0,A           ;SAVE COUNTERS
0888 83           =3008          RET
                  =3009 ;****************************************************************
                  =3010 ; ROUTINE: SUM12C
                  =3011 ; FUNCTION: CALCULATE L6S1 + R6S1 MOD-10 CHECKSUM.
                  =3012 ; ENTRY: L6S1 AND R6S1 HAVE DATA TO USE.
                  =3013 ; EXIT:  A = MOD-10 CHECKSUM CALCULATION FOR 12 CHARACTERS.
                  =3014 ;        USES R0,R2,R3
                  =3015 ;
0889 B824         =3016 SUM12C:  MOV    R0,#L6S1
```

```
0B88 1461       =3017           CALL    MOD106
0B8D A8         =3018           MOV     R3,A            ;SAVE LEFT HALF SUM
                =3019 ;
0B8E B82E       =3020           MOV     R0,#R6S1
0B90 1461       =3021           CALL    MOD106
0B92 68         =3022           ADD     A,R3            ;RIGHT SUM + LEFT SUM
0B93 57         =3023           DA      A
0B94 530F       =3024           ANL     A,#0FH          ;MASK SUM DIGIT
0B96 83         =3025           RET
                =3026 ;*************************************************************
                =3027 ; ROUTINE: CK6TOT
                =3028 ; FUNCTION: CHECK L6STOT AND R6STOT FOR COUNTS.
                =3029 ; ENTRY: R1 SETUP WITH MINUS THE MINIMUM NUMBER OF SCANS REQUIRED
                =3030 ; EXIT:  A=0 IF EITHER COUNTER < MINIMUM REQUIRED.
                =3031 ;        A<>0 IF BOTH COUNTERS >= MINIMUM REQUIRED.
                =3032 ;        USES R0
                =3033 ;
0B97 B82D       =3034 CK6TOT:   MOV     R0,#L6STOT
0B99 F0         =3035           MOV     A,@R0           ;GET LEFT SEGMENT TOTAL
0B9A 69         =3036           ADD     A,R1
0B9B F69F       =3037           JC      CK6T20          ;JUMP IF L6STOT >= -R1
0B9D 27         =3038 CK6T10:   CLR     A
0B9E 83         =3039           RET                     ;EITHER L6 OR R6 HAD < MINIMUM
                =3040 ;
0B9F B835       =3041 CK6T20:   MOV     R0,#R6STOT
0BA1 F0         =3042           MOV     A,@R0           ;GET RIGHT SEGMENT TOTAL
0BA2 69         =3043           ADD     A,R1
0BA3 E69D       =3044           JNC     CK6T10          ;JUMP R6STOT < -R1
0BA5 27         =3045           CLR     A
0BA6 37         =3046           CPL     A
0BA7 83         =3047           RET                     ;BOTH L6 AND R6 HAD >= MINIMUM
                =3048 ;
0BA8 83         =3049 CK6TRT:   RET
                =3050 ;*************************************************************
                =3051 ; ROUTINE: MAJSGS
                =3052 ; FUNCTION: DETERMINE MAJORITY SEGMENTS.
                =3053 ;           MOVE MAJORITY SEGMENT TO BUFFER #1 IF NECESSARY.
                =3054 ;           (I.E. EXCHANGE BUFFER 1 AND BUFFER 2 DATA AND COUNTERS.)
                =3055 ;           CHECK FOR EXCESS MISMATCHES.
                =3056 ;           IF EXCESS MISMATCHES, CLEAR COUNTERS.
                =3057 ; ENTRY: NO SETUP
                =3058 ; EXIT:  IF THE MISMATCH RATIO IS OK,
                =3059 ;           SEGMENT BUFFER 1 AND COUNTER 1 HAS MAJORITY.
                =3060 ;           SEGMENT BUFFER 2 AND COUNTER 2 HAS MINORITY.
                =3061 ;        IF EXCESS MISMATCHES, SEGMENT COUNTERS ARE CLEARED.
                =3062 ;
0BA9 B82C       =3063 MAJSGS:   MOV     R0,#L6SCNT
0BAB 7437       =3064           CALL    CKMAJ
0BAD F683       =3065           JC      MAJSG0          ;JUMP IF S1 IS MAJORITY
0BAF B824       =3066           MOV     R0,#L6S1
0BB1 7478       =3067           CALL    EXSBF4          ;EXCHANGE S2/S1 DATA AND COUNTERS
0BB3 7448       =3068 MAJSG0:   CALL    CKMISM
                =3069 ;
0BB5 B834       =3070           MOV     R0,#R6SCNT
0BB7 7437       =3071           CALL    CKMAJ
0BB9 F68F       =3072           JC      MAJSG1
0BBB B82E       =3073           MOV     R0,#R6S1
0BBD 7474       =3074           CALL    EXSBF3
0BBF 7448       =3075 MAJSG1:   CALL    CKMISM
                =3076 ;
0BC1 BB08       =3077           MOV     R3,#8           ;NUMBER OF 4-CHAR SEGMENT BUFFERS
0BC3 B83A       =3078           MOV     R0,#L4SCNT      ;FIRST S2/S1 COUNTER ADDRESS
                =3079 ;
0BC5 7437       =3080 MAJSG4:   CALL    CKMAJ
0BC7 F6CF       =3081           JC      MAJSG5          ;JUMP IF S1 IS THE MAJORITY
0BC9 F8         =3082           MOV     A,R0
0BCA 03FC       =3083           ADD     A,#-4           ;CALCULATE THE S1 DATA BUFFER ADDRESS
0BCC A8         =3084           MOV     R0,A
0BCD 7470       =3085           CALL    EXSBF2          ;EXCHANGE S2/S1 DATA AND COUNTS
                =3086 ;
0BCF 7448       =3087 MAJSG5:   CALL    CKMISM          ;CHECK MISMATCHES
0BD1 F8         =3088           MOV     A,R0
0BD2 0306       =3089           ADD     A,#6            ;CALCULATE NEXT S2/S1 COUNTER ADDRESS
0BD4 A8         =3090           MOV     R0,A
0BD5 E8C5       =3091           DJNZ    R3,MAJSG4
0BD7 83         =3092           RET
                =3093 ;*************************************************************
0BD8 A3         =3094 TROPGB:   MOVP    A,@A
0BD9 83         =3095           RET
0C00            =3096           ORG     0C00H
                =3097 ;*************************************************************
                =3098 ; ROUTINE: VERTAG
                =3099 ; FUNCTION: PERFORM MISMATCH TEST AND GET MAJORITY SEGMENT AND COUNT
                =3100 ;           INTO BUFFER AND COUNTER #1. (MAJSGS)
                =3101 ;           TRY TO BUILD BLOCKS INTO VERSIONS. (TBLKXX)
                =3102 ; ENTRY: NO SETUP
                =3103 ; EXIT:  A=0 IF ENOUGH BLOCKS FOR A VERSION ARE FOUND.
                =3104 ;        A<>0 IF NOT ENOUGH BLOCKS FOUND.
                =3105 ;        R6 SET TO INDICATE VALID VERSION IF ONE WAS FOUND.
                =3106 ;        R1 SETUP WITH MINUS THE MINIMUM NUMBER OF SCANS REQUIRED.
                =3107 ;
```

```
0C00 74A9    =3108 VERTAG: CALL   MAJSGS        ;MAJORITY/MISMATCH SEGMENT TEST
0C02 3400    =3109         CALL   HCOMM         ;CHECK COMM. MAJSGS TAKES A WHILE.
0C04 FE      =3110         MOV    A,R6
0C05 53F0    =3111         ANL    A,#0F0H       ;CLEAR THE VERSION POINTER/FLAG.
0C07 AE      =3112         MOV    R6,A
             =3113 ;
0C08 E5      =3114         SEL    MB0
0C09 B400    =3115         CALL   CHKSCN        ;SET R1 ACCORDING TO 2 SCAN OPTION
0C0B F5      =3116         SEL    MB1
             =3117 ;
0C0C 944F    =3118 TRYBLK: CALL   TBLKA
0C0E C64D    =3119         JZ     VERA          ;JUMP IF A GOOD UPC-A BLOCK
             =3120 ;
0C10 946C    =3121         CALL   TBLK13
0C12 C64C    =3122         JZ     VER13         ;JUMP IF A GOOD EAN-13 BLOCK
             =3123 ;
0C14 9488    =3124         CALL   TBLK2
0C16 C62B    =3125         JZ     VERT10        ;JUMP IF A GOOD BLK-2
             =3126 ;
0C18 B9FE    =3127         MOV    R1,#-2        ;ALWAYS REQUIRE 2 SCANS MINIMUM FOR E
0C1A 949B    =3128         CALL   TBLKE
0C1C C64B    =3129         JZ     VERE          ;JUMP IF A GOOD UPC-E BLOCK
             =3130 ;
0C1E E5      =3131         SEL    MB0
0C1F B400    =3132         CALL   CHKSCN        ;SET R1 ACCORDING TO SELECTED 2 SCAN OPTION
0C21 F5      =3133         SEL    MB1
             =3134 ;
0C22 B42F    =3135 VERT05: CALL   TBLK1
0C24 C649    =3136         JZ     VERD1         ;JUMP IF A GOOD BLK-1. (D-1)
             =3137 ;
0C26 94AE    =3138         CALL   TBLK8
0C28 C64A    =3139         JZ     VER8          ;JUMP IF A GOOD EAN-8 BLOCK
0C2A 83      =3140         RET                  ;RETURN IF NOT ENOUGH BLOCKS
             =3141 ;
             =3142 VERT10:
0C2B E5      =3143         SEL    MB0
0C2C B400    =3144         CALL   CHKSCN        ;SET R1 ACCORDING TO SELECTED 2 SCAN OPTION
0C2E F5      =3145         SEL    MB1
             =3146 ;
0C2F B49E    =3147 VERT15: CALL   TBLK5
0C31 C63C    =3148         JZ     VERT20        ;JUMP IF A GOOD BLK-5
             =3149 ;
0C33 B406    =3150         CALL   TBLK6
0C35 C647    =3151         JZ     VERD3         ;JUMP IF A GOOD BLK-6. (D-3)
             =3152 ;
0C37 B466    =3153         CALL   TBLK3
0C39 C648    =3154         JZ     VERD2         ;JUMP IF A GOOD BLK-3. (D-2)
0C3B 83      =3155         RET                  ;RETURN IN NOT ENOUGH BLOCKS
             =3156 ;
0C3C B48A    =3157 VERT20: CALL   TBLK7
0C3E C645    =3158         JZ     VERD5         ;JUMP IF A GOOD BLK-7. (D-5)
             =3159 ;
0C40 B482    =3160         CALL   TBLK4
0C42 C646    =3161         JZ     VERD4         ;JUMP IF A GOOD BLK-4. (D-4)
0C44 83      =3162         RET                  ;RETURN IF NOT ENOUGH BLOCKS
             =3163 ;
0C45 1E      =3164 VERD5:  INC    R6            ;SET R6=9
0C46 1E      =3165 VERD4:  INC    R6            ;SET R6=8
0C47 1E      =3166 VERD3:  INC    R6            ;SET R6=7
0C48 1E      =3167 VERD2:  INC    R6            ;SET R6=6
0C49 1E      =3168 VERD1:  INC    R6            ;SET R6=5
0C4A 1E      =3169 VER8:   INC    R6            ;SET R6=4
0C4B 1E      =3170 VERE:   INC    R6            ;SET R6=3
0C4C 1E      =3171 VER13:  INC    R6            ;SET R6=2
0C4D 1E      =3172 VERA:   INC    R6            ;SET R6=1
             =3173 ;
0C4E 83      =3174 VERT90: RET
              3175 $       INCLUDE(:F4:TBLKXX.SRC)
             =3176 ;********************************************************************
             =3177 ; FILE:  TBLKXX.SRC  09-11-86 09:10  BOB ACTIS
             =3178 ;********************************************************************
             =3179 ; ROUTINE: TBLKA
             =3180 ; FUNCTION: TRY FOR A VALID UPC-A BLOCK.
             =3181 ;             CHECK THAT L6 AND R6 HAVE ENOUGH DATA.
             =3182 ;             CHECK THAT L6 IS AN A-L.
             =3183 ;             IF OK SO FAR, CALCULATE MOD-10 CHECK CHARACTER.
             =3184 ;             IF STILL OK, RETURN WITH A=0.
             =3185 ;             IF MOD-10 ERROR, CLEAR 4&6-CHAR SEGMENT COUNTERS AND
             =3186 ;                 CLEAR VERSION POINTER/FLAG.
             =3187 ; ENTRY: SCAN 1 BUFFER IS MAJORITY SCAN.
             =3188 ;        R1 SETUP WITH MINUS THE MINIMUM NUMBER OF SCANS REQUIRED
             =3189 ; EXIT:  USES R0,R2,R3,A
             =3190 ;        A=0 IF GOOD BLOCK
             =3191 ;        A<>0 IF NO BLOCK
             =3192 ;
0C4F 7497    =3193 TBLKA:  CALL   CK6TOT
0C51 C669    =3194         JZ     TBNONE        ;JUMP IF NO LEFT OR NO RIGHT SEGMENTS
             =3195 ;
0C53 B827    =3196         MOV    R0,#L6S1+3
0C55 F0      =3197         MOV    A,@R0         ;GET PARITY DECODE BYTE
0C56 530C    =3198         ANL    A,#0CH
```

```
0C58 D30C      =3199           XRL     A,#0CH
0C5A 9669      =3200           JNZ     TBNONE          ;JUMP IF NOT AN AL
               =3201 ;
0C5C 7489      =3202           CALL    SUM12C          ;GO CALCULATE LEFT + RIGHT CHECKSUM
0C5E 9661      =3203           JNZ     TBERR6          ;JUMP IF MOD-10 IS BAD
0C60 83        =3204           RET
               =3205 ;
               =3206 ; THE FOLLOWING IS USED BY OTHER TBLXXX ROUTINES, BUFMAN, & RDTAG
               =3207 ;
0C61           =3208 CLRVER    EQU     $               ;ENTRY POINT TO CLEAR VERSION FLAGS & DATA
0C61 1400      =3209 TBERR6:   CALL    CLR6SG          ;CLEAR 6-CHAR SEGMENTS AND COUNTERS
0C63 1406      =3210 TBERR4:   CALL    CLR4SG          ;CLEAR 4-CHAR SEGMENTS AND COUNTERS
0C65 FE        =3211           MOV     A,R6
0C66 53F0      =3212           ANL     A,#0F0H         ;CLEAR VERSION POINTER/FLAG
0C68 AE        =3213           MOV     R6,A
0C69 27        =3214 TBNONE:   CLR     A
0C6A 37        =3215           CPL     A
0C6B 83        =3216           RET
               =3217 ;****************************************************************
               =3218 ; ROUTINE: TBLK13
               =3219 ; FUNCTION: TRY FOR A VALID EAN-13 BLOCK.
               =3220 ;            CHECK THAT L6 AND R6 HAVE ENOUGH DATA.
               =3221 ;            CHECK THAT L6 IS AN EAN-13-L.
               =3222 ;            IF OK SO FAR, CALCULATE MOD-10 CHECK CHARACTER.
               =3223 ;            IF STILL OK, RETURN WITH A=0.
               =3224 ;            IF MOD-10 FAILS, CLEAR 4&6-CHAR SEGMENT COUNTER AND
               =3225 ;                 CLEAR VERSION POINTER/FLAG.
               =3226 ; ENTRY: SCAN 1 BUFFER IS MAJORITY SCAN.
               =3227 ;        R1 SETUP WITH MINUS THE MINIMUM NUMBER OF SCANS REQUIRED
               =3228 ; EXIT: USES R0,R2,R3,A
               =3229 ;        A=0 IF GOOD BLOCK.
               =3230 ;        A<>0 IF NO BLOCK FOUND.
               =3231 ;
0C6C 7497      =3232 TBLK13:   CALL    CK6TOT
0C6E C669      =3233           JZ      TBNONE          ;JUMP IF NO LEFT OR NO RIGHT SEGMENTS
               =3234 ;
0C70 B827      =3235           MOV     R0,#L6S1+3
0C72 F0        =3236           MOV     A,@R0           ;GET PARITY DECODE BYTE
0C73 5330      =3237           ANL     A,#EDECE+EDECD  ;MASK D AND E SEG BITS
0C75 9669      =3238           JNZ     TBNONE          ;JUMP IF D OR E SEGMENT
               =3239 ;
0C77 F0        =3240           MOV     A,@R0
0C78 530F      =3241           ANL     A,#0FH          ;MASK THE DECODED CHARACTER
0C7A 03F6      =3242           ADD     A,#-10          ;A>9 IS AN A OR B SEGMENT
0C7C F669      =3243           JC      TBNONE          ;JUMP IS A OR B SEGMENT
               =3244 ;
0C7E 7489      =3245           CALL    SUM12C
0C80 A8        =3246           MOV     R3,A            ;SAVE 12 CHARACTER SUM
               =3247 ;
0C81 B827      =3248           MOV     R0,#L6S1+3
0C83 F0        =3249           MOV     A,@R0           ;GET PARITY DECODE CHARACTER
0C84 68        =3250           ADD     A,R3            ;ADD 13TH CHARACTER
0C85 57        =3251           DA      A
0C86 530F      =3252           ANL     A,#0FH
0C88 9661      =3253           JNZ     TBERR6          ;JUMP IF MOD-10 IS BAD
0C8A 83        =3254           RET
               =3255 ;****************************************************************
               =3256 ; ROUTINE: TBLK2
               =3257 ; FUNCTION: TRY FOR A VALID VERSION-D BLOCK-2.
               =3258 ;            CHECK THAT L6 AND R6 HAVE ENOUGH DATA.
               =3259 ;            CHECK THAT L6 IS A D-TAG.
               =3260 ;            IF OK SO FAR, CALCULATE MOD-10 CHECK CHARACTER.
               =3261 ;            IF STILL OK, RETURN WITH A=0.
               =3262 ;            IF MOD-10 ERROR, CLEAR 4&6-CHAR SEGMENT COUNTERS AND
               =3263 ;                 CLEAR VERSION POINTER/FLAG.
               =3264 ; ENTRY: SCAN 1 BUFFER IS MAJORITY SCAN.
               =3265 ;        R1 SETUP WITH MINUS THE MINIMUM NUMBER OF SCANS REQUIRED
               =3266 ; EXIT: USER R0,R2,R3,A
               =3267 ;        A=0 IF GOOD BLOCK
               =3268 ;        A<>0 IF NO BLOCK
               =3269 ;
0C8B 7497      =3270 TBLK2:    CALL    CK6TOT
0C8D C669      =3271           JZ      TBNONE          ;JUMP IF NO LEFT OR NO RIGHT SEGMENTS
               =3272 ;
0C8F B827      =3273           MOV     R0,#L6S1+3
0C91 F0        =3274           MOV     A,@R0           ;GET PARITY DECODE BYTE
0C92 5320      =3275           ANL     A,#EDECD
0C94 C669      =3276           JZ      TBNONE          ;JUMP IF NOT A D-TAG.
               =3277 ;
0C96 7489      =3278           CALL    SUM12C
0C98 9661      =3279           JNZ     TBERR6          ;JUMP IF MOD-10 TEST FAILED
0C9A 83        =3280           RET
               =3281 ;****************************************************************
               =3282 ; ROUTINE: TBLKE
               =3283 ; FUNCTION: TRY FOR A VALID UPC-E BLOCK.
               =3284 ;            CHECK THAT L6 HAS ENOUGH DATA
               =3285 ;            CHECK THAT L6 IS AN E-TAG.
               =3286 ;            CHECK THAT R6 HAS NO DATA.
               =3287 ;            IF OK, RETURN WITH A=0.
               =3288 ;            ELSE, CLEAR 4&6-CHAR SEGMENT COUNTERS AND
               =3289 ;                 CLEAR THE VERSION POINTER/FLAG.
```

```
                =3290 ; ENTRY: SCAN 1 BUFFER IS THE MAJORITY SCAN.
                =3291 ;        R1 SETUP WITH MINUS THE MINIMUM NUMBER OF SCANS REQUIRED
                =3292 ; EXIT:  USES R0,A
                =3293 ;        A=0 IF GOOD BLOCK.
                =3294 ;        A<>0 IF NO BLOCK.
                =3295 ;
0C9B B82D       =3296 TBLKE:  MOV     R0,#L6STOT
0C9D F0         =3297         MOV     A,@R0
0C9E 69         =3298         ADD     A,R1
0C9F E669       =3299         JNC     TBNONE          ;JUMP IF < -R1 LEFT SEGMENTS
                =3300 ;
0CA1 B827       =3301         MOV     R0,#L6S1+3
0CA3 F0         =3302         MOV     A,@R0           ;GET PARITY DECODE BYTE
0CA4 5310       =3303         ANL     A,#EDECE
0CA6 C669       =3304         JZ      TBNONE          ;JUMP IF NOT AN E-SEG.
                =3305 ;
0CA8 B835       =3306         MOV     R0,#R6STOT
0CAA F0         =3307         MOV     A,@R0
0CAB 9661       =3308         JNZ     TBERR6          ;JUMP IF R6 SEGMENTS ARE PRESENT
                =3309 ;
0CAD 83         =3310         RET
                =3311 ;****************************************************************
                =3312 ; ROUTINE:  TBLK8
                =3313 ; FUNCTION: TRY FOR A VALID EAN-8 BLOCK.
                =3314 ;             IF ANY 6-CHAR SEGMENTS ARE PRESENT, CLEAR 4-CHAR
                =3315 ;               SEGMENT COUNTERS AND VERSION POINTER/FLAG.
                =3316 ;             CHECK THAT L4 AND R4 HAVE ENOUGH DATA.
                =3317 ;             IF OK SO FAR, CALCULATE THE MOD-10 CHECK CHARACTER.
                =3318 ;             IF STILL OK, RETURN WITH A=0.
                =3319 ;             IF MOD-10 ERROR, CLEAR 4-CHAR SEGMENT COUNTERS AND
                =3320 ;               CLEAR VERSION POINTER/FLAG.
                =3321 ; ENTRY: SCAN 1 BUFFER IS THE MAJORITY SCAN.
                =3322 ;        R1 SETUP WITH MINUS THE MINIMUM NUMBER OF SCANS REQUIRED
                =3323 ; EXIT:  USES R0,R2,R3,A
                =3324 ;        A=0 IF GOOD BLOCK
                =3325 ;        A<>0 IF NO BLOCK
                =3326 ;
0CAE B82D       =3327 TBLK8:  MOV     R0,#L6STOT
0CB0 F0         =3328         MOV     A,@R0
0CB1 9663       =3329         JNZ     TBERR4          ;JUMP IF ANY 6L SEGMENTS
                =3330 ;
0CB3 B835       =3331         MOV     R0,#R6STOT
0CB5 F0         =3332         MOV     A,@R0
0CB6 9663       =3333         JNZ     TBERR4          ;JUMP IF ANY 6R SEGMENTS
                =3334 ;
0CB8 B83B       =3335         MOV     R0,#L4STOT
0CBA F0         =3336         MOV     A,@R0
0CBB 69         =3337         ADD     A,R1
0CBC E669       =3338         JNC     TBNONE          ;JUMP IF < -R1 LEFT HALF SEGMENTS
                =3339 ;
0CBE B841       =3340         MOV     R0,#R4STOT
0CC0 F0         =3341         MOV     A,@R0
0CC1 69         =3342         ADD     A,R1
0CC2 E669       =3343         JNC     TBNONE          ;JUMP IF < -R1 RIGHT HALF SEGMENTS
                =3344 ;
0CC4 B836       =3345         MOV     R0,#L4S1
0CC6 145C       =3346         CALL    MOD104
0CC8 AB         =3347         MOV     R3,A            ;SAVE LEFT SUM
0CC9 B83C       =3348         MOV     R0,#R4S1
0CCB 145C       =3349         CALL    MOD104
0CCD 6B         =3350         ADD     A,R3            ;RIGHT SUM + LEFT SUM
0CCE 57         =3351         DA      A
0CCF 530F       =3352         ANL     A,#0FH
0CD1 9663       =3353         JNZ     TBERR4          ;JUMP IF MOD-10 IS BAD
0CD3 83         =3354         RET
                =3355 ;****************************************************
0CD4 A3         =3356 TROPGC: MOVP    A,@A
0CD5 83         =3357         RET
0D00            =3358         ORG     0D00H
                =3359 ;****************************************************************
                =3360 ; ROUTINE:  TBLK6
                =3361 ; FUNCTION: TRY FOR A VALID VERSION-D BLOCK-6.
                =3362 ;             CHECK THAT N(3), N(5) AND 8(R) HAVE ENOUGH DATA.
                =3363 ;             IF THEY DO, CALCULATE MOD-10 CHECK CHARACTER.
                =3364 ;             IF OK, RETURN WITH A=0.
                =3365 ;             ELSE, CLEAR 4-CHAR SEGMENT COUNTERS AND
                =3366 ;               CLEAR THE VERSION POINTER/FLAG.
                =3367 ; ENTRY: SCAN 1 IS THE MAJORITY SCAN.
                =3368 ;        R1 SETUP WITH MINUS THE MINIMUM NUMBER OF SCANS REQUIRED
                =3369 ; EXIT:  USES R0,R2,R3,A
                =3370 ;        A=0 IF GOOD BLOCK
                =3371 ;        A<>0 IF NO BLOCK
                =3372 ;
0D00 8463       =3373 TBER4J: JMP     TBERR4
0D02 8461       =3374 TBER6J: JMP     TBERR6
0D04 8469       =3375 TBNONJ: JMP     TBNONE
                =3376 ;
0D06 8853       =3377 TBLK6:  MOV     R0,#N3STOT
0D08 F0         =3378         MOV     A,@R0
0D09 69         =3379         ADD     A,R1
0D0A E604       =3380         JNC     TBNONJ          ;JUMP IF < -R1 N3 SEGMENTS
```

```
                =3381 ;
000C B85F       =3382           MOV     R0,#N5STOT
000E F0         =3383           MOV     A,@R0
000F 69         =3384           ADD     A,R1
0010 E604       =3385           JNC     TBNONJ      ;JUMP IF < -R1 N5 SEGMENTS
                =3386 ;
0012 B841       =3387           MOV     R0,#R4STOT
0014 F0         =3388           MOV     A,@R0
0015 69         =3389           ADD     A,R1
0016 E604       =3390           JNC     TBNONJ      ;JUMP IF < -R1 8R SEGMENTS
                =3391 ;
0018 B84E       =3392           MOV     R0,#N3S1
001A 145C       =3393           CALL    MOD104
001C AB         =3394           MOV     R3,A
                =3395 ;
001D B85A       =3396           MOV     R0,#N5S1
001F 145C       =3397           CALL    MOD104
0021 68         =3398           ADD     A,R3
0022 57         =3399           DA      A
0023 AB         =3400           MOV     R3,A
                =3401 ;
0024 B83C       =3402           MOV     R0,#R4S1
0026 145C       =3403           CALL    MOD104
0028 68         =3404           ADD     A,R3
0029 57         =3405           DA      A
002A 530F       =3406           ANL     A,#0FH
002C 9600       =3407           JNZ     TBER4J
002E 83         =3408           RET
                =3409 ;**********************************************************
                =3410 ; ROUTINE: TBLK1
                =3411 ; FUNCTION: TRY FOR A VALID VERSION-D BLOCK-1.
                =3412 ;           CHECK THAT L6, N(6) AND 8(L) HAVE ENOUGH DATA.
                =3413 ;           CHECK THAT L6 IS A D-TAG
                =3414 ;           REVERSE 8L DATA
                =3415 ;           CALCULATE MOD-10 CHECK CHARACTER.
                =3416 ;           IF OK, RETURN WITH A=0.
                =3417 ;           ELSE, CLEAR 4&6-CHAR SEGMENT COUNTERS AND
                =3418 ;             CLEAR THE VERSION POINTER/FLAG.
                =3419 ; ENTRY: SCAN 1 IS THE MAJORITY SCAN.
                =3420 ;        R1 SETUP WITH MINUS THE MINIMUM NUMBER OF SCANS REQUIRED
                =3421 ; EXIT:  USES R0,R2,R3,A
                =3422 ;        A=0 IF GOOD BLOCK
                =3423 ;        A<>0 IF NO BLOCK
                =3424 ;
002F B82D       =3425 TBLK1:    MOV     R0,#L6STOT
0031 F0         =3426           MOV     A,@R0
0032 69         =3427           ADD     A,R1
0033 E604       =3428           JNC     TBNONJ      ;JUMP IF < -R L6 SEGMENTS
                =3429 ;
0035 B827       =3430           MOV     R0,#L6S1+3
0037 F0         =3431           MOV     A,@R0       ;GET PARITY DECODE BYTE
0038 5320       =3432           ANL     A,#EDECD
003A C604       =3433           JZ      TBNONJ      ;JUMP IF NOT A D-TAG
                =3434 ;
003C B865       =3435           MOV     R0,#N6STOT
003E F0         =3436           MOV     A,@R0
003F 69         =3437           ADD     A,R1
0040 E604       =3438           JNC     TBNONJ      ;JUMP IF < -R1 N6 SEGMENTS
                =3439 ;
0042 B83B       =3440           MOV     R0,#L4STOT
0044 F0         =3441           MOV     A,@R0
0045 69         =3442           ADD     A,R1
0046 E604       =3443           JNC     TBNONJ      ;JUMP IF < -R1 8L SEGMENTS
                =3444 ;
0048 B824       =3445           MOV     R0,#L6S1
004A 1461       =3446           CALL    MOD106
004C AB         =3447           MOV     R3,A
                =3448 ;
004D B860       =3449           MOV     R0,#N6S1
004F 145C       =3450           CALL    MOD104
0051 68         =3451           ADD     A,R3
0052 57         =3452           DA      A
0053 AB         =3453           MOV     R3,A
                =3454 ;
0054 B836       =3455           MOV     R0,#L4S1    ;REVERSE 8L DATA
0056 F0         =3456           MOV     A,@R0       ;GET CHAR 1&2
0057 47         =3457           SWAP    A
0058 18         =3458           INC     R0
0059 20         =3459           XCH     A,@R0       ;GET CHAR 3&4, SAVE CHAR 2&1
005A 47         =3460           SWAP    A
005B C8         =3461           DEC     R0
005C A0         =3462           MOV     @R0,A       ;SAVE CHAR 4&3
                =3463 ;
005D 145C       =3464           CALL    MOD104
005F 68         =3465           ADD     A,R3
0060 57         =3466           DA      A
0061 530F       =3467           ANL     A,#0FH
0063 9602       =3468           JNZ     TBER6J
0065 83         =3469           RET
                =3470 ;**********************************************************
                =3471 ; ROUTINE: TBLK3
```

```
                =3472 ; FUNCTION:  TRY FOR A VALID VERSION-D BLOCK-3.
                =3473 ;            CHECK THAT N(2) AND 8(R) HAVE ENOUGH DATA.
                =3474 ;            IF THEY DO, CALCULATE MOD-10 CHECK CHARACTER.
                =3475 ;            IF OK, RETURN WITH A=0.
                =3476 ;            ELSE, CLEAR 4-CHAR SEGMENT COUNTERS AND
                =3477 ;                  CLEAR THE VERSION POINTER/FLAG.
                =3478 ; ENTRY: SCAN 1 IS THE MAJORITY SCAN.
                =3479 ;        R1 SETUP WITH MINUS THE MINIMUM NUMBER OF SCANS REQUIRED
                =3480 ; EXIT:  USES R0,R2,R3,A
                =3481 ;        A=0 IF GOOD BLOCK
                =3482 ;        A<>0 IF NO BLOCK
                =3483 ;
0066 B84D       =3484 TBLK3:  MOV     R0,#N2STOT
0068 F0         =3485         MOV     A,@R0
0069 69         =3486         ADD     A,R1
006A E604       =3487         JNC     TBNONJ          ;JUMP IF < -R1 N2 SEGMENTS
                =3488 ;
006C B841       =3489         MOV     R0,#R4STOT
006E F0         =3490         MOV     A,@R0
006F 69         =3491         ADD     A,R1
0070 E604       =3492         JNC     TBNONJ          ;JUMP IF < -R1 8R SEGMENTS
                =3493 ;
0072 B848       =3494         MOV     R0,#N2S1
0074 145C       =3495         CALL    MOD104
0076 AB         =3496         MOV     R3,A
                =3497 ;
0077 B83C       =3498         MOV     R0,#R4S1
0079 145C       =3499         CALL    MOD104
007B 68         =3500         ADD     A,R3
007C 57         =3501         DA      A
007D 530F       =3502         ANL     A,#0FH
007F 9600       =3503         JNZ     TBER4J
0081 83         =3504         RET
                =3505 ;***************************************************************
                =3506 ; ROUTINE:  TBLK4
                =3507 ; FUNCTION:  TRY FOR A VALID VERSION-D BLOCK-4.
                =3508 ;            CHECK THAT N(5) AND N(1) HAVE ENOUGH DATA.
                =3509 ;            IF THEY DO, CALCULATE MOD-10 CHECK CHARACTER.
                =3510 ;            IF OK, RETURN WITH A=0.
                =3511 ;            ELSE, CLEAR 4-CHAR SEGMENT COUNTERS AND
                =3512 ;                  CLEAR THE VERSION POINTER/FLAG.
                =3513 ; ENTRY: SCAN 1 IS THE MAJORITY SCAN.
                =3514 ;        R1 SETUP WITH MINUS THE MINIMUM NUMBER OF SCANS REQUIRED
                =3515 ; EXIT:  USES R0,R2,R3,A
                =3516 ;        A=0 IF GOOD BLOCK
                =3517 ;        A<>0 IF NO BLOCK
                =3518 ;
0082 B85F       =3519 TBLK4:  MOV     R0,#N5STOT
0084 F0         =3520         MOV     A,@R0
0085 69         =3521         ADD     A,R1
0086 E604       =3522         JNC     TBNONJ          ;JUMP IF < -R1 N5 SEGMENTS
                =3523 ;
0088 B847       =3524         MOV     R0,#N1STOT
008A F0         =3525         MOV     A,@R0
008B 69         =3526         ADD     A,R1
008C E604       =3527         JNC     TBNONJ          ;JUMP IF < -R1 N1 SEGMENTS
                =3528 ;
008E B85A       =3529         MOV     R0,#N5S1
0090 145C       =3530         CALL    MOD104
0092 AB         =3531         MOV     R3,A
                =3532 ;
0093 B842       =3533         MOV     R0,#N1S1
0095 145C       =3534         CALL    MOD104
0097 68         =3535         ADD     A,R3
0098 57         =3536         DA      A
0099 530F       =3537         ANL     A,#0FH
009B 9600       =3538         JNZ     TBER4J
009D 83         =3539         RET
                =3540 ;***************************************************************
                =3541 ; ROUTINE:  TBLK5
                =3542 ; FUNCTION:  TRY FOR A VALID VERSION-D BLOCK-5.
                =3543 ;            CHECK THAT N(4) AND 8(R) HAVE ENOUGH DATA.
                =3544 ;            IF THEY DO, CALCULATE MOD-10 CHECK CHARACTER.
                =3545 ;            IF OK, RETURN WITH A=0.
                =3546 ;            ELSE, CLEAR 4-CHAR SEGMENT COUNTERS AND
                =3547 ;                  CLEAR THE VERSION POINTER/FLAG.
                =3548 ; ENTRY: SCAN 1 IS THE MAJORITY SCAN.
                =3549 ;        R1 SETUP WITH MINUS THE MINIMUM NUMBER OF SCANS REQUIRED
                =3550 ; EXIT:  USES R0,R2,R3,A
                =3551 ;        A=0 IF GOOD BLOCK
                =3552 ;        A<>0 IF NO BLOCK
                =3553 ;
009E B859       =3554 TBLK5:  MOV     R0,#N4STOT
00A0 F0         =3555         MOV     A,@R0
00A1 69         =3556         ADD     A,R1
00A2 E604       =3557         JNC     TBNONJ          ;JUMP IF < -R1 N4 SEGMENTS
                =3558 ;
00A4 B841       =3559         MOV     R0,#R4STOT
00A6 F0         =3560         MOV     A,@R0
00A7 69         =3561         ADD     A,R1
00A8 E604       =3562         JNC     TBNONJ          ;JUMP IF < -R1 8R SEGMENTS
```

```
           =3563 ;
OOAA 8854  =3564       MOV    RO,#N4S1
OOAC 145C  =3565       CALL   MOD104
OOAE AB    =3566       MOV    R3,A
           =3567 ;
OOAF 883C  =3568       MOV    RO,#R4S1
00B1 145C  =3569       CALL   MOD104
00B3 68    =3570       ADD    A,R3
00B4 57    =3571       DA     A
00B5 530F  =3572       ANL    A,#OFH
00B7 9600  =3573       JNZ    TBER4J
00B9 83    =3574       RET
           =3575 ;*******************************************************
           =3576 ; ROUTINE:  TBLK7
           =3577 ; FUNCTION: TRY FOR A VALID VERSION-D BLOCK-7.
           =3578 ;           CHECK THAT N(3), N(6) AND N(1) HAVE ENOUGH DATA.
           =3579 ;           IF THEY DO, CALCULATE MOD-10 CHECK CHARACTER.
           =3580 ;           IF OK, RETURN WITH A=0.
           =3581 ;           ELSE, CLEAR 4-CHAR SEGMENT COUNTERS AND
           =3582 ;                 CLEAR THE VERSION POINTER/FLAG.
           =3583 ; ENTRY: SCAN 1 IS THE MAJORITY SCAN.
           =3584 ;        R1 SETUP WITH MINUS THE MINIMUM NUMBER OF SCANS REQUIRED
           =3585 ; EXIT:  USES RO,R2,R3,A
           =3586 ;        A=0 IF GOOD BLOCK
           =3587 ;        A<>0 IF NO BLOCK
           =3588 ;
00BA 8853  =3589 TBLK7: MOV   RO,#N3STOT
00BC F0    =3590       MOV    A,@RO
00BD 69    =3591       ADD    A,R1
00BE E604  =3592       JNC    TBNONJ         ;JUMP IF < -R1 N3 SEGMENTS
           =3593 ;
00C0 8865  =3594       MOV    RO,#N6STOT
00C2 F0    =3595       MOV    A,@RO
00C3 69    =3596       ADD    A,R1
00C4 E604  =3597       JNC    TBNONJ         ;JUMP IF < -R1 N6 SEGMENTS
           =3598 ;
00C6 8847  =3599       MOV    RO,#N1STOT
00C8 F0    =3600       MOV    A,@RO
00C9 69    =3601       ADD    A,R1
00CA E604  =3602       JNC    TBNONJ         ;JUMP IF < -R1 N1 SEGMENTS
           =3603 ;
00CC 884E  =3604       MOV    RO,#N3S1
00CE 145C  =3605       CALL   MOD104
00D0 AB    =3606       MOV    R3,A
           =3607 ;
00D1 8860  =3608       MOV    RO,#N6S1
00D3 145C  =3609       CALL   MOD104
00D5 68    =3610       ADD    A,R3
00D6 57    =3611       DA     A
00D7 AB    =3612       MOV    R3,A
           =3613 ;
00D8 8842  =3614       MOV    RO,#N1S1
00DA 145C  =3615       CALL   MOD104
00DC 68    =3616       ADD    A,R3
00DD 57    =3617       DA     A
00DE 530F  =3618       ANL    A,#OFH
00E0 9600  =3619       JNZ    TBER4J
00E2 83    =3620       RET
           3621 ;*******************************************
00E3 A3    3622 TROPGD: MOVP  A,@A
00E4 83    3623       RET
0E00       3624       ORG    0E00H
           3625 $     INCLUDE(:F4:FTRDTG.SRC)
           =3626 ;*******************************************************
           =3627 ; FILE: FTRDTG.SRC 07-09-86 13:00  BOB ACTIS
           =3628 ; ROUTINE: RDTAG THIS IS THE MAIN PROGRAM
           =3629 ;
0E00 FC    =3630 RDTAG: MOV   A,R4             ;CLEAR THE SCAN FLAGS EXCEPT FOR
0E01 5328  =3631       ANL    A,#ESBFUL+EBFREQ ;SEND BUFFER FULL AND
0E03 AC    =3632       MOV    R4,A             ;BUFMAN REQUEST
0E04 B208  =3633       JB5    RDT05            ;JUMP IF THE BUFMAN REQUEST FLAG IS SET
           =3634 ;
0E06 9461  =3635       CALL   CLRVER           ;CLEAR THE VERSION POINTER/FLAG & DATA
0E08 140C  =3636 RDT05: CALL  CLRSNB           ;CLEAR THE SCAN BUFFER
           =3637 ;
           =3638 ; WAIT FOR THE LABEL TO GO AWAY
           =3639 ;
0E0A D492  =3640 RDT10: CALL  MTRCHK           ;CHECK MOTOR SPEED
0E0C 3400  =3641       CALL   HCOMM            ;SERVICE THE I/F AND BUFMAN
0E0E 8619  =3642       JNI    RDT20            ;JUMP IF SYMCAP (SEGMENT OR SDATA)
           =3643 ;
0E10 FF    =3644       MOV    A,R7             ;GET THE "SEG SEEN" TIMER
0E11 960A  =3645       JNZ    RDT10            ;JUMP IF A SEG RECENTLY SEEN
           =3646 ;
0E13 8D16  =3647       MOV    R5,#EDRDLY       ;SET THE DOUBLE READ TIMER
0E15 8F2A  =3648       MOV    R7,#EGDLTW       ;SET THE GD-LT ON TIMER
0E17 C41F  =3649       JMP    RDT30            ;GO WAIT FOR A LABEL TO READ
           =3650 ;
           =3651 ; RESET THE SYMCAP OR SERVICE SDATA
           =3652 ;
0E19 14A4  =3653 RDT20: CALL  CKFCA            ;RESET THE SEG, ALSO CHECK FOR SDATA
```

```
0E1B 3400      =3654          CALL   HCOMM        ;SERVICE THE I/F AND BUFMAN. ALSO
0E1D C40A      =3655          JMP    RDT10        ;DELAY FOR FCA TO RESET
               =3656 ;
               =3657 ;  WAIT FOR A LABEL TO READ. CHECK GO-LT ON TIME.
               =3658 ;
0E1F FC        =3659 RDT30:   MOV    A,R4
0E20 4301      =3660          ORL    A,#ESCNG     ;SET THE SCAN FLAG SO CKFCA WILL
0E22 AC        =3661          MOV    R4,A         ;PUT THE SEGMENT INTO THE SCAN BUFFER
               =3662 ;
               =3663 RDT35:
0E23 8808      =3664          MOV    R0,#SWLATC   ;CHECK SWITCHES (SWITCH 9- 85)
0E25 80        =3665          MOVX   A,@R0        ;  FOR TWO LABEL FLAG PROGRAM MODE.
0E26 B231      =3666          JB5    RDT37        ;IN PROGRAM MODE - JUMP TO READ LABEL.
0E28 887D      =3667          MOV    R0,#SWISET   ;CHECK PROGRAMMED SWITCH SETTINGS.
0E2A F0        =3668          MOV    A,@R0        ;
0E2B B231      =3669          JB5    RDT37        ;IN PROGRAM MODE - JUMP TO READ LABEL.
               =3670 ;NOT IN PROGRAM MODE. CLEAR TWO LABEL FLAG POINTER.
0E2D FE        =3671          MOV    A,R6
0E2E 538F      =3672          ANL    A,#8FH
0E30 AE        =3673          MOV    R6,A
               =3674 ;
               =3675 RDT37:
0E31 3400      =3676          CALL   HCOMM
0E33 14A4      =3677          CALL   CKFCA        ;SERVICE FCA. POSSIBLE SEG OR SDATA.
0E35 8823      =3678          MOV    R0,#SCNBUF+3
0E37 F0        =3679          MOV    A,@R0        ;GET THE SCAN BUF PARITY DECOTE BYTE
0E38 9645      =3680          JNZ    RDT40        ;JUMP IF SCAN BUFFER HAS DATA
               =3681 ;
0E3A D492      =3682          CALL   MTRCHK       ;CHECK MOTOR SPEED
               =3683 ;
0E3C FF        =3684          MOV    A,R7
0E3D 9623      =3685          JNZ    RDT35        ;JUMP IF GO-LT TIMER <> 0
0E3F 990F      =3686          ANL    P1,#255-EGDLT ;GO-LT OFF
0E41 8940      =3687          ORL    P1,#EBDLT    ;BD-LT ON
0E43 C423      =3688          JMP    RDT35        ;STILL WAITING FOR A LABEL
               =3689 ;
               =3690 ;  START READING THE LABEL
               =3691 ;
0E45 3400      =3692 RDT40:   CALL   HCOMM
0E47 990F      =3693          ANL    P1,#255-EGDLT ;GREEN LIGHT OFF
0E49 8940      =3694          ORL    P1,#EBDLT    ;RED LIGHT ON
0E4B FC        =3695          MOV    A,R4
0E4C B200      =3696          JB5    RDTAG        ;JUMP IF THE BUFMAN REQUEST FLAG IS SET
0E4E C456      =3697          JMP    RDT60        ;GO PROCESS THE FIRST SEGMENT
               =3698 ;
               =3699 ;  COLLECT AND PROCESS SEGMENTS
               =3700 ;
0E50 D492      =3701 RDT50:   CALL   MTRCHK       ;CHECK MOTOR SPEED
0E52 3400      =3702          CALL   HCOMM
0E54 14A4      =3703          CALL   CKFCA        ;GET SEGMENTS IF ANY
0E56 5404      =3704 RDT60:   CALL   PROCSG       ;PROCESS SEGMENTS IF ANY
0E58 E5        =3705          SEL    MB0
0E59 F400      =3706          CALL   CKCNTS       ;CHK FOR ENOUGH SEGS FOR PSBL VERSION
0E5B F5        =3707          SEL    MB1
0E5C C661      =3708          JZ     RDT70        ;JUMP IF ENOUGH SEGMENTS
               =3709 ;
0E5E FF        =3710          MOV    A,R7
0E5F 9650      =3711          JNZ    RDT50        ;JUMP IF SEGMENTS RECENTLY SEEN
               =3712 ;
               =3713 ;  TRY FOR A VALID LABEL
               =3714 ;
0E61 3400      =3715 RDT70:   CALL   HCOMM
0E63 9400      =3716          CALL   VERTAG
0E65 C66E      =3717          JZ     GOODRD       ;JUMP IF A GOOD VERSION WAS FOUND
               =3718 ;
0E67 FF        =3719          MOV    A,R7
0E68 9650      =3720          JNZ    RDT50        ;JUMP IF SEGMENTS RECENTLY SEEN
               =3721 ;
0E6A 3400      =3722 BADRD:   CALL   HCOMM
0E6C C48A      =3723          JMP    RDT90
               =3724 ;
0E6E 3400      =3725 GOODRD:  CALL   HCOMM
0E70 FD        =3726          MOV    A,R5         ;GET THE DOUBLE READ TIMER
0E71 C67B      =3727          JZ     GOOD10       ;JUMP IF DR TIMER=0 (OK TO DOUBLE READ)
               =3728 ;
0E73 E5        =3729          SEL    MB0
0E74 F490      =3730          CALL   DRSUMT       ;CALCULATE AND TEST THE DOUBLE READ SUM
0E76 F5        =3731          SEL    MB1
0E77 967F      =3732          JNZ    GOOD20       ;JUMP IF OLD<>NEW (NO DOUBLE READ)
0E79 C400      =3733          JMP    RDTAG        ;JUMP IF DOUBLE READ TOO SOON
               =3734 ;
0E7B E5        =3735 GOOD10:  SEL    MB0
0E7C F490      =3736          CALL   DRSUMT       ;CALCULATE AND SAVE THE LABEL SUM
0E7E F5        =3737          SEL    MB1
               =3738 GOOD20:
0E7F E5        =3739          SEL    MB0
0E80 C470      =3740          JMP    FLGPRG       ;JUMP TO CHECK SWITCH 9
               =3741 GOOD30:
0E82 998F      =3742          ANL    P1,#255-EBDLT ;BD-LT OFF
0E84 8920      =3743          ORL    P1,#EGDLT    ;GO-LT ON
0E86 D5        =3744          SEL    RB1
```

```
0E87 BE04    =3745         MOV     R6,#EGDTON    ;GOOD TONE LENGHT
0E89 C5      =3746         SEL     RB0
             =3747 ;
0E8A FC      =3748 RDT90:  MOV     A,R4
0E8B 4320    =3749         ORL     A,#EBFREQ     ;SET THE BUFMAN REQUEST FLAG
0E8D AC      =3750         MOV     R4,A
0E8E F40A    =3751         CALL    BUFMAN
0E90 C400    =3752         JMP     RDTAG
             =3753 ;
             =3754 ; CHECK MOTOR UP2SPD* SIGNAL  (UP TO SPEED & OVER SPEED)
0E92 0A      =3755 MTRCHK: IN      A,P2
0E93 37      =3756         CPL     A
0E94 B297    =3757         JB5     MTRC10        ;JUMP IF MOTOR SPEED PROBLEM
0E96 83      =3758         RET                   ;RETURN IF OK
             =3759 ;
0E97 BF64    =3760 MTRC10: MOV     R7,#100       ;SET TIMER FOR 2 SECONDS
0E99 FF      =3761 MTRC20: MOV     A,R7
0E9A 9699    =3762         JNZ     MTRC20        ;WAIT IN CASE OF SPURIOUS ERROR
             =3763 ;
0E9C 0A      =3764         IN      A,P2
0E9D 37      =3765         CPL     A
0E9E B2A1    =3766         JB5     MTRERR        ;JUMP IF STILL A PROBLEM AFTER WAIT
0EA0 83      =3767         RET                   ;REUTRN IF OK
             =3768 ;
             =3769 ; COME HERE IF THERE IS A MOTOR PROBLEM DURING RDTAG
0EA1 8910    =3770 MTRERR: ORL     P1,#ELASDB    ;LASER OFF
0EA3 99DD    =3771         ANL     P1,#255-(EMTREB+EGDIT) ;MOTOR OFF, GREEN LIGHT OFF
0EA5 B804    =3772         MOV     R0,#4
0EA7 E5      =3773         SEL     MB0
0EA8 7481    =3774         CALL    TERRWT        ;GIVE 4 BEEPS FOR A MOTOR ERROR
0EAA F5      =3775         SEL     MB1
             =3776 ;
             =3777 ; STICK HERE WITH THE RED LIGHT FLASHING
0EAB BF05    =3778 MTRE20: MOV     R7,#5         ;SET TIMER FOR 100MS
0EAD FF      =3779 MTRE30: MOV     A,R7
0EAE 96AD    =3780         JNZ     MTRE30        ;WAIT BETWEEN LIGHT TOGGLES
             =3781 ;
0EB0 09      =3782         IN      A,P1
0EB1 998F    =3783         ANL     P1,#255-EBDLT ;RED LIGHT OFF
0EB3 D2AB    =3784         JB6     MTRE20        ;JUMP IF THE RED LIGHT WAS ON
0EB5 8940    =3785         ORL     P1,#EBDLT     ;RED LIGHT ON
0EB7 C4AB    =3786         JMP     MTRE20
             =3787 ;****************************************
0EB9 A3      3788 TROPGE: MOVP    A,@A
0EBA 83      3789         RET
0F00         3790         ORG     0F00H
             3791 $       INCLUDE(:F4:BUFMAN.SRC)
             =3792 ;*********************************************************
             =3793 ; FILE: BUFMAN.SRC  9-11-86 09:20  BOB ACTIS
             =3794 ;*********************************************************
             =3795 ; ROUTINE:  BUF12C
             =3796 ; FUNCTION: LOAD 12 CHARACTERS INTO THE COMMUNICATIONS BUFFER.
             =3797 ;           (LOAD L6 AND R6 DATA)
             =3798 ; ENTRY: R1+1 = NEXT AVAILABLE COMM BUFFER BYTE.
             =3799 ; EXIT:  R1 = NEXT AVAILABLE COMM BUFFER BYTE.
             =3800 ;        L6 AND R6 DATA MOVED TO COMM BUFFER.
             =3801 ;
0F00 19      =3802 BUF12C: INC     R1            ;INCREMENT TO NEXT AVAILABLE BYTE
0F01 B824    =3803         MOV     R0,#L6S1
0F03 142A    =3804         CALL    MOV3BY
0F05 B82E    =3805         MOV     R0,#R6S1
0F07 142A    =3806         CALL    MOV3BY
0F09 83      =3807         RET
             =3808 ;*********************************************************
             =3809 ; ROUTINE: BUFMAN
             =3810 ; FUNCTION: IF BUFMAN REQUEST FLAG IS NOT SET,
             =3811 ;           THEN RETURN,
             =3812 ;           ELSE IF COMM BUF IS BUSY
             =3813 ;                THEN IF NO VALID VERSIONS, CLR REQ FLAG. RETURN
             =3814 ;                ELSE PROCESS MESSAGE BUFFER REQUEST.
             =3815 ; ENTRY: RB0
             =3816 ;        R6 VERSION FLAGS SETUP
             =3817 ; EXIT:  USES R0,R1,A
             =3818 ;        SPECIAL CHARACTERS
             =3819 ;           DATA "C" = FILLER CHARACTER
             =3820 ;           BYTE 0CCH = TERMINATION  (ETRMBY)
             =3821 ;
0F0A FC      =3822 BUFMAN: MOV     A,R4
0F0B 820E    =3823         JB5     BUFM10        ;JUMP IF BUFMAN REQUEST FLAG IS SET
0F0D 83      =3824         RET
0F0E 72AD    =3825 BUFM10: JB3     BUFM93        ;JUMP IF COMM BUFFER IS BUSY
             =3826 ;
0F10 FE      =3827         MOV     A,R6
0F11 530F    =3828         ANL     A,#0FH
0F13 C682    =3829         JZ      BUFM94        ;JUMP IF NOT A VALID VERSION
             =3830 ;
0F15 B967    =3831 BUFM20: MOV     R1,#SBUF      ;SEND BUFFER START ADDRESS
0F17 FE      =3832         MOV     A,R6          ;GET VERSION FLAGS
0F18 530F    =3833         ANL     A,#0FH        ;MASK VERSION POINTER
0F1A 0300    =3834         ADD     A,#0          ;SETUP CARRY FOR DA
0F1C 57      =3835         DA      A
```

```
0F1D 92B2      =3836           JB4       BUFM94         ;JUMP IF POINTER > 9.  ILLEGAL VERSION.
               =3837  ;
0F1F 0321      =3838           ADD       A,#LOW BUFTBL-1 ;DID AWAY WITH MISCAN OPTION
0F21 83        =3839           JMPP      @A
               =3840  BUFTBL:
0F22 2B        =3841           DB        LOW BUFMA
0F23 31        =3842           DB        LOW BUFM13
0F24 39        =3843           DB        LOW BUFME
0F25 42        =3844           DB        LOW BUFM8
0F26 49        =3845           DB        LOW BUFMD1
0F27 5A        =3846           DB        LOW BUFMD2
0F28 62        =3847           DB        LOW BUFMD3
0F29 6E        =3848           DB        LOW BUFMD4
0F2A 84        =3849           DB        LOW BUFMD5
               =3850  ;
0F2B B1AC      =3851  BUFMA:   MOV       @R1,#0ACH       ;UPC-A HEADER AND FILLER
0F2D F400      =3852  BUFM12:  CALL      BUF12C
0F2F E49E      =3853           JMP       BUFM90
               =3854  ;
0F31 23F0      =3855  BUFM13:  MOV       A,#0F0H         ;EAN-13 HEADER
0F33 B827      =3856           MOV       R0,#L6S1+3      ;PARITY DECODE CHARACTER ADDRESS
0F35 30        =3857           XCHD      A,@R0           ;PUT PARITY DECODE CHAR INTO A WITH HEADER
0F36 A1        =3858           MOV       @R1,A           ;PUT HEADER & CHAR INTO SEND BUFFER
0F37 E42D      =3859           JMP       BUFM12          ;GO DO THE NEXT 12 CHARS
               =3860  ;
0F39 B1E0      =3861  BUFME:   MOV       @R1,#0E0H       ;UPC-E HEADER AND N/S 0
0F3B 19        =3862           INC       R1
0F3C B824      =3863           MOV       R0,#L6S1
0F3E 142A      =3864           CALL      MOV3BY
0F40 E49E      =3865           JMP       BUFM90
               =3866  ;
0F42 B1FF      =3867  BUFM8:   MOV       @R1,#0FFH       ;EAN-8 HEADER CHARS
0F44 19        =3868           INC       R1
0F45 B836      =3869           MOV       R0,#L4S1
0F47 E47C      =3870           JMP       BUFM8R
               =3871  ;
0F49 81D1      =3872  BUFMD1:  MOV       @R1,#0D1H       ;VERSION D-1 HEADER
0F4B 19        =3873           INC       R1
0F4C B824      =3874           MOV       R0,#L6S1
0F4E 142A      =3875           CALL      MOV3BY
0F50 B860      =3876           MOV       R0,#N6S1
0F52 1426      =3877           CALL      MOV2BY
0F54 B836      =3878           MOV       R0,#L4S1        ;ALREADY SWAPPED
0F56 1426      =3879           CALL      MOV2BY
0F58 E49E      =3880           JMP       BUFM90
               =3881  ;
0F5A B1D2      =3882  BUFMD2:  MOV       @R1,#0D2H       ;VERSION D-2 HEADER
0F5C F400      =3883           CALL      BUF12C
0F5E B848      =3884           MOV       R0,#N2S1
0F60 E47C      =3885           JMP       BUFM8R
               =3886  ;
0F62 B1D3      =3887  BUFMD3:  MOV       @R1,#0D3H       ;VERSION D-3 HEADER
0F64 F400      =3888           CALL      BUF12C
0F66 B84E      =3889           MOV       R0,#N3S1
0F68 1426      =3890           CALL      MOV2BY
0F6A B85A      =3891           MOV       R0,#N5S1
0F6C E47C      =3892           JMP       BUFM8R
               =3893  ;
0F6E B1D4      =3894  BUFMD4:  MOV       @R1,#0D4H       ;VERSION D-4 HEADER
0F70 F400      =3895           CALL      BUF12C
0F72 B85A      =3896           MOV       R0,#N5S1
0F74 1426      =3897           CALL      MOV2BY
0F76 B842      =3898           MOV       R0,#N1S1
0F78 1426      =3899           CALL      MOV2BY
0F7A B854      =3900           MOV       R0,#N4S1
0F7C 1426      =3901  BUFM8R:  CALL      MOV2BY
0F7E B83C      =3902           MOV       R0,#R4S1
0F80 1426      =3903           CALL      MOV2BY
0F82 E49E      =3904           JMP       BUFM90
               =3905  ;
0F84 B1D5      =3906  BUFMD5:  MOV       @R1,#0D5H       ;VERSION D-5 HEADER
0F86 F400      =3907           CALL      BUF12C
0F88 B854      =3908           MOV       R0,#N4S1
0F8A 1426      =3909           CALL      MOV2BY
0F8C B83C      =3910           MOV       R0,#R4S1
0F8E 1426      =3911           CALL      MOV2BY
0F90 B84E      =3912           MOV       R0,#N3S1
0F92 1426      =3913           CALL      MOV2BY
0F94 B860      =3914           MOV       R0,#N6S1
0F96 1426      =3915           CALL      MOV2BY
0F98 B842      =3916           MOV       R0,#N1S1
0F9A 1426      =3917           CALL      MOV2BY
0F9C E49E      =3918           JMP       BUFM90
               =3919  ;
0F9E B1CC      =3920  BUFM90:  MOV       @R1,#ETRMBY     ;LOAD THE DATA TERMINATION CHARACTER
0FA0 B966      =3921           MOV       R1,#SBFPNT      ;SEND BUFFER POINTER ADDRESS
0FA2 B1CE      =3922           MOV       @R1,#SBSTRT     ;PUT PACKED DATA START ADRS IN POINTER
0FA4 9461      =3923           CALL      CLRVER          ;CLEAR THE VERSION POINTER/FLAG & DATA
0FA6 FC        =3924           MOV       A,R4
0FA7 53DF      =3925           ANL       A,#255-EBFREQ   ;CLEAR THE BUFMAN REQUEST FLAG
0FA9 4308      =3926           ORL       A,#ESBFUL       ;SET THE SEND BUFFER FULL BIT
```

```
OFAB AC        =3927           MOV     R4,A
OFAC 83        =3928           RET
               =3929   ;
OFAD FE        =3930   BUFM93: MOV     A,R6
OFAE 530F      =3931           ANL     A,#0FH          ;MASK THE VERSION POINTER/FLAG
OFB0 9686      =3932           JNZ     BUFM95          ;JUMP IF A VALID VERSION
               =3933   ;
OFB2 FC        =3934   BUFM94: MOV     A,R4
OFB3 53DF      =3935           ANL     A,#255-EBFREQ   ;CLEAR THE BUFMAN REQUEST FLAG
OFB5 AC        =3936           MOV     R4,A
               =3937   ;
OFB6 83        =3938   BUFM95: RET
                3939   ;****************************************
OFB7 A3         3940   TROPGF: MOVP    A,@A
OFB8 83         3941           RET
                3942   ;****************************************
OFF7            3943           ORG     0FF7H
                3944   ;
                3945   ; CHECKSUM BYTE
                3946   ;
OFF7 FF         3947           DB      0FFH
                3948   ;
                3949   ; DATE
                3950   ;
OFF8 07         3951           DB      07H,22H,87H
OFF9 22
OFFA 87

3952   ;
                3953   ; PART NUMBER
                3954   ;
OFFB 52         3955           DB      'R',096H,001H,030H
OFFC 96
OFFD 01
OFFE 30

3956   ;
                3957   ; REVISION
                3958   ;
OFFF 30         3959           DB      '0'
                3960   ;****************************************
                3961           END
```

USER SYMBOLS
```
APL3R2 0855    BADRD  0E6A    BF4CNT 0030    BF4CST 0036    BF6CNT 0012    BF6CST 0024    BUF12C 0F00    BUFM10 0F0E
BUFM12 0F2D    BUFM13 0F31    BUFM20 0F15    BUFM8  0F42    BUFM8R 0F7C    BUFM90 0F9E    BUFM93 0FAD    BUFM94 0FB2
BUFM95 0FB6    BUFMA  0F2B    BUFMAN 0F0A    BUFMD1 0F49    BUFMD2 0F5A    BUFMD3 0F62    BUFMD4 0F6E    BUFMD5 0F84
BUFME  0F39    BUFTBL 0F22    CHECLB 04AC    CHKIJ  06A1    CHKLP1 068F    CHKSCN 0500    CK4H10 004A    CK4H20 004B
CK4H30 0052    CK4HRS 0048    CK6T10 089D    CK6T20 0B9F    CK6TOT 0897    CK6TRT 0BA8    CKCN10 0714    CKCN20 071C
CKCN30 0729    CKCN40 0739    CKCN45 073F    CKCN50 0747    CKCN60 0761    CKCN70 0769    CKCN80 077D    CKCNNG 0785
CKCNOK 0783    CKCNTS 0700    CKEPDO 0186    CKEPRM 0183    CKFC10 08A7    CKFC20 0883    CKFC80 0809    CKFC90 080B
CKFC95 080F    CKFCA  08A4    CKMAJ  0837    CKMAJ9 0845    CKMISM 0848    CKMS30 0866    CKMS80 086C    CKMS90 086F
CKSENT 01ED    CKSNRT 0520    CLKEPM 01D9    CLR4SG 0806    CLR6SG 0800    CLRRAM 02A4    CLRSBF 0816    CLRSH1 0811
CLRSNB 080C    CLRTOO 0810    CLRVER 0C61    DATA   01CE    DECRO  0641    DISLAS 02CC    DRSM13 07A5    DRSM1X 07DE
DRSM3X 07D6    DRSM4X 07D6    DRSM5X 07B7    DRSM7B 07DC    DRSM7C 07E0    DRSM8  07E6    DRSMA  07A5    DRSMD1 07CA
DRSMD2 07D3    DRSMD3 07C1    DRSMD4 07B4    DRSMD5 07AB    DRSMON 07EF    DRSME  07A8    DRSTBL 079B    DRSUM  007C
DRSUMT 0790    DRTIMR 0005    DRVRNG 07F4    E1000M 0032    EAMB8Y 008B    EAMBMS 0004    EAMESD 00C2    EAMESE 00C1
EBDLT  0040    EBDTOM 0014    EBFREQ 0020    EBIT6  0040    ECASE1 087C    ECASE2 0885    ECASE3 0890    ECASE4 0896
EDEC8L 000A    EDEC8R 0008    EDECAL 000C    EDECAR 0000    EDECB7 0080    EDECBE 000E    EDECSF 000F    EDECBK 0040
EDECD  0020    EDECE  0010    EDECOO 000F    EDRDLY 0016    EFCRST 0003    EFRRST 0001    EGDLT  0020    EGDLTW 002A
EGDTON 0004    EHCNTL 0001    ELASDB 0010    ELST1  04DE    ELSTBT 0665    EMOD10 0866    EMOOCK 089D    EMOOSM 089B
EMTREB 0002    ENLAS  0207    EOCIA  0002    EPARRD 0000    EPRDEC 0004    EPRMCS 0080    EPRMDI 0004    EPRMSK 0008
ER4B1  0002    ER4B4  0010    ER4B6  0040    ER4B7  0080    ER6B4  0010    ER6B5  0020    ER6B6  0040    ER6B7  0080
ERAL   0020    ERASE  00C0    ERASFL 05B5    ERS2RM 04DA    ESBFUL 0008    ESCNG  0001    ESDIS  00C4    ESEN   0045
ESENT  0010    ESR4CH 0010    ESRCHR 000F    ESRF13 0020    ESRPER 0040    ESRRD  0001    ESRSDT 0080    ETEST  0001
ETMARK 0002    ETNCT1 0014    ETNCT2 001E    ETNCT3 0028    ETNCT4 0038    ETNFQ1 00F4    ETNFQ2 00F8    ETNFQ3 00FA
ETNFQ4 00FC    ETONCT 0028    ETONE  0080    ETNFQ  FFFA    ETRMBY 00CC    EUP2SP 0020    EVER00 0000    EVER13 0002
EVER8  0004    EVERA  0001    EVERD1 0005    EVERD2 0006    EVERD3 0007    EVERD4 0008    EVERD5 0009    EVERE  0003
EVLSIR 0040    EWAIT  0008    EWDS   0000    EWEN   0030    EXSBF2 0B70    EXSBF3 0B74    EXSBF4 0B78    EXSBFL 087E
EXSBFX 087A    FACTOR 0001    FILFF  063A    FLCKRT 066F    FLGCHK 0680    FLGPRG 0670    FREQAD 0044    GETLUP 0275
GOOD10 0E7B    GOOD20 0E7F    GOOD30 0E82    GOODRD 0E6E    HCOM10 0909    HCOM20 091E    HCOM30 0932    HCOM40 093A
HCOM55 0942    HCOM80 0945    HCOM90 0948    HCOMM  0900    INCHNB 0969    INCLNB 0971    INCPNT 06C3    INCX90 0979
INCXRT 097C    INLAB1 065F    INTSTR 007F    INTTRP 0003    L4S1   0036    L4S2   0038    L4SCNT 003A    L4STOT 003B
L6S1   0024    L6S2   0028    L6SCNT 002C    L6STOT 002D    LASTBT 0564    LBDET  0631    LOOPCK 0292    LSTBYT 009F
LSTUSD 007F    MAJSG0 0BB3    MAJSG1 0BBF    MAJSG4 0BC5    MAJSG5 0BCF    MAJSGS 0BA9    MCH2BY 097D    MCH3BY 0981
MCH4BY 0985    MCHXBY 0987    MCHXRT 098F    MOD104 085C    MOD106 0861    MOV2BY 0826    MOV3BY 082A    MOV4BY 082E
MOVXBY 0830    MRB0   0000    MRB1   0018    MRB1R4 001C    MTRC10 0E97    MTRC20 0E99    MTRCHK 0E92    MTRE20 0EA8
MTRE30 0EAD    MTRERR 0EA1    N1S1   0042    N1S2   0044    N1SCNT 0046    N1STOT 0047    N2S1   0048    N2S2   004A
N2SCNT 004C    N2STOT 004D    N3S1   004E    N3S2   0050    N3SCNT 0052    N3STOT 0053    N4S1   0054    N4S2   0056
N4SCNT 0058    N4STOT 0059    N5S1   005A    N5S2   005C    N5SCNT 005E    N5STOT 005F    N6S1   0060    N6S2   0062
N6SCNT 0064    N6STOT 0065    NOLSBT 0569    OCIRET 0569    OPREAD 0080    OVRRET 04C0    OVRSET 04A6
OVRST1 008C    OWRITE 0040    PARITY 0190    PDATA  006F    POW00  03A3    POW10  038B    POW20  0301    POW25  03DA
POW30  03E1    POWUP  03A4    PRO4C2 0A62    PRO4C3 0A6A    PRO4C4 0A70    PRO4C6 0A81    PRO4C7 0A89    PRO4C8 0A8F
PRO4CH 0A51    PRO6C2 0AA4    PRO6C3 0AA8    PRO6C4 0AAE    PRO6C6 0ABD    PRO6C7 0AC1    PRO6C8 0AC7    PRO6CH 0A95
PRO7C2 0B0F    PRO7C3 0813    PRO7C4 0819    PRO7C6 0828    PRO7C7 082C    PRO7C8 0832    PRO7CH 0B00    PROC05 0A19
PROC3L 0A14    PROC8  0A1B    PROC8L 0A20    PROC8R 0A24    PROCA  0A45    PROCAL 0A4A    PROCAR 0A4C    PROCD  0A14
PROCDN 0A2C    PROCDX 0A28    PROCE  0A3D    PROCEX 0A4E    PROCNT 0A37    PROCRT 0A50    PROCSG 0A04    PROLAB 0685
R4S1   003C    R4S2   003E    R4SCNT 0040    R4STOT 0041    R6S1   002E    R6S2   0031    R6SCNT 0034    R6STOT 0035
RAMRT  02E6    RCRAM  0020    RDEPRM 0280    RDLAB1 064B    RDLAB2 064F    RDT05  0E08    RDT10  0E0A    RDT20  0E19
RDT30  0E1F    RDT35  0E23    RDT37  0E31    RDT40  0E45    RDT50  0E50    RDT60  0E56    RDT70  0E61    RDT90  0E8A
RDTAG  0E00    RLACC  018A    ROCIA  0552    ROCIA1 0554    ROCIA2 0558    RSTTRP 0000    RTPRG  06E7    RTRCVR 0647
RTRLAB 0605    RTRM1  068D    RTRMRT 0687    SAVEBT 0480    SBFEND 0078    SBFPNT 0066    SBSTRT 00CE    SBUF   0067
```

| | | | | | | | |
|---|---|---|---|---|---|---|---|
| SBUFAD 0067 | SBUFSZ 0012 | SCNBUF 0020 | SCNFLG 0004 | SDAT10 0486 | SDAT11 0494 | SDAT12 04A2 | SDATA 0400 |
| SDATA1 0406 | SDATA2 0400 | SDATA3 0417 | SDATA4 0425 | SDATA5 043C | SDATA6 044A | SDATA7 045C | SDATA8 0468 |
| SDATA9 0474 | SDATAH 042C | SEGBUF 0020 | SETCS 0284 | SETDI 0101 | SETDI1 0107 | SFTLFT 0196 | SGSUM4 0837 |
| SGSUM6 0838 | SGSUMR 0854 | SGSUMX 083C | SGSUMY 0849 | SHIFTL 05C1 | SNDWRT 0501 | SOCIA 01EB | SP2SCN 0515 |
| ST2SCN 051E | STACK 0008 | STOCIA 0511 | STRAM1 0089 | STRRAM 0600 | STSDTA 007E | SUM12C 0889 | SUM2BY 078C |
| SUM3BY 078A | SUM4BY 0788 | SWISET 007D | SWLATC 0008 | SWP4SJ 0A00 | SWP4SN 0949 | SWP6SJ 0A02 | SWP6SN 0954 |
| SWPXEX 0962 | SWPXRT 0A09 | SWSET 01A0 | SWSET1 00CB | TASAVE 001F | TBER4J 0000 | TBER6J 0002 | TBERR4 0C63 |
| TBERR6 0C61 | TBLK1 002F | TBLK13 0C6C | TBLK2 0C88 | TBLK3 0066 | TBLK4 0082 | TBLK5 009E | TBLK6 0006 |
| TBLK7 008A | TBLK8 0CAE | TBLKA 0C4F | TBLKE 0C98 | TBNONE 0C69 | TBNONJ 0004 | TCKCNT 0280 | TCNT1 0038 |
| TCNT2 003A | TERR02 0387 | TERR04 038A | TERR06 038F | TERR08 0395 | TERR10 039A | TERR12 039C | TERRWT 0381 |
| TEST1 0241 | TEST2 0245 | TEST3 0248 | TEST4 0258 | THO05 04A4 | TIME05 0015 | TIME10 0019 | TIME20 001B |
| TIME30 0023 | TIME40 002A | TIME50 0033 | TIME60 003A | TIMER 0007 | TIMREG 0007 | TIMTRP 0007 | TMOT10 0306 |
| TMOT20 030F | TMOT22 0311 | TMOT24 0313 | TMOT28 0325 | TMOT40 032B | TMOT50 0331 | TMOT60 0333 | TMOT80 0335 |
| TMOT90 034A | TMOT95 034F | TMOTOR 0300 | TOC10 0185 | TOC20 018A | TOC50 018C | TOCIA 0176 | TOCRET 0363 |
| TON1CT 056C | TONADD 0576 | TONCNT 001D | TONLTH 001E | TPON 0351 | TPON15 03CE | TPON20 0359 | TPON30 0361 |
| TPON40 0369 | TPON50 0373 | TPON60 037B | TPON90 037D | TPORET 0387 | TRAM 0131 | TRAM10 0133 | TRAM20 0139 |
| TRAM30 0141 | TRAM40 014E | TRAM50 015B | TRAM60 0168 | TRAMER 0174 | TRARET 035B | TREPRM 005B | TRNDTA 052D |
| TRNFLG 04C1 | TRO10 0109 | TRO20 0110 | TRO50 011C | TROMSM 0100 | TROPG0 00AC | TROPG1 01F6 | TROPG2 02E9 |
| TROPG3 03F7 | TROPG4 04E4 | TROPG5 05D8 | TROPG6 06EA | TROPG7 07F6 | TROPG8 08E4 | TROPG9 0990 | TROPGA 0ACC |
| TROPGB 0BD8 | TROPGC 0CD4 | TROPGD 00E3 | TROPGE 0EB9 | TROPGF 0FB7 | TRORET 0353 | TROTAB 0121 | TRPRM1 00C8 |
| TRPRM2 004A | TRRAM 0061 | TRYBLK 0C0C | TSCBUF 0050 | TSEG1 0030 | TSEG2 0034 | TST31 0251 | TST32 0255 |
| TST41 0262 | TST42 0266 | TTA90 02A7 | TTACHK 02A9 | TTAG 020E | TTARET 0368 | TTATAB 0200 | TWOLAB 0067 |
| TXRET 00AB | UNPACK 0073 | UNPAK1 0077 | UNPK1 021D | UNPK2 0222 | VALFLG 06A7 | VER13 0C4C | VER8 0C4A |
| VERA 0C4D | VERD1 0C49 | VERD2 0C48 | VERD3 0C47 | VERD4 0C46 | VERD5 0C45 | VERE 0C4B | VERFLG 0006 |
| VERT05 0C22 | VERT10 0C2B | VERT15 0C2F | VERT20 0C3C | VERT90 0C4E | VERTAG 0C00 | WAIT 01E1 | WAIT0 01E3 |
| WAIT1 01E5 | WRACC 01C2 | WREPRM 0521 | WRKBUF 0079 | WRPRM1 00C7 | WRTPRM 0600 | | |

ASSEMBLY COMPLETE, NO ERRORS

ISIS-II ASSEMBLER SYMBOL CROSS REFERENCE, V2.1

```
APL3R2  2304#  2318   2327   2390
BADRD   3722#
BF4CNT  274#   2193
BF4CST  234#   274    2192
BF6CNT  232#   2181
BF6CST  222#   232    2180
BUF12C  3802#  3852   3883   3888   3895   3907
BUFM10  3823   3825#
BUFM12  3852#  3859
BUFM13  3842   3855#
BUFM20  3831#
BUFM8   3844   3867#
BUFM8R  3870   3885   3892   3901#
BUFM90  3853   3865   3880   3904   3918   3920#
BUFM93  3825   3930#
BUFM94  3829   3836   3934#
BUFM95  3932   3938#
BUFMA   3841   3851#
BUFMAN  2486   3751   3822#
BUFMD1  3845   3872#
BUFMD2  3846   3882#
BUFMD3  3847   3887#
BUFMD4  3848   3894#
BUFMD5  3849   3906#
BUFME   3843   3861#
BUFTBL  3838   3840#
CHECLB  1408   1412#
CHKIJ   1871   1874#
CHKLP1  1836   1857#
CHKSCN  1493#  3115   3132   3144
CK4H10  393#   404
CK4H20  392    395#
CK4H30  397    401#
CK4HRS  392#   1035   1063
CK6T10  3038#  3044
CK6T20  3037   3041#
CK6TOT  3034#  3193   3232   3270
CK6TRT  3049#
CKCN10  1965#
CKCN20  1953   1971#
CKCN30  1958   1981#
CKCN40  1983   1988   1992#
CKCN45  1997#
CKCN50  1978   2003#
CKCN60  2016   2024#
CKCN70  2011   2030#
CKCN80  2038   2046#
CKCNNG  1963   1969   1974   1990   1995   2001   2006   2022   2028   2033   2044   2049   2054#
CKCNOK  1968   1979   1984   1989   2000   2021   2027   2043   2051#
CKCNTS  1949#  3706
CKEPDO  722#   727
CKEPRM  719#   962    967
CKFC10  2413   2416#
CKFC20  2418   2425#
CKFC80  2456   2460#
CKFC90  2427   2458   2462#
CKFC95  2420   2426   2466#
CKFCA   896    2413#  3653   3677   3703
CKMAJ   2902#  3064   3071   3080
```

```
CKMAJ9  2908   2914#
CKMISM  2932#  3068   3075   3087
CKMS30  2948   2965#
CKMS80  2954   2960   2967   2972#
CKMS90  2933   2943   2975#
CKSENT  792#   793
CKSNRT  1505   1508   1510   1512#
CLKEPM  753    755#
CLR4SG  2192#  3210
CLR6SG  888    2180#  3209
CLRRAM  931#   932
CLRSBF  2223#  2521   2536
CLRSN1  2207#  2209   2233
CLRSNB  1003   2204#  2457   2721   3636
CLRTOO  2182   2194   2206#
CLRVER  1002   3208#  3635   3923
DATA    742    749#
DECRO   1748   1763#
DISLAS  985#   1303   1328   1337   1367   1379   1388
DRSM13  2096   2106#
DRSM1X  2136   2145#
DRSM3X  2130   2140#
DRSM4X  2124   2141#
DRSM5X  2116   2120#
DRSM7B  2107   2144#
DRSM7C  2110   2146#
DRSM8   2098   2150#
DRSMA   2095   2105#
DRSMD1  2099   2132#
DRSMD2  2100   2138#
DRSMD3  2101   2126#
DRSMD4  2102   2118#
DRSMD5  2103   2112#
DRSMDN  2148   2156#
DRSME   2097   2109#
DRSTBL  2092   2094#
DRSUM   290#   2156
DRSUMT  2086#  3730   3736
DRTIMR  201#
DRVRNG  2090   2094   2161#
E1000M  143#   1157   1221
EAMBBY  166#
EAMBMS  108#   988    1350   1359
EAMESD  152#   1356
EAMESE  153#   1347
EBDLT   45#    986    995    1044   1047   1050   1136   1228   1321   1927   3687   3694   3742   3783   3785
EBDTON  146#
EBFREQ  111#   3631   3749   3925   3935
EBIT6   156#   2520
ECASE1  2347   2355#
ECASE2  2348   2364#
ECASE3  2350   2375#
ECASE4  2351   2372   2384#
EDEC8L  83#
EDEC8R  84#
EDECAL  85#
EDECAR  86#
EDECB7  92#
EDECBE  87#
EDECBF  88#
EDECBK  91#    2584
EDECD   90#    3237   3275   3432
EDECE   89#    3237   3303
EDECOO  82#
EDRDLY  175#   3647
EFCRST  64#    642    814    991    1161   1189   1230
EFRRST  62#    996    2462
EGDLT   44#    986    995    1006   1044   1047   1050   1075   1078   1135   1216   1227   1320   1928   3686   3693   3
EGDLTW  174#   3648
EGDTON  145#   1930   3745
EHCNTL  184#   403    1310
ELASDB  43#    849    1019   1184   1220   1227   1289   1296   1321   3770
ELST1   1474#  1476
ELSTBT  1717   1718   1724   1725   1732   1733   1741   1767   1779   1791#
EMOO10  2339#  2711
EMOOCK  2394#
EMOOSM  2360   2390#
EMTREB  40#    1019   1032   1052   1082   1228   3771
ENLAS   994#   1305   1330   1342   1372   1381   1390
EOCIA   63#    401    645    795    1282   1585   2539
EPARRD  60#
EPRDEC  65#    2450
EPRMCS  53#    953    970    1181   1535   1551   1559   1563   1649   1651   1692   1694
EPRMDI  41#    752    754    756
EPRMSK  42#    725    726    744    745    755    756    959    960
ER4B1   107#
ER4B4   110#
ER4B6   112#
ER4B7   113#
ER6B4   128#
ER6B5   129#
ER6B6   130#
```

| Symbol | | | | | | | | | | | | | | | |
|---|---|---|---|---|---|---|---|---|---|---|---|---|---|---|---|
| ER6B7 | 131# | | | | | | | | | | | | | | |
| ERAL | 136# | 1527 | | | | | | | | | | | | | |
| ERASE | 139# | | | | | | | | | | | | | | |
| ERASFL | 1528 | 1647# | | | | | | | | | | | | | |
| ERS2RM | 1471# | 1792 | 1884 | 1915 | | | | | | | | | | | |
| ESBFUL | 109# | 2224 | 3631 | 3926 | | | | | | | | | | | |
| ESCNG | 106# | 893 | 999 | 3660 | | | | | | | | | | | |
| ESDIS | 155# | 1294 | | | | | | | | | | | | | |
| ESEN | 154# | 1287 | | | | | | | | | | | | | |
| ESENT | 50# | | | | | | | | | | | | | | |
| ESR4CH | 97# | | | | | | | | | | | | | | |
| ESRCHR | 96# | | | | | | | | | | | | | | |
| ESRF13 | 98# | | | | | | | | | | | | | | |
| ESRPER | 99# | | | | | | | | | | | | | | |
| ESRRD | 61# | 395 | 2416 | | | | | | | | | | | | |
| ESRSDT | 100# | | | | | | | | | | | | | | |
| ETEST | 38# | 641 | 816 | 849 | 1113 | | | | | | | | | | |
| ETMARK | 39# | 863 | 865 | 877 | 879 | 1113 | | | | | | | | | |
| ETNCT1 | 186# | 1625 | | | | | | | | | | | | | |
| ETNCT2 | 187# | 1626 | | | | | | | | | | | | | |
| ETNCT3 | 188# | 1627 | | | | | | | | | | | | | |
| ETNCT4 | 189# | 1628 | | | | | | | | | | | | | |
| ETNFQ1 | 190# | 379 | | | | | | | | | | | | | |
| ETNFQ2 | 191# | 380 | | | | | | | | | | | | | |
| ETNFQ3 | 192# | 381 | | | | | | | | | | | | | |
| ETNFQ4 | 193# | 382 | | | | | | | | | | | | | |
| ETONCT | 148# | 1145 | | | | | | | | | | | | | |
| ETONE | 46# | 353 | 355 | 367 | 849 | 1184 | | | | | | | | | |
| ETONFQ | 149# | | | | | | | | | | | | | | |
| ETRMBY | 167# | 2501 | 2517 | 3920 | | | | | | | | | | | |
| EUP2SP | 51# | | | | | | | | | | | | | | |
| EVER00 | 117# | | | | | | | | | | | | | | |
| EVER13 | 119# | | | | | | | | | | | | | | |
| EVER8 | 121# | | | | | | | | | | | | | | |
| EVERA | 118# | 1835 | | | | | | | | | | | | | |
| EVERD1 | 122# | | | | | | | | | | | | | | |
| EVERD2 | 123# | | | | | | | | | | | | | | |
| EVERD3 | 124# | | | | | | | | | | | | | | |
| EVERD4 | 125# | | | | | | | | | | | | | | |
| EVERD5 | 126# | | | | | | | | | | | | | | |
| EVERE | 120# | | | | | | | | | | | | | | |
| EVLSIR | 52# | 1181 | 1183 | | | | | | | | | | | | |
| EWAIT | 173# | 174 | 175 | 2422 | 2460 | | | | | | | | | | |
| EWDS | 138# | 1560 | | | | | | | | | | | | | |
| EWEN | 135# | 1690 | | | | | | | | | | | | | |
| EXSBF2 | 2988# | 3085 | | | | | | | | | | | | | |
| EXSBF3 | 2990# | 3074 | | | | | | | | | | | | | |
| EXSBF4 | 2992# | 3067 | | | | | | | | | | | | | |
| EXSBFL | 2998# | 3003 | | | | | | | | | | | | | |
| EXSBFX | 2989 | 2991 | 2993# | | | | | | | | | | | | |
| FACTOR | 176# | 343 | 1023 | 1034 | 1053 | 1062 | 1146 | 1151 | 1157 | 1218 | 1221 | 1232 | | | |
| FILFF | 1758# | 1760 | | | | | | | | | | | | | |
| FLCKRT | 1776 | 1789 | 1801# | | | | | | | | | | | | |
| FLGCHK | 1882 | 1887# | | | | | | | | | | | | | |
| FLGPRG | 1811# | 3740 | | | | | | | | | | | | | |
| FREQAD | 374 | 378# | | | | | | | | | | | | | |
| GETLUP | 895# | 899 | | | | | | | | | | | | | |
| G00010 | 3727 | 3735# | | | | | | | | | | | | | |
| G00020 | 3732 | 3738# | | | | | | | | | | | | | |
| G00030 | 1831 | 3741# | | | | | | | | | | | | | |
| GOOORD | 3717 | 3725# | | | | | | | | | | | | | |
| HCOM10 | 2483 | 2489# | | | | | | | | | | | | | |
| HCOM20 | 2505 | 2508# | | | | | | | | | | | | | |
| HCOM30 | 2514 | 2518 | 2523# | | | | | | | | | | | | |
| HCOM40 | 2526 | 2529# | | | | | | | | | | | | | |
| HCOM55 | 2502 | 2536# | | | | | | | | | | | | | |
| HCOM80 | 2534 | 2539# | | | | | | | | | | | | | |
| HCOM90 | 2485 | 2490 | 2511 | 2542# | | | | | | | | | | | |
| HCOMM | 2482# | 3109 | 3641 | 3654 | 3676 | 3692 | 3702 | 3715 | 3722 | 3725 | | | | | |
| INCHNB | 2606# | 2782 | 2832 | 2884 | | | | | | | | | | | |
| INCLNB | 2612# | 2758 | 2815 | 2867 | | | | | | | | | | | |
| INCPNT | 1885 | 1902# | | | | | | | | | | | | | |
| INCX90 | 2610 | 2619# | | | | | | | | | | | | | |
| INCXRT | 2609 | 2616 | 2623# | | | | | | | | | | | | |
| INLAB1 | 1782 | 1786# | | | | | | | | | | | | | |
| INTSTR | 295# | 331 | 347 | | | | | | | | | | | | |
| INTTRP | 310# | | | | | | | | | | | | | | |
| L4S1 | 235# | 2135 | 2151 | 3345 | 3455 | 3869 | 3878 | | | | | | | | |
| L4S2 | 236# | | | | | | | | | | | | | | |
| L4SCNT | 237# | 2689 | 3078 | | | | | | | | | | | | |
| L4STOT | 238# | 1960 | 1997 | 3335 | 3440 | | | | | | | | | | |
| L6S1 | 223# | 914 | 1440 | 1976 | 1981 | 2146 | 2856 | 3016 | 3066 | 3196 | 3235 | 3248 | 3273 | 3301 | 3430 | 3445 | 3 |
| | 3863 | 3874 | | | | | | | | | | | | | |
| L6S2 | 224# | 1986 | 2873 | | | | | | | | | | | | |
| L6SCNT | 225# | 902 | 2853 | 2866 | 2870 | 2883 | 3063 | | | | | | | | |
| L6STOT | 226# | 1955 | 1971 | 2887 | 3034 | 3296 | 3327 | 3425 | | | | | | | |
| LASTBT | 1592 | 1595# | | | | | | | | | | | | | |
| LBDET | 1747 | 1750# | | | | | | | | | | | | | |
| LOOPCK | 916# | 923 | 928 | | | | | | | | | | | | |
| LSTBYT | 466 | 475 | 487# | | | | | | | | | | | | |
| LSTUSD | 297# | | | | | | | | | | | | | | |

```
MAJSG0  3065   3068#
MAJSG1  3072   3075#
MAJSG4  3080#  3091
MAJSG5  3081   3087#
MAJSGS  3063#  3108
MCH2BY  2640#  2753   2777
MCH3BY  2642#  2811   2828
MCH4BY  2644#  2863   2880
MCHXBY  2641   2643   2645#  2650
MCHXRT  2647   2651#
MOD104  2317#  3346   3349   3393   3397   3403   3450   3464   3495   3499   3530   3534   3565   3569   3605   3609   3
MOD106  2326#  3017   3021   3446
MOV2BY  2245#  2747   2771   3877   3879   3890   3897   3899   3901   3903   3909   3911   3913   3915   3917
MOV3BY  2247#  2341   2808   2825   3804   3806   3864   3875
MOV4BY  2249#  2860   2877
MOVXBY  2246   2248   2250#  2254
MRB0     199#
MRB1     209#
MRB1R4   210#
MTRC10  3757   3760#
MTRC20  3761#  3762
MTRCHK  3640   3682   3701   3755#
MTRE20  3778#  3784   3786
MTRE30  3779#  3780
MTRERR  3766   3770#
N1S1     245#  2123   3533   3614   3898   3916
N1S2     246#
N1SCNT   247#  2703
N1STOT   248#  2030   3524   3599
N2S1     250#  2139   3494   3884
N2S2     251#
N2SCNT   252#  2704
N2STOT   253#  2018   3484
N3S1     255#  2115   2129   3392   3604   3889   3912
N3S2     256#
N3SCNT   257#  2705
N3STOT   258#  2024   2046   3377   3589
N4S1     260#  2121   3564   3900   3908
N4S2     261#
N4SCNT   262#  2706
N4STOT   263#  2008   3554
N5S1     265#  2119   2127   3396   3529   3891   3896
N5S2     266#
N5SCNT   267#  2707
N5STOT   268#  2013   2040   3382   3519
N6S1     270#  2113   2133   3449   3608   3876   3914
N6S2     271#
N6SCNT   272#  2708
N6STOT   273#  1992   2035   3435   3594
NOLSBT  1740#
OCIRET  1597   1600#
OPREAD   134#   952
OVRERR  1410   1414   1425#
OVRRET  1423   1427#
OVRSET  1389   1405#
OVRST1   160#  1386
OWRITE   137#  1531
PARITY   478    481    488    492    671#   706   1589   2532
PDATA    435    441#
POW00   1171#  1177
POW10   1202#  1203
POW20   1227#
POW25   1233#  1234
POW30   1240#  1241
POWUP    307   1172#
PRO4C2  2742   2750#
PRO4C3  2748   2756#
PRO4C4  2754   2761#
PRO4C6  2766   2774#
PRO4C7  2772   2780#
PRO4C8  2778   2785#
PRO4CH  2690   2692   2702   2737#
PRO6C2  2806   2811#
PRO6C3  2809   2814#
PRO6C4  2812   2818#
PRO6C6  2823   2828#
PRO6C7  2826   2831#
PRO6C8  2829   2835#
PRO6CH  2719   2801#
PRO7C2  2858   2863#
PRO7C3  2861   2866#
PRO7C4  2864   2870#
PRO7C6  2875   2880#
PRO7C7  2878   2883#
PRO7C8  2881   2887#
PRO7CH  2683   2713   2718   2853#
PROCO5  2678   2685#
PROC3L  2680#
PROC8   2686#
PROC8L  2689#
PROC8R  2688   2691#
```

| | | | | | | | | | | | | | | |
|---|---|---|---|---|---|---|---|---|---|---|---|---|---|---|
| PROCA | 2685 | 2715# | | | | | | | | | | | | |
| PROCAL | 2718# | | | | | | | | | | | | | |
| PROCAR | 2717 | 2719# | | | | | | | | | | | | |
| PROCD | 2681# | 2695 | | | | | | | | | | | | |
| PROCDN | 2696# | | | | | | | | | | | | | |
| PROCDX | 2673 | 2694# | | | | | | | | | | | | |
| PROCE | 2674 | 2710# | | | | | | | | | | | | |
| PROCEX | 2712 | 2721# | 2759 | 2783 | 2789 | 2816 | 2833 | 2837 | 2868 | 2885 | 2889 | | | |
| PROCNT | 2699 | 2703# | | | | | | | | | | | | |
| PROCRT | 2671 | 2722# | | | | | | | | | | | | |
| PROCSG | 897 | 2669# | 3704 | | | | | | | | | | | |
| PROLAB | 1819 | 1823 | 1833# | | | | | | | | | | | |
| R4S1 | 240# | 2142 | 2153 | 3348 | 3402 | 3498 | 3568 | 3902 | 3910 | | | | | |
| R4S2 | 241# | | | | | | | | | | | | | |
| R4SCNT | 242# | 2691 | | | | | | | | | | | | |
| R4STOT | 243# | 1965 | 2003 | 3340 | 3387 | 3489 | 3559 | | | | | | | |
| R6S1 | 228# | 925 | 1450 | 1858 | 2144 | 2804 | 3020 | 3073 | 3805 | | | | | |
| R6S2 | 229# | 2821 | | | | | | | | | | | | |
| R6SCNT | 230# | 909 | 2801 | 2814 | 2818 | 2831 | 3070 | | | | | | | |
| R6STOT | 231# | 1950 | 2835 | 3041 | 3306 | 3331 | | | | | | | | |
| RAMRT | 993 | 1006# | | | | | | | | | | | | |
| RCRAM | 218# | 1339 | | | | | | | | | | | | |
| RDEPRM | 424 | 949# | 1250 | | | | | | | | | | | |
| RDLAB1 | 1772# | 1788 | | | | | | | | | | | | |
| RDLAB2 | 1774# | 1785 | | | | | | | | | | | | |
| RDT05 | 3633 | 3636# | | | | | | | | | | | | |
| RDT10 | 3640# | 3645 | 3655 | | | | | | | | | | | |
| RDT20 | 3642 | 3653# | | | | | | | | | | | | |
| RDT30 | 3649 | 3659# | | | | | | | | | | | | |
| RDT35 | 3663# | 3685 | 3688 | | | | | | | | | | | |
| RDT37 | 3666 | 3669 | 3675# | | | | | | | | | | | |
| RDT40 | 3680 | 3692# | | | | | | | | | | | | |
| RDT50 | 3701# | 3711 | 3720 | | | | | | | | | | | |
| RDT60 | 3697 | 3704# | | | | | | | | | | | | |
| RDT70 | 3708 | 3715# | | | | | | | | | | | | |
| RDT90 | 3723 | 3748# | | | | | | | | | | | | |
| RDTAG | 1259 | 1838 | 1933 | 3630# | 3696 | 3733 | 3752 | | | | | | | |
| RLACC | 722 | 724# | | | | | | | | | | | | |
| ROCIA | 1407 | 1580# | 1716 | 1723 | 1731 | 1739 | | | | | | | | |
| ROCIA1 | 1582# | 1583 | | | | | | | | | | | | |
| ROCIA2 | 1582 | 1584# | | | | | | | | | | | | |
| RSTTRP | 306# | 1126 | 1393 | | | | | | | | | | | |
| RTPRG | 1872 | 1876 | 1891 | 1923 | 1932# | | | | | | | | | |
| RTRCVR | 1752 | 1761 | 1766 | 1770# | 1909 | | | | | | | | | |
| RTRLAB | 1716 | 1764 | | | | | | | | | | | | |
| RTRM1 | 1896# | 1900 | | | | | | | | | | | | |
| RTRMRT | 1889 | 1893# | | | | | | | | | | | | |
| SAVEBT | 1412 | 1416# | | | | | | | | | | | | |
| SBFEND | 284# | | | | | | | | | | | | | |
| SBFPNT | 277# | 2227 | 2492 | 3921 | | | | | | | | | | |
| SBSTRT | 282# | 2228 | 3922 | | | | | | | | | | | | |
| SBUF | 281# | 282 | 283 | 2230 | 3831 | | | | | | | | | |
| SBUFAD | 280# | | | | | | | | | | | | | |
| SBUFSZ | 283# | 2231 | | | | | | | | | | | | |
| SCNBUF | 220# | 2204 | 2339 | 2343 | 2394 | 2428 | 2558 | 2568 | 2669 | 2741 | 2765 | 2805 | 2822 | 2857 | 2874 | 3678 |
| SCNFLG | 200# | | | | | | | | | | | | | |
| SDAT10 | 1366 | 1375# | | | | | | | | | | | | |
| SDAT11 | 1378 | 1384# | | | | | | | | | | | | |
| SDAT12 | 1387 | 1393# | 1394 | | | | | | | | | | | |
| SDATA | 1282# | 2467 | | | | | | | | | | | | |
| SDATA1 | 1287# | | | | | | | | | | | | | |
| SDATA2 | 1288 | 1292# | | | | | | | | | | | | |
| SDATA3 | 1295 | 1299# | | | | | | | | | | | | |
| SDATA4 | 1302 | 1308# | | | | | | | | | | | | |
| SDATA5 | 1311 | 1324# | | | | | | | | | | | | |
| SDATA6 | 1327 | 1333# | | | | | | | | | | | | |
| SDATA7 | 1336 | 1345# | | | | | | | | | | | | |
| SDATA8 | 1348 | 1354# | | | | | | | | | | | | |
| SDATA9 | 1357 | 1363# | | | | | | | | | | | | |
| SDATAH | 405 | 1312# | | | | | | | | | | | | |
| SEGBUF | 219# | | | | | | | | | | | | | |
| SETCS | 953# | 973 | | | | | | | | | | | | |
| SETDI | 748 | 751# | 759 | | | | | | | | | | | |
| SETDI1 | 751 | 754# | | | | | | | | | | | | |
| SFTLFT | 676# | 678 | | | | | | | | | | | | |
| SGSUM4 | 2267# | 2317 | | | | | | | | | | | | |
| SGSUM6 | 2271# | 2326 | 2359 | 2385 | | | | | | | | | | |
| SGSUMR | 2291 | 2296# | | | | | | | | | | | | |
| SGSUMX | 2269 | 2272# | | | | | | | | | | | | |
| SGSUMY | 2279 | 2284# | | | | | | | | | | | | |
| SHIFTL | 1442 | 1459 | 1665# | 1677 | | | | | | | | | | |
| SNOWRT | 1525 | 1689# | | | | | | | | | | | | |
| SOCIA | 438 | 442 | 479 | 482 | 489 | 493 | 699 | 707 | 789# | | | | | |
| SP2SCN | 1500 | 1506# | | | | | | | | | | | | |
| ST2SCN | 1502 | 1511# | | | | | | | | | | | | |
| STACK | 206# | 509 | | | | | | | | | | | | |
| STOCIA | 1498 | 1504# | | | | | | | | | | | | |
| STRAM1 | 161# | 1301 | | | | | | | | | | | | |
| STRRAM | 1304 | 1710# | | | | | | | | | | | | |
| STSDTA | 294# | 1284 | 1292 | 1299 | 1308 | 1324 | 1333 | 1345 | 1354 | 1363 | 1375 | 1384 | | |
| SUM12C | 3016# | 3202 | 3245 | 3278 | | | | | | | | | | |

| Symbol | | | | | | | | | | | | | | | | |
|---|---|---|---|---|---|---|---|---|---|---|---|---|---|---|---|---|
| SUM2BY | 2071# | 2114 | 2120 | 2122 | 2128 | 2134 | 2141 | 2143 | 2152 | 2154 | | | | | | |
| SUM3BY | 2069# | 2145 | | | | | | | | | | | | | | |
| SUM4BY | 2067# | 2147 | | | | | | | | | | | | | | |
| SWISET | 293# | 371 | 703 | 1253 | 1418 | 1494 | 1616 | 1817 | 3667 | | | | | | | |
| SWLATC | 66# | 700 | 1252 | 1821 | 3664 | | | | | | | | | | | |
| SWP4SJ | 2666# | 2687 | 2697 | | | | | | | | | | | | | |
| SWP4SN | 2558# | 2666 | | | | | | | | | | | | | | |
| SWP6SJ | 2667# | 2682 | 2710 | 2716 | | | | | | | | | | | | |
| SWP6SN | 2568# | 2667 | | | | | | | | | | | | | | |
| SWPXEX | 2566 | 2582# | | | | | | | | | | | | | | |
| SWPXRT | 2586 | 2673# | | | | | | | | | | | | | | |
| SWSET | 696# | 1380 | | | | | | | | | | | | | | |
| SWSET1 | 159# | 1377 | | | | | | | | | | | | | | |
| TASAVE | 213# | | | | | | | | | | | | | | | |
| TBER4J | 3373# | 3407 | 3503 | 3538 | 3573 | 3619 | | | | | | | | | | |
| TBER6J | 3374# | 3468 | | | | | | | | | | | | | | |
| TBERR4 | 3210# | 3329 | 3333 | 3353 | 3373 | | | | | | | | | | | |
| TBERR6 | 3203 | 3209# | 3253 | 3279 | 3308 | 3374 | | | | | | | | | | |
| TBLK1 | 3135 | 3425# | | | | | | | | | | | | | | |
| TBLK13 | 3121 | 3232# | | | | | | | | | | | | | | |
| TBLK2 | 3124 | 3270# | | | | | | | | | | | | | | |
| TBLK3 | 3153 | 3484# | | | | | | | | | | | | | | |
| TBLK4 | 3160 | 3519# | | | | | | | | | | | | | | |
| TBLK5 | 3147 | 3554# | | | | | | | | | | | | | | |
| TBLK6 | 3150 | 3377# | | | | | | | | | | | | | | |
| TBLK7 | 3157 | 3589# | | | | | | | | | | | | | | |
| TBLK8 | 3138 | 3327# | | | | | | | | | | | | | | |
| TBLKA | 3118 | 3193# | | | | | | | | | | | | | | |
| TBLKE | 3128 | 3296# | | | | | | | | | | | | | | |
| TBNONE | 3194 | 3200 | 3214# | 3233 | 3238 | 3243 | 3271 | 3276 | 3299 | 3304 | 3338 | 3343 | 3375 | | | |
| TBNONJ | 3375# | 3380 | 3385 | 3390 | 3428 | 3433 | 3438 | 3443 | 3487 | 3492 | 3522 | 3527 | 3557 | 3562 | 3592 | 3597 | 3
| TCKCNT | 903# | 911 | | | | | | | | | | | | | | |
| TCNT1 | 181# | | | | | | | | | | | | | | | |
| TCNT2 | 182# | | | | | | | | | | | | | | | |
| TERR02 | 1141# | | | | | | | | | | | | | | | |
| TERR04 | 1144# | 1155 | | | | | | | | | | | | | | |
| TERR06 | 1147# | 1148 | | | | | | | | | | | | | | |
| TERR08 | 1152# | 1153 | | | | | | | | | | | | | | |
| TERR10 | 1142 | 1157# | | | | | | | | | | | | | | |
| TERR12 | 1158# | 1159 | | | | | | | | | | | | | | |
| TERRWT | 1125 | 1135# | 1426 | 1795 | 3774 | | | | | | | | | | | |
| TEST1 | 854# | 885 | | | | | | | | | | | | | | |
| TEST2 | 856# | 884 | | | | | | | | | | | | | | |
| TEST3 | 859# | 859 | | | | | | | | | | | | | | |
| TEST4 | 872# | 872 | | | | | | | | | | | | | | |
| TH005 | 1322 | 1394# | | | | | | | | | | | | | | |
| TIME05 | 338 | 340# | | | | | | | | | | | | | | |
| TIME10 | 341 | 343# | 368 | | | | | | | | | | | | | |
| TIME20 | 344# | 376 | | | | | | | | | | | | | | |
| TIME30 | 335 | 352# | | | | | | | | | | | | | | |
| TIME40 | 354 | 356# | | | | | | | | | | | | | | |
| TIME50 | 363 | 365# | | | | | | | | | | | | | | |
| TIME60 | 357 | 366 | 369# | | | | | | | | | | | | | |
| TIMER | 327# | | | | | | | | | | | | | | | |
| TIMREG | 203# | | | | | | | | | | | | | | | |
| TIMTRP | 313# | | | | | | | | | | | | | | | |
| TMOT10 | 1024# | 1025 | | | | | | | | | | | | | | |
| TMOT20 | 1033# | | | | | | | | | | | | | | | |
| TMOT22 | 1034# | 1045 | 1048 | | | | | | | | | | | | | |
| TMOT24 | 1035# | 1037 | | | | | | | | | | | | | | |
| TMOT28 | 1041 | 1050# | | | | | | | | | | | | | | |
| TMOT40 | 1054# | 1055 | | | | | | | | | | | | | | |
| TMOT50 | 1029 | 1061# | | | | | | | | | | | | | | |
| TMOT60 | 1062# | 1076 | 1079 | | | | | | | | | | | | | |
| TMOT80 | 1063# | 1065 | | | | | | | | | | | | | | |
| TMOT90 | 1058 | 1072 | 1082# | | | | | | | | | | | | | |
| TMOT95 | 1068 | 1088# | | | | | | | | | | | | | | |
| TMOTOR | 1019# | 1118 | | | | | | | | | | | | | | |
| TOC10 | 653# | 657 | | | | | | | | | | | | | | |
| TOC20 | 655 | 657# | | | | | | | | | | | | | | |
| TOC50 | 651 | 659# | | | | | | | | | | | | | | |
| TOCIA | 641# | 1107 | | | | | | | | | | | | | | |
| TOCRET | 660 | 1108# | | | | | | | | | | | | | | |
| TON1CT | 359 | 1209 | 1245 | 1614# | | | | | | | | | | | | |
| TONADD | 1619 | 1624# | | | | | | | | | | | | | | |
| TONCNT | 211# | | | | | | | | | | | | | | | |
| TONLTH | 212# | | | | | | | | | | | | | | | |
| TPON | 1095# | 1195 | | | | | | | | | | | | | | |
| TPON15 | 1222# | 1223 | | | | | | | | | | | | | | |
| TPON20 | 1098 | 1102# | | | | | | | | | | | | | | |
| TPON30 | 1103 | 1107# | | | | | | | | | | | | | | |
| TPON40 | 1108 | 1112# | | | | | | | | | | | | | | |
| TPON50 | 1114 | 1118# | | | | | | | | | | | | | | |
| TPON60 | 1119 | 1123# | | | | | | | | | | | | | | |
| TPON90 | 1100 | 1105 | 1110 | 1116 | 1121 | 1125# | | | | | | | | | | |
| TPORET | 1123 | 1196# | | | | | | | | | | | | | | |
| TRAM | 573# | 1102 | | | | | | | | | | | | | | |
| TRAM10 | 574# | 576 | | | | | | | | | | | | | | |
| TRAM20 | 580# | 583 | | | | | | | | | | | | | | |
| TRAM30 | 587# | 595 | | | | | | | | | | | | | | |
| TRAM40 | 599# | 607 | | | | | | | | | | | | | | |

```
TRAM50   611#   619
TRAM60   623#   631
TRAMER   582    603    627    634#
TRARET   634    1103#
TREPRM   416#   1341
TRNDTA   1534#  1557
TRNFLG   1438#  1908
TRO10    522#   536
TRO20    531#   534
TRO50    531    542#
TROMSM   509#   1095
TROPG0   498#   549
TROPG1   550    801#
TROPG2   551    1009#
TROPG3   552    1261#
TROPG4   553    1479#
TROPG5   554    1697#
TROPG6   555    1935#
TROPG7   556    2164#
TROPG8   557    2471#
TROPG9   558    2653#
TROPGA   559    2839#
TROPGB   560    3094#
TROPGC   561    3356#
TROPGD   562    3622#
TROPGE   563    3788#
TROPGF   564    3940#
TRORET   538    1096#
TROTAB   523    549#
TRPRM1   158#   1335
TRPRM2   162#   1365
TRRAM    427#   1371
TRYBLK   3118#
TSCBUF   183#
TSEG1    179#   1318
TSEG2    180#
TST31    862    865#
TST32    864    869#
TST41    876    879#
TST42    878    883#
TTA90    907    919    934#
TTACHK   915    936#
TTAG     814#   1112
TTARET   934    1113#
TTATAB   812#   817
TWOLAB   279#   1249   1369   1473   1530   1713   1771   1773   1894   1895   1907
TXRET    439    496#
UNPACK   446#
UNPAK1   452#   484
UNPK1    822#   845
UNPK2    826#   843
VALFLG   1875   1879#
VER13    3122   3171#
VER8     3139   3169#
VERA     3119   3172#
VERD1    3136   3168#
VERD2    3154   3167#
VERD3    3151   3166#
VERD4    3161   3165#
VERD5    3158   3164#
VERE     3129   3170#
VERFLG   202#
VERT05   3135#
VERT10   3125   3142#
VERT15   3147#
VERT20   3148   3157#
VERT90   3174#
VERTAG   3108#  3716
WAIT     771#   1553   1653
WAIT0    774#   776
WAIT1    775#   775
WRACC    741#   957    1538   1543   1549   1562   1650   1693
WREPRM   1329   1523#  1926
WRKBUF   287#   2340   2355   2364   2375   2384
WRPRM1   157#   1326
WRTPRM   1913   1926#
```

CROSS REFERENCE COMPLETE

It is seen that the scanner of the present invention and the method by which the scanner is programmed facilitate programming the scanner. The technician repairing or installing the scanner need not have a portable terminal or access to the host computer in order to be able to program the scanner. Only properly encoded bar code labels are required. Having described the invention in detail and by reference to the preferred embodiment thereof, it will be apparent that other modifications and variations are possible without departing from the scope of the invention defined in the appended claims.

What is claimed is:

1. A scanner for scanning bar code labels and for providing data related thereto to a host computer, comprising:

scanning means for optically scanning bar code labels and providing an electrical signal in response thereto, decoding means, responsive to said scanning means for translating said electrical signal into a digital signal, microprocessor means, responsive to said decoding means, for controlling operation of said scanner and for translating said digital signal into data to be provided to the associated host computer under control of control characters, a non-volatile random access control memory in which control characters are stored, interface means, connected to said host computer and to said microprocessor means, for transferring data from said microprocessor means to said host computer, and switch means for enabling said microprocessor to translate said digital into control characters and for enabling said microprocessor to store said control characters in said non-volatile random access control memory.

2. The scanner of claim 1 in which said non-volatile random access control memory comprises an electrically erasable programmable read only memory.

3. The scanner of claim 1 in which said interface means comprises an optically isolated interface.

4. The scanner of claim 2 in which said non-volatile random access control memory comprises an EEPROM memory device.

5. The scanner of claim 1 in which said control characters are character sets which when read by the scanner indicate that two bar code labels are associated with the same item.

6. A scanner for scanning bar code labels on products presented to the scanner and for providing the data from the bar code labels to a host computer, comprising:

scanning means for optically scanning bar code labels and providing an electrical signal in response thereto, decoding means, responsive to said scanning means, for translating said electrical signal into a digital signal, a non-volatile random access control memory in which a plurality of sets of control characters are stored, said sets of control characters defining characters which, if detected on a pair of successively scanned labels, indicate that the labels are affixed to the same product and further indiate which is the first and which is the second of the label pair, microprocessor means, responsive to said decoding means, for controlling operation of said scanner and for translating said digital signal into data to be provided to the associated host computer under control of control characters, interface means, connected to said host computer and to said microprocessor means, for transferring data from said microprocessor means to said host, and switch means for enabling said microprocessor means to translate said digital signal into control characters and for enabling said microprocessor to store said control characters in said non-volatile random access control memory.

7. The scanner of claim 6 in which said non-volatile random access control memory comprises an electrically erasable programmable rad only memory.

8. The scanner of claim 7 in which said non-volatile random access control memory comprises an EEPROM memory device.

9. The scanner of claim 7 in which said non-volatile random access control memory comprises a NOVRAM memory device.

10. A method of programming a bar code scanner of the type which optically scans bar code labels, said scanner including a switch and a non-volatile control memory in which at least one set of control characters is stored, said set of control characters defining characters which, if detected on a pair of successively scanned labels, indicate that the labels are affixed to the same product and further indicate which is the first and which is the second of the label pair, actuation of said switch indicating that control characters encoded on bar code labels which are scanned are to be stored in said non-volatile control memory, comprising the steps of:

(a) providing at least one bar code label having sets of control characters encoded thereon, (b) actuating said switch, (c) scanning said at least one bar code label, (d) storing said set of control characters in said control memory, and (e) deactuating said switch.

11. A method of programming a scanner of the type which optically scans bar code labels, said scanner including a non-volatile control memory in which control characters are stored, comprising the steps of:

(a) providing a programming bar code label with control characters encoded thereon;

(b) scanning said programming bar code label with said scanner;

(c) transmitting said control characters to said scanner non-volatile control memory for storage therein.

12. The method of claim 11 in which said control characters are character sets which when read by the scanner indicate that two bar code labels are associated with the same item.

* * * * *

UNITED STATES PATENT AND TRADEMARK OFFICE
CERTIFICATE OF CORRECTION

PATENT NO. : 4,861,972

DATED : August 29, 1989

INVENTOR(S) : Randy D. Elliott and Nicolas N. Tabet

It is certified that error appears in the above-identified patent and that said Letters Patent is hereby corrected as shown below:

```
Col. 1, line 28 "bea" should be --beam--.
Col. 1, line 54 "ae" should be --are--.
Col. 2, line 10 "tbhe" should be --the--.
Col. 3, line 61 "which read" should be --which when read--.
Col. 4, line 33 "hosst" should be --host--.
Col. 5, line 20 "interactionof" should be --interaction of--.
Col. 6, line 7 "ad" should be --and--.
Col. 228, line 13, claim 7 "rad" should be --read--.
```

Signed and Sealed this

Twenty-eighth Day of August, 1990

Attest:

HARRY F. MANBECK, JR.

*Attesting Officer*     *Commissioner of Patents and Trademarks*

REEXAMINATION CERTIFICATE (4226th)

United States Patent [19]
Elliott et al.

[11] B1 4,861,972
[45] Certificate Issued Dec. 5, 2000

[54] BAR CODE SCANNER AND METHOD OF PROGRAMMING

[75] Inventors: Randy D. Elliott; Nicholas N. Tabet, both of Eugene, Oreg.

[73] Assignee: Spectra-Physics Scanning Systems, Inc., Eugene, Oreg.

Reexamination Request:
No. 90/003,963, Sep. 22, 1995

Reexamination Certificate for:
Patent No.: 4,861,972
Issued: Aug. 29, 1989
Appl. No.: 07/116,962
Filed: Nov. 5, 1987

Certificate of Correction issued Aug. 28, 1990.

[51] Int. Cl.[7] .................................................. G06F 17/00
[52] U.S. Cl. ............................ 235/462.15; 235/462.25; 235/462.45; 235/375; 235/436; 708/141
[58] Field of Search ..................... 235/462.15, 462.25, 235/462.45, 462.46, 375, 470, 472.01, 472.02

[56] References Cited

U.S. PATENT DOCUMENTS

| | | | |
|---|---|---|---|
| 4,409,470 | 10/1983 | Shepard et al. | 235/472 |
| 4,431,912 | 2/1984 | Dickson et al. | 235/462 |
| 4,481,412 | 11/1984 | Fields | 235/472 |
| 4,516,016 | 5/1985 | Kodron | 235/472 |
| 4,603,262 | 7/1986 | Eastman et al. | 235/472 |
| 4,608,487 | 8/1986 | Awane | 235/383 |
| 4,682,015 | 7/1987 | Quan | 235/472 |
| 4,825,058 | 4/1989 | Poland | 235/472 |
| 4,868,375 | 9/1989 | Blanford | 235/462 |

OTHER PUBLICATIONS

Intermec 9511 Online Reader Manual (No Date).
Insta Read Model 310/350 Bar Code Scanner Operator's Manual (No Date).
Insta Read Model 380 Bar Code Scanner Operator's Manual (No Date).
Welch Allyn HBD–E2 Bar Code Decoder Product Manual (No Date).
Welch Allyn HBD–E Bar Code Decoder Programming Menu (No Date).
Spectra–Physics Model 2001 hand held laser scanner brochure (No Date).

*Primary Examiner*—Michael G. Lee

[57] ABSTRACT

The scanner includes scanning circuitry for optically scanning bar code labels and providing an electrical signal in response thereto, decoding circuitry, responsive to the scanning circuitry for translating the electrical signal into a digital signal, and a microprocessor, responsive to the decoding circuitry, for controlling operation of the scanner and for translating the digital signal into data to be provided to the associated host computer under control of control characters. A non-volatile random access control memory is provided for storing control characters. Interface circuitry, connected to the host computer and to the microprocessor, transfers data from the microprocessor to the host computer. A switch enables the microprocessor to translate the digital signal into control characters and enables the microprocessor to store the control characters in the non-volatile random access control memory. The control characters may be character sets which when read by the scanner indicate that two bar code labels are associated with the same item.

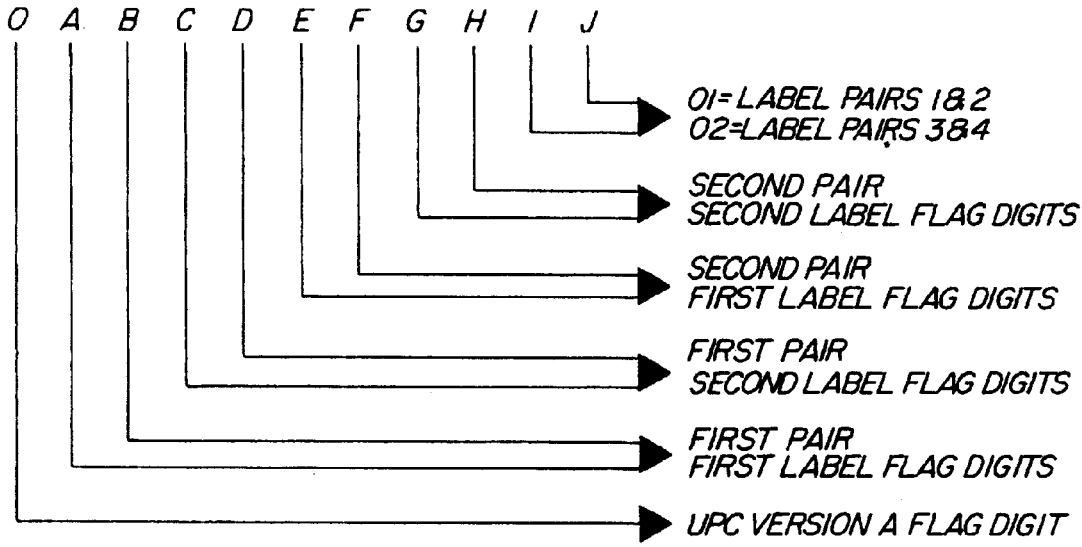

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 57–68 through column 2, lines 1–9:

Each scanner typically includes a microprocessor which performs a number of functions, including recognizing the electrical signals produced when a label is scanned. Previously, the valid character set for indicating "first" and "second" labels where the labels are affixed to the same product have been stored in the random access memory of the microprocessor, or have been manually set by means of mechanical switches. Both approaches are disadvantageous. Either the character set cannot be easily changed, or the [chacter] *character* set is not maintained in memory when the scanner is turned off and must be reloaded upon resumption of operation. To avoid these difficulties, a scanner system has been developed in which a number of character sets may be stored in an electrically erasable programmable read only memory associated with the scanner microprocessor. Such a system is disclosed in U.S. patent application Ser. No. 122,743, filed Nov. 19, 1987, *now U.S. Pat. No. 4,866,257* entitled BAR CODE SCANNER AND METHOD, assigned to the assignee of the present invention, which is incorporated herein by reference.

Column 4, lines 29–51:

The scanner 12 includes interface circuitry 14 which communicates with the host computer over line 16. Line 16, although illustrated by a single line in FIG. 1, is actually a plurality of lines which provide for two way communication between [hosst] *host* computer 10 and each of scanners 12, as described more fully in copending U.S. patent application Ser. No. 122,743, filed Nov. 19, 1987, *now U.S. Pat. No. 4,866,257* entitled BAR CODE SCANNER AND METHOD. Transmission of data over line 16 is accomplished in a serial format.

A microprocessor means 18 is responsive to scanning circuitry 20 and decoding circuitry 22 for controlling operation of the scanner, identifying the characters on the scanned labels and transmitting the data produced by the scanning operation to the host computer 10 via interface means 14 over the line 16. Scanning means 20 optically scans bar code labels and provides an electrical signal in response thereto. Decoding means 22 is responsive to the scanning means 20 for translating the electrical signal into a digital signal. An example of such circuitry is shown in U.S. patent Ser. No. 063,538, filed Jun. 18, 1987, *now U.S. Pat. No. 4,749,879* entitled SIGNAL TRANSITION DETECTION METHOD AND SYSTEM.

AS A RESULT OF REEXAMINATION, IT HAS BEEN DETERMINED THAT:

The patentability of claim 10 is confirmed.

Claim 11 is cancelled.

Claims 1, 6 and 12 are determined to be patentable as amended.

Claims 2–5 and 7–9, dependent on an amended claim, are determined to be patentable.

New claims 13–27 are added and determined to be patentable.

1. A scanner for scanning bar code labels and for providing data related thereto to a host computer, comprising:
   scanning means for optically scanning bar code labels and providing an electrical signal in response thereto,
   decoding means, responsive to said scanning means for translating said electrical signal into a digital signal,
   microprocessor means, responsive to said decoding means, for controlling operation of said scanner and for translating said digital signal into data to be provided to the associated host computer under control of control characters,
   a non-volatile random access control memory in which control characters are stored,
   interface means, connected to said host computer and to said microprocessor means, for transferring data from said microprocessor means to said host computer, and
   switch means for enabling said microprocessor to translate said digital *signal* into control characters and for enabling said microprocessor to store said control characters in said non-volatile random access control memory.

6. A scanner for scanning bar code labels on products presented to the scanner and for providing the data from the bar code labels to a host computer, comprising:
   scanning means for optically scanning bar code labels and providing an electrical signal in response thereto,
   decoding means, responsive to said scanning means, for translating said electrical signal into a digital signal,
   a non-volatile random access control memory in which a plurality of sets of control characters are stored, said sets of control characters defining characters which, if detected on a pair of successively scanned labels, indicate that the labels are affixed to the same product and further [indiate] *indicate* which is the first and which is the second of the label pair,
   microprocessor means, responsive to said decoding means, for controlling operation of said scanner and for translating said digital signal into data to be provided to the associated host computer under control of control characters,
   interface means, connected to said host computer and to said microprocessor means, for transferring data from said microprocessor means to said host, and
   switch means for enabling said microprocessor means to translate said digital signal into control characters and for enabling said microprocessor to store said control characters in said non-volatile random access control memory.

12. [The] *A* method of [claim 11 in which] *programming a scanner of the type which optically scans bad code labels,* said scanner including a non-volatile control memory in which control characters are stored, comprising the steps of:

(a) providing a programming bar code label with control characters encoded thereon;

(b) scanning said programming bar code label with said scanner;

(c) transmitting said control characters to said scanner non-volatile control memory for storage therein, wherein said control characters are character sets which when read by the scanner indicate that two bar code labels are associated with the same item.

13. The scanner of claim 1 wherein the switch means comprises a mechanical switch.

14. The scanner of claim 1 wherein said switch means indicates to the scanner that subsequent bar code labels to be scanned contain data characters.

15. The scanner of claim 5 wherein the character sets indicate which is the first and which is the second of the two bar code labels.

16. The scanner of claim 5 wherein each character set associated with a bar code label comprises at least one control character for storage in the non-volatile random access control memory.

17. The scanner of claim 1 wherein the control characters once decoded are stored directly into the non-volatile random access control memory without further conversion.

18. The scanner of claim 6 wherein the switch means comprises a mechanical switch.

19. The scanner of claim 6 wherein said switch means indicates to the scanner that subsequent bar code labels to be scanned contain data characters.

20. The method of claim 10 wherein the step of actuating said switch comprises actuating a mechanical switch.

21. The method of claim 10 wherein the step of deactuating said switch indicates to the scanner that subsequent bar code labels to be scanned contain data characters.

22. The method of claim 10 wherein the set of control characters once decoded is stored directly into the control memory without further conversion.

23. A method of programming a scanner of the type which optically scans bar code labels, said scanner including a non-volatile control memory in which control characters are stored, comprising the steps of:

(a) providing a programming bar code label with control characters encoded thereon;

(b) scanning said programming bar code label with said scanner;

(c) transmitting said control characters to said scanner non-volatile control memory for storage therein, wherein said control characters are character sets which when read by the scanner indicate that two bar code labels are associated with the same item and further indicate which is a first label and which is a second label of the two bar code labels.

24. A method of programming a scanner of the type which optically scans bar code labels providing an electrical signal in response thereto, said scanner including circuitry for translating the electrical signal into a digital signal, microprocessor means for controlling operation of the scanner and translating the digital signal into data, and a non-volatile control memory in which control characters are stored, comprising the steps of:

(a) providing a programming bar code label with control characters encoded thereon;

(b) scanning said programming bar code label with said scanner;

(c) transmitting said control characters to said scanner non-volatile control memory for storage therein, wherein said programming bar code label having control characters encoded thereon is a bar code label that is modified from a bar code symbology selected from the group consisting of: UPC, EAN or JAN symbology.

25. A method of programming a scanner of the type which optically scans bar code labels, said scanner including a non-volatile control memory in which control characters are stored, comprising the steps of:

(a) providing a programming bar code label with control characters encoded thereon;

(b) scanning said programming bar code label with said scanner;

(c) transmitting said control characters to said scanner non-volatile control memory for storage therein;

(d) actuating a switch to indicate to the scanner that a subsequent bar code label to be scanned contains control characters to be stored in the non-volatile control memory;

(e) deactuating the switch to indicate to the scanner that subsequent bar code labels to be scanned contain data characters.

26. The method of claim 25 further comprising (f) decoding the control characters on the bar code label for storage in the non-volatile control memory.

27. The method of claim 25 wherein the step of actuating said switch comprises actuating a mechanical switch.

* * * * *